US011812258B2

(12) United States Patent
Li

(10) Patent No.: US 11,812,258 B2
(45) Date of Patent: Nov. 7, 2023

(54) SYSTEMS AND METHODS FOR PROGRAMMING, CONTROLLING AND MONITORING WIRELESS NETWORKS

(71) Applicant: Sol Mingso Li, Elk Grove, CA (US)

(72) Inventor: Sol Mingso Li, Elk Grove, CA (US)

( * ) Notice: Subject to any disclaimer, the term of this patent is extended or adjusted under 35 U.S.C. 154(b) by 263 days.

(21) Appl. No.: 16/870,965

(22) Filed: May 9, 2020

(65) Prior Publication Data

US 2020/0344602 A1 Oct. 29, 2020

Related U.S. Application Data

(63) Continuation-in-part of application No. 15/978,018, filed on May 11, 2018, now Pat. No. 10,652,735, (Continued)

(51) Int. Cl.

| | |
|---|---|
| ***H04W 12/04*** | (2021.01) |
| ***H04W 8/20*** | (2009.01) |
| ***H04W 8/18*** | (2009.01) |
| ***H04L 67/125*** | (2022.01) |
| ***H04L 67/1097*** | (2022.01) |

(Continued)

(52) U.S. Cl.

CPC ............ *H04W 12/04* (2013.01); *G08B 5/222* (2013.01); *G08B 21/24* (2013.01); *H04L 12/2809* (2013.01); *H04L 67/1097* (2013.01); *H04L 67/125* (2013.01); *H04M 3/42008* (2013.01); *H04W 4/90* (2018.02); *H04W 8/186* (2013.01); *H04W 8/20* (2013.01); *H04W 8/205* (2013.01); *H04W 12/35* (2021.01); *H04L 2012/2841* (2013.01); *H04W 4/70* (2018.02);

(Continued)

(58) Field of Classification Search

CPC ..... H04W 12/04; H04W 12/06; H04W 12/08; H04W 12/35; H04W 12/71; H04W 4/70; H04W 4/90; H04W 8/18; H04W 8/186; H04W 8/20; H04W 8/205; G08B 5/222; G08B 21/24; H04L 12/2809; H04L 67/1097; H04L 67/125; H04L 2012/2841; H04M 3/42008; G08C 17/02

See application file for complete search history.

(56) References Cited

U.S. PATENT DOCUMENTS 5,850,180 A 12/1998 Hess
5,918,180 A 6/1999 Dimino
(Continued)

OTHER PUBLICATIONS

ISA/US, "International Search Report and Written Opinion" corresponding PCT Application No. PCT/US2014/57880, dated Jan. 9, 2015, 16 pages.

(Continued)

*Primary Examiner* — Orlando Bousono
(74) *Attorney, Agent, or Firm* — Kang S. Lim

(57) ABSTRACT

A system for programming, controlling and monitoring wireless networks enabling a wireless device (Dev) being utilized and integrated into car electronic control module or home (or business) alarm/security system. This system also presents a general control (robotic) device, which controls general input and output functions, where plurality of cellular handsets, internet devices can co-control, monitor, share and exchange information through the cellular, the internet networks and other wire/wireless network.

9 Claims, 73 Drawing Sheets

Related U.S. Application Data which is a continuation-in-part of application No. 15/669,867, filed on Aug. 4, 2017, now abandoned, which is a continuation of application No. 15/141,373, filed on Apr. 28, 2016, now Pat. No. 9,736,688, and a continuation-in-part of application No. 14/497,248, filed on Sep. 25, 2014, now Pat. No. 9,734,694.

(60) Provisional application No. 62/154,659, filed on Apr. 29, 2015, provisional application No. 61/887,321, filed on Oct. 4, 2013.

(51) Int. Cl.

| | |
|---|---|
| ***H04M 3/42*** | (2006.01) |
| ***G08B 5/22*** | (2006.01) |
| ***G08B 21/24*** | (2006.01) |
| ***H04W 4/90*** | (2018.01) |
| ***H04L 12/28*** | (2006.01) |
| ***H04W 12/30*** | (2021.01) |
| *H04W 12/08* | (2021.01) |
| *H04W 4/70* | (2018.01) |
| *H04W 12/71* | (2021.01) |

(52) U.S. Cl.

CPC .............. *H04W 8/18* (2013.01); *H04W 12/08* (2013.01); *H04W 12/71* (2021.01)

(56) References Cited

U.S. PATENT DOCUMENTS

| | | | | |
|---|---|---|---|---|
| 5,966,654 | A | 10/1999 | Croughwell et al. | |
| 6,049,273 | A | 4/2000 | Hess | |
| 6,441,731 | B1 | 8/2002 | Hess | |
| 6,564,056 | B1 | 5/2003 | Fitzgerald | |
| 7,323,970 | B1 | 1/2008 | Murray | |
| 7,412,231 | B1 | 8/2008 | Kelleher | |
| 8,131,281 | B1 | 3/2012 | Hildner | |
| 8,140,062 | B1 | 3/2012 | Hildner | |
| 8,331,990 | B2 | 12/2012 | Larsson | |
| 8,373,538 | B1 | 2/2013 | Hildner | |
| 2003/0162533 | A1 | 8/2003 | Moles | |
| 2003/0171111 | A1 | 9/2003 | Clark | |
| 2004/0240653 | A1 | 12/2004 | Ramian | |
| 2004/0242209 | A1 | 12/2004 | Kruis et al. | |
| 2005/0068938 | A1 | 3/2005 | Wang | |
| 2005/0113113 | A1 | 5/2005 | Reed | |
| 2005/0143134 | A1* | 6/2005 | Harwood ............ | H04M 1/6091 455/563 |
| 2005/0232186 | A1 | 10/2005 | Karaoguz | |
| 2005/0232210 | A1 | 10/2005 | Karaoguz | |
| 2005/0232242 | A1 | 10/2005 | Karaoguz | |
| 2005/0232284 | A1 | 10/2005 | Karaoguz | |
| 2005/0233693 | A1 | 10/2005 | Karaoguz | |
| 2005/0233735 | A1 | 10/2005 | Karaoguz | |
| 2005/0233744 | A1 | 10/2005 | Karaoguz | |
| 2005/0239445 | A1 | 10/2005 | Karaoguz | |
| 2005/0277431 | A1 | 12/2005 | White | |
| 2006/0025132 | A1 | 2/2006 | Karaoguz | |
| 2006/0030339 | A1 | 2/2006 | Zhovnirovsky | |
| 2006/0073808 | A1 | 4/2006 | Buchert | |
| 2006/0140350 | A1 | 6/2006 | Jorasch | |
| 2006/0154642 | A1 | 7/2006 | Scannell, Jr. | |
| 2006/0203969 | A1 | 9/2006 | Jorasch | |
| 2006/0203970 | A1 | 9/2006 | Jorasch | |
| 2006/0219776 | A1 | 10/2006 | Finn | |
| 2006/0248342 | A1 | 11/2006 | Bajar | |
| 2007/0086579 | A1 | 4/2007 | Lorello | |
| 2007/0111756 | A1 | 5/2007 | Reed | |
| 2007/0207795 | A1 | 9/2007 | Roundtree | |
| 2007/0291683 | A1 | 12/2007 | Bonner | |
| 2008/0057929 | A1 | 3/2008 | Min | |
| 2008/0108388 | A1 | 5/2008 | Ebrom | |
| 2008/0197992 | A1 | 8/2008 | Murray | |
| 2009/0022129 | A1 | 1/2009 | Karaoguz | |
| 2009/0163140 | A1* | 6/2009 | Packham ................ | H04L 67/02 455/557 |
| 2009/0209241 | A1 | 8/2009 | Karaoguz | |
| 2009/0215388 | A1 | 8/2009 | Karaoguz | |
| 2009/0273438 | A1 | 11/2009 | Sultan | |
| 2010/0075657 | A1 | 3/2010 | Gonsalves | |
| 2010/0145730 | A1 | 6/2010 | Abreu | |
| 2010/0279669 | A1 | 11/2010 | Roundtree | |
| 2010/0292886 | A1 | 11/2010 | Szczerba et al. | |
| 2011/0021234 | A1 | 1/2011 | Tibbitts et al. | |
| 2011/0026436 | A1 | 2/2011 | Karaoguz | |
| 2011/0092197 | A1 | 4/2011 | Gonsalves | |
| 2011/0109431 | A1* | 5/2011 | Bragagnini .............. | G07C 9/38 340/5.52 |
| 2011/0112969 | A1* | 5/2011 | Zaid ...................... | H04W 4/027 701/2 |
| 2011/0197266 | A1 | 8/2011 | Chu et al. | |
| 2011/0244846 | A1 | 10/2011 | Min | |
| 2011/0310806 | A1 | 12/2011 | Karaoguz | |
| 2012/0022958 | A1 | 1/2012 | de Sylva | |
| 2012/0069799 | A1 | 3/2012 | Karaoguz | |
| 2012/0268241 | A1 | 10/2012 | Hanna | |
| 2012/0286930 | A1 | 11/2012 | Kim | |
| 2012/0313746 | A1 | 12/2012 | Rahman | |
| 2012/0323763 | A1 | 12/2012 | Michael | |
| 2012/0323767 | A1 | 12/2012 | Michael | |
| 2012/0323769 | A1 | 12/2012 | Michael | |
| 2012/0329431 | A1 | 12/2012 | Dossas | |
| 2013/0006775 | A1 | 1/2013 | Jordan et al. | |
| 2013/0012207 | A1 | 1/2013 | Chatterjee et al. | |
| 2013/0046691 | A1 | 2/2013 | Culton | |
| 2013/0057695 | A1 | 3/2013 | Huisking | |
| 2013/0080251 | A1 | 3/2013 | Dempski | |
| 2013/0109341 | A1 | 5/2013 | Haywood | |
| 2013/0144486 | A1 | 6/2013 | Ricci | |
| 2013/0204466 | A1* | 8/2013 | Ricci ....................... | G06F 17/00 701/2 |
| 2013/0210360 | A1 | 8/2013 | Ljung et al. | |
| 2013/0245882 | A1 | 9/2013 | Ricci | |
| 2013/0265136 | A1 | 10/2013 | Wadia | |
| 2013/0290522 | A1 | 10/2013 | Behm, Jr. | |
| 2013/0307670 | A1 | 11/2013 | Ramaci | |
| 2014/0070957 | A1 | 3/2014 | Longinotti-Buitoni | |
| 2014/0073291 | A1 | 3/2014 | Hildner | |
| 2014/0098247 | A1* | 4/2014 | Rao ....................... | H04L 67/125 455/420 |
| 2014/0121883 | A1 | 5/2014 | Shen et al. | |
| 2014/0121890 | A1 | 5/2014 | Gercekci | |
| 2014/0159877 | A1* | 6/2014 | Huang .................. | G08C 17/02 340/12.5 |
| 2014/0337221 | A1 | 11/2014 | Hoyos | |
| 2014/0364169 | A1 | 12/2014 | Hicks, III | |
| 2015/0097669 | A1 | 4/2015 | Li | |
| 2015/0161377 | A1 | 6/2015 | Rodzevski et al. | |
| 2017/0212511 | A1 | 7/2017 | Paiva Ferreira et al. | |

OTHER PUBLICATIONS

USPTO, ISA/US, "Notification of Transmittal of the International Search Report and the Written Opinion of the International Searching Authority, or The Declaration", dated Aug. 8, 2016, 7 pages.

ISA/US, "Notification of Transmittal of the ISR and the WO of the International Searching Authority or The Declaration", in PCT Application No. PCT/US2019/030901, dated Aug. 2, 2019, 23 pages.

* cited by examiner

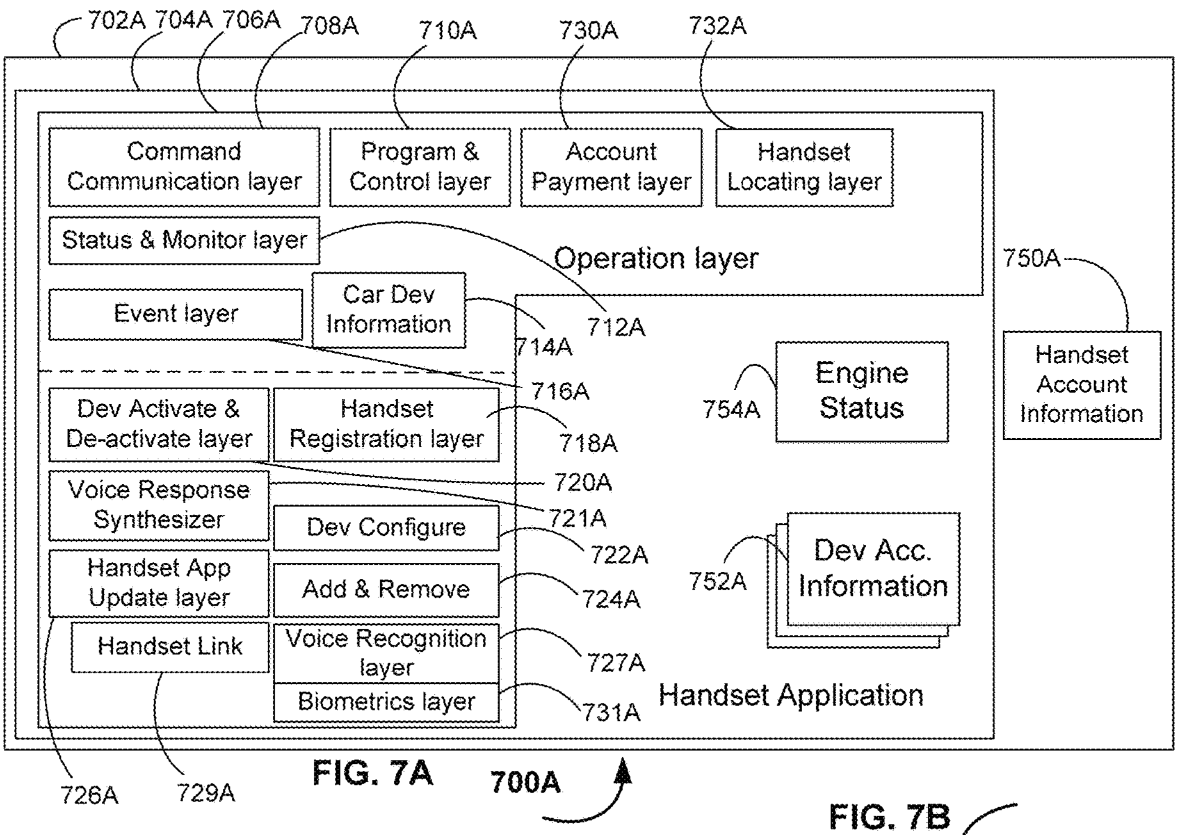
FIG. 7A
FIG. 7B
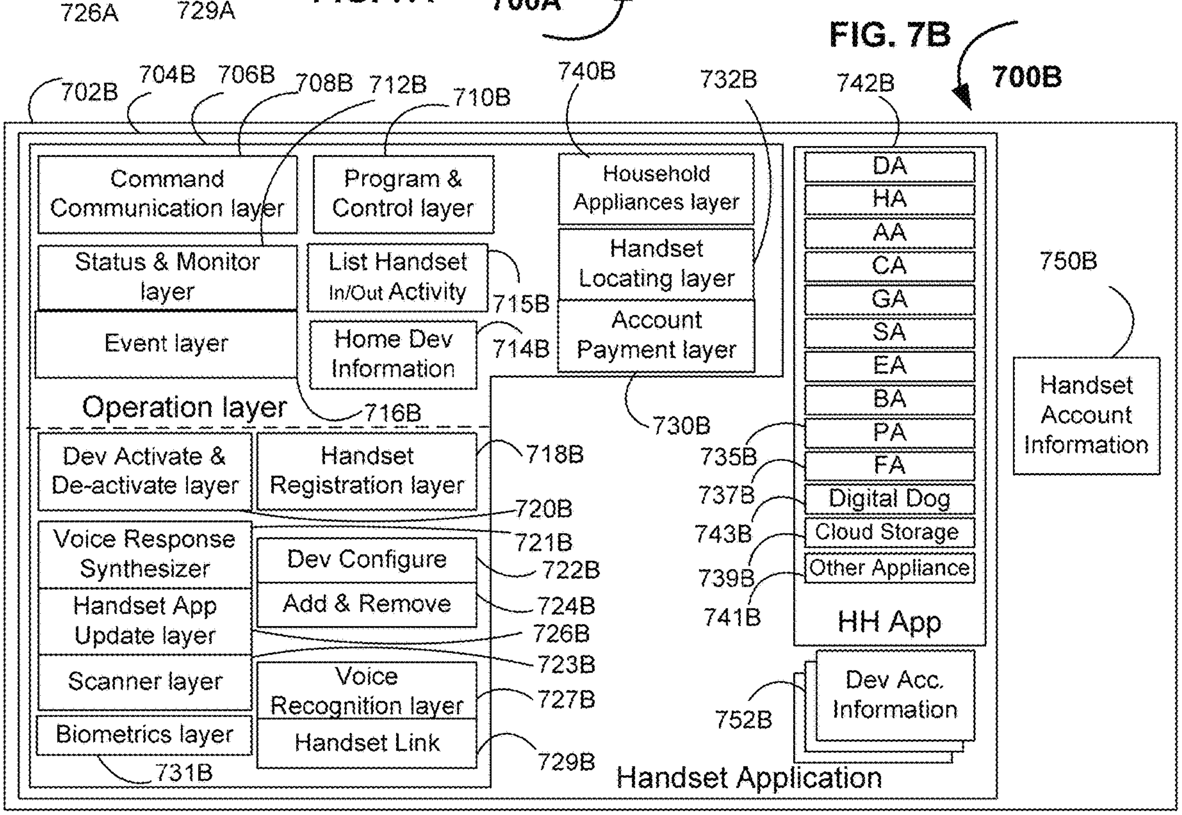

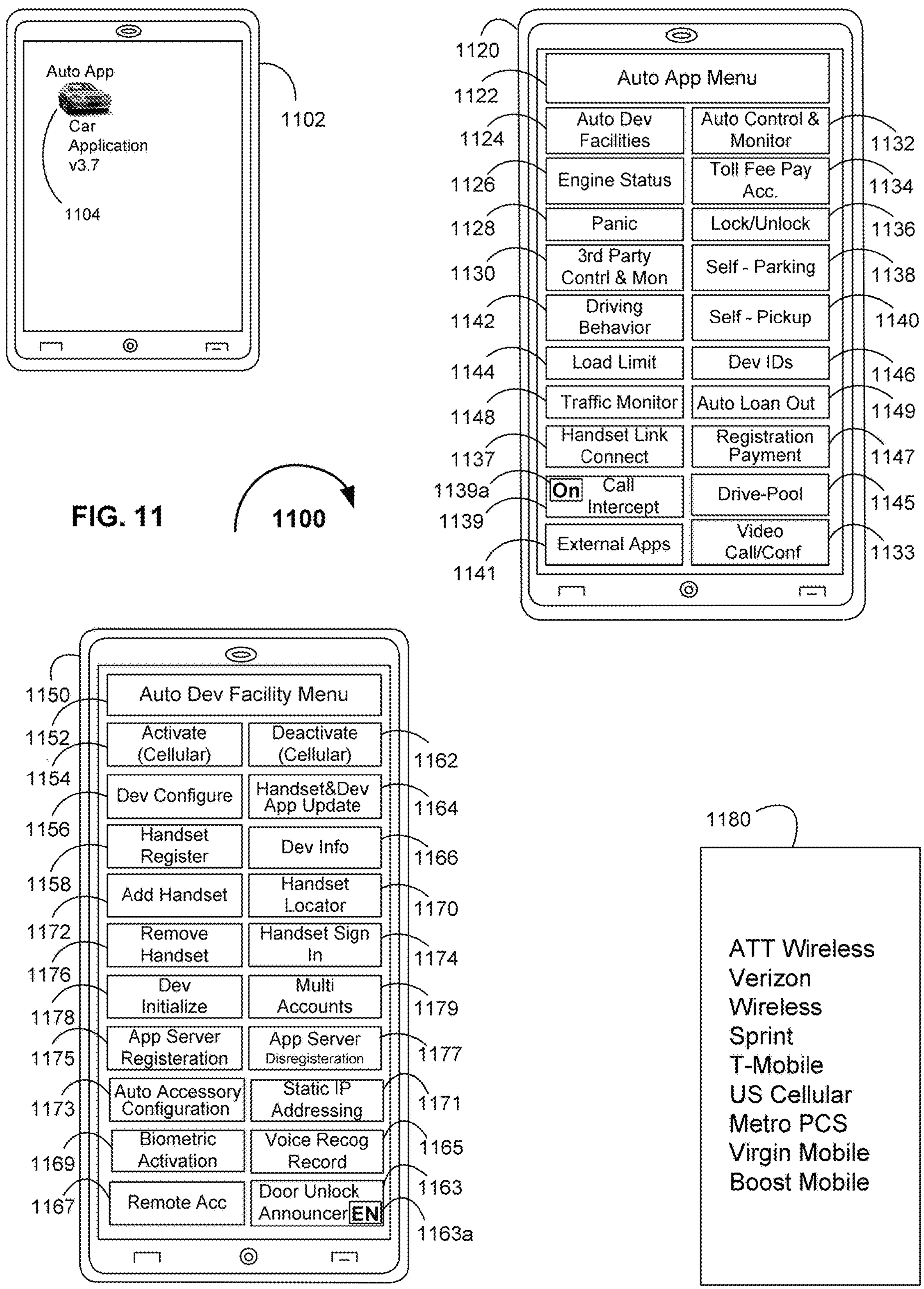

Auto App
Car
Application
v3.7
1104
1102
1120
Auto App Menu
1122
Auto Dev Facilities
1124
Auto Control & Monitor
1132
Engine Status
1126
Toll Fee Pay Acc.
1134
Panic
1128
Lock/Unlock
1136
3rd Party Contrl & Mon
1130
Self - Parking
1138
Driving Behavior
1142
Self - Pickup
1140
Load Limit
1144
Dev IDs
1146
Traffic Monitor
1148
Auto Loan Out
1149
Handset Link Connect
1137
Registration Payment
1147
On
Call Intercept
1139a
1139
Drive-Pool
1145
External Apps
1141
Video Call/Conf
1133
FIG. 11
1100
1150
Auto Dev Facility Menu
1152
Activate (Cellular)
Deactivate (Cellular)
1162
1154
Dev Configure
Handset&Dev App Update
1164
1156
Handset Register
Dev Info
1166
1158
Add Handset
Handset Locator
1170
1172
Remove Handset
Handset Sign In
1174
1176
Dev Initialize
Multi Accounts
1179
1178
App Server Registeration
App Server Disregisteration
1177
1175
Auto Accessory Configuration
Static IP Addressing
1171
1173
Biometric Activation
Voice Recog Record
1165
1169
Remote Acc
Door Unlock Announcer
EN
1163
1163a
1167
1180
ATT Wireless
Verizon
Wireless
Sprint
T-Mobile
US Cellular
Metro PCS
Virgin Mobile
Boost Mobile

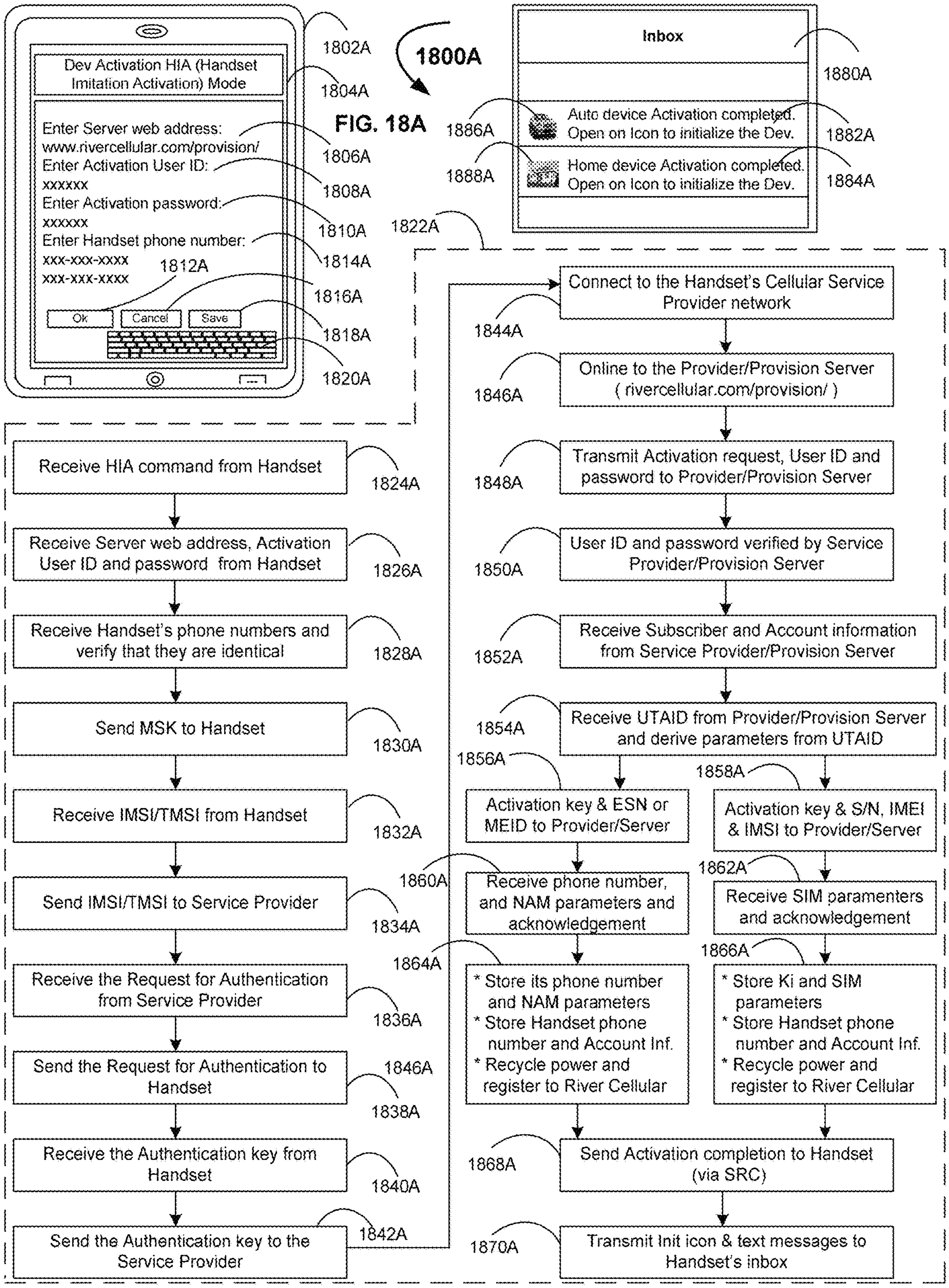
1800A
FIG. 18A
Dev Activation HIA (Handset Imitation Activation) Mode
Enter Server web address:
www.rivercellular.com/provision/
Enter Activation User ID:
xxxxxx
Enter Activation password:
xxxxxx
Enter Handset phone number:
xxx-xxx-xxxx
xxx-xxx-xxxx
Ok
Cancel
Save
1802A
1804A
1806A
1808A
1810A
1812A
1814A
1816A
1818A
1820A
Inbox
Auto device Activation completed. Open on Icon to initialize the Dev.
Home device Activation completed. Open on Icon to initialize the Dev.
1880A
1882A
1884A
1886A
1888A
1822A
Receive HIA command from Handset
1824A
Receive Server web address, Activation User ID and password from Handset
1826A
Receive Handset's phone numbers and verify that they are identical
1828A
Send MSK to Handset
1830A
Receive IMSI/TMSI from Handset
1832A
Send IMSI/TMSI to Service Provider
1834A
Receive the Request for Authentication from Service Provider
1836A
Send the Request for Authentication to Handset
1846A
1838A
Receive the Authentication key from Handset
1840A
Send the Authentication key to the Service Provider
1842A
Connect to the Handset's Cellular Service Provider network
1844A
Online to the Provider/Provision Server ( rivercellular.com/provision/ )
1846A
Transmit Activation request, User ID and password to Provider/Provision Server
1848A
User ID and password verified by Service Provider/Provision Server
1850A
Receive Subscriber and Account information from Service Provider/Provision Server
1852A
Receive UTAID from Provider/Provision Server and derive parameters from UTAID
1854A
1856A
1858A
Activation key & ESN or MEID to Provider/Server
Activation key & S/N, IMEI & IMSI to Provider/Server
1860A
1862A
Receive phone number, and NAM parameters and acknowledgement
Receive SIM paramenters and acknowledgement
1864A
1866A
* Store its phone number and NAM parameters
* Store Handset phone number and Account Inf.
* Recycle power and register to River Cellular
* Store Ki and SIM parameters
* Store Handset phone number and Account Inf.
* Recycle power and register to River Cellular
Send Activation completion to Handset (via SRC)
1868A
Transmit Init icon & text messages to Handset's inbox
1870A

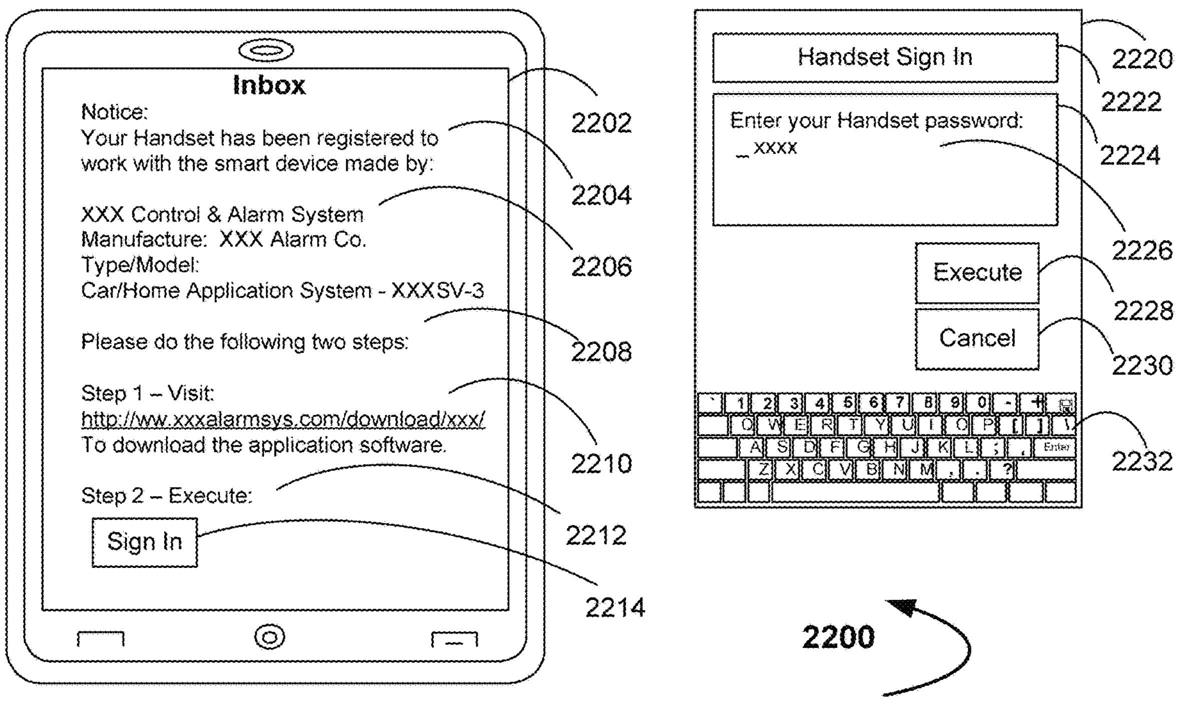
FIG. 22
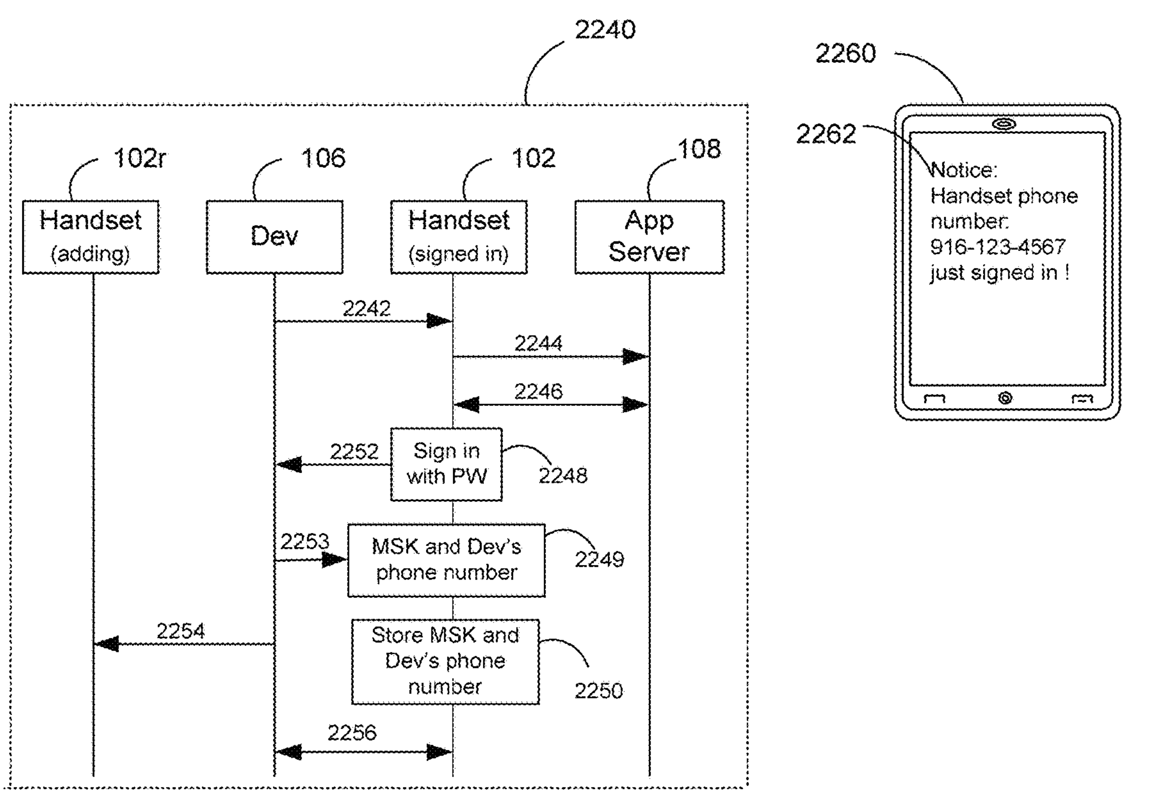

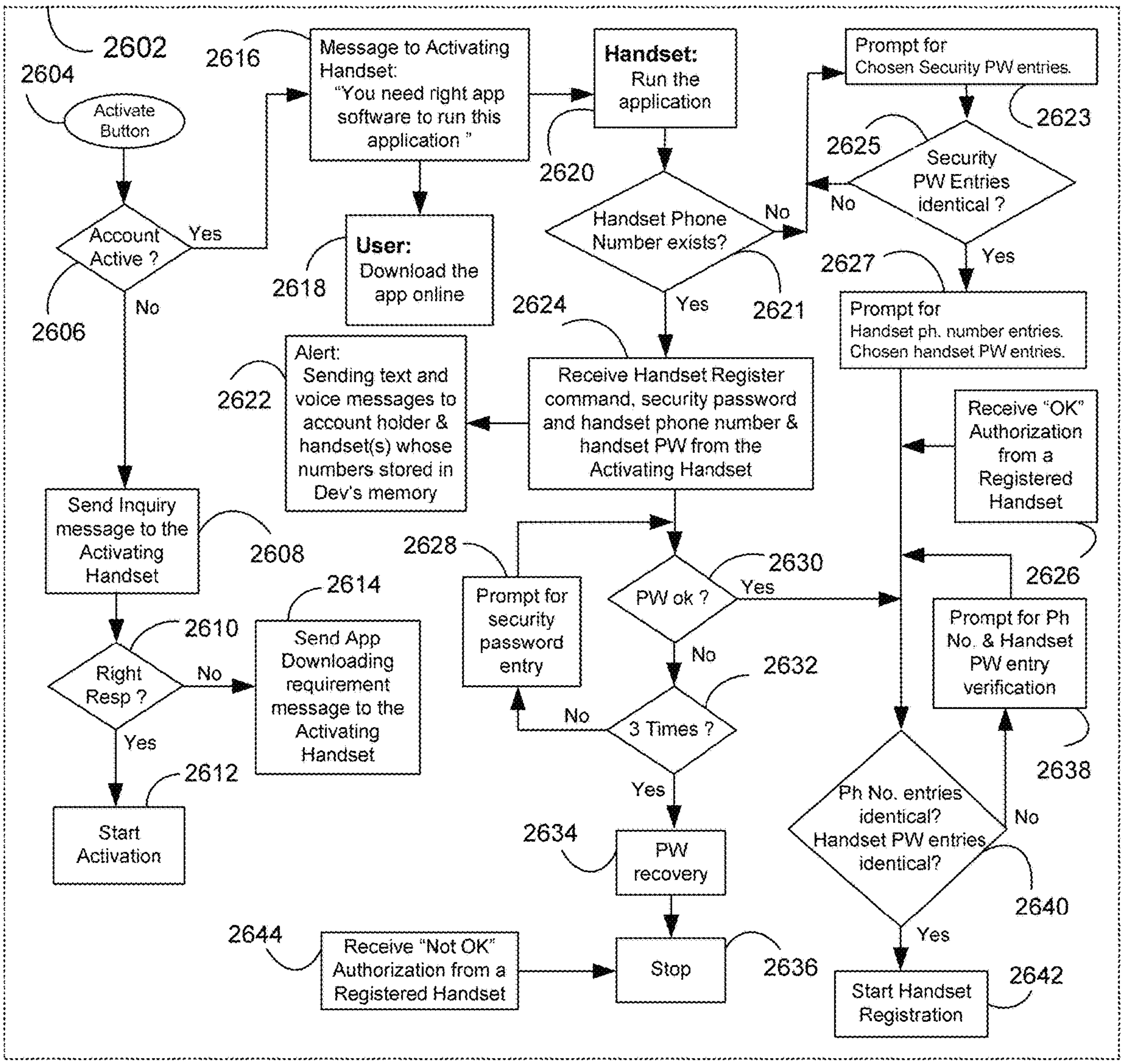
FIG. 26
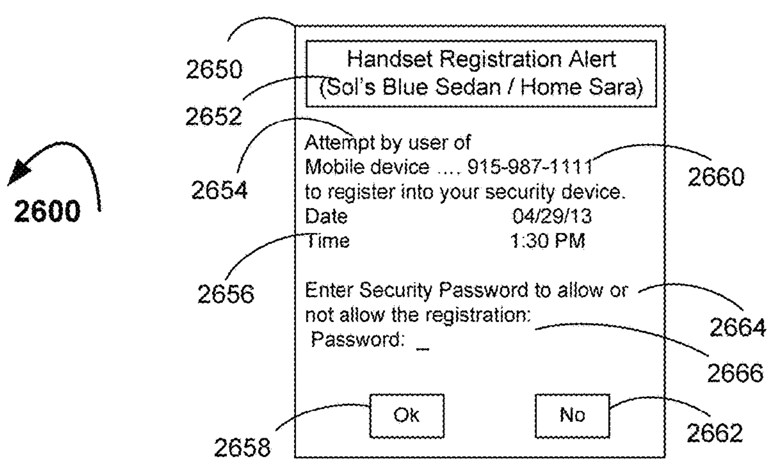

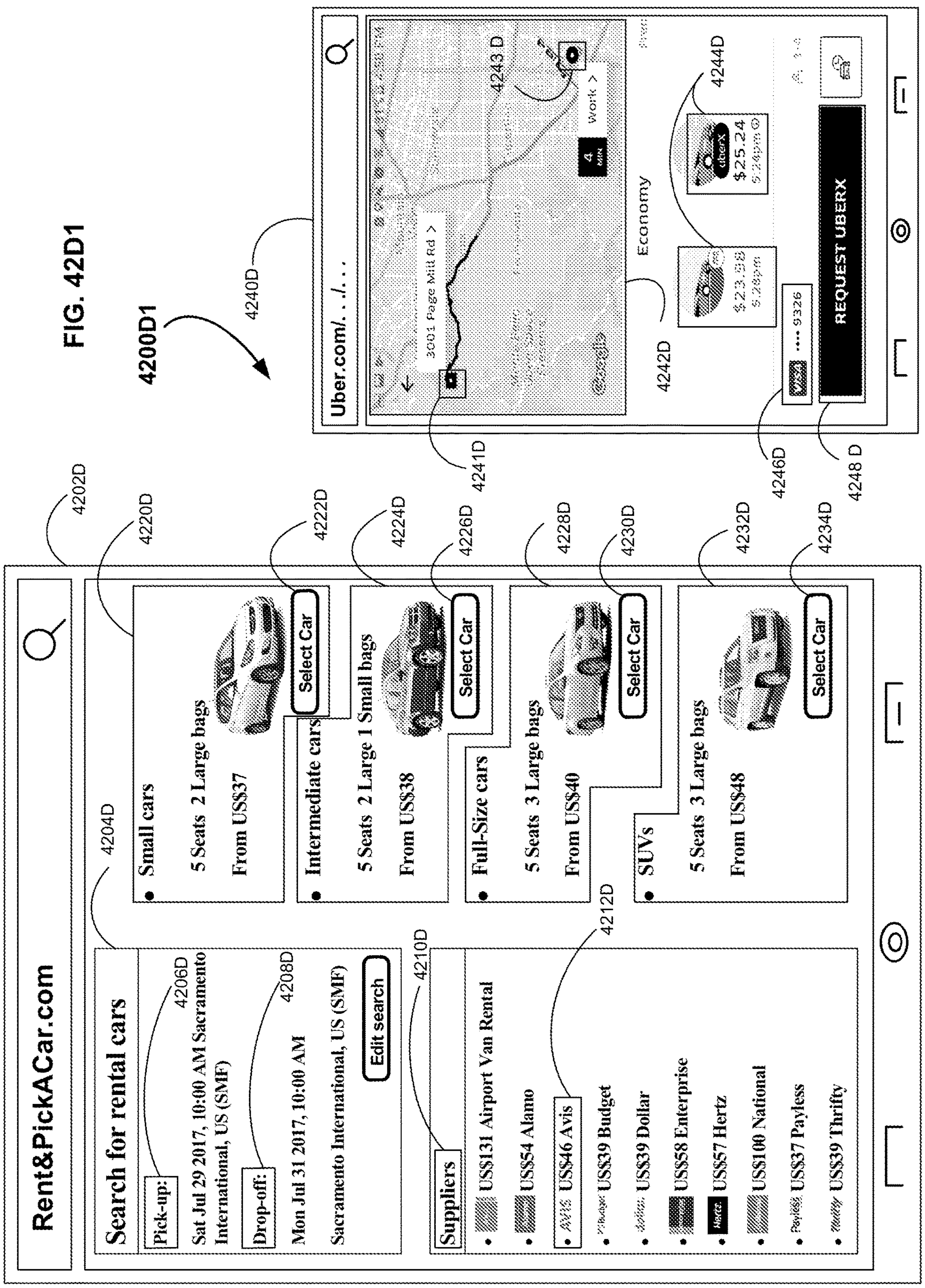
FIG. 42D1

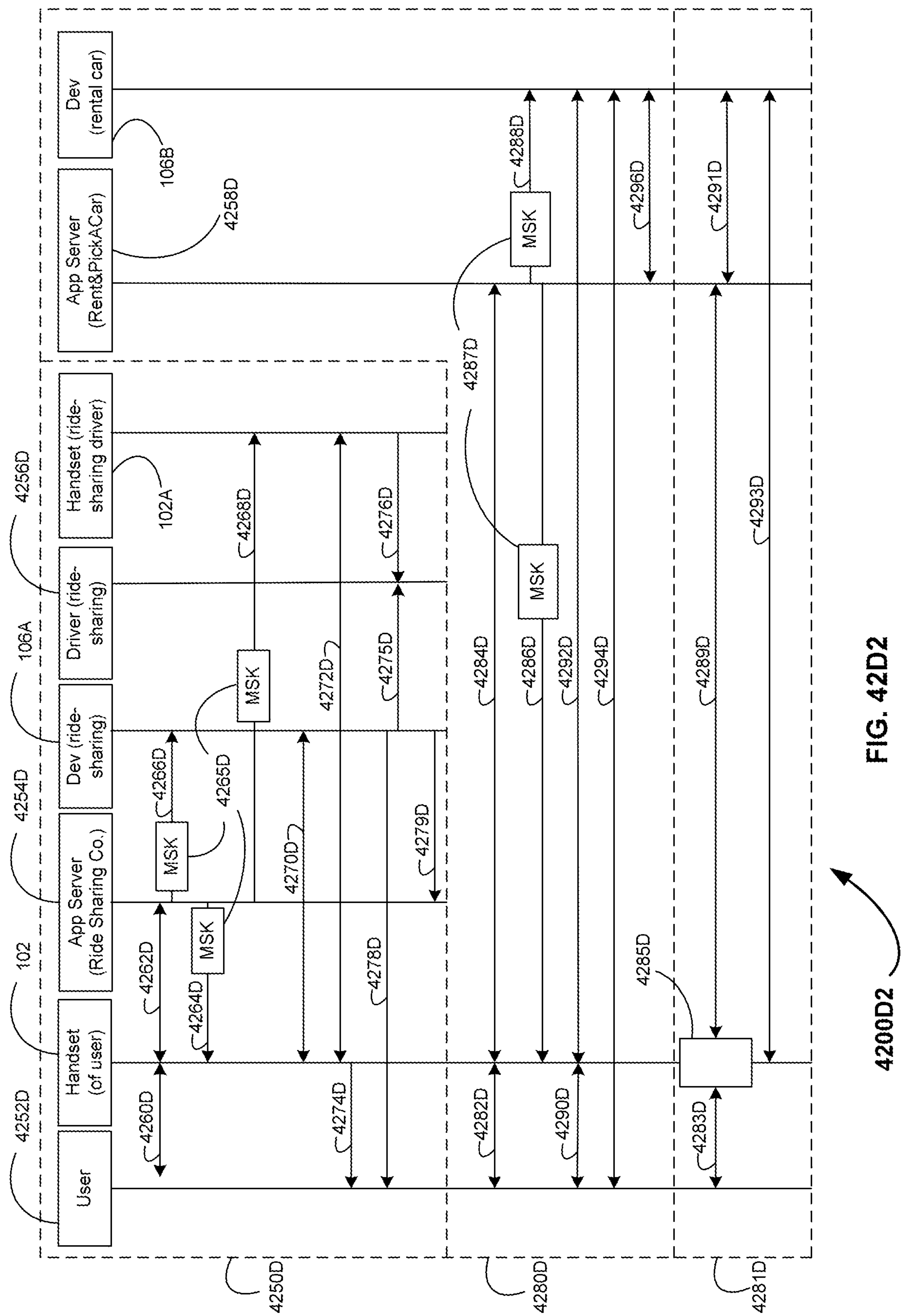
FIG. 42D2

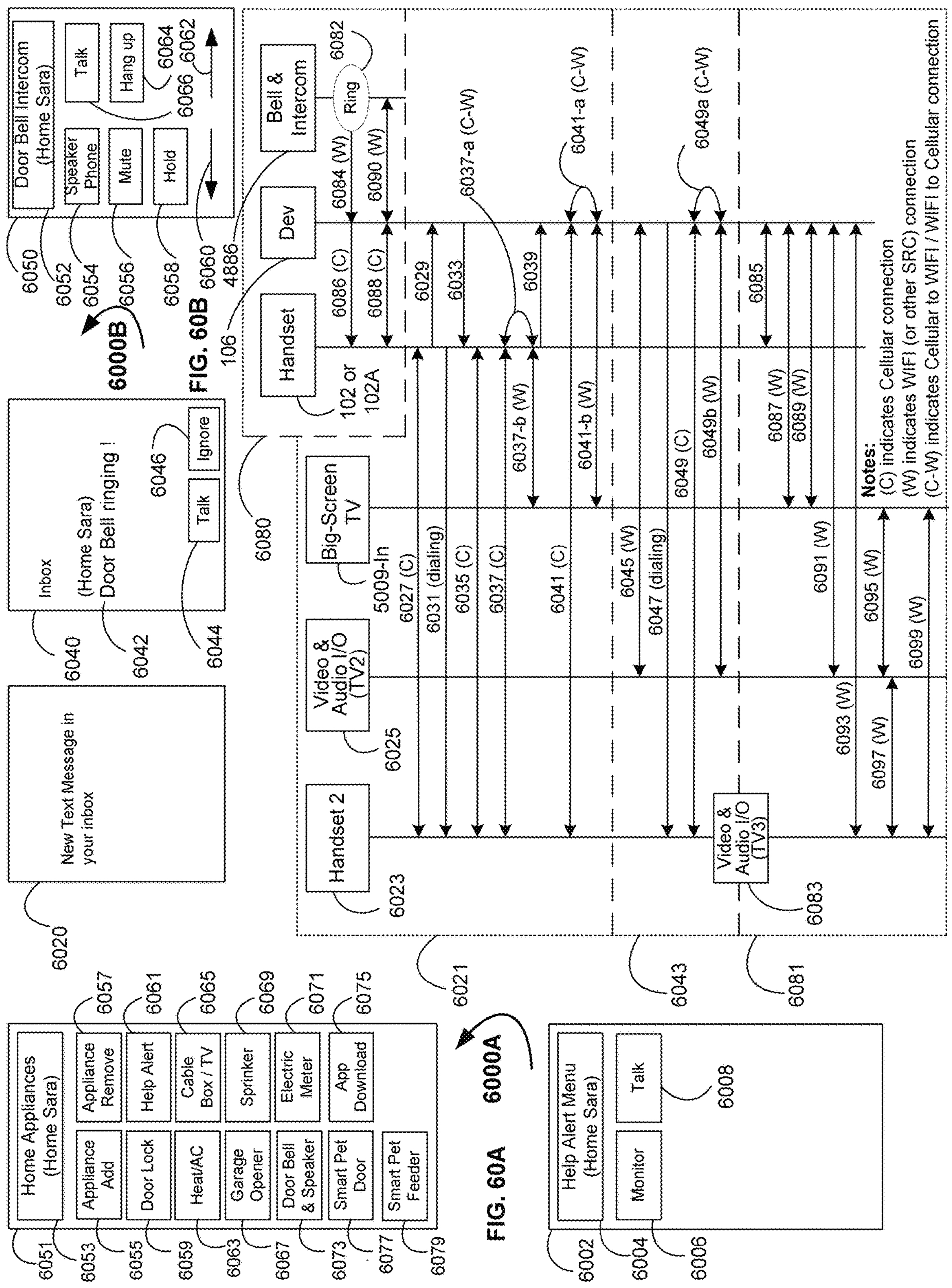
Home Appliances (Home Sara)
Appliance Add
Appliance Remove
Door Lock
Help Alert
Heat/AC
Cable Box / TV
Garage Opener
Sprinkler
Door Bell & Speaker
Electric Meter
Smart Pet Door
App Download
Smart Pet Feeder
6051
6053
6055
6057
6059
6061
6063
6065
6067
6069
6071
6073
6075
6077
6079
FIG. 60A
6000A
Help Alert Menu (Home Sara)
Monitor
Talk
6002
6004
6006
6008
New Text Message in your inbox
6020
Inbox
(Home Sara)
Door Bell ringing !
Talk
Ignore
6040
6042
6044
6046
Door Bell Intercom (Home Sara)
Speaker Phone
Talk
Mute
Hang up
Hold
6050
6052
6054
6056
6058
6060
6062
6064
6066
4886
6000B
FIG. 60B
106
Handset
Dev
Bell & Intercom
Ring
6082
102 or 102A
6080
6084 (W)
6090 (W)
6086 (C)
6088 (C)
6029
6033
6037-a (C-W)
6039
6041-a (C-W)
6049a (C-W)
6085
6037-b (W)
6041-b (W)
6049 (C)
6049b (W)
6087 (W)
6089 (W)
Big-Screen TV
5009-In
6027 (C)
6031 (dialing)
6035 (C)
6037 (C)
6041 (C)
6045 (W)
6047 (dialing)
6091 (W)
6095 (W)
6099 (W)
Video & Audio I/O (TV2)
6025
6093 (W)
6097 (W)
Handset 2
6023
Video & Audio I/O (TV3)
6083
6021
6043
6081
Notes:
(C) indicates Cellular connection
(W) indicates WIFI (or other SRC) connection
(C-W) indicates Cellular to WIFI / WIFI to Cellular connection

SYSTEMS AND METHODS FOR PROGRAMMING, CONTROLLING AND MONITORING WIRELESS NETWORKS

CROSS REFERENCE TO RELATED APPLICATIONS

This application claims the benefit and is a continuation-in-part of U.S. application Ser. No. 15/978,018, filed on May 11, 2018, by the same title, pending, which application claims the benefit and is a continuation-in-part of U.S. application Ser. No. 15/669,867, filed on Aug. 4, 2017, by the same title, abandoned, which application claims the benefit and is a Continuation of U.S. application Ser. No. 15/141,373 filed Apr. 28, 2016, by the same title, now U.S. Pat. No. 9,736,688, which claims the benefit of and is a non-provisional application of U.S. Provisional Application No. 62/154,659 filed Apr. 29, 2015, by the same title. Also, application Ser. No. 15/669,867 claims the benefit of and is a continuation-in-part of U.S. application Ser. No. 14/497,248 filed Sep. 25, 2014, by the same title, now U.S. Pat. No. 9,734,694, which application claims the benefit and is a non-provisional application of U.S. Provisional Application No. 61/887,321 filed Oct. 4, 2013, by the same title. All above-referenced applications/patents listed above are hereby fully incorporated in their entirety by this reference.

BACKGROUND

The present invention is in the field of wireless communication, in particular cellular communication where a wireless or wired device or Dev (e.g., appliance) can communicate wirelessly in the wireless network, particularly cellular network, wireless internet network and short range communication (SRC) network. The PCMD (Program Control & Monitor Device) or Dev (e.g., appliance:—the inventor uses the term "Dev" for the description of this invention in the rest of this text, while the term "appliance" will be used in the claims that follow at the end of this text) communicates with a handset (e.g., cellular handset) or plurality of cellular handset, and the Dev can also be directed by any one of the handsets (e.g., mobile devices), which also can be a smart phone, tablet, tablet PC, laptop PC, VoIP device, iPad-like device, PDA (Personal Digital Assistant), any portable electronic device, wearable device (i.e., smart watch, smartwatch, fitness tracker or the like) or mobile device, so that the Dev can be used to monitor and control its environment, associated equipment, or plurality of associated equipment, and alert when any unauthorized or unsafe events take place, so its owner(s) can take appropriate measure to deal with the situation.

The Dev can also allow the user to add (register) another handset, so the owner of said handset can have the same access to the vehicle/home control and monitor system, as the original user. The Dev also lets the user remove (deregister) a missing, stolen or no longer used handset.

The Dev can also allow the user hundreds or thousands of miles (kilometers) away from home, to program the handset of a friend or a relative to have access to the home security and monitor system, so said friend or relative can stay at his/her home for a programmable period of time.

The Dev can also allow the user to program the handset of the household help personnel (i.e., cleaning person) to have access only to a certain limited function of the home security and monitor system, such as: entry and exit on certain day(s) of the week and certain time. And such the entry and exit record can be created, stored and viewed by the user.

The Dev can also alert the user when someone attempts to register his/her handset into its control and monitor system so the user can be aware of such attempt and has the option to allow or not allow it to take place.

The Dev can also let the user locate the GPS location of another missing registered handset via his/her handset.

The Dev can also allow the user to have the liberty of choosing another cellular service provider by providing a fairly simple mechanism to which it can be easily activated and registered into the new network.

The Dev can also allow the user remotely to enter and retrieve data to and from the GPS, and inquire the vehicle current location through said GPS.

The Dev can also allow the driver to pay the toll collector (i.e., bridges, highways) electronically and the transaction account is stored in memory for later review.

The Dev can also allow the user to record and view remotely the driving habit of other drivers, such as: driving speed, and optionally alerts the user when such maximum speed limit happens: where, when and the duration. It also allows car rental, taxi, truck companies, and the like, to have the driving record of each vehicle transmitted and stored into the company's storage servers for later review.

The Dev can also alert the car owner when an authorized moving or entry in of his/her vehicle. It lets the owner know the location and time of where and when the event took place.

The Dev can also alert the driver who might be leaving a child or pet inside his/her parked vehicle, which is extremely dangerous, when the temperature is either very warm or very cold outside.

The Dev can also alert the driver who might accidentally leave the car engine on (idle) for a long period of time especially in a closed environment (garage) where the potential of carbon dioxide poisoning is at the greatest. If no response from the driver/owner, the Dev will automatically turn off the engine and all its accessories (i.e., radio, lights, A/C, etc.).

The Dev can also allow the user to program, control, and monitor his/her vehicle and its accessories remotely through his/her handset.

The Dev can also alert the emergency center in case of an accident such as: a sudden impact happens to the vehicle and/or its airbag is inflated. It also lets the driver communicate via the hands-free speaker and microphone with the emergency operator. The driver can also talk to a family member of his/hers (another registered handset), with the aid of the vehicle "dial and talk" button, in case his/her phone does not work or is not in his/her possession.

The Dev can also allow a third party (police/firefighters/emergency personnel) to take possession over the vehicle when said vehicle has been stolen/hijacked and is being driven dangerously without regard for public safety. This can be accomplished by transmitting a third party control and monitor command (with a MSK) to said third party by its registered handset and at the same time the Dev receives a notice with a MSK verification key from said registered handset that said command has been transmitted to said third party or by the Dev itself transmitting said third-party control and monitor command to said third party.

The Dev can also allow the user to lock/unlock the car door, car trunk, start and drive his/her vehicle without using the car key. The user can use his/her registered handset to communicate with the Dev or use voice commands directly to the Dev (with the handset in his/her possession or the vicinity) in controlling his/her vehicle such as: lock/unlock the car door, car trunk, turn on/off lights, starting the vehicle engine (with or without a car key) or the likes.

The Dev can also allow a user, who loans out his/her car to a friend or relative (i.e., borrower), to program the Dev remotely via his/her handset to restrict borrower's usage of said vehicle to a time limit. The user's handset does it by having the Dev generated a unique one-time and time-limited MSK and then transmitted it to the borrower's handset. The borrower then uses his/her handset or voice commands (with the handset in his/her possession or the vicinity) to lock/unlock the car door, car trunk, start/stop engine (with or without of car key), drive the car and the likes. When the length of the borrowing period expires, the Dev invalidates its MSK and borrower cannot use said car any longer because his/her handset and the Dev can no longer have valid communication.

The Dev can also allow a driver who has time-limited use of its vehicle i.e., a car lessee who leases said vehicle from a car leasing company. The car leasing company's Application Server (app) generates a unique one-time and time-limited MSK and transmitted it to both the car lessee's handset and the Dev. The lessee uses his/her handset or voice commands (with the handset in his/her possession or the vicinity) to lock/unlock the car door, car trunk, start/stop engine (with or without of car key) and the likes. When the lease expires, the lessee returns the car back to the leasing company and the Dev invalidates its used MSK.

The Dev 106 preferably can also allow a user (driver/passenger) who has time-limited use of its driverless (self-driving) vehicle i.e., a car lessee who leases said vehicle from a car leasing company. The car leasing company's Application Server, via its Car Rental App (one of 3$^{rd}$ Party Apps block 613 in FIG. 6), generates a unique one-time and time-limited MSK and transmits it to the car lessee's handset (assuming said handset containing its corresponding app download). The lessee then is able to use his/her handset to lock/unlock the car door, car trunk, start/stop engine, input the destination to the GPS and the vehicle then drives itself to said destination and the likes. Or the lessee uses his/her voice commands (with the handset in his/her possession or the vicinity) to lock/unlock the car door, car trunk, start/stop engine, communicate the destination to the Dev which translates said command to the GPS and then makes the vehicle drive itself to said destination and the likes. When the lease expires, the lessee returns the car back to the leasing company; the Dev then invalidates its used MSK and transmits the lessee's usage data to the company's data server for accounting and processing.

The Dev 106 and its associated app (Ride-Sharing App, one of 3$^{rd}$ Party Apps block 613 in FIG. 6) preferably can also offer the user (passenger) requesting an online ride-sharing service with the added confidence of boarding the correct vehicle and the (ride-sharing) driver connecting with the correct passenger. Both the user's handset and the Dev (or the driver's handset) will signal (because their SRC communication, assigned with the same unique MSK, has been verified as valid) to their corresponding owners with a positive confirmation (for example, by emitting sound from their corresponding handsets and/or blinking the vehicle lights).

The Dev can also alert the vehicle owner if someone or something attempts to plant an adverse object: alien or harmful device such as GPS tracker, explosive device, illegal substance or the likes, by detecting its presence via its external smart motion, video, audio, frequency sensors; and/or especially, in the case of a GPS tracker, via its Frequency Hopper (i.e., TMSI, IMSI detector). It records the video of the said person or said something moving toward its vehicle or within its vehicle peripheral leading to a physical contact. The Dev can also, via its cameras, employ facial recognition technology, as are well known to those of ordinary skill in the art, to record images of persons of interest who, more than one occasion (or determined number of times), snoop around in its vicinity. It then transmits said recorded video to the owner's handset for his/her visual verification and determination.

The Dev can also allow the user to use its control and monitor system to program, control and monitor his/her home security system, such as: turning on or off the alarm, monitoring and viewing the house entries and exits, viewing its motion sensing devices, and observing its interior and exterior surroundings remotely, through his/her handset.

The Dev can also alert the home owner when an authorized or illegal entry takes place in his/her own house or business premises. It lets the owner know the exact location within the house or business premises, and time when it happened.

The Dev can also alert the home owner when the monitor camera detects changes in its inputs, then transmits the video images to the owner for his/her viewing and decision.

The Dev can also communicate wired/wirelessly with one or plurality of wireless handsets/terminals, computers, servers, and the like so account information can be exchanged between the Dev and one or plurality of device, such as: handsets/terminals, servers/computers (wire/wireless) to facilitate the financial (or non-finance) transaction or any other needed financial (or non-finance) exchanges.

The Dev can also communicate wired/wirelessly with one or plurality of household appliance/equipment at home or on business premises, with the assistance of the software application downloaded from a plurality of server on the internet (i.e. the Internet), or transferred from said appliances/equipments to the Dev, then from Dev passed to the handset; therefore allow the user(s) through the handset or via voice input to control, program, monitor, view, record, play back, said appliances/equipments via the Dev. The Dev also functions like the Dynamic Host Configuration Protocol (DHCP) server which along with the plurality of its connected household appliance (home application) or vehicle equipment accessories (auto application) form a closed-loop private LAN and/or WIFI and therefore less susceptible to outside snooping and interference. It will alert the user(s)/owner(s) of its registered handset(s) if any unauthorized device attempts to communicate with any of its household appliances/equipments.

The Dev can also be programmed, controlled, and then communicates wired/wirelessly with institutions, such as: a utility company to pass monthly user's utility usage information (i.e., electric/water/[heating & cooking gas] meter reading) so said company's computers can process and calculate the charges. The utility company then completes the payment automatically, or transmits said information to user's handset, so he/she using said handset is able to complete the transaction by paying online.

The Dev can also let the user speak to a visitor who rings the doorbell by alerting him/her via his/her handset (wherever he/she might be), thus allowing their communication through the intercom (front door speaker and microphone). The uninvited visitor is not aware that the owner might not be at home, at the present moment.

The Dev can also let the home owner monitor the well-being of his/her pets (dogs), by communicating with the Integrated Smart Pet Door (its door, speakers and cameras), to let them out to the backyard multiple times a day and for specified times, such as: opening its door and playing the owner voice on its speakers, and enticing/commanding them back into the house by replaying the same speaker, then closing and locking the pet door.

The Dev can also let the user store/retrieve data (audio, video, files, pictures, graphic and the likes) into/from his/her private cloud 4904 of FIG. 49/51/53/54 via any registered handset.

The Dev can also be embedded into robotic device, which can be programmed and controlled remotely by the handset via the cellular network. Cellular communication is more ubiquitous, practical, in real-time and anywhere than the Internet. The robotic device can be used in situations, such as: long distance medical surgery, remote rescue mission, remote firefighting and rescue, package delivering flying drones and the like.

The Dev can also be embedded into black boxes, shipping containers, and the like which can be programmed and controlled by the handset or a computer via the cellular network or satellite network (or a hybrid network consisting of cellular, wireless, wire, terrestrial and satellite) to communicate its locations to said handset or said computer.

Since the Dev is a wireless device and particularly a cellular device, it needs to be registered and activated into a cellular network, so the network computers/servers can recognize it, and allow it into their network, in order for it to communicate with other mobile devices. Unlike cellular phone handsets, tablets, personal assistants, and the like, the Dev communicates with other handsets or wireless devices, when programmed to do so by one or more of its registered handsets. It does not communicate with everybody's cellular device, nor does it respond, when others try to communicate with it. In other words, it will ignore or will not answer uninvited calls/messages (with the exception is that during its activation/registration). The Dev receives, decodes and executes commands and data from registered handset(s), and does its tasks/functions as intended/programmed, and transmits back information and/or status to handset(s)/devices. Commands and data from the handset can be in packet(s), in binary or combination of binary and ASCII text format. Commands from the handset also preferably contain encoded handset phone number, encrypted mobile security key (MSK) and password, so the Dev can differentiate them from unwanted sources. If the phone number, (and/or) MSK and the password match with the stored ones in the Dev's memory, the Dev will execute the commands accordingly. Data can also be in video and audio text format. Information and/or status from the Dev can be in packet(s), and in binary or combination of binary, ASCII, video, streaming video and audio, or streaming audio text format. The Dev also sends messages (messages in the present invention, besides being text messages can also in the form data messaging: IM, MMS "Multimedia Message Service", iMessages) to the handset(s), to alert the owner(s) when an event happens, or sends commands to App Server or Email Server to email owner's password to his/her email address for password recovery; as are known to those of ordinary skill in the art. The MSK is a random generated encrypted security data parameter the Dev assigns for each of its registered devices (or commands as in the case of third-party command) and is transmitted by said Dev to its registering device during the activation or registration process; in other words, each MSK is associated with one of the Dev's registered handsets (devices) or a third-party command (transmitted to a third party who will has a time-limited control and monitor over the Dev). The MSK is then encoded in the commands generated by the handset which allows the Dev to identify and recognize if it communicates with its registered device(s) or a legitimate third party. The MSK provides enhanced security protection between the Dev and its registered device(s) during their communication (via cellular, internet, SRC and satellite) and if an unmatched MSK received by said Dev during the process, said Dev requests that the user is required to register his/her new unregistered device and alerts its users via text messages, voice and emails.

The Dev's function is to monitor and control its environment, communicate with other intended wireless devices; and in such a case where it functions as a security device, it has to be installed in a position, where it is not easily removed or disabled by any un-wanted person. It preferably is in the form of an embedded electronic module consisting of a microcontroller or CPU, IC (integrated chipset), EPLD, volatile and non-volatile memory (i.e., flash, RAM, SDRAM, EEPROM, ROM, SSD, storage media, . . . ) storages (for software code, application programs, cellular account information, OS, . . . ), antenna(s), cellular phone/wireless LAN chipset, SRC (Short Range Communication) interfaces, components (NFC, WI-FI, Bluetooth, USB, wireless radio frequency (RF) technology), and general I/Os. The module can be part of the automobile controlling circuitry when applies to a vehicle, or part of the home security system, when applies to the house, and part of the electronic circuitry when applies to a robotic device or a shipping container.

The Dev can obtain, store and run software applications from other devices/servers wirelessly. In the case of a vehicle, it also contains finance account application to facilitate the toll fee transaction, when bridge toll or road toll requires. It also contains features, which allow user to locate the GPS location of other registered handset(s). It also allows user to control devices/appliances at home or on remote premises by having automatic add and remove functions, which it uses to discover/find out other controlled devices, so it can add in their functionality, or later on to remove them as commanded by user via the handset.

It also offers a general purpose control system where the main handset can register other handsets, which then together can communicate with the Dev to coordinate in monitoring and controlling what is going on within the Dev's environment, such as: a robotic/surgery/search-rescue robot, and monitoring what's going through the cameras and sensors and display the real time image on the terminal screen. Or the general purpose control system can be embedded into black boxes, cargos, shipping containers and the likes so they will be programmed by the handset or computer and their positions can then be tracked and monitored in real time by said handset or said computer.

These three applications—car, home, and robotic/surgery/search-rescue operations/shipping containers/black boxes are for cited examples and do not mean that the Dev is restricted for these applications only.

In its lifetime, it most likely has several ownership changing hands, and thus it has to be easily activated and registered by its new owner, when change of ownership takes place. It also prevents an unauthorized one from activating or registering, and also alerts its owner(s) when such event happens. This makes it very easy for owner to switch to another service provider while still being active with the current provider by having the owner (through the handset) activated the Dev into the new service provider's network. After the activation to the new service provider is successfully done, the Dev deactivates itself from the previous network or optionally retains said account data when it is in Multi Accounts mode, and also transmits commands to other registered handset(s) which will update the Dev's new phone number.

Cellular phones/devices already exist in automobiles but their functions are quite limited. The main function of the current system is to take over the call, when the driver's cellular phone rings, and thus allows him/her to answer it, and communicate hands-free with the outside caller. Some other applications allow the owner of the car to remotely lock/unlock the car or start up its engine. Part of the reason, the car manufacturers have not yet provided the complete solution, as presented herein by the present invention, is how to come up with a mechanism, so that the cellular phone system (which is already inside the vehicle cellular embedded phone module, as in the case, where it takes over the function of the driver's cellular handset) can be programmed, controlled, monitored, and thus be able to communicate with the owner's handset, and execute its functions as cited herein in the present invention. Extending the hardware (microcontroller and cellular chipset) so it can interface with other devices in the car, such as: its GPS, its engine oil/fuel level, speedometer reading, door locks, car alarm, ignition system and the like, will not do much, if a clear and straight forward mechanism by which the car owner can monitor, program, and have it activated easily with his/her chosen cellular service provider so it can communicate with his/her cellular phone, has not been implemented as presented herein by the present invention.

Furthermore, the current car Security, Control & Monitor System (SCMS), for example: allows the car owner (via smart phone) to remotely lock/unlock its doors, turn on/off its ignition/horn/lights, check its engine and electrical/electronic system (e.g., fuel, coolant fluid or oil level, battery reading, etc.) and the like or being alerted via his/her handset (smart phone, smart watch, mobile device, wearable device or the like) when certain events happen to the vehicle (e.g., break in, impact etc.), has some major drawbacks; for example.

On the consumer side, the user (potential owner of the system) has few options and depends mainly on a single exclusive security service provider (SSP) who likely is the manufacturer of the system or company affiliated with it; in other words, tied to a single security service provider. The user therefore, tends to be less receptive to the product (as added equipment into his/her vehicle) because no other company would be able to provide its connecting service. Common sense tells us that, as the exclusive service provider, the SSP tends to charge more for the service and has less incentive to offer and improve its service quality. The user has no other choice but to accept the service of the sole SSP or his/her "already paid for" equipment sits in the car being unused. Furthermore, any useful or handy command (for instance, finding out the (GPS) location of the car), requires the user to pay additional costs as an option since it is likely considered as extra feature.

On the provider side, fewer car manufacturers are adopting this technology, because as mentioned above, it requires them to form a separate company or division. Alternatively, they may associate with a third party company in order to be able to provide the service for the system. Example for this is the OnStar® Corporation which is a subsidiary of General Motors.

Therefore, for owners (whose vehicles are not equipped with SCMSs) who want to have said equipment for their cars; the only option is to depend on products offered by after-market providers (for example: AutoAlarm Pro at autoalarmpro.com or Viper Start at viper.com). The upfront expense for said product is usually more costly than the before-market solutions because more labor is involved in making modification to the vehicle interior e.g., structure, mechanical and electrical changes in order to accommodate the installation. The finished product installation might not be as aesthetic since not all vehicles are made to allow for the after-market installation. The installation might impact the manufacturer's warranty of the vehicle or render its dashboard eco-system in an unpleasant way.

The reason for all this is because of the architecture of the current SCMS. The security service provider (SSP) leases the lines from the cellular phone company so their equipment can provide the two-way communication between their SCMSs and their clients' registered smart phones (the term: handset or smart phone can also be any mobile, portable or wearable device as intended within this document). To start, first the user applies for an account with the SSP preferably online by providing his/her tax ID (i.e., social security numbers), personal and financial information to the SSP; he/she then registers his/her SCMS's unique IDs (e.g., S/N) along with the registered smart phone(s) IDs (contact phone numbers, email addresses) and then downloads the app into said smart phones. The SSP can then associate the SCMS with the user and his/her account. The service thus can begin.

Furthermore, the communication between the smart phone and the SCMS which starts at the originating device (either at the smart phone or at the SCMS) must first go through the cellular network; it is then routed to the SSP equipment which verifies the device's ID against its registered accounts. The SSP equipment (i.e., switchers/routers) then transmits the data to the destination again via the cellular network. This method adds another potential drawback to the communication system because the additional SSP equipment (another layer) requirement results in additional failure junctions and more time delay into the data delivery system.

In comparison, the present invention offers a better alternative since it allows a direct communication between the smart phone (handset) and the SCMS (Dev) without third party's switching/routing equipment involved. The user can choose or switch to any available cellular service provider of his/her choice. Furthermore, car manufacturers can treat the system as an option similar to the built-in garage opener and not having any SSP to deal with. The user can always bundle the service with his/her mobile device plan to lower cost; besides insurance companies may offer drivers better terms on their premium since the insured vehicles will have more and better security options when equipped with said device. Furthermore, the SCMS manufacturing cost can be significantly lower since most of the cellular chipsets typically already have built-in GPS which would allow them to offer car buyers two extra options (GPS capability and SCMS) with the IC (integrated Circuit) cost of one.

House monitoring security system presents less of a challenge, since it is a stationary device and can be wired and monitored by a home security company. The house monitoring system also requires a phone line (expensive and prone to being disabled because the phone line can be cut) and comes with a pretty high price tag such as monthly service fee. The monitoring can only be as good as the system and the security personnel who have the responsibility of overseeing so many stations. The system has to be installed by the home security company, and they do not provide much except calling and/or alerting the owner, when something happened or the house has been breached. The owner has no idea what happened, and neither does the alarm company until the police arrives, or the owner gets home or to the business office. Often, this can be due to a false alarm, such as: a curtain falling and causing the motion sensor to trip. There are also home installed security cameras connected online to the manufacturer's website, where an owner can create, and later logs into his/her account, and sees what the cameras see, and observes what is going on. It is a passive system, in other words, the user cannot program it in order of for him/her to be alerted when a certain condition happens.

The more advanced home Security, Control & Monitor System, where the provider's equipments and SCMS are connected to the cellular network, is also similar to the vehicle security system in having similar drawbacks. As mentioned earlier, the user, who has the system installed at his/her home/business/factory/field/farm, can only depend on one exclusive SSP who likely is also the equipment manufacturer or company affiliated with it. The additional layer of having their switching/routing equipment, in between the cellular network that handles the communication, adds more failure points and extra delay in the data delivery system.

In comparison, the present invention offers better alternative since it allows a direct communication between the smart phone (handset) and the SCMS (Dev). The user can choose or switch to any available cellular service provider of his/her choice. Furthermore, it also acts as a hub or traffic controller/router, communicating or transmitting commands, statuses and/or data between the handset(s) and various house-hold (business/factory/field/farm-related) security equipment and appliances as fast as the cellular network allows. These equipment/appliance(s) can be IoT (Internet of Things) compatible (as illustrated in FIGS. 50 and 51 showing IPv4 version, but the Dev also supports IPv6) or non-WIFI SRC (Short Range Communication) or NWSRC (non-WIFI SRC) (as illustrated in FIGS. 48 and 49), such as Bluetooth, wireless RF, . . . or a mixture of both IoT (Internet of Things) and NWSRC networks. The Dev thus lets user manage all these devices from one single appliance (Dev) unified with one single app while with current technology (e.g., smart appliances such as: smart lock, smart lamps, smart refrigerator, smart washing machine, smart sensors, smart oven, smart thermostat, and the likes), the user has to have an app for each separate device (smart appliance) and also has to depend on the manufacturer's equipment/server(s) for communication which adds extra delay and more failure points. Furthermore, the plurality of apps populating on the handset's screen makes them harder to manage, thus adding extra delay and a drain on its battery, etc. Furthermore, the current existing system will let anyone with the right user ID and password access to its controlled environment and thus exposes or creates loopholes to potential hackers or thieves in commandeering the owner's vehicle or causing physical and monetary damages to said owners' dwelling or worse, by intruding/peeping into their personal environment without them being aware of such violations. The present invention (Dev) prevents this from ever happening since it can recognize the user's handset (with its corresponding MSK); otherwise it requires the user to register because of his/her using an unrecognized device, and simultaneously, alerts its registered handset(s) of said action; thus allowing the owner(s) to take the appropriate or preventive action.

As mentioned earlier for vehicle owners, home owners also benefit since they can always bundle the service with his/her mobile handset plan to lower cost and insurance companies may offer home owners better terms on the premium since the insured homes have more and better security option when equipped with said device.

The present invention allows owner 24 hour monitoring system. It goes straight to the user's handset (and his/her family members'), instead of to a third party not having the capacity to fully monitor all activity, due to the multiple terminals they need to monitor. It alerts when something happens and owner(s) can see, in real-time, what happens in his/her handset (where the Dev already transmitted the related information). Programming, controlling, and monitoring are all done through the handset, while the current paid system requires keypad located inside the house, plus a remote hand-held device just to turn the system on/off, when user is near the house within a close proximity. The present invention also extends beyond providing security of home alarm system. It allows its owner(s) means to control and monitor other household appliances/equipments, such as: heating/AC, cable/satellite TV, Garage opener, entry door lock, help-alert wearer, sprinkler control system, door bell and intercom, pet's daily needs, electric meter reading and transmitting the information to utility company. It allows its owner to store and/or retrieve, via his/her handset or any portable device, notes, pictures and the likes to and/or from his/her private storage cloud, and plurality of others.

US Patent Application US20110244846A1 and US20080057929A1 by Min: "Cell Phone with Remote Control System" mentioned a remote Automobile and Home Control System by a mobile phone, within a mobile communication network, a plurality of remote systems and a server. Min described the interconnection and integration of the plurality of systems of his invention, in terms of hardware, but never mentioned how the device in vehicle/home gets registered and activated so it can be connected to the network, how it obtained its owner's phone number and the numbers of all other handsets, and how it assigned each random generated MSK for each of its registered devices (cellular phones and/or other wired/wireless devices), so it could alert the owner and family about the unexpected events.

It is therefore apparent that an urgent need exists for improved systems and methods for programming, controlling, and monitoring wireless networks.

SUMMARY

This present invention presents mechanism involving a wireless device (Dev) being utilized and integrated into car and home (or business) electronic control and alarm/security monitor systems. This present invention also presents a general control (robotic) device, which controls general input, and output functions, where plurality of cellular handsets, internet devices can co-control, monitor, share and exchange information through the cellular, the internet networks, and other wire/wireless networks. These three cited examples should not be restricted as the only applications, since there are many applications already exist, or have yet to be invented, which can benefit from the present invention's application.

Before activation of the Dev, the owner should preferably get in touch with his/her chosen cellular service provider, to obtain the wireless service plan for the Dev and receives activation parameters (activation data), such as: activation password and user ID, account number, and/or any required information (so the service provider can associate it/them with the subscriber), in order for the Dev to be successfully activated into the service provider's network. The owner can go to one of the service provider's sales office, get in touch by phone, or go online to obtain the required information.

Activation is getting easier as cellular handsets are becoming more common devices. But even for a cellular phone user, when choosing or switching to a different service provider, he/she needs to be present in person at one of the service provider's sales office, since he/she has to choose a new handset, while at the same time having it activated and registered by the service provider sales personnel. To cut down time, manpower and improve efficiency and minimize user's waiting and frustration, service providers find ways to simplify and speed up the activation processes, by providing automatic activation of the device, such as: over the air (OTA) and on demand activation (ODA). OTA means the Dev can temporarily connect to the network during activation, and ODA means the cellular service provider can allocate any available phone number to the Dev during activation (thus Dev and its SIM, or U/SIM (Universal SIM), or ModSIM (define by the inventor as Modified SIM) like storage area does not have to be pre-programmed with any phone number), If the user chooses the same service provider, as the one of his/her handset, the same account number can be used as a group account, as commonly practiced by service providers. The first thing the user/owner needs to do is to activate the Dev and register his/her handset phone number (along with his/her account information) to the Dev, so the Dev can communicate with the handset after it has been successfully activated.

Before or during the activation, the user also has to pass a certain activation data to the Dev, (using the handset); meaning the handset has to contain associated software for it to do so (communication between the Dev and handset). Normal handset does not contain software application to run the Dev, so during the start of the activation process (after the Dev's activation button is pushed or voice activated command is excited), the Dev tries to communicates to the handset via SRC. If no response or wrong response coming back from the handset, the Dev sends a message or messages to the handset, informing the user of the website, from which to download the needed software. After the software has been downloaded to the handset, the Dev and handset can communicate properly via SRC, so information can be exchanged, and the activation data required by the Dev can also be passed from the handset to the Dev. During this time, the Dev's software can also be updated if necessary, and at the pleasure of the user since the website might inform user through the handset of the choice.

The Dev activation request can be in the form of SMS, USSD string or any other means, as are known to those of ordinary skill in the art. During and before activation, the Dev and the handset communicate with each other via near distance communication, such as: Bluetooth, wire/wireless USB, NFC, WI-FI, wireless radio frequency (RF) technology or any as defined by this inventor as SRC (Short Range Communication), as are known to those of ordinary skill in the art.

The Dev activation can be started via voice activating input, by pushing a button by the side of enclosure (in the case of the home control and monitor system) or the push button located by the interior rear mirror similar to one to program the garage opener (in the case for the car control and monitor system). Most would refer to this as syncing devices, device sync, etc. Activating the Dev into a cellular network is quite similar to programming the garage opener, except the former requires several more steps. For Dev equipped with a display as illustrated by 1802C/1832C of FIG. 18C, the activation button preferably is located as shown by 1814C/1844C of FIG. 18C.

The Dev's activation is carried out by the service provider's equipment(s) known by various names, such as: service provider servers/computers, Authentication Center, Home Location Registry, activation server/computer, provision server/computer, or any other systems associated with or provided by the service provider; and is mentioned in the present invention, as the Provision Application Storage Computer/Server (PASC) or Provision Server 114. The provision server can be part of the Service Provider internal network system, or it can reside separately on the internet/cellular network, as are known to those of ordinary skill in the art.

Note that the various features of the present invention described above may be practiced alone or in combination. These and other features of the present invention will be described in more detail below, in the detailed description of the invention, and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 1 shows the preferred exemplary networks the present invention where Dev 106 is operating in.

FIG. 7A/7B shows a preferred example of software block diagram on handset 102, related to the present invention in communication with Dev 106 in automobile/home application.

FIG. 11/13 shows a preferred example of handset's screen displays of present invention, in running/executing the just downloaded auto/home application software.

FIG. 22 shows a preferred example of handset's screen displays and a flow diagram, presenting the interaction between the registered handset 102, the Dev 106, added handset 102 and the App Server 108 during the sign-in of the added handset, relating to the present invention.

FIG. 26 shows a preferred example of a flow diagram of the Dev 106 during the Handset Registration process of a new handset, and the notified handset's screen displaying the Dev's notification messages to a registered handset 102, relating to the present invention.

FIGS. 42D1 and 42D2 show preferred examples of handset's screen displays, presenting the user booking a vehicle from a car rental company and hailing a cab from a ride sharing company, online along with the flow diagram showing their interaction, relating to the present invention in the automobile application.

FIG. 60A shows a preferred example of handset's screen displays and a flow diagram, presenting the communication of handset 102 and Dev 106, in the monitoring and talking to the wearer of Help Alert device 4874, relating to the present invention in the home application.

FIG. 60B shows a preferred example of handset's screens and flow diagram, presenting the communication of user using the handset 102 to communicate to intercom 4886 via Dev 106, in answering the doorbell that is rang by a visitor, relating to the present invention in the home application.

DETAILED DESCRIPTION

Figure 1:
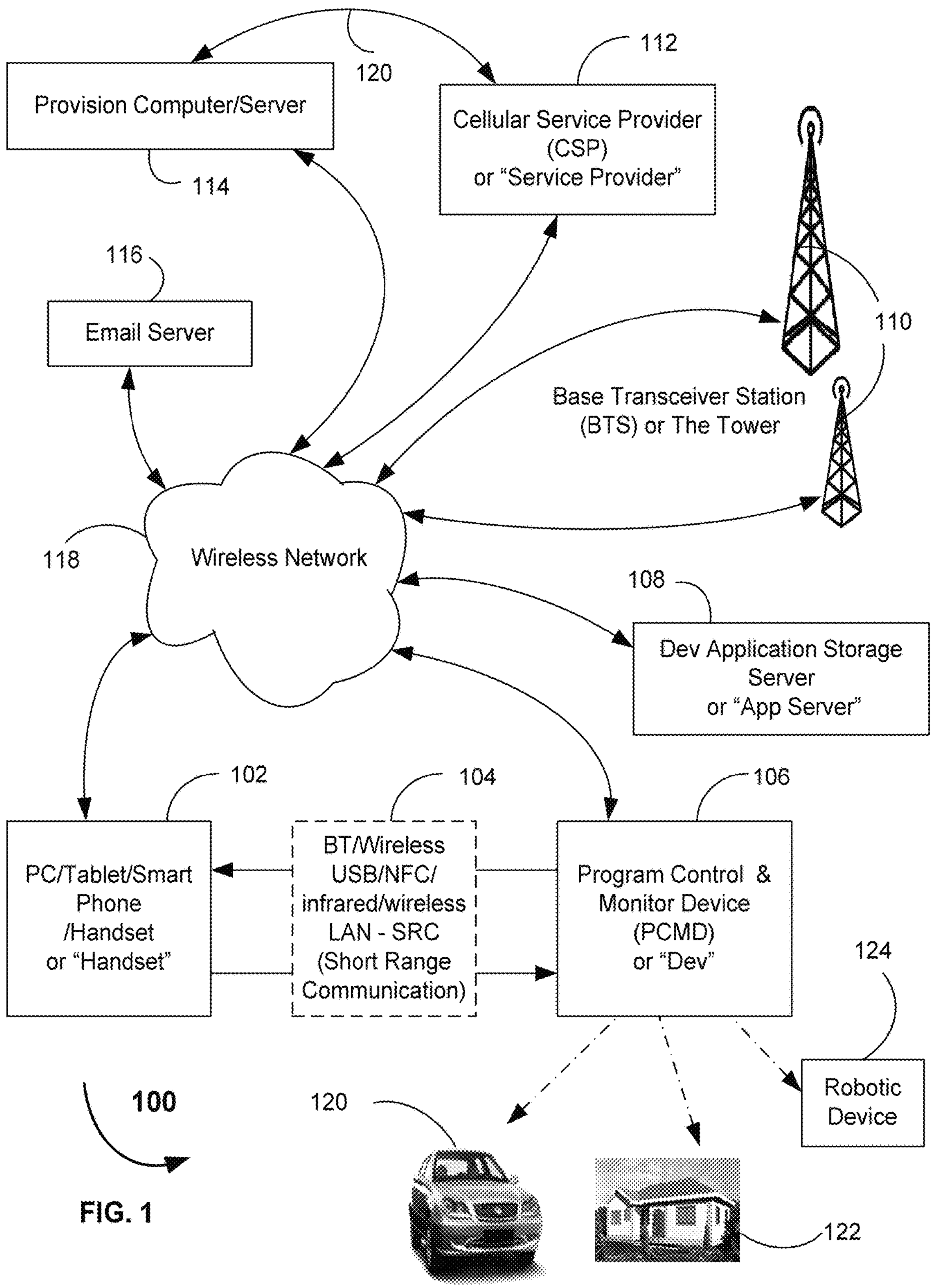

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention and all changes and modifications that come within the spirit of the invention are desired to be protected. The features and advantages of embodiments may be better understood with reference to the drawings and discussions that follow. Further, the "present invention" or "invention" is intended to refer to "embodiment(s) of the present invention".

Aspects, features, and advantages of exemplary embodiments of the present invention will become better understood with regard to the following description, in connection with the accompanying drawing(s). It should be apparent to those skilled in the art, that the described embodiments of the present invention provided herein, are illustrative only and not limiting, having been presented by way of example only. Alternative features serving the same or similar purpose may replace all features disclosed in this description, unless expressly stated otherwise. Therefore, numerous other embodiments of the modifications thereof are contemplated as falling within the scope of the present invention as defined herein and equivalents thereto. Hence, use of absolute terms, such as: for example, "will", "will not", "shall", "shall not", "must", and "must not", and other terms such as: "need", "needs", "needed", "require", "requires" and "required" are not meant to limit the scope of the present invention, as the embodiments disclosed herein are merely exemplary.

It is also understood that when using terms, such as: handset/Dev making, calling, talking, answering, alerting, letting, allowing, using, programming, controlling, monitoring, activating, downloading, detecting, obtaining, containing, assuming, fetching, transferring, updating, configuring, adding, registering, removing, deregistering, comparing, operating, sending, selecting, starting, locking, unlocking, recording, turning on, turning off, playing back, transmitting, translating, passing, bypassing, receiving, displaying, executing, communicating, encoding, encapsulating, encrypting, decrypting, extracting, decoding, processing, verifying, navigating, exchanging, running, informing, copying, refer to actions and processes of the application programs in either handset 102 or Dev 106 (program code, OS, I/O drivers and the like and their interprocess-communication) residing in the micro-computer system's memory and executed by the CPU, in association with its supporting components i.e., cellular chipset, memory devices, peripheral I/O, transceivers, amplifiers, analog front-end, discrete/integrated ICs.

It is also understood that unless expressly stated otherwise (such as: "new handset", "non-registered handset", "normal handset", "regular handset"); "handset" and "registered handset" are used interchangeably herein, for ease of presentation by the inventor, since a handset has to be registered into the Dev, in order for both to communicate with each other, as principal goal of this invention.

The present invention is about a wireless device "Dev or appliance". In particular, Dev is a cellular device, which resides or is part of a module controlling and monitoring its surrounding environment. In the following examples, three are cited and it does not mean that the Dev is restricted for these applications only. Controlling and programming means the Dev needs to be commanded or programmed to do so and its communication is restricted to a selected number of devices (their phone numbers and/or their associated mobile security keys (MSKs) are stored in the Dev's memory). There exists a need for a system and method of how the Dev is to be activated to a network with the companionship of the user's handset (or similar device cited previously), thus allowing the Dev to be registered and recognized by the network (at a later time); the way how the Dev is configured, programmed, controlled by the user/handset; the way additional handset(s) is(are) added/registered into Dev's memory, thus allowing additional users to program and utilize the Dev; the way a no longer used (an obsolete) handset is removed (deregistered) from Dev's memory; the way the Dev monitors and reports status and events from its I/O; the way the Dev knows which selected handsets/devices to exchange the information by associating their corresponding registered phone numbers and or their mobile security keys (MSK); the way the Dev knows which email addresses so it can request App Server to send information to; the manner how the Dev is programmed by one or more handsets (or wireless/mobile devices) for its many functions; the way the Dev alerts one or more handsets (or wireless/mobile devices) when an un-expected or potentially catastrophic event occurs; the way the Dev switches to SRC network in communication with a registered handset, when the said handset is within its SRC network range; the way additional house-hold appliances/equipments is discovered and connected, and their applications are copied or downloaded (via download links) and run, so that said appliances can be programmed and controlled by user's handset via the Dev itself through the cellular network, or directly to said appliances via SRC network when the handset is within said medium range; and the way household appliances/equipments is removed from the Dev and from a handset when said appliance/equipment is no longer in use.

In order for the above summaries come into realization, these following steps preferably are to be taken:

The network it operates in: The present invention is in the field of wireless communication, in particular cellular communication or a long distance wired/wireless network or GSM network, CDMA network, WCDMA network, TD-SCDMA network, NAMPS network and/or networks operating in accordance with any derivatives—GPRS, EDGE, CDMA2000, WiMAX, LTE, TD-LTE—based on GSM/EDGE and UMTS/HSPA, 3GPP, 4G LTE, 5G, among other similar and future medium, such as: satellite network or a hybrid network consisting many types of media—wire, wireless, terrestrial and satellite as are known to those of ordinary skill in the art). It also involves "Short Range Communication" SRC (Short Range Communication), such as: Bluetooth, wireless USB, NFC, WI-FI, wireless LAN, or any wireless radio frequency (RF) technology as are known to those of ordinary skill in the art.

During activation process the Dev communicates with the handset through SRC (Bluetooth, wireless USB and the like) since cellular communication to the Dev has not yet been established or has been discontinued. The handset on the other hand has both the cellular and internet connections and thus can download activation and application software from the App Server into its memory if needed and be also used to pass needed activation information from the server to the Dev through SRC media before and during the Dev activation process.

With activation and application software resident in their memory (after successful download to the handset or update to the Dev), the Dev starts the activation process through Over The Air Activation (OTA). During this process, the Dev can temporarily connect to the service provider or service provider's equipment known as provision server or activation server/computer in order to be activated. The activation process can be summarized in three phases: First,—activation key and pre-activation data from the service provider and user's phone number along with user account information (i.e., vehicle make/home address, account name, account number) to the activated device. Second,—activation request, activation key, device identifier(s) and/or activation data from the activated device to the cellular provider. Finally,—the activation/registration data and acknowledgement from the cellular provider sent back to the activated device.

The exchange of messages for the activation of the Dev with the provision server does not necessarily mean it is a direct communication. The messages can go through many nodes and each one of them transmits these messages to each other or one another, and finally to the provision server. For instance, the messages first go to one or a series of towers or Base Transceiver Stations (BTS), which transmit(s) the messages to the service provider or MSC/VLR (Mobile Switching Center/Visitor Location Register). Because these messages are activation messages, the MSC/VLR then transmits them to HLR/AuC (Home Location Register/Authentication Center) and DBS (Database Server for data verification and the Provision Server or OTA (Over The Air) Activation Processor for being processed/acknowledged/approved (FIG. 1 of US Patent Application Publication by Chatterjee et at US 2013/0012207 A1 Jan. 10, 2013 and FIG. 1 of US Patent by Larsson U.S. Pat. No. 8,331,990 B2 Dec. 11, 2012). The numbers of transmission the activation messages go through, how, where, and by which equipment(s) they are being processed and routed, are up to the service provider's internal layout and design architecture, and are outside the scope of the present invention. During the Dev Activation, the present invention just says data sent/received by the Provision Server, processed by the Provision Server and acknowledged by the Provision Server as are known to those of ordinary skill in the art.

The present invention also supports plugged-in SIM card 270 (FIG. 2) preferably already activated; otherwise if the user has to activate it, then the SIM storage module is already available. Also, the benefit of the SIM card for the user is the convenience of continue usage when he/she gets a new handset without having to have reactivate it and allowing it to retain all the personal information, such as: phone directory, personal messages and the like while such information is not needed in the Dev, and the Dev functions much differently from a smart handset. The Dev only communicates with a limited numbers of handsets or mobile devices as directed by the registered phone, or one of the registered phones, and unlike the handset, the Dev is not convenient for the user to have access to its SIM card. Its task is to allow users to program, control and monitor what users want it to do. It also can observe and inform of what is going in its surroundings, thus providing the option to alert the users as programmed/instructed.

Choosing the service provider—The user should have in possession preferably a smart phone in order to maximize the use of the present invention. The present invention protocol utilizes a mechanism in having Dev activated and then provisioned into the network (and it thus can register and be recognized/authenticated by the network); configured, programmed, controlled, and monitored its security tasks; set up account for paying tolls; discovered house-hold device for remote control and usage and all the various functions, which make it into a real, useful and very powerful device; also registers/removes (de-registers) other handsets or no longer used handsets into/from the Dev so they can/cannot control, program, monitor and will not be/(no longer be) alerted by the Dev just as the main handset.

The user applies and obtains the network service to the Dev with the service provider either in person, through phone call, or online. The user provides information or personal data (Name, address, employer's name and address, credit card [for payment deposit], handset phone number to the service provider for approval) and the service provider in turn provides user a set of information such account number (service plan, service rate . . . ), user ID, activation password and activation phone number or activation internet link (address). The service provider then generates a one-time and time limited ticket (one-time limited ticket), token or identifier UTAID (Unique Temporary Activation Identifier preferably consists of: activation type/methodology, security/encryption key, activation key) based on user's account and personal information, and transmits it to user's handset. The handset in turn, passes the UTAID to the Dev, which separates out the activation key, and transmits it along with the Dev's own identifier(s) and other parameters to the service provider during activation. Through this activation key, the service provider/provision server verifies against the one stored in its database server, and thus can associate it with the subscriber ('s account) during activation. The UTAID also preferably contains a byte, indicating activation methodologies (activation types) of NAM, SIM (or USIM or ModSIM) or any customized activation type/methodology, which when received by the Dev, will allow the Dev to activate itself into the service provider network accordingly (either using NAM, SIM, USIM, ModSIM or any customized activation type/methodology). The UTAID also preferably contains a mathematically algorithm or security/encryption key; and thus when it is received, decoded, stored and executed by the Dev, will encrypt said Dev's voice and data transmission in total privacy. The UTAID can also optionally contain an IMSI, which the Dev uses to transmit during activation instead of using its dummy IMSI, as are known to those of ordinary skill in the art.

Other parameters which the Dev preferably provides during activation such as:—ESN/MEID/IMEI (Electronic Serial Number/Mobile Equipment Identifier/International Mobile Equipment Identifier), which the service provider associates with the device as in the case for NAM activation, have been pre-programmed into the Dev's NAM while the Dev will store its assigned phone number and the user's account information during the activation.—The dummy IMSI or IMSI (International Mobile Subscriber Identity decoded from the UTAID if it is provided) which the service provider associates with the subscriber (subscriber identification) and IMEI (International Mobile Station Equipment Identity) which the service provider associates with the device (device identification), as in the case for SIM activation, along with the user's account information, can be stored into the Dev's SIM memory storage module areas during the activation.

Preferably, the service provider can also associate the Dev ID Parameter (542/642 of FIG. 5/6), such as: Dev's SN (serial number), model number, manufacturer name with the device, which are already reside in the Dev's memory, while the user's account information, the Dev's assigned phone number, and the TMSI can be stored into the Dev's memory storage module during the activation, as in the case for ModSIM activation.

Pre-activation—Un-registered handset: A regular handset normally does not contain activation and application software. When the activation button is pushed (preferably located similar to where built-in garage door openers are in vehicles near the rear-view mirror, in case for vehicle application, or by the side of the enclosure in case of home system application, or when the Dev is equipped with a display as illustrated by 1814C/1844C, screen 1802C/1832C in FIG. 18C), the Dev sends activation query via SRC media to the handset (un-registered to the Dev) and waits for the appropriate response. When no or incorrect response comes back from handset, the Dev assumes the handset does not contain appropriate application software, and sends a text message providing the link to the server location to the handset, informing user that he/she needs to download the activation and application software from the application server (App Sever) into the handset, in order to activate the Dev and run application software to communicate to the Dev. The user then proceeds to download the activation and application software. Before or during the downloading, the App Server preferably checks to see if the requested download version is up to date and if necessary (besides downloading the latest version of the software to the handset), the Dev also needs to be updated (downloaded) with the newest revision. If this is the case, the handset not only downloads its own activation and application software from the App Server, but also the Dev's application of the latest version to its memory storage, and then transmits it to the Dev; or the handset transmits to the Dev the App Update command with the download web link, making said Dev download said app update. Each cellular service provider in conjunction with the manufacturer of the Dev supplies their own activation and application software, and preferably the service provider also supports OTA (Over The Air) activation and ODA (On Demand Activation) activation.

Figure 12:
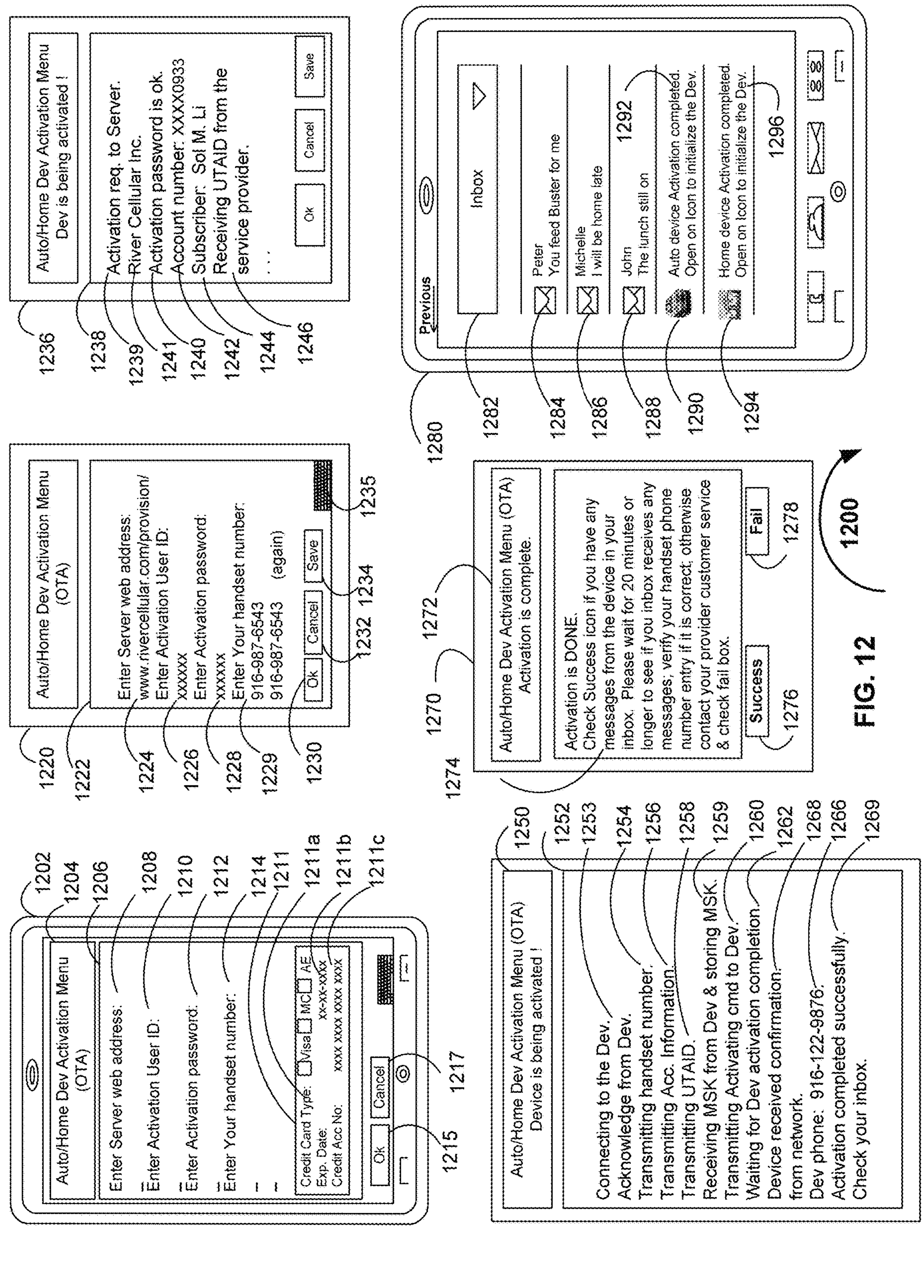
FIGS. 12 and 14 show preferred examples of handset's screen displays of present invention, in having Dev 106 activated into a network in auto/home application.

Dev Activation: before the user puts the Dev into usage, the Dev needs to be activated so it can be recognized (when it registers into the network), and thus allowed into the service provider network; and can therefore call/send messages or receive calls/messages from other devices. A user utilizes his/her handset in activating the Dev—the pre-activation data (activation User ID 1226/1426, activation password 1228/1428) to obtain UTAID from the service provider can be inputted by the user from the handset's touch screen and keyboard 1235/1435. The user also provides separate information to the Dev, such as: the handset's phone number 1229/1429 (along with the account information) as illustrated in FIG. 12/14 since the handset phone is the very first device the Dev will send message to, after it has been recognized and connected into the service provider's network. After activation, the Dev does a power-on reset 249 (FIG. 2/3/4) and then is registered and recognized by the network (in 1519A/1519B, 1619A/1619B, and 1719/1719A of FIGS. 15A/15B, 16A/16B and 17/17A) as are known to those of ordinary skill in the art. Preferably the user has to acknowledge back with an Ok message so the Dev knows its communication link to the handset has been accomplished and user can start the Dev's initialization/configuration process right after.

During its communication with the Dev, the handset's IDs (i.e., its phone number in 1229/1429 of FIG. 12/14) and/or MSK are/is preferably encapsulated and its data encrypted (with the same security/encryption key provided in UTAID as mentioned earlier) in its command packet(s), and therefore the Dev, when it receives said packet(s), preferably decrypts the data, decapsulates (reverses the encapsulation) or separates the handset's phone number and/or associated MSK from the command packet(s). Next the Dev refers it with its stored handset numbers and/or verifies its associated MSK; and only responds if there is a match. From then on, the Dev will communicate with the handset via cellular network 118 or cellular and internet networks. (The Dev can preferably automatically switch to communicate with the handset via SRC network 104 when the handset is within its near distance vicinity or SRC network range, as is known to those of ordinary skill in the art). The Dev then can be initialized or configured by the user via the handset with information, such as: password (for added security), user's email address (for password recovery) and stores them into its memory. The user then can program, control and monitor the Dev, from then on, for its intended tasks. The Dev, on the other hand, preferably does not transmit its IDs (i.e., phone number) during its communication (no caller ID); in other words, the service provider assigns one same dummy number to all the Dev sunder its service so that they can communicate even with handsets which have been programmed to reject calls/texts without caller IDs. This mechanism shields the Dev from exposing its call number identity, thus minimizes it from denial of service (DoS) attacks and since said Dev only communicates with other devices within its close loop circle.

The user can also command using his/her handset preferably with account security password (for added protection) to add in additional handsets, which the Dev will be allowed to communicate and directed by these handsets to do its tasks in the service of said handset user(s).

Dev activation can be either

Using NAM (Number Assignment Module)

NAM principal parameters are assigned phone number, MIN/IMSI, System ID (ESN/MEID/IMEI), Access Overload Class, Group ID Mark, Initial Paging Channel, Lock Code, local use flag, A/B system selection and MIN mark flag.

Using SIM (Subscriber Identification Module)

SIM principal parameters are IMSI, TMSI (temporary IMSI), MSISDN, and Authentication key (Ki) and possibly ICCID and IMEI.

Using ModSIM (Modified SIM)

ModSIM principal parameters are assigned phone number, TMSI, Dev ID parameters and Authentication key (Ki).

The method and system will be explained in detail later in the figures that follow. In no way it implies that these are the only three ways for the Dev to be activated as are known to those of ordinary skill in the art. When there is a need for new and better ways of activation, the Dev will be able to accommodate the requirement with appropriate software, which can be downloaded as discussed in the present invention as technology changes and improves.

Activation and Application software resides both in the handset and in the Dev.

- Activation software is used and executed by both of them during Dev activation and between each one of them or of both of them with the provision server.
- Application software is used and executed when the handset and the Dev communicate with each other. The software is downloaded over the wireless network (cellular, internet) or updated software can also be downloaded to run newer and improved version. (These software programs are stored in servers which the present invention refers as Device Application Storage Server—App Server 108)

During the activation period, communication between the handset and the Dev is via SRC (Short Range Communication) which is either Bluetooth, wireless USB, NFC, WI-FI, wireless LAN, or any wireless radio frequency (RF) technology as are known to those of ordinary skill in the art.

After the Dev has been successfully activated, it then runs the initialization reset (or self-power recycle), and then registers into the network (and thus will be recognized by the service provider's network). From then on, the Dev runs and executes its application software to communicate with user's handset (as mentioned previously, the handset can also be a smart phone, tablet, tablet PC, laptop PC, iPad-like device, PDA (Personal Digital Assistant), any portable electronic device or mobile device). Correspondingly, the user utilizes his/her handset (which had its application software downloaded) to communicate with the Dev, by going and scrolling through the handset's respected screens and related icons, to program the Dev 106 and thus control, command, monitor and view its programmed tasks. The user will also be informed (alerted) through his/her handset by the Dev when certain unauthorized events take place.

Methods and systems for programming, controlling and monitoring the Dev are described below.

According to one aspect of the invention (FIGS. 8-10), the Dev starts out (after its activation button has been pushed) by transmitting (via SRC media) to user's handset, a text message with the App Server's URL instructing him/her to download the required activation and application software, from said site into the handset in order to activate the Dev, then runs and executes the downloaded application, in order for the handset to communicate with the Dev.

According to one aspect of the invention (FIG. 11/13), after the user has downloaded the Auto/Home App (application) icon 1104/1304, executes said icon which makes the handset navigate to the Auto/Home App Menu 1122/1322. The Auto/Home App Menu allows the user many choices and one of them is to execute the Auto/Home Dev Facilities icon 1124/1324 which makes the handset navigate to the Auto/Home Facility Menu 1152/1352 which presents these command icons (which the user can execute leading these commands in the Figures as described if applicable): Activate the Dev 1154/1354 (FIGS. 12, 14, 15A-17A), Deactivate the Dev 1162/1362, Dev configuration 1156/1356 (FIG. 24B), Handset & Dev App Update 1164/1364 (FIG. 27), Handset Register 1158/1358 (FIG. 25), Dev Information 1166/1366 (FIG. 28A), Adding another handset 1172/1372 (FIGS. 21A/21B), Lost Handset Locator 1170/1370 (FIG. 39), Remove a lost (or unused) Handset 1176/1376 (FIG. 23), A newly registered Handset Sign In 1174/1374 (FIG. 22), Dev Initialization 1178/1378 (FIGS. 19/20), Multi Accounts Enable 1179/1379 and App Server Dis-registration 1177/1377. Dev App Server Registration 1175/1375 lets user register the Dev online, creating an account with the App Server by providing owner's user ID, password, email address, handset phone number and Dev's S/N and the likes. The account allows the user with the handset to control and monitor the Dev which in turn communicates and alerts, via email and/or mail to SMS messages to the user's handset if certain events happen.

Figure 28A:
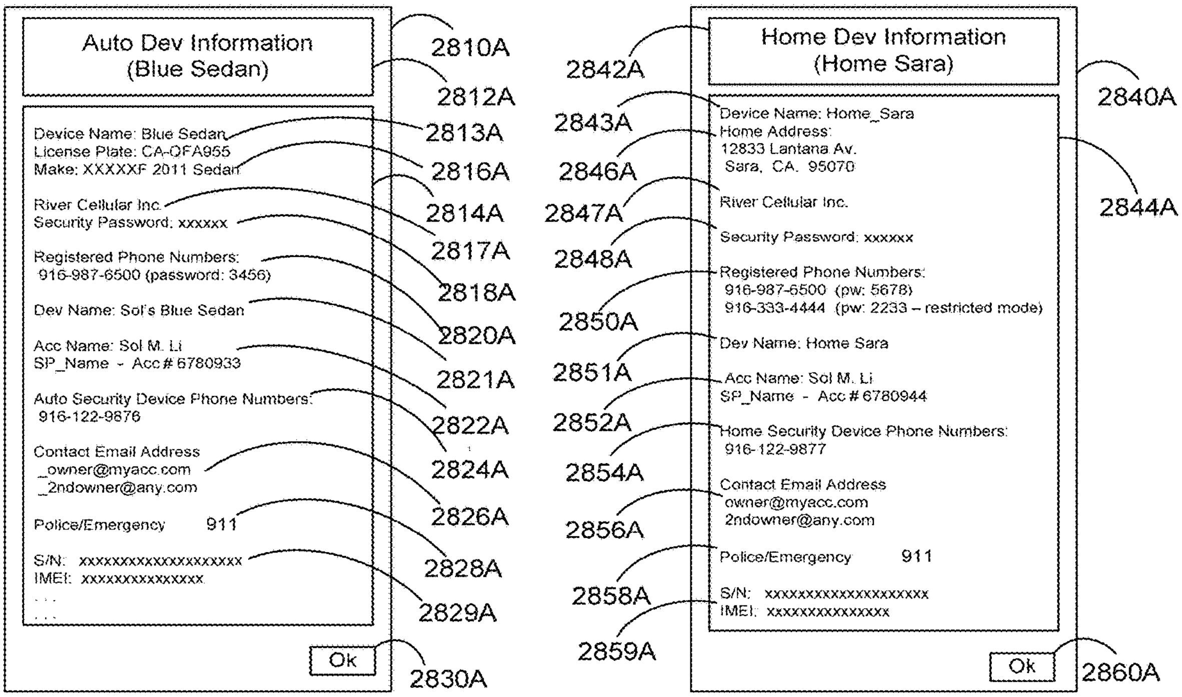
FIG. 28A shows a preferred example of handset's screen displays, presenting the Auto/Home Device/Dev Information (command) of Dev 106, relating to the present invention.
Figure 28B:
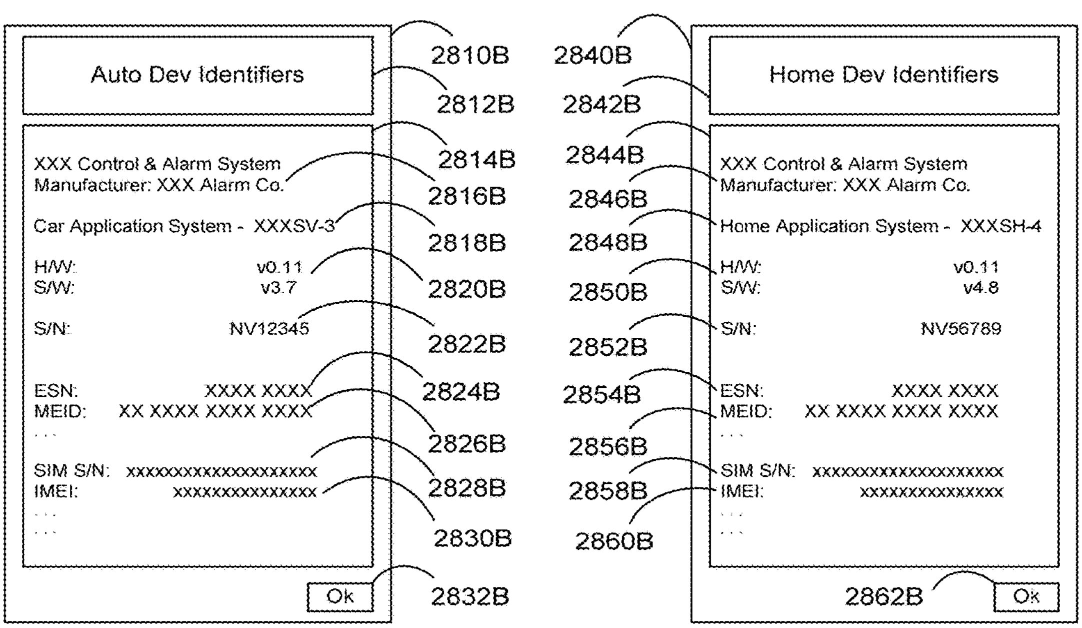
FIG. 28B shows a preferred example of handset's screen displays, presenting the Auto/Home Device/Dev ID (command) of Dev 106, relating to the present invention.
Figure 30:
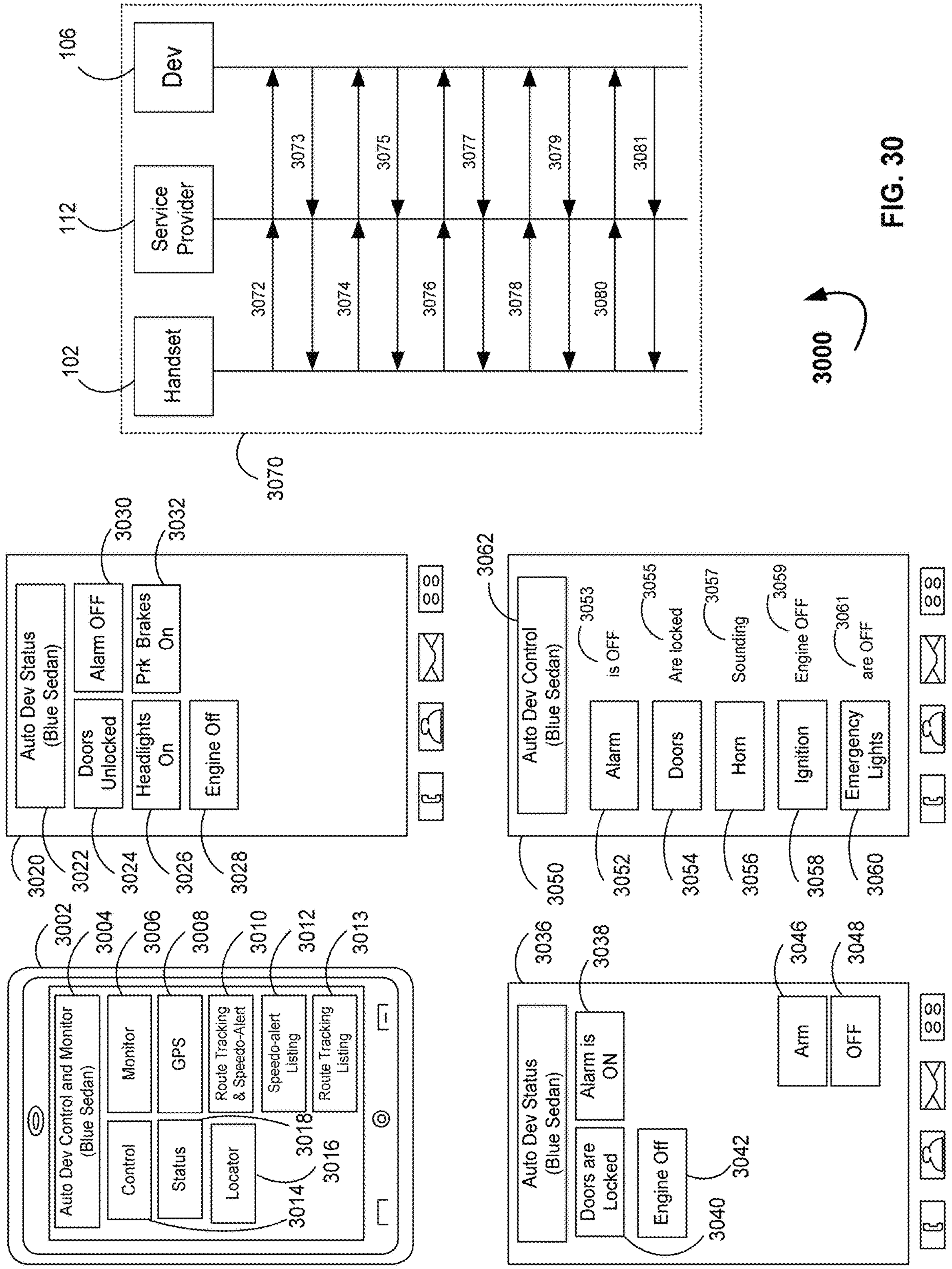
FIG. 30 shows a preferred example of handset's screen displays and flow diagram, presenting the Control and Monitor menu of Dev 106, relating to the present invention in the automobile application.
Figure 33:
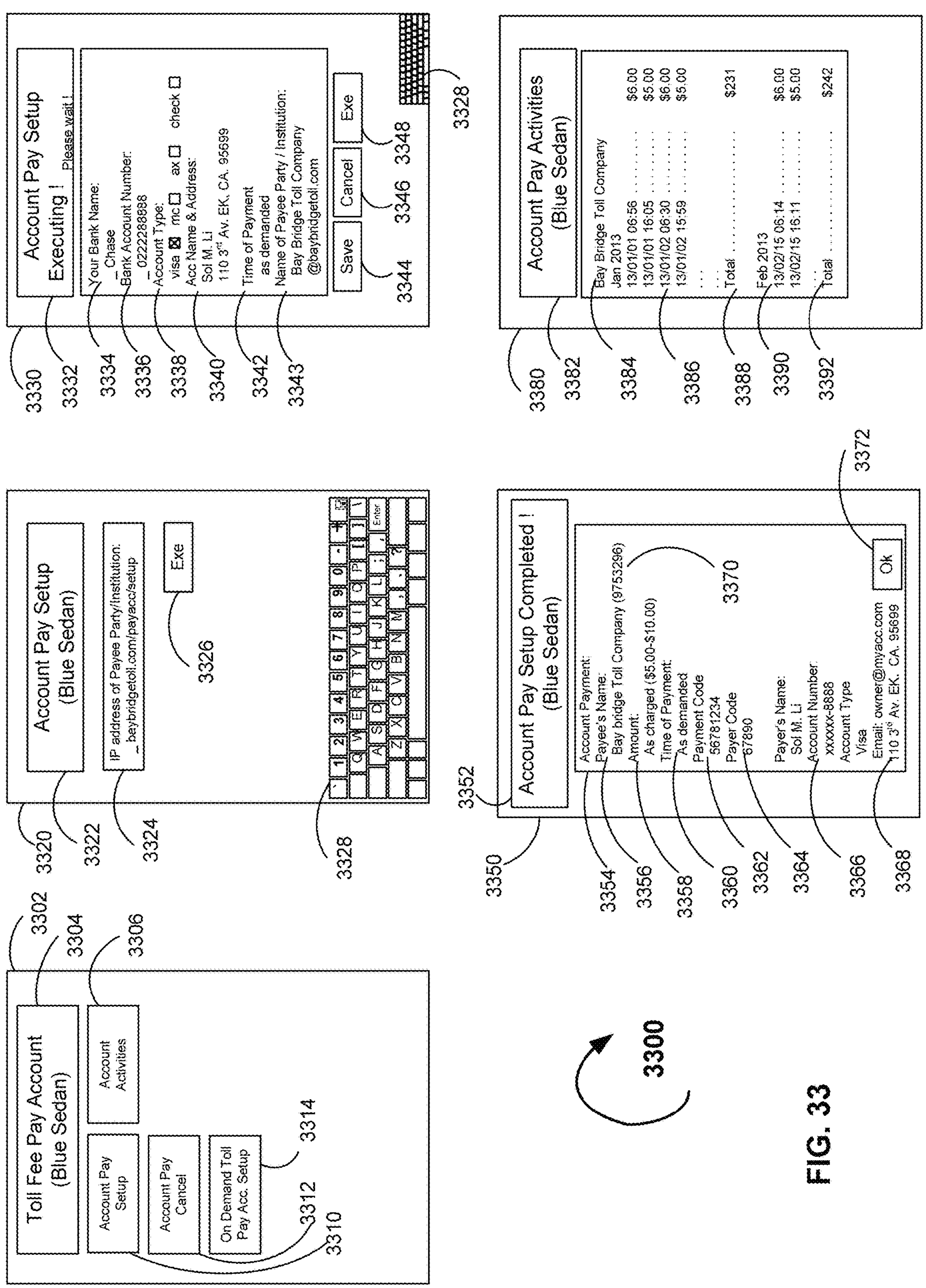
FIG. 33 shows a preferred example of handset's screen displays, presenting the toll fee account setup menu, and the account activity listing of Dev 106, relating to the present invention in the auto application.
Figure 37:
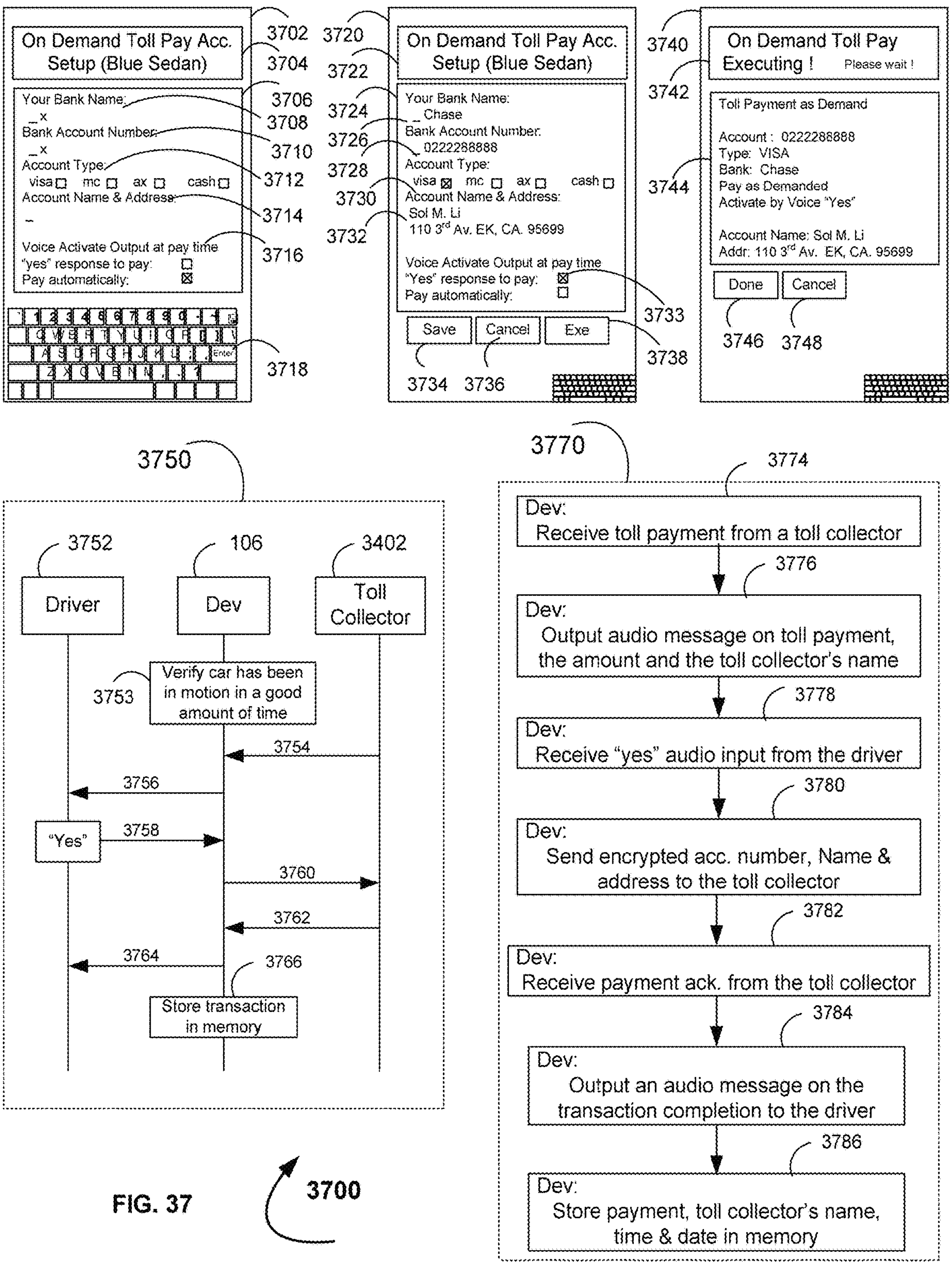
FIG. 37 shows a preferred example of handset's screen displays and flow diagram as well as a flow chart, presenting another toll fee account setup, and the interaction between various devices and program flow of Dev 106, during a toll fee collection, relating to the present invention in the auto application.
Figure 42A:
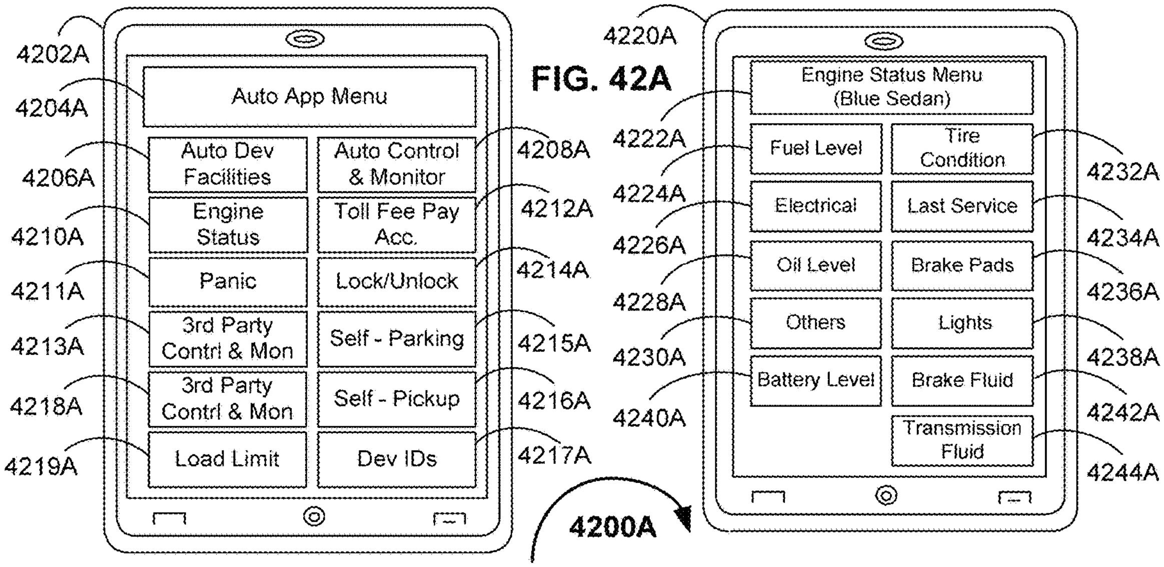
FIG. 42A shows a preferred example of handset's screen displays, presenting the engine status from Dev 106 to handset 102, relating to the present invention in the automobile application.
Figure 42B:
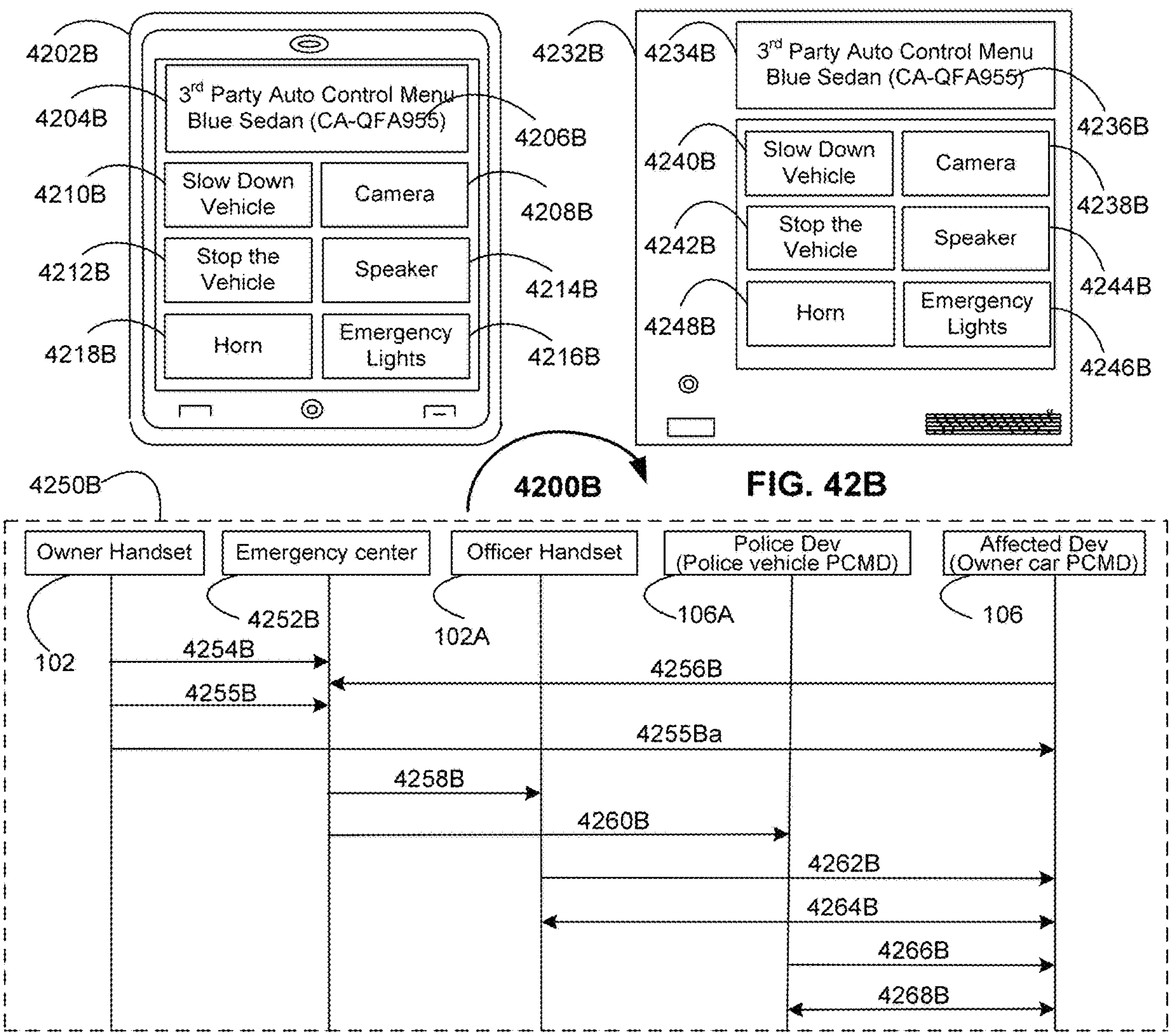
FIG. 42B shows a preferred example of vehicle control menu appearing on police's handset screen and/or police vehicle's dashboard console display allowing the temporary control by police officer(s) of the affected vehicle equipped with Dev 106, relating to the present invention in the automobile application.
Figure 42C:
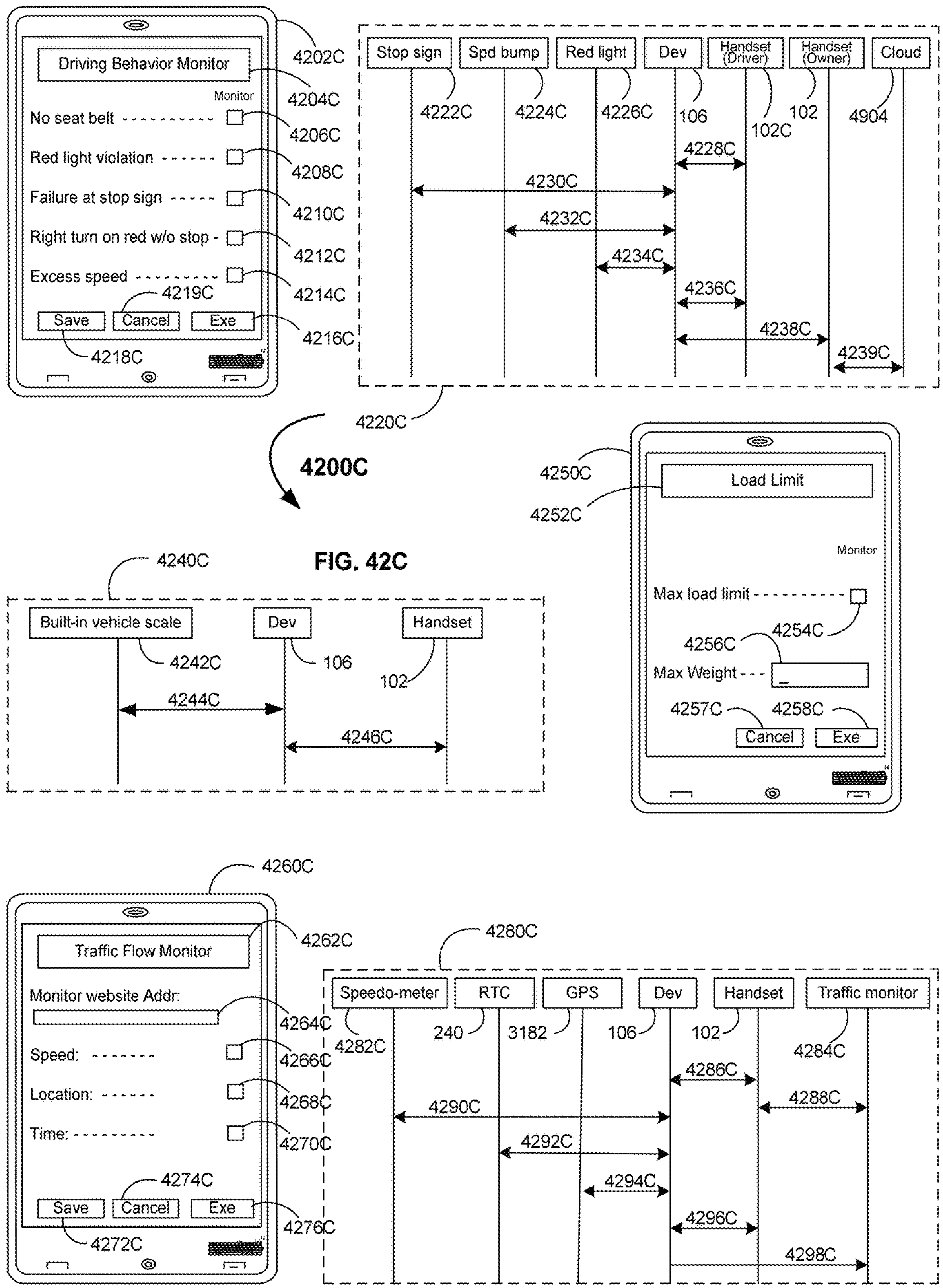
FIG. 42C shows preferred examples of a vehicle monitor menu and flow diagrams illustrating vehicle monitoring activities, relating to the present invention in the automobile application.

Execution of the other commands in the Auto App Menu 1122 such as: Auto Control & Monitor icon 1132 is shown in FIG. 30, Engine Status icon 1126 is shown in FIG. 42A, Toll Fee Pay Acc icon 1134 is shown in FIGS. 33 and 37, Third-Party Control and Monitor icon 1130 is shown in FIG. 42B, Driving Behavior 1142 and Load Limit 1144 icons are shown in FIG. 42C, Auto/Home Dev IDs icon 1146/1346 is shown in FIG. 28B. Panic icon 1128 allows user to turn on the car alarm to deter potential burglars/thieves. Lock/Unlock icon 1136 lets user lock/unlock the car remotely, Self-Parking 1138 and Self-Pickup 1140 icons let the user command the Dev to self-park his/her vehicle and self drive to pick up the driver when command to do so.

Figure 43:
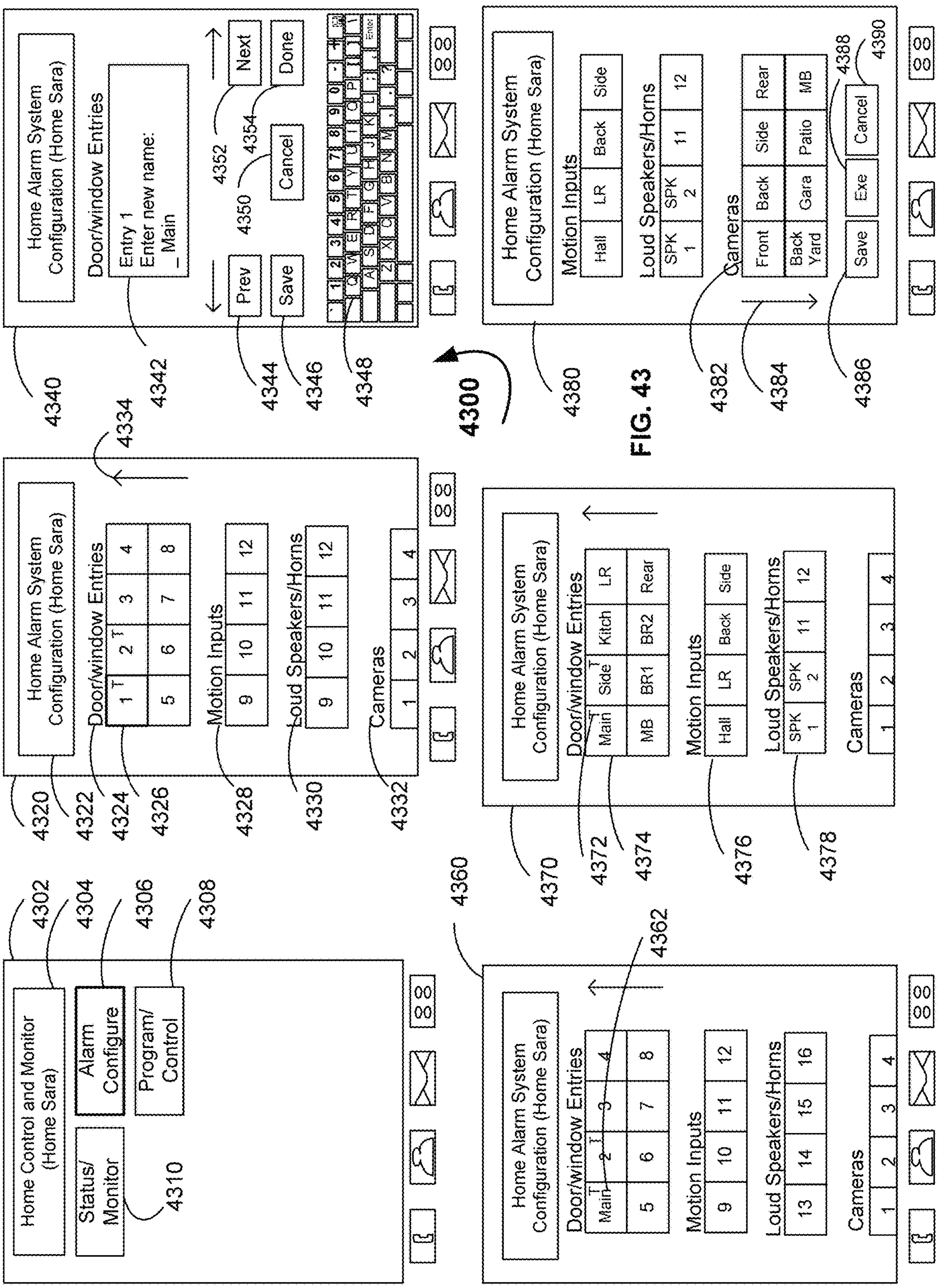
FIG. 43 shows a preferred example of handset's screen displays, presenting the configuration of home security alarm of Dev 106, relating to the present invention in the home application.
Figure 45:
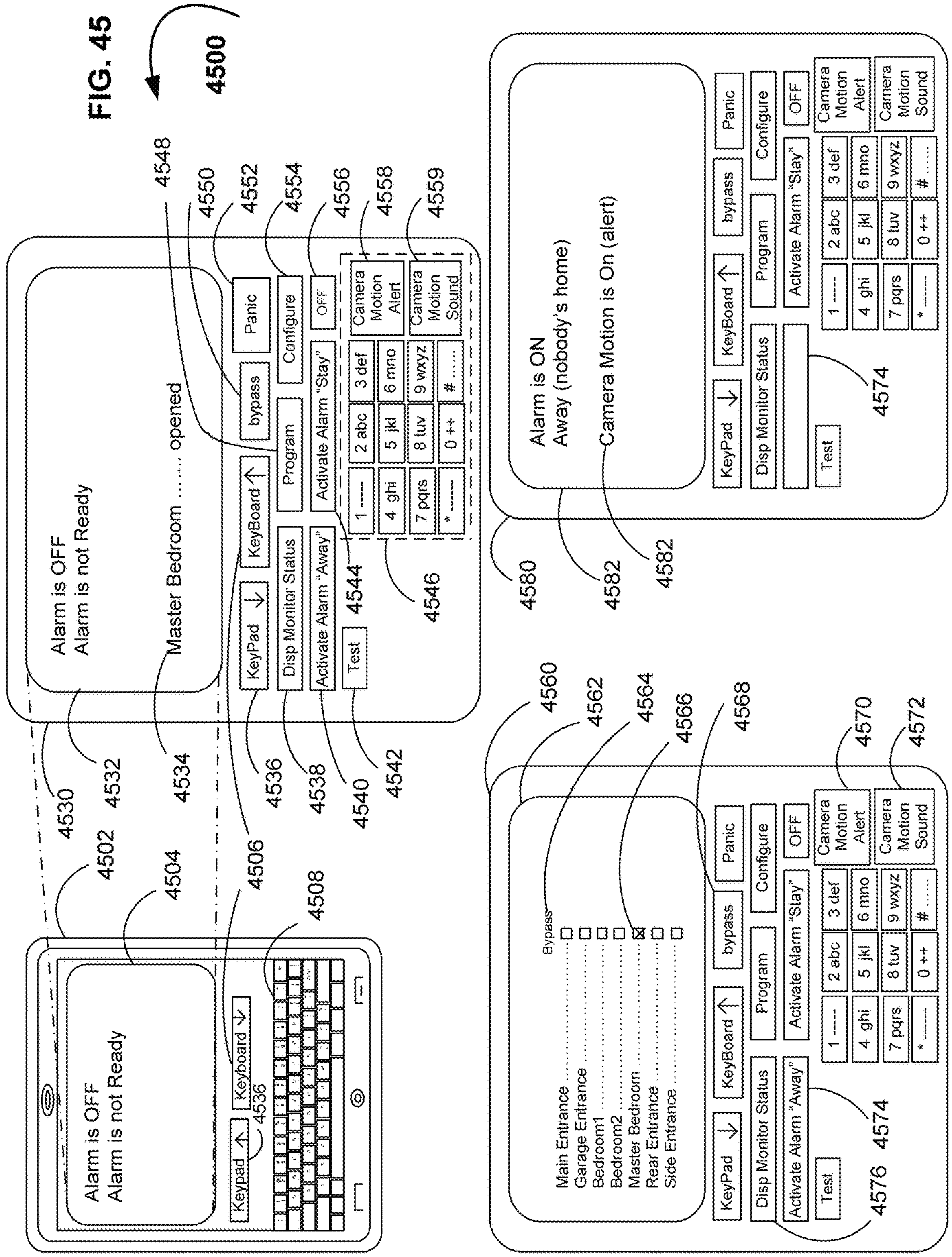
FIG. 45 shows a preferred example of handset's screen displays, presenting the program and control of home alarm function of Dev 106, relating to the present invention in the home application.

Execution of the other commands in the Home App Menu 1322 such as: Home Control & Monitor icon 1326 is shown in FIG. 43, Home Door Lock 1332, Unlock 1334 icons are shown in FIG. 56B, Home Alarm On 1336, Off 1338 icons are shown in FIG. 45, Garage Opener icon 1340 is shown in FIG. 55B and Household Appliances icon 1344 is shown in FIGS. 48-54.

According to one aspect of the invention (FIGS. 12, 14, 15A-17A), the user then starts the Dev activation process, after having applied and obtained the service account for the Dev from his/her cellular provider, by executing the Activate icon in Dev Facility Menu (FIG. 11/13). During or before the activation process which can be either NAM (FIG. 15A/15B), SIM (FIG. 16A/16B), ModSIM (FIG. 17/17A) or any new or improved activation methodology, the handset receives from the service provider or provision server an UTAID (Unique Temporary Activation Identifier which contains activation key and other parameters), which it then passes (via SRC media) to the Dev. The Dev derives from UTAID, the activation key and transmits it along with its identifier(s) and other activation parameters to the provision server in order to complete the activation process (FIGS. 12, 14, 15A-17A). The Dev then registers and is thus recognized by the network, and from then on it is able to communicate with the handset and other registered mobile devices. During the activation process, the handset also transmits its phone number (automatically or entered by user) to and receives a MSK from the Dev, which later will also send back (via cellular) to said handset, a confirmation message after it has been able to connect to the network. As soon as the Dev receives the confirmation acknowledgement from the handset, it sends back an Initialization icon (1290/1490 or 1294/1494 in screen 1280/1480 of FIG. 12/14, containing its assigned phone number), which the user will execute to start his/her handset and the Dev initialization process (FIG. 19/20), allowing said handset to use said Dev's phone number in its communication with said Dev. The encrypted MSK is preferably encoded, as part of the handset (or wired/wireless device) cellular (or other wireless long distance network) transmit packet(s) during routine communication with the Dev, which only responds back if said MSK matches with one which has been stored in its memory.

Figure 14:
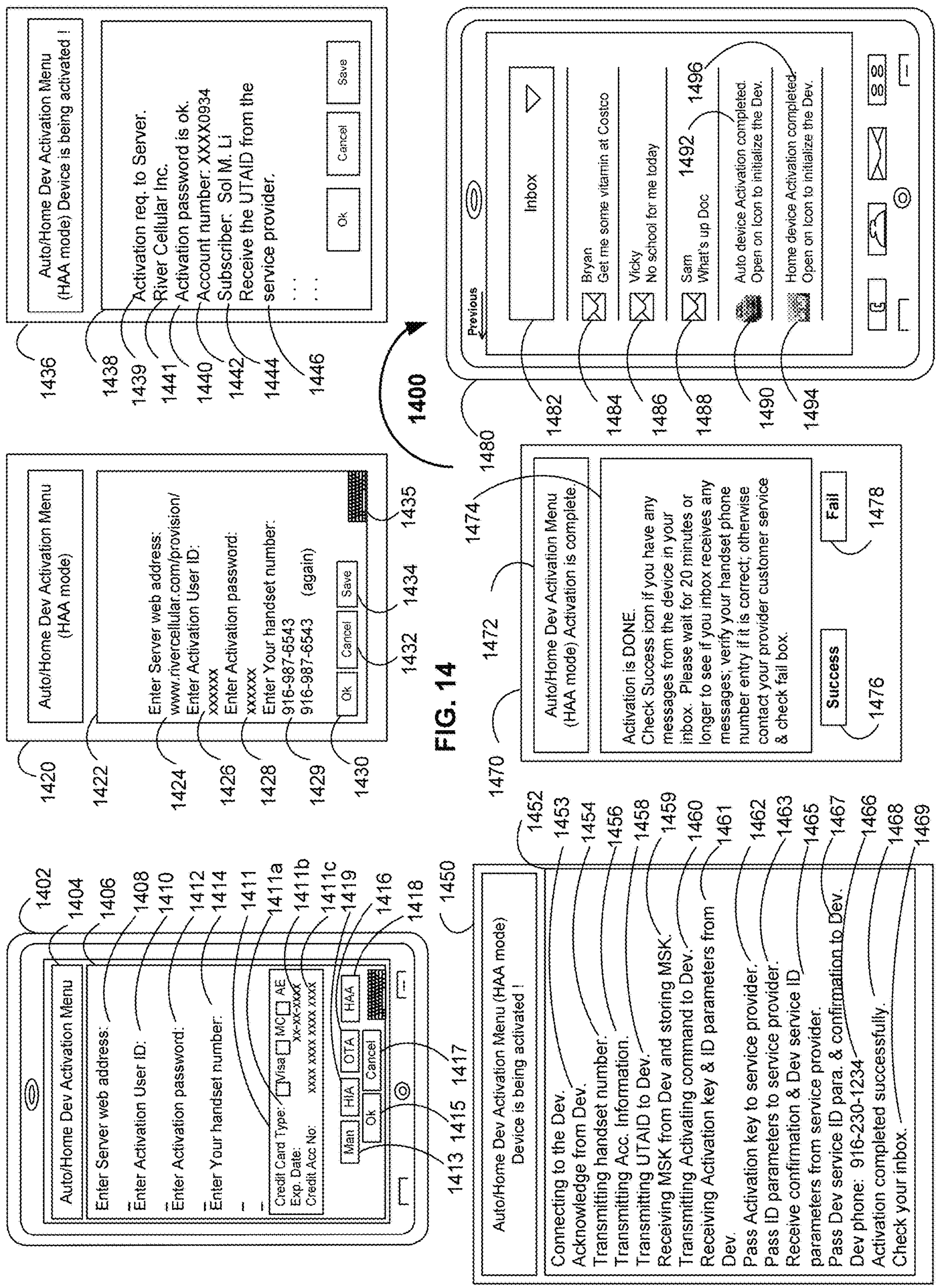

According to one aspect of the invention (FIG. 18A), the user preferably can start the Handset Imitation Activation (HIA) by executing icon 1419 (FIG. 14). In the HIA, the Dev starts the activation by receiving the activation command, the provision server web address, user ID, password and handset phone number via SRC from the handset and in return, it sends back the MSK to the handset. It then obtains the handset's service parameters; thus connects to the cellular network (of the handset) and then transmits the activation request and activation parameters to the provision server, receives the service parameters and acknowledgement from said provision server and is able to connect to the network (its network).

According to one aspect of the invention (FIG. 18B), the user preferably can start the Manual activation by executing icon 1413 (FIG. 14). In the Manual activation, the user goes to the service provider provision website 1844B using his/her handset, fills out the Dev's information and the account billing and activation codes, and executes the activation thus allowing the Dev to connect to the network.

Figure 2:
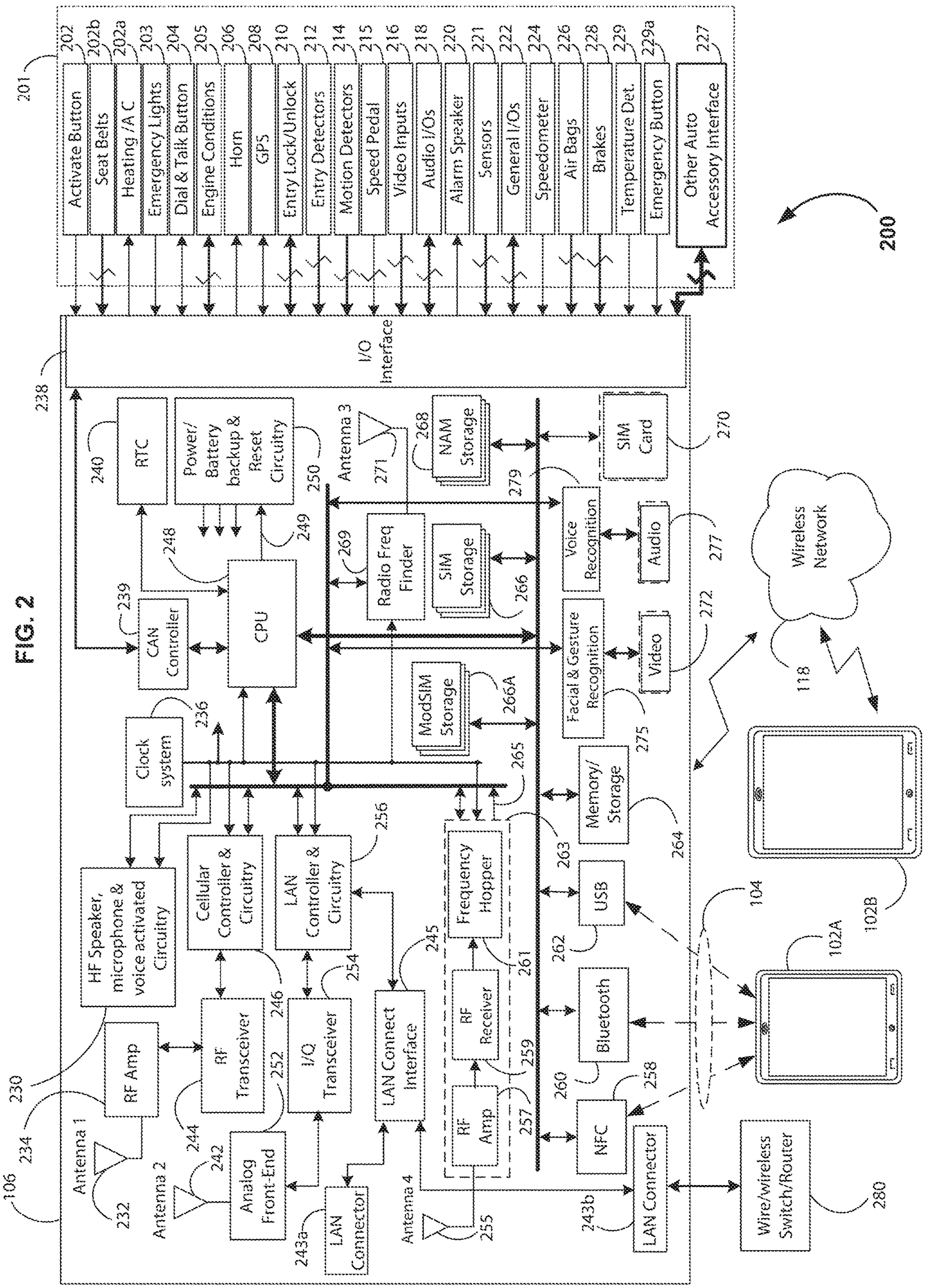
FIG. 2 shows a preferred example of one hardware functional block diagram of the present invention of Dev 106 in the automobile application.

According to one aspect of the invention (FIG. 18C), the Dev optionally can be equipped with a video display which the user can interact with directly (video connector 272 in FIG. 2/3/4). For the auto application, a display is already available on the dashboard console in many of the vehicles and therein the Dev can share said display 1802C with other functions. As for the home application, a separate distinct video display 1832C is shown as presumably mounted by the front panel of the Dev (Home Control and Monitor System).

According to one aspect of the invention (FIG. 18D), the user preferably has an option to start the Dev registration/activation process via SIM/USIM card by inserting said card into the Dev's SIM connector 1821D. As shown in FIG.

18C, this option either: 1. It requires a wired/wireless connector (not shown) from the Dev either to the dashboard console display 1802C with its hard-keypad 1806C and soft-keyboard 1822C (auto application) or to the front panel display 1832C with its soft-keyboard 1852C (home application). This option also requires a keypad-keyboard and display firmware driver module (block 568/668 in FIG. 5/6). The dashboard console hard-keypad preferably consists of several buttons for information displaying, such as: GPS for GPS information (1808C FIG. 18C), AM/FM (1810C FIG. 18C) for radio, M/C (1812C FIG. 18C) for Dev Monitor and Control as commonly practiced by the industry. 2. The Dev does not require to have a separate display since Dev's screens 1816D, 1830D, 1846D and 1866D can also appear on the handset screens 106 transmitted by said Dev via SRC similar to the ones as previously described in FIGS. 12 and 14.

According to one aspect of the invention (FIG. 19/20), the user executes the just received Initialization icon (1290/1490 or 1294/1494) in his/her handset's inbox (screen 1280/1480 of FIG. 12/14) from the Dev 106 or 1878A/1876B/1888D or 1880A/1878B/1890D of FIG. 18A/18B/18D) from the user. The handset 102 then navigates to screen 1902/2002 where the user can enter the required information. He/she then enters requested parameters, such as: the user's chosen account security password 1914/2014 and 1916/2016 (for added security), his/her handset own chosen password 1918/2018, email address (for password recovery), vehicle identification, home address, and emergency phone numbers (such as 911 in North America or other numbers depending on geographical and national locations), which all will be transmitted by the handset to the Dev for processing and storage. During the initialization, the handset also obtains and stores the Dev's phone number (1226) which is used by its application in their communication, as is known to those of ordinary skill in the art.

According to one aspect of the invention (FIG. 21A), a new handset 102 can be added (registered) into the Dev 106, by a registered handset 102; and will be able to control said Dev 106 just as said registered handset without any limitation.

According to one aspect of the invention (FIG. 21B), a new handset 102 can be added (registered) into the Dev 106, by a registered handset 102; and will have limited function in controlling said Dev 106.

According to one aspect of the invention (FIG. 22), the just newly added handset 102 receives from the Dev, the application download link and messages, instructing its owner to follow its instruction, in order for said handset to operate and communicate with the Dev, which will also notify the owner of the registering handset 102 when said newly handset completes its task.

According to one aspect of the invention (FIG. 23), a registered handset can be removed (deregistered) from the Dev by another registered handset.

According to one aspect of the invention (FIG. 24A), the Dev executes the password recovery process after the user failed to enter a matching password after three attempts. The Dev transmits the password recovery command to the Email Server, which will email the recovered password to said user.

According to one aspect of the invention (FIG. 24B), the user utilizes the handset to configure the Dev, in order to change, remove and/or update certain information, such as: vehicle license plate(s), house address, passwords, account number(s), email addresses, and emergency center phone numbers and the like.

According to one aspect of the invention (FIG. 24C), the user utilizes the handset to retrieve the device information from the Dev.

According to one aspect of the invention (FIG. 25), the user utilizes the new handset to register said handset into the Dev. The registration command requires the user to enter information, such as: the correct account security password, new handset's phone numbers (twice), handset passwords (twice), and Dev's phone number (which the new handset uses to transmit the command to, and will save Dev's phone number into its memory, when it receives the confirmation response to its registration from said Dev). The Dev verifies the account security password, it then checks to see both the handset phone number entries and its chosen password entries, each entered twice, are identical. If all the information is correct, the Dev will send the confirmation response and its device information to the handset; and from then on, they both can communicate with each other. During the registration process, the Dev will also transmit alert messages to other registered handset(s), if there are any in its memory, to inform the user(s) of such registration.

According to one aspect of the invention (FIG. 26), the user attempts to activate or register a new handset into the Dev, using the activation button 202 (of FIG. 2/3/4). If the Dev does not have any cellular service at the time, it will start the activation process as described previously. Otherwise the Dev will inform the registering handset user that the right application is needed to run the process. The user then either downloads the application online (if the handset does not contain the application), or run the application (if the handset contains said software). (The Dev also checks to see if it has any registered handset's phone number in its memory. If it does not contain any [meaning it has not been activated with the aid of a handset], a SIM card must be plugged into its slot [270 in FIG. 2/3/4], it will allow the user to initialize by letting him/her to enter the security password for the account, the phone number of his/her registering handset and the chosen password for said handset). When the Dev receives the registration command and its data from the handset, as illustrated previously (in screen 2502 of FIG. 25), it verifies and processes the command and the data; it also alerts the other handset(s) of the attempted action (if there is any). During the registration process, if any alerted handset sends back a "Not Ok" message 2662, the registration is immediately aborted; or if the Dev receives an OK 2658, then the registration can start immediately without the account security password entries or verification. For added protection, the account security password is required for the user of the alerted handset before he/she is able to allow or not allow such process to take place.

According to one aspect of the invention (FIG. 27), the user utilizes the handset to update to the latest version of the application of the handset 102, and of the Dev 106. The handset obtains the Dev's current version app information from said Dev, and its latest version and the Dev's latest version from the App Server 108. When the user decides to update to the latest version, he/she just executes the update icon allowing the handset to receive the copy of the latest version app from the App Sever. The handset then sends the Dev's app update URL (or Dev's latest version app) along with update command to the Dev, and then the handset and the Dev, each updates its own latest version app (or alternatively, the handset 102 receives the Dev's update app from the App Server 108 and then transmits it to the Dev 106).

According to one aspect of the invention (FIG. 28A), the user utilizes the handset to retrieve the device information from the Dev 106.

According to one aspect of the invention (FIG. 28B), the user utilizes the handset to retrieve the device ID parameters from the Dev 106.

According to one aspect of the invention (FIG. 29), when it is time for the user to switch to another service provider, he/she goes through a similar activation process again, in order for the Dev 106 to be able to connect to the network of the new service provider. The user signs up and obtains a new UTAID from the new service provider, and preferably should (via his/her handset) activate the Dev 106 while it is still connecting to the current service provider network. The user therefore can do the activation anywhere (instead of having to be in the vicinity of the Dev 106 in order to communicate with it using the SRC media as the case in previous activation process in FIGS. 11/13 and 12 and 14) since the handset still can communicate with the Dev 106 via the cellular network. As soon as the Dev 106 is activated and able to register, and then connected into the new network, its service to the previous network can be disconnected, and from then on the Dev 106 communicates with other handsets (mobile devices) in the new network. The Dev's device information file contains the same programmed data; in other words, there is no need for the user to reinitialize or reconfigure the Dev. Preferably the only difference is the new account number and possibly the Dev 106 has been assigned a different number. The handset 102 updates the Dev's phone number (regardless of it being a different number or not), and uses it from now on in its communication with the Dev 106. The Dev 106 also preferably sends command(s) to the other handset(s) so the user(s) of said handset(s) can also update the Dev's phone number.

According to one aspect of the invention (FIG. 30), the user utilizes the handset's Auto Control and Monitor menu to communicate with the Dev 106, in order to control the vehicle's electrical-mechanical components, such as: starting its ignition, locking/unlocking its doors, turning the alarm on/off, and the like, or to check the vehicle accessory status.

According to one aspect of the invention (FIGS. 31 and 32), the user utilizes the handset's GPS icon in the Auto Control and Monitor menu to communicate with the Dev 106, in order to enter the location address inputs into the vehicle GPS device, or retrieve the stored entries from GPS memory.

According to one aspect of the invention (FIGS. 33-37), the user utilizes the handset's Toll Fee Pay Account menu to communicate with the Dev 106, in order to set up the toll fee payment account on said Dev which will process, pay the required fee when demanded and record the transaction in its memory. The Dev 106 also transmits the transaction activities to the handset when the corresponding icon is executed on said handset 102.

According to one aspect of the invention (FIG. 38), the user utilizes the handset's vehicle Locator icon in the Control and Monitor menu to communicate with the Dev 106, in order to locate the current location of the vehicle. The Dev 106 then translates and transmits the current location command to the GPS, and passes the current GPS location information back to the handset 102.

According to one aspect of the invention (FIG. 39), the user utilizes his/her handset' Handset Locator icon in the Control and Monitor menu to communicate with the Dev 106, in locating a missing registered handset. The Dev 106 transmits back its listed registered handsets 102, which the user can choose from, in order for the Dev 106 to locate said handset 102.

According to one aspect of the invention (FIG. 40), the user utilizes the handset's Route Tracking and Speedo-Alert Program/Status icons in the Auto Control and Monitor menu to communicate with the Dev 106, in order to set up a certain speed limit recording history with the alert option and/or vehicle's route tracking history. The Dev 106 then interacts with the speedometer and the GPS to build up the history of when and where, the speed limit takes place, or just plain route tracking (where its track sampling time is programmable in minute time) which user can review later on with said handset. The user can also fill in, if needed, the network server destination for the off-Dev storage.

According to one aspect of the invention (FIG. 41A), the Dev 106 transmits a message preferably with video (or streaming video) data to the user's handset informing him/her that a certain event has happened to his/her vehicle, such as: a break-in. The user will be able to know the nature of the event, time and date and location, the event took place, and the registered handset phone numbers which have been alerted.

According to one aspect of the invention (FIG. 41B), the Dev 106 transmits a message preferably with video (or streaming video) data to the user's handset informing him/her that a certain event has happened to his/her vehicle, such as: a child or pet might have been left inside said parked vehicle. The user will be able to view the accompanied videos, and then takes appropriate actions with the handset, which transmits them to the Dev 106, such as: ignoring because of false alarm or confirming it by either taking one of a combination of these immediate and temporary measures: unlock the car door, car trunk, lower down car windows, sound the horn, turn on the car alarm, turn heat or air on, flash a light, call emergency center, or that the driver in on his/her way to the car.

According to one aspect of the invention (FIG. 42A), the user utilizes the handset's Engine Status icon in the Auto App menu to communicate with the Dev 106, in order to view the vehicle engine status remotely.

According to one aspect of the invention (FIG. 42B), the user (i.e., police officer) receives the command menu (icon) from the police emergency center transmitted by the Dev (originated by its hijacked driver for example) or by a registered handset owner (whose vehicle reported missing) allowing the officer to have temporary control of the affected vehicle driven by a third party driver.

According to one aspect of the invention (FIG. 42C), the user programs the Dev in order to store the data on the driving behavior of a driver of his/her car into his/her secure private cloud storage, to be informed when the vehicle is overloaded and to take part in a traffic monitor program during rush hours.

According to one aspect of the invention (FIGS. 42D1 and 42D2), the user goes online with his/her handset to book a rental vehicle from a car leasing company or hail transportation from a ride-sharing company. In the car leasing scenario, the user is capable of visually identifying and locating his/her rental car by its make, color, model and license plate; but the exchange of the unique verifiable identifier (MSK previously transmitted by the car rental company App Server) between the (rental car) Dev and his/her handset will let him/her get into said car and man the vehicle (with or without any car key). In the ride-sharing case, the user would go to his/her ride at the arranged pickup location, find it by its make, color, and model; but for added assurance, the exchange of the unique verifiable identifier (MSK previously transmitted by the ride-sharing company App Server) to his/her handset, to the driver's handset and to the (ride-sharing/taxi) Dev will assure both of them: the user getting into the right car and the driver picking up the right passenger.

According to one aspect of the invention (FIG. 43), the user utilizes the handset's Alarm Configure icon in the Home Control and Monitor menu to communicate with the Dev 106, in order to configure the alarm I/O, such as: door and window entries, motion detectors, alarm speakers and horns, and cameras in more descriptive terms (instead of plain numeric values), such as: Door/Window Entry #1 into BR2 (bedroom #2 window), Motion input #1 into Hall (motion detector), Camera #5 into Back yard (camera), when he/she is at home, away, or far away from home.

According to one aspect of the invention (FIG. 44), the user utilizes the handset's Status/Monitor icon in the Home Control and Monitor menu to communicate with the Dev 106, in order to monitor and view various windows, motion detectors and cameras in the house, when he/she is at home, away, or far away from home.

According to one aspect of the invention (FIG. 45), the user utilizes the handset's Program/Control icon in the Home Security menu to communicate with the Dev 106, in order to program and arm the house alarm system, when he/she is at home, away, or far away from home.

According to one aspect of the invention (FIG. 46), the Dev 106 transmits a message, preferably with video (or streaming video) data, to the user's handset informing him/her a certain event has happened to his/her house, such as: a break-in. The user then can view and find out through the handset where and when (which entries and time) the event took place, when he/she is away or far away from home.

According to one aspect of the invention (FIG. 47), the Dev 106 transmits a message, preferably with video (or streaming video) data, to the user's handset informing him/her a certain event has happened in the camera monitoring device, such as: detection of a moving object outside his/her house, when the owner is at home, away, or far away from home.

According to one aspect of the invention (FIGS. 48-49), the user utilizes the handset's Appliance Add icon in the Home Appliances menu to communicate with the Dev 106, in order to discover or find out the presence of house-hold devices. The handset then has them connected and transferred their software applications to the Dev 106, and then to the handset; or has them provided the URLs (web links), which allow the user to download the software applications to his/her handset which also transmits them to the Dev, or the Dev can download automatically the app from said URLs. The user can then run these apps to control these said devices remotely, when he/she is at home, away, or far away from home.

Figure 13:
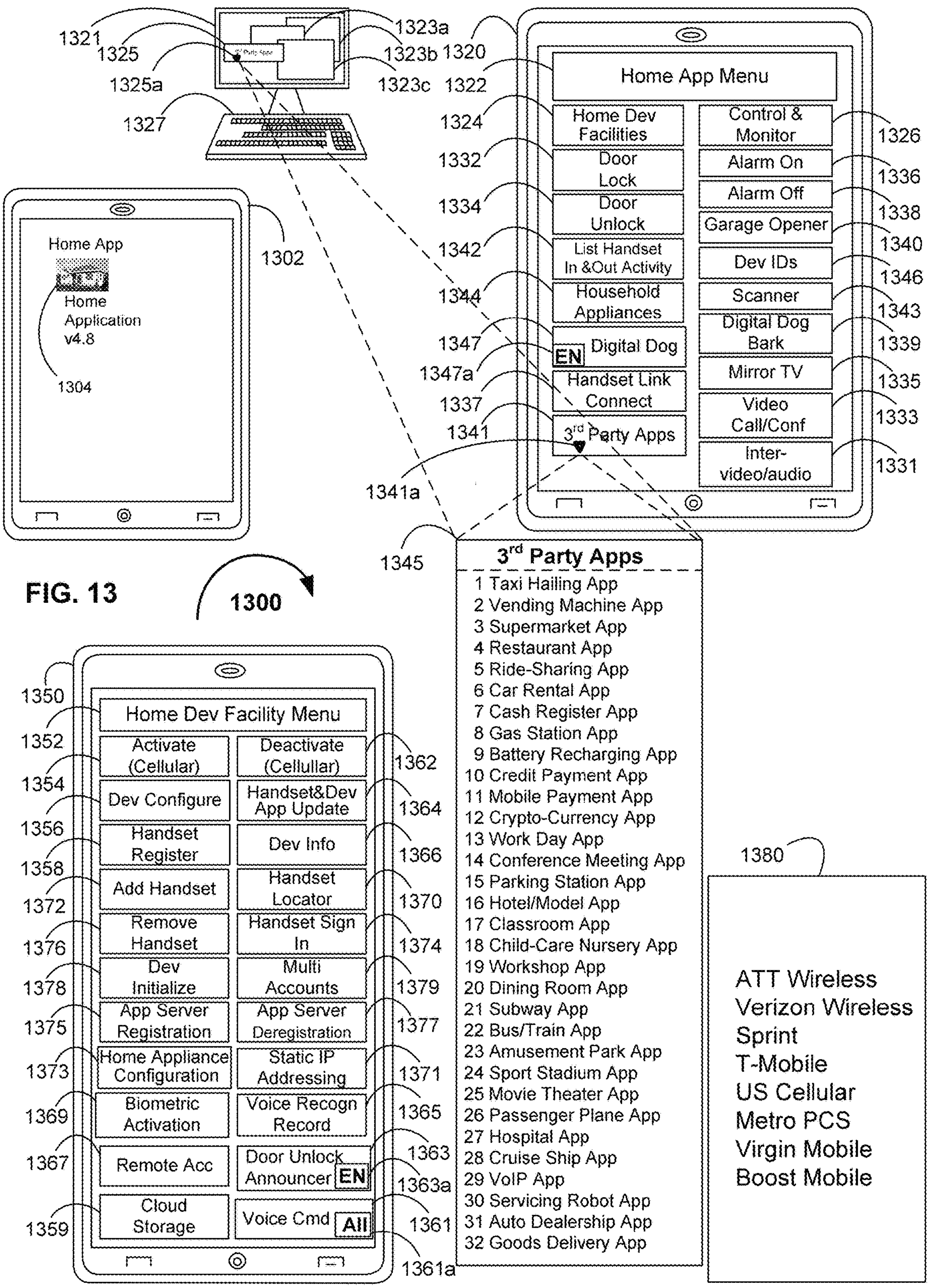

According to one aspect of the invention (FIG. 50), the user utilizes the handset's Home Appliance Configuration icon 1373 in the Home Dev Facility Menu 1352 of FIG. 13, to configure the Dev as a Dynamic Host Configuration Protocol (DHCP) web-server (executed by its DHCP Server layer block 619 of FIG. 6) which in turn is able to assign its IP address dynamically to one or more of its household appliances or premises equipment (in other words—Connected Devices) as soon as said device(s)/host(s) is(are) connected to its private Local Area Network (non-public wired/wireless LAN or LAN/WLAN).

According to one aspect of the invention (FIG. 51), the user communicates with his/her household/premises appliances either interacting with the Dev directly or via his/her handset. It also presents an alert text message the user receives from the Dev on his/her registered handset when an external household/premises device attempts to connect to its private (wired/wireless LAN) LAN/WLAN network; it only allows said attempt into its network with the user's permission.

According to one aspect of the invention (FIG. 51A), the user communicates with his/her household/premises appliances such as the Cloud Storage (block 4904 of FIG. 49/50/51) via his/her handset (executed by both the Dev's Cloud Storage app 639 of FIG. 6 and the handset's Cloud Storage app 739B of FIG. 7B) in order to store (upload) photos residing in said handset. He/she can also store the photos or video in real-time while taking said pictures or recording video. Files and other documents in the handset such as journals, personal notes can also be stored (with or without encrypted password) on or retrieved from the Cloud Storage.

According to one aspect of the invention (FIG. 52), the user utilizes the handset's Appliance Remove icon in the Home Appliances menu to communicate with the Dev 106, in order to remove a certain house-hold device or devices which are no longer in use, when he/she is at home, away, or far away from home.

Figure 6:
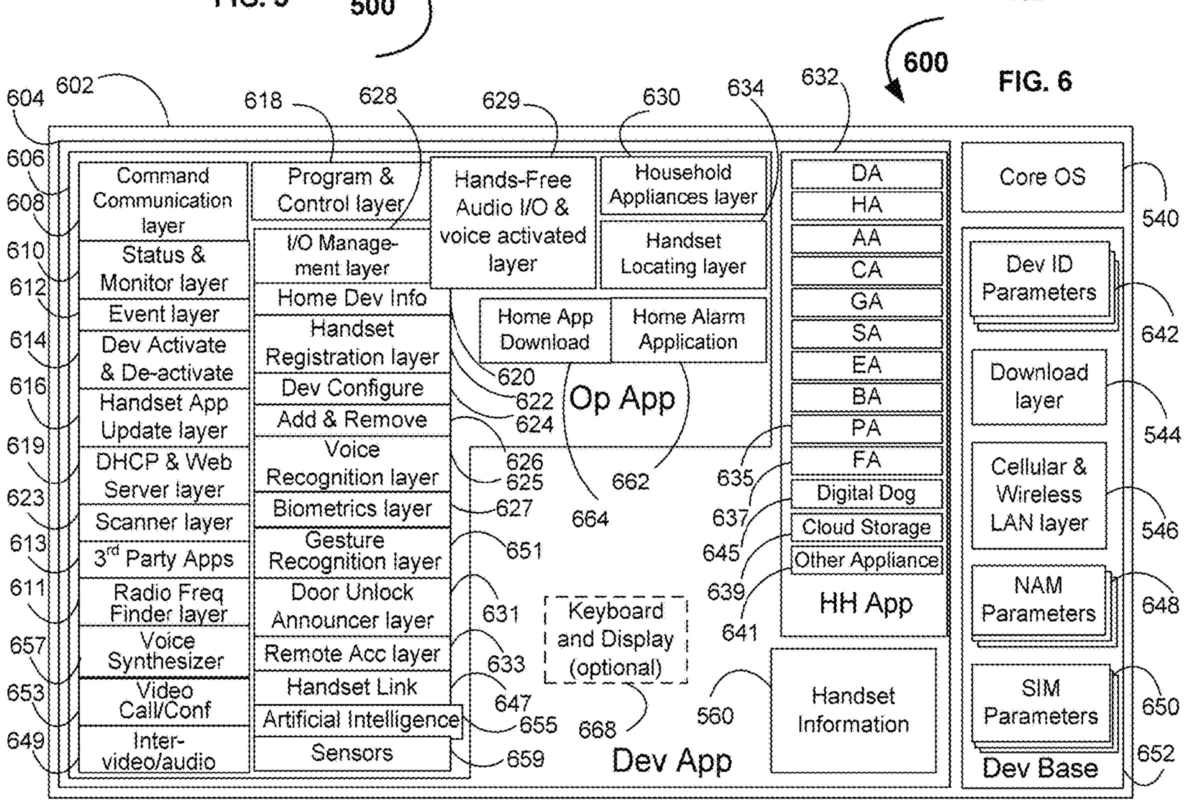
FIG. 6 shows a preferred example of second variation of software block diagram of the present invention of Dev 106 in the home application.

According to one aspect of the invention (FIG. 53), the Dev 106 is used as a Vending Machine Controller (executed by its Vending Machine App, one of 3$^{rd}$ Party Apps block 613 of FIG. 6) dispensing merchandise item(s) where a customer can use his/her handset (with a displayed QR barcode block 5322 he/she is able to scan using his/her handset to obtain the URL for instant access to Vending Machine App) to purchase said item(s) and pay with the encrypted credit account information in the handset. The Dev 106 also is used as a bus/train passenger information service controller communicating with the passengers' handsets while they are about to get onboard. It lets the passengers know if they are boarding the right trip by texting to their handsets. It also transmits the trip itinerary information map and alerts its passengers when they are about to arrive to their destination.

According to one aspect of the invention (FIG. 54), the Dev 106 (executed by its Restaurant App, one of 3$^{rd}$ Party Apps block 613 of FIG. 6) is used as a Handset Traffic Controller and/or a public DHCP server openly allowing and connecting a plurality of mobile devices (i.e., handsets, tablets, flat screen displays and the likes as mentioned throughout in this invention) to its public WIFI network, in order for it to transmit and display its products and services to potential customers (in this case: menus to its restaurant customers via their handsets), alert its service staffs of the customers' presence (via handsets/tablets of waiters in charge of the tables or servicing robots), taking the customers' orders (from their handsets or waiters' handsets), transmit said orders to its kitchen/bartending staffs (to their handsets/tablets or overhang flat-screen displays), inform its waiting staffs or servicing robots when the orders are ready to be served, complete the payment transaction when the customers are ready to pay and also allow its owner (the restaurant owner) to view, monitor and/or survey the quality of service his/her customers being rendered.

According to one aspect of the invention (FIG. 55A), the Dev 106 is able to conduct a payment transaction with a customer's handset as his/her purchase or exchange of service is rendered at the Cash Register Counter 5511. The Figure also presents a scenario how he/she is informed when his/her handset is admittedly out of reach of his/her Handset Link Device 5504.

According to one aspect of the invention (FIG. 55B), the user utilizes the handset's Garage Opener icon in the Home Appliances menu or in the Home App menu to communicate with the Dev 106, in order to open or close the garage door(s). The Dev also lets user know if the garage is closed or opened, when he/she is at home, away, or far away from home.

According to one aspect of the invention (FIG. 56A), the user utilizes the handset's Heat/AC icon in the Home Appliances menu to communicate with the Dev 106, in order to program the central air unit, such as: when and at what degree to turn it on and at what degree to turn it off, to control in real-time, and view its status at any moment, when he/she is at home, away, or far away from home.

According to one aspect of the invention (FIG. 56B), the user utilizes the handset's Door Lock icon in the Home Appliances menu or in the Home App menu to communicate with the Dev 106, in order to lock or unlock the main door entry, when he/she is at home, away, or far away from home.

According to one aspect of the invention (FIG. 57), the user utilizes the handset's Sprinkler icon in the Home Appliances menu to communicate with the Dev 106, in order to program the landscape sprinkler, such as: on which day(s) of the week, at what time and for how long, and which station(s) to turn the sprinkler system on to water the landscape (garden, and house plants and the like). The sprinkler can also be turned on or off at any moment by the user via the handset at home, away, or far away from home.

According to one aspect of the invention (FIGS. 58 and 59), the user utilizes the handset's Electric Meter icon in the Home Appliances menu to communicate with the Dev 106, in order to set up the monthly electricity payment account, so the Dev 106 will acquire the electricity meter reading every month, and then transmits it to the utility company which will receive the payment automatically or bill the user who will then pay it via his/her handset, when he/she is at home, away, or far away from home.

According to one aspect of the invention (FIG. 60A), the user utilizes the handset's Help Alert icon in the Home Appliances menu to communicate with the Dev 106, in order to monitor and communicate with the wearer of the Help Alert device via his/her handset, when he/she is far away from the premises.

According to one aspect of the invention (FIG. 60B), the user utilizes the handset's Door Bell & Intercom icon in the Home Appliances menu to communicate with the Dev 106, which connects to the intercom letting the user answer (via the handset) when someone rings the doorbell. This feature allows the owner away from home to answer the door just like being at home.

According to one aspect of the invention (FIG. 61), the user utilizes the handset's Smart Pet Door icon in the Home Appliances menu to communicate with the Dev 106, in order to program and set up the Smart Pet Door system for the pets' daily needs, and to control its components in real-time, when he/she is at home, away, or far away from home.

According to one aspect of the invention (FIG. 62), Dev 106 integrating in the robotic application, allows a plurality of users to program, control, direct, command, and monitor its functions in its surrounding environment, while at the same time, be informed of any expected and unexpected events relating to its application.

FIG. 1 illustrates a preferred example of embodiment 100 of the present invention. It presents the wireless network 118 where all devices have access to and use to communicate with one another. Network 118 is commonly known as a cellular network or the type of wireless network (such as wide area cellular network—GSM network, CDMA network, WCDMA network, TD-SCDMA network, NAMPS network and/or networks operating in accordance with any derivatives—GPRS, EDGE, CDMA2000, WiMAX, LTE, TD-LTE—based on GSM/EDGE and UMTS/HSPA, 3GPP, 4G LTE, 5G, among other similar and future medium, such as: satellite network or a hybrid network consisting many types of media—wire, wireless, terrestrial and satellite) provided by the service provider(s). The invented device/appliance or Dev (for short) 106 is the present invention communicating with the handset 102 which also can be a smart phone, tablet PC, laptop PC, iPad-like device, PDA (Personal Digital Assistant), or any portable, mobile electronic device through SRC media 104 (Short Range Communication) which it uses during an activation process or when they are within said SRC network range. The Dev 106 is shown either residing in an automobile 120, a residential house (or business premises) 122 or a general robotic device (equipment) 124. The Cellular Service Provider or Service Provider 112 is the provider of cellular communication service to the Dev 106 thus recognizing and allowing it to communicate with other cellular devices through wireless network 118. Before the Service Provider 112 can recognize the Dev 106, the Dev 106 has to be activated. The activation process involves the exchanges of pre-usage/pre-programmed and/or specific unique issued information between the Dev 106 and the Service Provider 112 itself or a combination of its network computers/servers [such as MSC (Message Switching Center), VLR (Visitor Location Register), HLR (Home Location Register), AuC (Authenticity Center), Activation Server, and other backend systems as are known to those of ordinary skill in the art], which are proprietary in nature to the service provider but known in this invention simply as Provision Server 114. The Dev 106 contains some of the parameters for activation in its internal memory storage. Some of them the Dev 106 obtained by downloading from the service provider 112 and/or the Provision Server 114 via the handset 102. The App Server 108 can be either provided by the Dev 106 manufacturer (not shown in FIG. 1) and/or by the Service Provider 112 operator (also not shown in FIG. 1 in cooperation with the Dev 106 manufacturer). The App Server 108 in latter case can be part of the Service Provider 112 intranet network just as shown in the backend connection 120 between the Provision Server 114 and the Service Provider 112.

FIG. 1 also shows BTS (Base Transceiver Stations) or The Towers 110 (as illustration herein, the communication between the various devices going to the Service Provider 112 but actually goes through one or more Towers 110 first). The information from one device goes through one or more towers 110 and then is transmitted to one of the regional Service Provider 112. The Service Provider 112 then again passes said information to one or more towers 110 where it finally reaches the destination server/computer.

All these components, such as: Towers 110, Service Provider 112, and Provision Server 114, and the like can also be referred to as Public Land Mobile Network (PLMN). So when Provision Server 114 or Service Provider 112 is referred to in the herein examples, it also involves the function of the whole PLMN with the main task falling into said mentioned component (Provision Server or Service Provider). The Email Server 116 acts as an email server to email password recovery to the user's email address, when requested by the Dev 106 in case the user has problems entering the required password. The Email server 116 can also be part of (incorporated into) the App Server 108.

Figure 3:
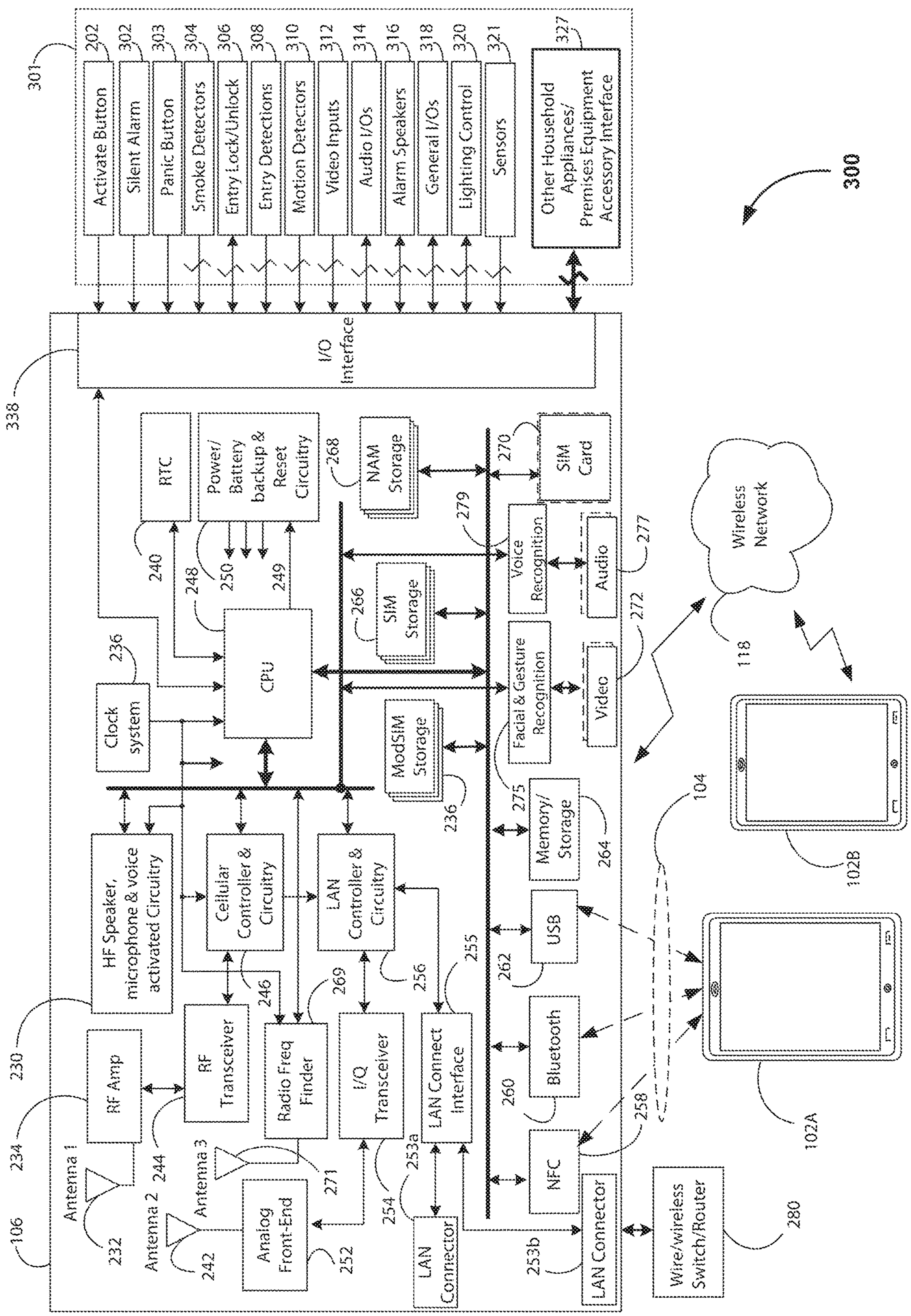
FIG. 3 shows a preferred example of second variation of hardware functional block diagram of the present invention of Dev 106 in the home application.
Figure 4:
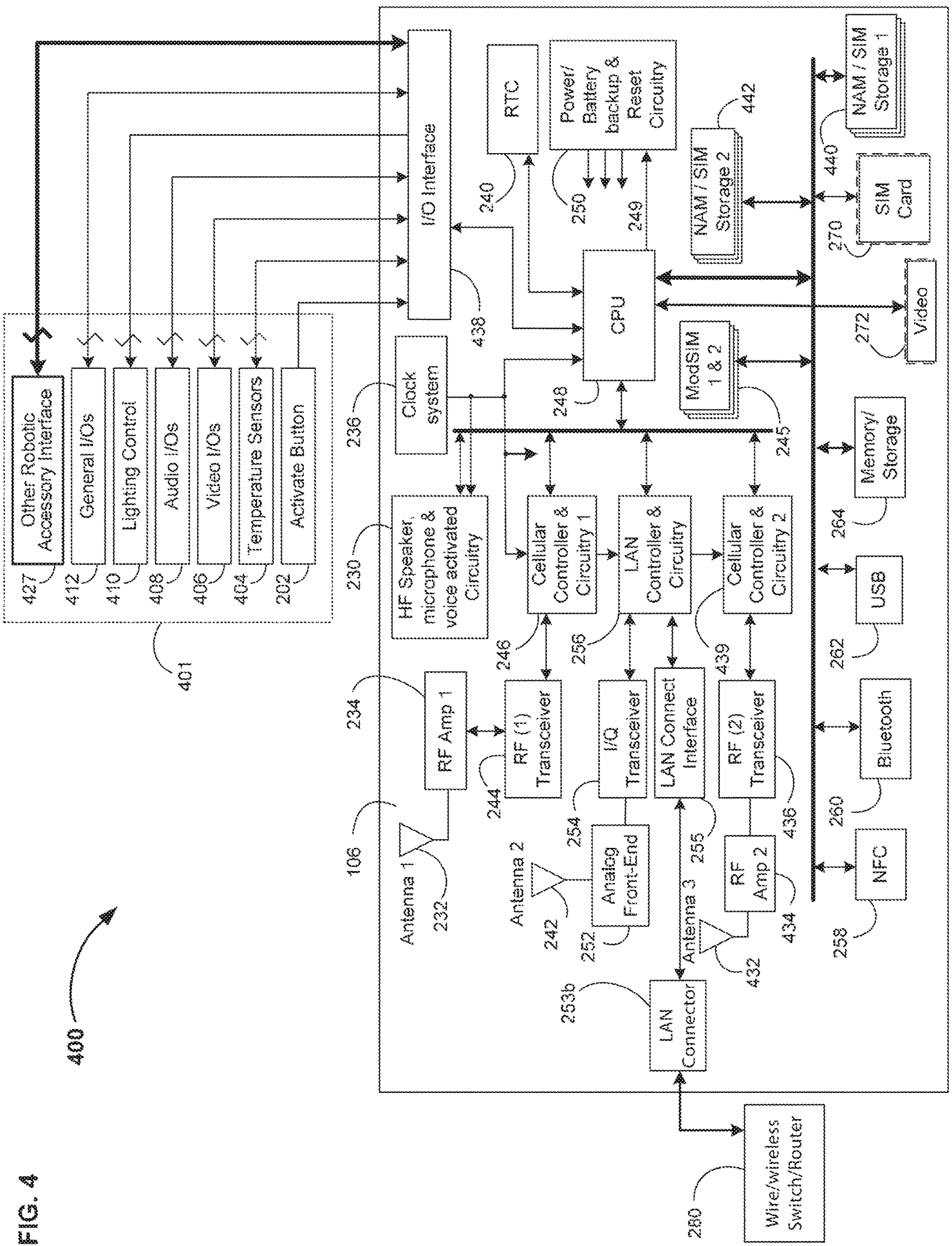
FIG. 4 shows a preferred example of third variation of hardware functional block diagram of the present invention of Dev 106 in robotic application.

FIGS. 2-4 illustrate preferred examples of embodiments 200, 300 and 400 of the present invention in terms of hardware block diagrams as are known to those of ordinary skill in the art. They present the Dev 106 integrating and interfacing into the Car control and Monitor System as represented by Illustrations 200 in FIG. 2, the House Control and Monitor System 300 in FIG. 3, and the General Robotic Control and Monitor System 400 in FIG. 4. The principle components of the Dev 106 are the CPU 248, its associated cellular phone circuitry 246, and its RF interface circuitry (RF Transceiver 244, RF Amp 234 and Antenna 232). One noticeable exception is the Car Control and Monitor System (FIG. 2) includes a Controller Area Network (CAN) 239 which is ISO 11898-1:2015 compliant and available from Lattice, Cypress, TI and a plurality of other semiconductor companies. An example of the CPU and its associated circuitry, or chipset is X-GOLD 101 single-chip by Intel Corp., NEON Cortex-A9 licensed by ARM, and others, such as: Qualcomm and many, as are known to those of ordinary skill in the art.

Block diagrams 200, 300 and 400 also include the wireless LAN controllers (which may also referred to as Wi-Fi or WIFI communication over one of more wireless local area network WLAN) and its associate circuitry 256, 254, 252 and 242, the volatile and non-volatile memory storage 264 (flash, SDRAM, RAM, EEPROM, . . . ), clock system 236, I/O interface 238/338/438, Real Time Clock 240 and power and battery backup 250. They also include one or more of the SRC (Short Range Communication) devices, such as: NFC 258, Bluetooth 260, wireless/wire USB 262, and other wireless radio frequency (RF) technology (not shown). It also contains non-volatile memory storage areas for NAM 268, SIM 266, ModSIM 266A parameter storage, and slot 270 for SIM card. The NAM 268, SIM 266 and Mod SIM parameter storages preferably can be incorporated into the Memory Storage 264, which is also storage for program code, application software, data, and OS firmware as are known by those of ordinary skill in the art. Embodiment 200 includes the Hands-free Speaker, Microphone, and voice activated circuitry 230 which can also reside in embodiments 300 and 400. The Hands-free Speaker, Microphone, and voice activated circuitry application 532 can also reside in embodiment 600 while embodiment 400 offers a plurality of cellular handset interface circuitry 439, 436, 434, and 432.

FIG. 2 also includes some inputs and outputs (I/O) which are very useful and life-saving, such as when the driver runs into an accident, where he/she may not have the mental or physical capability to take immediate actions to deal with the circumstances. The Input Dial & Talk button 204 offers a convenient way, when the driver does not happen to have the handset in his/her possession, to get in touch with a family member (registered handset 102) when the occasion requires.

Air Bag (226): In the case when there is an accident, which caused big impact to the car and/or inflated its Air Bag (226 in FIG. 2), the Dev 106 transmits alert emergency messages with the vehicle location to the Emergency Center (not shown) and to registered handsets at least one time (i.e., 911 in US and Canada, China 110 or similarly depending on national and geographical locations as mentioned earlier in the text). The Dev 106 also dials Emergency Center, and turns on the Hands-Free Microphone and Speaker (230 in FIG. 2), so the driver can communicate with the Emergency Center operator. If no response comes back from the Emergency Center within a short period of time (i.e., one minute or two; in other words there is possibly no cellular service available at the accident location), the Dev 106 will transmit emergency messages with the vehicle location to the Emergency Center (not shown) via satellite network if programmed to do so (not shown) or via a hybrid network consisting many types of media—wire, wireless, terrestrial and satellite as are known to those of ordinary skill in the art. If the Dev 106 still gets no response, after its message transmission, from the Emergency Center, whatsoever, it will transmit a satellite emergency command to the GPS (3182 in FIG. 31), which in turn preferably transmits it to the Emergency Center, along with its GPS location (not shown) via satellite.

Emergency Button (229*a*): Preferably located inside the vehicle, when pushed (multiple times in a row) will transmit an electrical signal to the Dev 106 which will transmit the emergency messages with the current GPS location to the other registered handsets 102 and the Emergency Center (not shown). The Dev 106 also dials the Emergency Center and turns on the Hands-Free Microphone and Speaker (230) to allow the driver of the vehicle to communicate with the Emergency Center personnel. The Dev 106 also dials a registered handset and (if it answers) connects to the Hands-Free Microphone and Speaker (230) to allow the driver of the vehicle to communicate with the user (i.e.; family member) of said handset.

Dial & Talk Button (204): Also allows the driver of the vehicle to communicate with a registered handset 102 user in case he/she does not have the handset in his/her possession or said handset does not function properly at the time.

FIGS. 2 and 3 also illustrate the communication between the handset 102A and the Dev 106 via the SRC network 104, such as: during the activation process (FIGS. 8, 9, 11/13, 12 and 14), or when they are within their short range communication (SRC) medium, and via the cellular (or other wireless) network 118 during normal operation.

Figure 5:
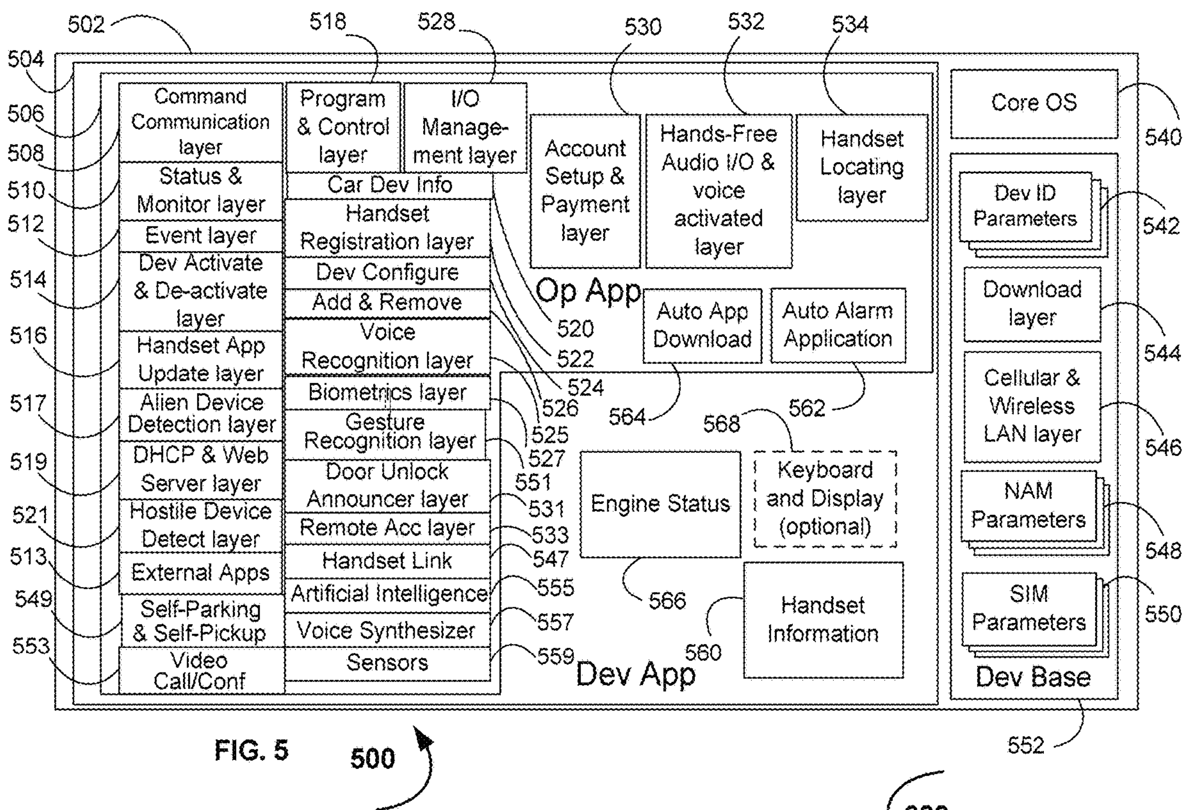
FIG. 5 shows a preferred example of one software block diagram of the present invention of Dev 106 in the auto application.

FIGS. 5 and 6 illustrate preferred examples of embodiments 500 and 600 of the present invention in terms of software block diagrams as are known to those of ordinary skill in the art. Illustration 502 represents the Auto Application and illustration 602 represents the Home Application. Each of these two preferably contains two principle software blocks:

Dev Base 552/652 along with core OS 540 (such as iOS, Google's Android mobile OS) forms the basic kernel. The Dev base 552/652 preferably consists of the Dev ID Parameter 542/642 (contains manufacturer name and production date, S/N number, model number, plant location), the Download layer/module 544 (used to download the updated version of Op App module 506/606 when the current version of its software application needs to be updated), the Cellular and Wireless LAN layer/module 546 (cellular and wireless LAN device driver and management module), the NAM (Name Assignment Module) 548/648 and the SIM (Subscriber Identity Module) 550/650 which contain all NAM and SIM related information parameters, such as: ESN, IMSI, etc.

Dev App 504/604 runs the application software allowing the Dev 106 to communicate with other wireless devices—decode and execute the program/control commands and the status/monitor commands received from the handset 102. The Dev App 504/604 preferably consists of two modules:

Handset Information module 560 (common for both automobile and home applications—consists of the handset 102 information such as: user's handset phone number, account number, passwords, other handsets' phone numbers, email addresses, etc.).

Op App module 506/606 preferably consists of the Command Communication layer/module 508/608 which receives the commands from and transmits the statuses to the handset 102, the Status and Monitor layer/module 510/610 which decodes and executes the status and monitor commands from the handset 102, the Event layer/module 512/612 which detects the changes in Dev's I/O and events, the Program and Control layer/module 518/618 which decodes and executes the program and control commands from the handset 102, the Dev Activate/De-activate layer/module 514/614 which decodes and executes the activation/de-activation commands from the handset 102, the Handset App Update layer/module 516/616 which decodes and executes the handset information update commands from the handset 102, the Handset Registration layer/module 522/622 which decodes and executes the handset registration commands from the handset 102, the Dev Configure layer/module 524/624 which decodes and executes the Dev configuration commands from the handset 102, the Add and Remove layer/module 526/626 which decodes and executes the add and remove handsets and parameters commands from the handset 102, the Car/Home (business) Dev Info 520/620 which fetches the Dev information to the handset 102, the Auto/Home Alarm Application module 562/662 which executes and runs the alarm application, the Auto/Home App Download 564/664 which decodes and executes the application download from the handset 102, the Handset Locating layer/module 534/634 which search for a missing registered handset, and the I/O Management layer/module 528/628 which allows the Dev 106 communicate with the I/O peripherals 201/301/401.

Car Op App module 506 and Home Op App module 606 preferably contain some other modules which are only applicable to each own functions. In the case of the car application, the Op App module 506 preferably contains the Account Payment setup layer/module 530, the Hands-free Audio I/O layer 532 (used for voice triggered Dev activation) that allows the Dev 106 to communicate in hands-free mode, with the driver during toll collector fee transaction or commands the Dev 106 to dial and connect to an emergency center, thus allowing the driver to communicate in hands-free with the emergency personnel. In the case of the home application, the module 606 preferably contains the Home Appliance layer/module 630 which discovers the household appliances/equipments, downloads their online applications or provides their download links to handset 102); then stores, executes the HH App 632 as commanded by the handset 102 (Household Appliances icon 1344 FIG. 13) in communication with a plurality of household appliances/equipments.

A pre-programmed version of Op App 506/606 already resides in the Dev's memory and an updated version of it can be downloaded during the activation 950/1050 (FIG. 9/10) if required or by the user executing the Handset and Dev App Update icon 1164/1364 (FIG. 11/13)

Dev App 504/604 preferably contains the communication and application functions interacting with the resident (or on-device) functions and the OS kernel which provides a uniform interface to the CPU and its environment. The kernel manages the CPU resource by allocating task (RTOS) for each function, such as: Command Communication layer/module, IPC (Inter-Process Communication between multiple tasks or Process-Cooperation), memory management, file system (FS), I/O device management, network management (cellular, LAN and other wireless networks), and associated drivers (all are not shown).

FIGS. 7A and 7B illustrate preferred examples of embodiments 700A and 700B of the present invention in terms of software block diagrams residing on the registered handset(s) 102. Illustration 702A is the counter part of 502 in FIG. 5 and illustration 702B is the counter part of 602 in FIG. 6 as are known to those of ordinary skill in the art.

Both the Handset Application 704A of the handset 102 in FIG. 7A and the Dev App 504 of the Dev 106 in FIG. 5 are used to communicate to each another. For each module in the Operation layer 706A of FIG. 7A, there is an equivalent counterpart module in the Op App 506 of FIG. 5. An example is when the user wants to see the car device information. The user browses through the handset 102 to the Auto Dev Facility Menu 1150 which preferably contains the Dev Info icon 1166, which when executed, makes the handset 102 navigate to the Auto Device Information screen 2810A (FIG. 28A). All the actions/functions have been preferably decoded and executed by the Command Communication layer/module 708A and the Car Dev Information module 714A; which also communicate with other resident (on-device) modules residing on the handset 102 including displaying screens by the "screen display module" (not shown) and sending messages/commands to the Dev 106, and receiving messages/responses from the Dev 106 through the "transceiver module" (not shown) as are known to those of ordinary skill in the art.

The handset 102 transmits the "car Dev Information" message/command to the Dev 106. The command/message is then received and decoded by the Command Communication layer/module 508 and executed by the Car Dev Info module 520 of Dev 106 in FIG. 5. The Dev 106 then transmits the requested data back to the handset 102 which receives and displays the information as shown on the Auto Device Information screen 2810A (FIG. 28A).

Similarly, both the Handset Application 704B of the handset 102 in FIG. 7B and the Dev Application 604 of Dev 106 in FIG. 6 are used to communicate with each another. For each module in the Operation layer 706B of FIG. 7B, there is an equivalent counterpart module in the Op App 606 of FIG. 6.

Figure 46:
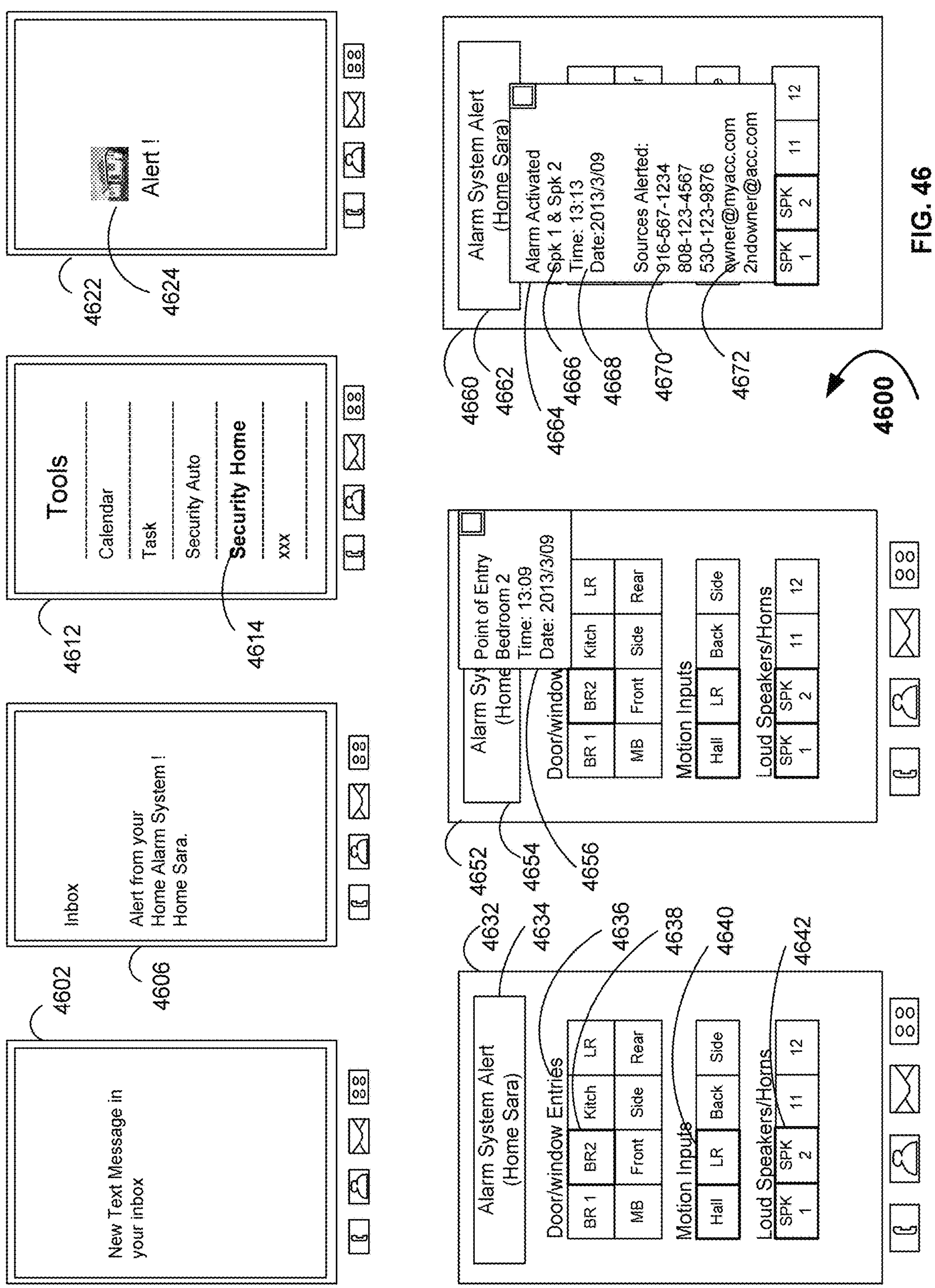
FIG. 46 shows a preferred example of handset's screen displays, presenting an alert from Dev 106 to handset 102, when an unauthorized event occurs, relating to the present invention in the home application.

An example is when an unauthorized entry/break-in to the house as indicated in illustration 4632 through Bedroom 2 (BR2 4638) in FIG. 46 (one of the inputs of the Entry detections 308 in FIG. 3) produces an alarm which sends a signal to the Dev 106 and is handled by the Event layer/module 612 in FIG. 6. The Event layer/module 612 decodes the break-in, which is one of the inputs of the Entry detections 308 FIG. 3 into BR2 (Bed Room 2) window and passes the information to the Command Communication layer/module 608 FIG. 6 which transmits it along with a message (or messages) to the handset 102 alerting its user of an break-in event. At handset 102, the Command Communication layer/module (708B in FIG. 7B) receives and decodes the message and passes it and its data to the Event layer/module 716B which executes and retains data in its memory ready to be displayed (as indicated by illustrations 4632, 4652 and 4660 in FIG. 46) when the user views the displayed message(s) after navigating through several display screens (as indicated by illustrations 4602, 4606, 4612 and 4622 in FIG. 46) as are known by those of skill in the art.

Figure 8:
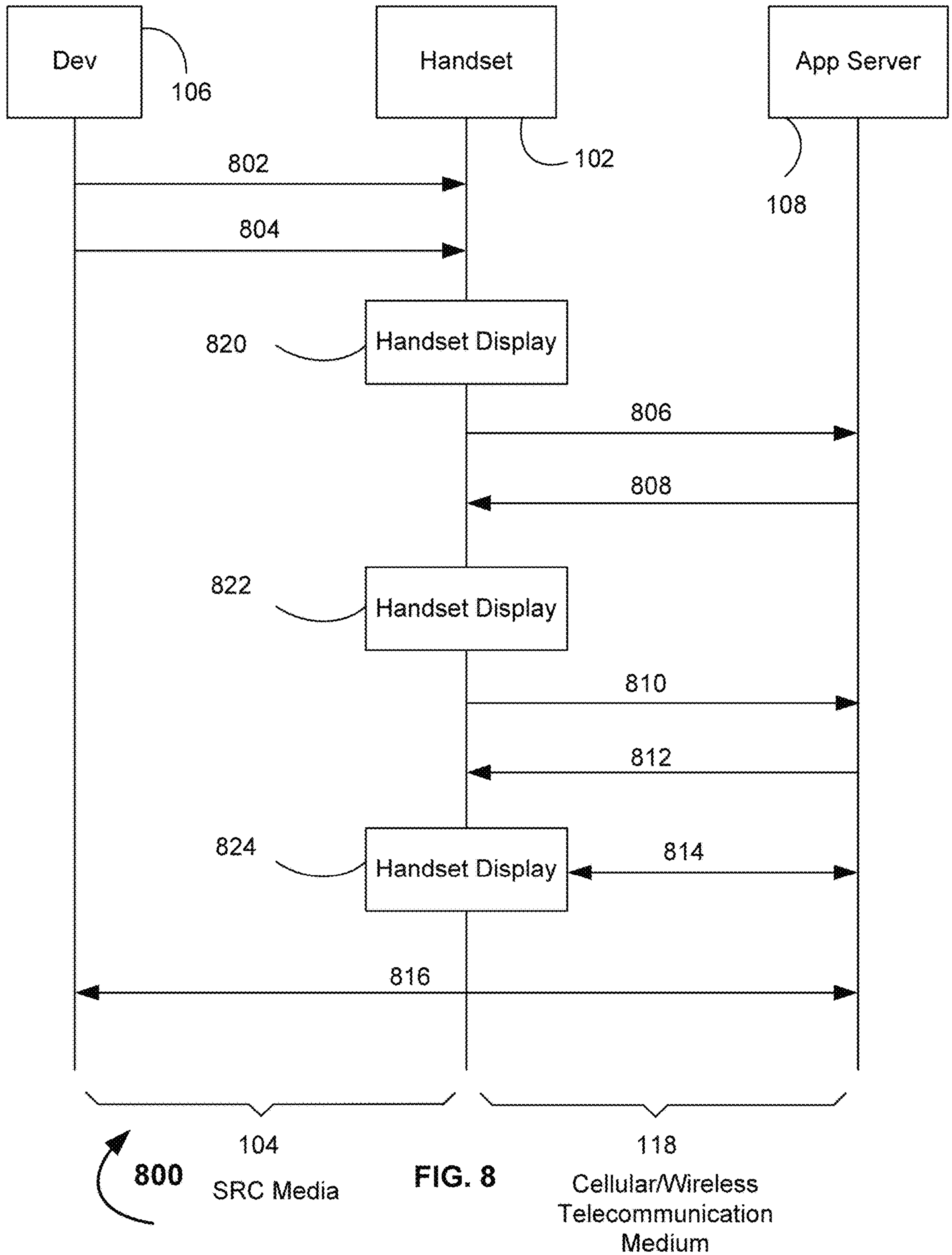
FIG. 8 shows a preferred example of the flow diagram of present invention, in the downloading of required activation and application program into handset 102.
Figure 9:
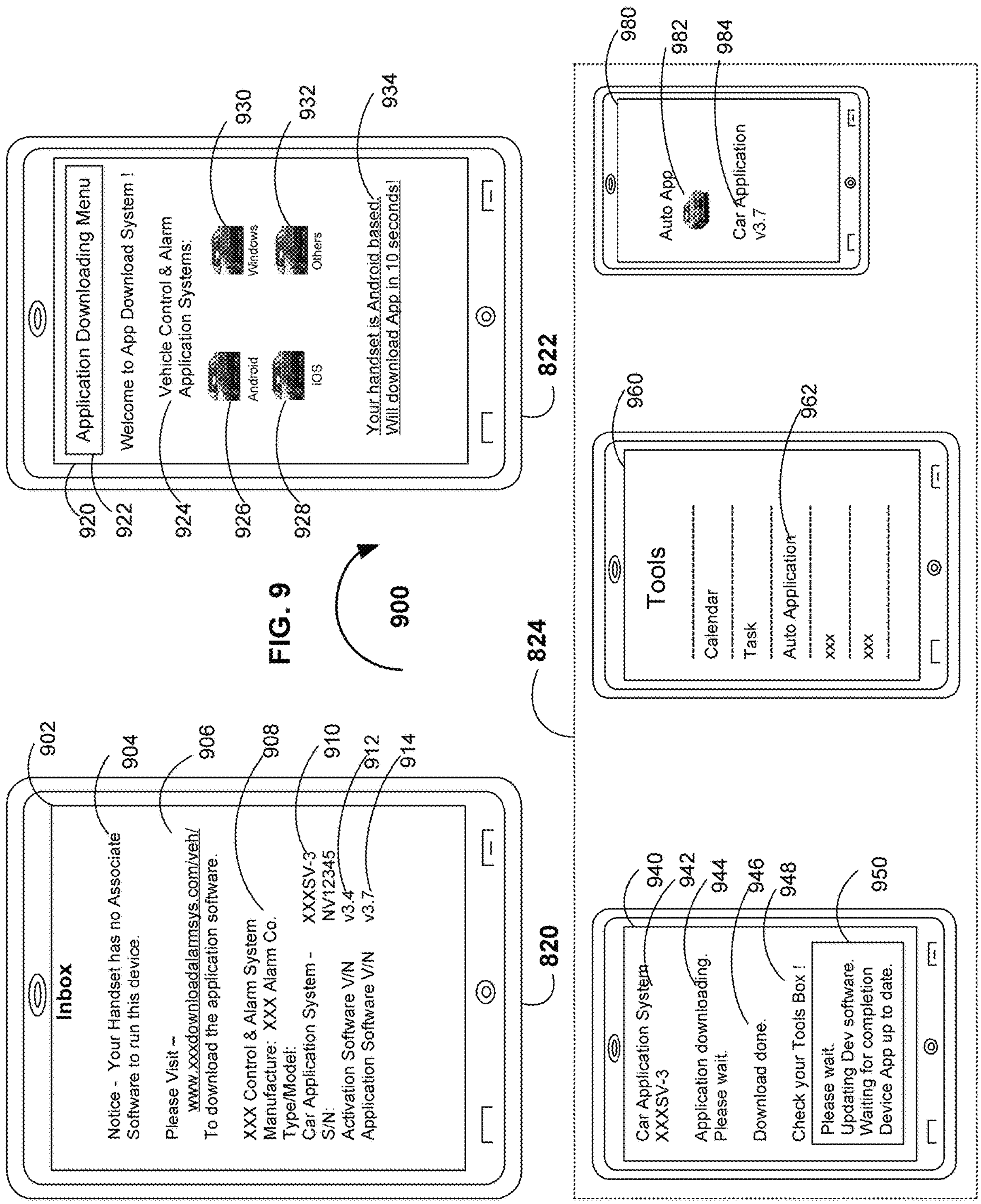
FIG. 9/10 shows a preferred example of handset's screen displays of present invention, in the downloading of required activation and application program into handset 102, in the automobile/home application.
Figure 10:
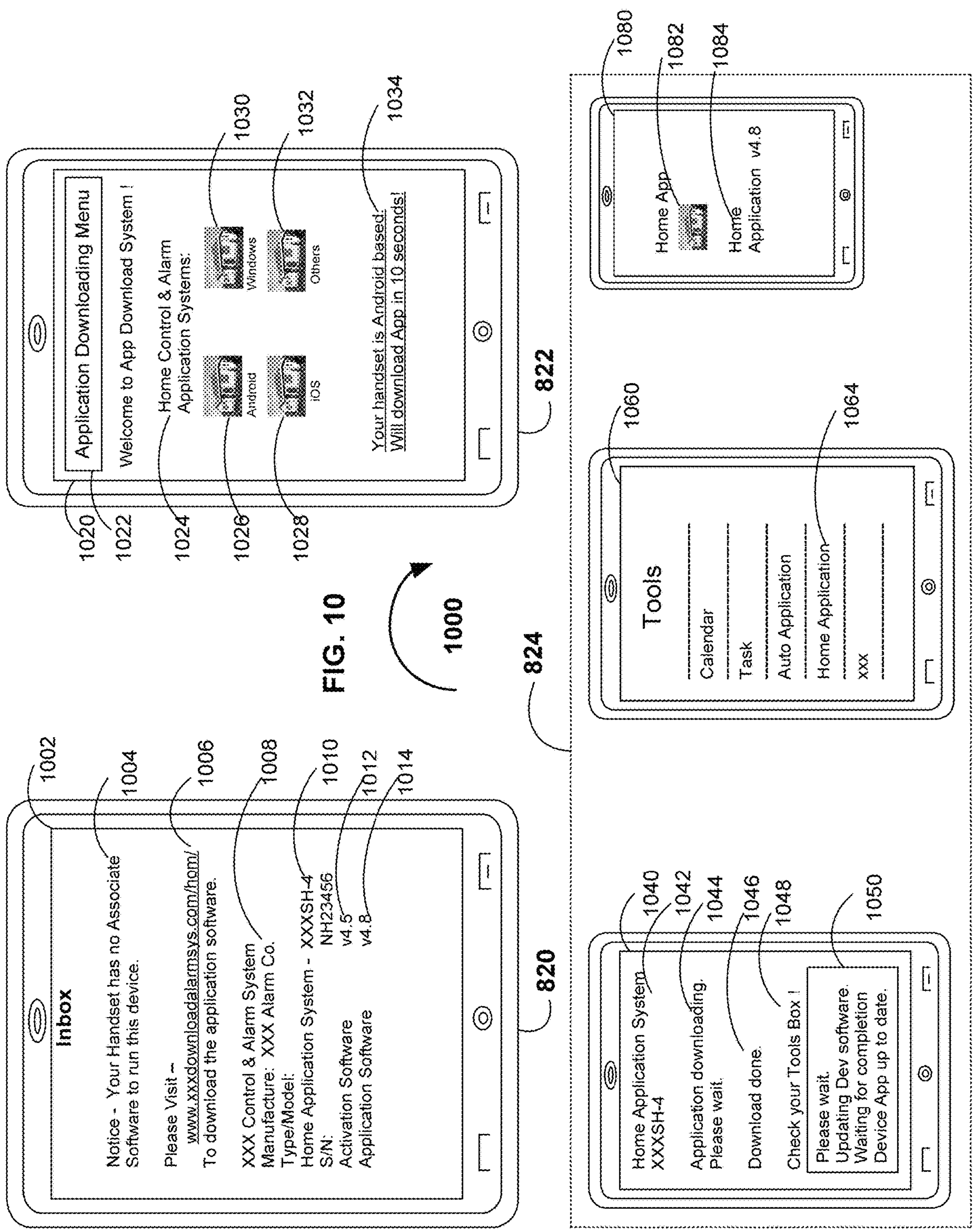

FIGS. 8, 9 and 10 illustrate preferred examples of embodiments 800, 900, and 1000 of the present invention in the handset 102 having the activation and application software downloaded into its memory storage from the App Server 108.

Before being able to communicate with the Dev 106, the handset 102 has to have compatible software application in its Memory/Storage area 264 FIG. 2/3/4. While the user attempts to have the Dev 106 activated by pushing the activation button (located somewhere near the garage button on the lower side of the interior rear view mirror, in the case of the automobile application; or using the voice activated circuitry (230 of FIG. 2) while inside the car; or an activation button inside the enclosure in the case of the home application; or as shown 1814C/1844C in FIG. 18C in the case the Dev equipped with a display), the newly Dev 106 (has not been activated nor registered) sends the activation software request message/command step 802 to the handset 102 via SRC (Short Range Communication) 104. When no response or unrecognized response comes back from the handset 102, the Dev 106 sends another message step 804 to the handset 102 inbox, indicating no associate software existing in the handset 102 (step 820 in FIG. 8, which is shown in more detail as in handset display screen 902/1002 in FIG. 9/10). The user then screen touches the web address link (URL) 906/1006 (FIG. 9/10), which makes the handset 102 send the application menu download request step 806 to the App Server 108 (FIG. 8). The App Server 108 then transmits back the requested information step 808 to the handset 102 as shown in the handset display 822 presented in more detail in screen 920/1020 (FIG. 9/10).

Screen 920/1020 presents the Vehicle/Home Control & Alarm application systems 924/1024 supporting some of the most popular OS (Operating System) based handsets 102, such as: Android (926/1026), iOS (928/1028), Windows (930/1030), and others (932/1032). These are some of the well-known OS in the U.S. and majority of the world, but the Dev 106 and its application software in the present invention will also support still being developed and yet to be invented OS anywhere in the world. The running software in Application Download Menu 922/1022 preferably auto-detects in this exemplary embodiment that handset 102 is Android based and presents the self-download link (URL) 934/1034 so the right OS based App download request (step 810 of FIG. 8) is self-transmitted by the handset 102 to the App Server 108 (when the timer expires—i.e., 10 seconds). The App Server 108 then transmits the requested application (step 812 of FIG. 8) to the handset 102 which displays it on screen 824 which is shown in more detail as in several screens 940/1040, 960/1060 and 980/1080 (FIG. 9/10).

Screen 940/1040 shows the application being downloaded 944/1044, its model or serial number 942/1042, and message to the user to check the tool box 948/1048 for the presence of the software. The user then flips to screen 960/1060 and selects (e.g., executes) the Auto/Home Application 962/1064 which takes to screen 980/1080, which shows the icon 982/1082 representing the just downloaded software. During its own application download, the handset 102 also preferably displays the updating status of Dev Application software 950/1050, if there is any update requirement from the App Server 108 to the Dev 106. During the handset's own application download (step 814), the Dev's application may need to be updated from the App Server to the Dev (step 816).

User can also preferably without receiving the message from the Dev 106 in his handset's inbox 902/102, goes online and types in the right address 906/1006 to download the activation and application into his/her handset 102.

FIG. 11/13 illustrates a preferred example of embodiment 1100/1300 of the present invention for auto/home application. It illustrates what first preferably needs to be done after the activation and application 1104/1304 has been downloaded into the handset 102. The handset 102 starts at screen 1102/1302 which shows the Auto/Home App 1104/1304 has been completely downloaded into the handset 102 after the user flips through screens 902/1002, 920/1020, 940/1040, 960/1060, and 980/1080 then executes the appropriate link and icons regarding the auto/home application download. Screen 980/1080 is repeated as screen 1102/1302 containing the Auto/Home App icon 1104/1304. When said icon 1104/1304 is executed by the user, it will make the handset 102 navigate to screen 1120/1320 showing the Auto/Home App Menu 1122/1322.

Now the user has the Dev Application software in his/her handset 102, he/she will have to activate (Activate 1154/1354) the Dev 106 in order for his/her handset 102 to be able to communicate with said Dev 106; and he/she (and later additional user) can use the handset 102 to program, control, monitor the Dev 106, and be alerted by said Dev 106 of what happens. The activation of the Dev 106 preferably only needs to be done once (in the beginning when the user uses the Dev 106 for the first time) by the user with the first handset 102—unless the service is disconnected or the user switches to another service provider (then activation is needed again as described in FIG. 29).

The Dev 106 will be able to communicate with the handset 102 (the one helping it to be activated into the network—handset #1) as soon as it is finished with the activation, since it contains the phone number of the said handset 102.

When the user selects the Auto/Home Dev Facilities icon 1124/1324 making the handset navigate to the Auto/Home Dev Facilities menu 1152/1352, where the user then selects the Activate icon 1154/1354 that starts the process of having the Dev 106 activated into the service provider network.

Alternatively the user has the option of registering the Dev (for its security control, monitor and program service) with App Server (Block 108 of FIG. 1) by going online to the App Server's website or by executing the handset (internet) App Server Registration icon 1175/1375 making said handset transmit the command via SRC to the Dev. The Dev in turn transmits to his/her handset the web address link (URL) of said App Server via SRC (in this case, both the handset and the Dev have to be within SRC distance). The user then navigates his/her handset's (device's) screen to said App Server website 108 (not shown). The user then registers his Dev to the App Server website by creating his/her account, unique access IDs such as: user ID and password, and enters required information such as his/her name, contact phone number, email address along with Dev's ID parameters such as: S/N (serial number) and the likes (not shown) as required similarly to the currently available system(s) and also as are well known to those of ordinary skill in the art. In the existing current system, the drawback is the App Server simply acts like a router transmitting/routing communication data between the handset and the Dev. As long as anyone enters the correct user ID and password, he/she can have access to the Dev without the real owner/user realizing his/her security is being compromised and his/her privacy being violated.

The Dev, on the other hand, provides an enhanced (secondary) security protection to its user/owner. After its user successfully registers the Dev with the App Server in order to communicate with his/her handset, said Dev transmits an encrypted MSK to said handset via text message (i.e., via mail to SMS gateway). The MSK will then be encoded in subsequent transmit command/control packets from the handset to the Dev which associates said MSK with said handset. The Dev will not respond to any handset/mobile device or wired/wireless device with an unmatched MSK and also alerts the user(s) through the registered handsets'/devices' ID (email, text message via mail to SMS gateway and the like) when such a mismatch occurs. During subsequent registration from another handset/device with an unmatched MSK, the Dev will alert and transmit an allowance/non-allowance command to its registered handset(s) and only when it receives an affirmative response from its registered user or one of its registered users, it will allow said registration to come to a successful conclusion and thus transmitting a MSK to the newly registered handset. If no response from its registered handset, the Dev requires the user, even after providing the right user ID and password, to provide the correct answers to further security questioning, such as: user's birth place, mother maiden name, favorite color and the likes. The following table presents a very short and partial list of the Mail to SMS gateway of some carriers as illustration only.

| Carrier | Country | Mail to SMS gateway |
|---|---|---|
| AT&T | USA | domestic-number@txt.att.net (SMS)<br>domestic number@mms.att.net (MMS) |
| Verizon | | number@vtext.com (SMS) |
| Wireless | | number@vzwpix.com (MMS) |
| Sprint | | number@messaging.sprintpcs.net (SMS)<br>number@pm.sprint.com (MMS) |
| T-Mobile | | number@tmomail.net |
| US Cellular | | number@email.uscc.net (SMS)<br>number@mms.uscc.net (MMS) |
| China Mobile | China | number@139.com |
| NTT Docomo | Japan | number@docomo.ne.jp |
| AU by KDDI | | number@ezweb.ne.jp |
| Vodafone | | number@c.vodafone.ne.jp<br>number@h.vodafone.ne.jp<br>number@t.vodafone.ne.jp |
| Helio | South Korea | number@myhelio.com |
| Airtel | India | number@airtelap.com |
| Telus | Canada | number@msm.telus.com (SMS) |
| Mobility | | number@mms.telusmobility.com (MMS) |
| Bell | | number@txt.bell.ca |
| Mobility | | number@txt.bellmobility.ca |

(Source—https://bithub.com/mfitzp/List_of_SMS_gateways/)

Illustration 1180/1380 shows some of the most popular cellular service providers in the USA—such AT&T Wireless, Verizon Wireless, Sprint, T-Mobile, US Cellular, Metro PCS, Virgin Mobile, and Boost.

If the user is in Mainland China, the cellular service providers would be China Mobile, China Unicom, China Telecom, China Tietong. (*)

(*) In Taiwan, the cellular service providers would be Far EasTone Telecommunications Co Ltd, Asia Pacific Telecom, LDTA/Chunghwa Telecom, VIBO Telecom, Taiwan Mobile Co. Ltd.

In Hong Kong, the cellular service providers would be CSL Limited, CITIC Telecom 1616, Truphone Limited, China Motion Telecom, and China-Hong Kong Telecom.

In Japan, the cellular service providers would be NTT DoCoMo, au, SoftBank Mobile, Willcom, EMOBILE, KDDI Corporation. In Korea, the cellular service providers would be KT, SK Telecom, LG Telecom and Korea Cable Telecom (t-plus), Eco-mobile.

In India, the cellular service providers would be Andhra Pradesh, Assam, Bihar, Chennai, Delhi & NCR, Gujarat, Haryana, Himachal, Himachal Pradesh, Jammu & Kashmir, Kerala, Maharashtra & Goa, Mumbai, North East, Orissa, Punjab, Tamil Nadu, Uttar Pradesh, West Bengal, In Canada, the cellular service providers would be Telus Mobility, Airtel Wireless, EastLink, Bell Mobility, ICE Wireless, Rogers Communications, SaskTel Mobility and Virgin Mobile Canada.

In Mexico, the cellular service providers would be Nextel Mexico, America Movil/Mextel, Movistar—Telefonica Moviles, lusacell. In Brazil, the cellular service providers would be NII Holdings, Inc., Telecom Italia Mobile, Claro, Vivo S.A., Sercomtel Celular, Brasil Telecom GSM and CTBC Celular S.A.

In the EU, the cellular service providers would be France Telecom, Globalstar Europt, Vivendi, RFF, Iliad, Bouygues Telecom, Transatel, Omea Telecom, El Telecom (France), T-Mobile Deutschland GmbH, Vodafone D2 GmbH, E-Plus Mobilfunk, O2 GmbH & Co. OHG, Arcor AG & Co, sipgate Wireless, Mobilecom Multimedia, Group 3G UMTS, Siemens AG, . . . (Germany), Telcom Italia SpA, Vodafone Omnitel N.V., Rete Ferroviaria Italiana, Wind Telecomunicazioni SpA, Hutchison 3G (Italy), Vodafone Spain, France Telecom Espana SA, Xfera Moviles SA, Telefonica Moviles Espana, BT Group, . . . (Spain), BT Group, Mundio Mobile Limited, Telefonica Europe, Jersey Airtel Limited, Cable & Wireless Worldwide, Network Rail Infrastructure Ltd, Vodafone, (UK).

In Russia, the cellular service providers would be Mobile TeleSystems, MegaFon OJSC, New Telephone Company, JSC Uralsvyazinform, Tele2, Central Telecommunication Company, SkyLink/MTS/the Moscow Cellular communication.

(Source Wikipedia)

FIG. 12 illustrates a preferred activation example of embodiment 1200 of the present invention for auto/home application. It presents the Dev Vehicle/Home activation screen 1202, where the handset 102 navigates to, after the Activate icon 1154/1354 (FIG. 11/13) is executed. This screen starts the activation process by letting user enter required information in order to have the Dev 106 activated into the service provider's network. Before the Dev 106 can connect to the network, so it can make calls and communicate data with other cellular and/or wireless devices, it needs to be recognized by the service provider, its user/owner subscribes to and thus activation is required.

The present invention takes advantage of the advance and progress made by the service provider, providing OTA (Over The Air) activation procedure where "not yet register mobile device (Dev 106)" can make one time connection to its network in order to be connected/logged in, exchange the activation/provision and registration information parameters between the mobile device (i.e., Dev 106), and the service provider equipments/servers. The service provider, after the successful activation process, recognizes the Dev 106 and from then on the Dev 106 is connected to the service provider's network where it can communicate voice, messages, video, and the like with other wireless devices.

The present invention illustrates the following preferred exemplary steps for the Dev 106 activation:

The user applies, signs up, and chooses a service plan with the service provider. The user, after being approved, preferably receives from the service provider an IP address, user ID, an activation password and through his/her handset 102 obtains an encrypted UTAID (Unique Temporary Activation Identifier) which as mentioned earlier also preferably contains an activation type/methodology (NAM, SIM, ModSIM or other) and the activation key. The handset 102 starts the activation process by transmitting the UTAID and the user account information to the Dev 106. The Dev 106 then processes the data and separates the activation type from the UTAID, decodes the activation type and begins the activation accordingly (either NAM, SIM, ModSIM or any other activation methodology). The Dev 106 then transmits the activation key, Dev ID parameters along with the accompanying activation data to the service provider 112 or the provision server 114 when it is temporarily allowed into the service provider's network. The activation key and data are then routed to the OTA activation processor (or responsible servers) by the service provider/provision server/computer which authenticates them for activation processing and finally registers the Dev 106 into its network. The Dev 106 also derives its security/encryption key from the UTAID for the encryption of its communication data to other devices.

The above steps are illustrated in FIGS. 12 and 14:

The user enters the service provider's IP address 1208 (as shown in 1224), activation User ID 1210 (as shown in 1226), activation password 1212 (as shown in 1228), and his/her handset phone number 1214 (as shown in 1229), using screen keyboard 1235; then executes Ok icon 1230.

Handset 102 passes the information the user entered on screen 1220 to the service provider/provision server 114 as shown on screen 1238 requesting activation to the server 1239 of the service provider 1241. After the password is verified 1240, the handset in turn receives from the server, the subscriber's account information 1242 (or Dev/account phone number), name 1244, along with UTAID 1246.

Handset 102 then connects to the Dev 106 and communicates with it via SRC 104 (since Dev 106 has not been able to connect to the network 118 yet) 1253 transmitting its phone number 1254, user account information 1256, UTAID 1258 and receives the mobile security key (MSK) from the Dev 1259. The handset then transmits the activation command 1260 to the Dev 106, and then waits for said Dev 106 to complete its activation 1262. When the Dev 106 completes its activation, it recycles its power (or does a power-on reset 249 FIG. 2/3/4), and then registers into the network. The Dev 106 completes the activation successfully as soon as it receives the confirmation message from the service provider 1268 within a predetermined time out period. The user is notified of the activation completion message from the Dev 106 in the inbox 1274 and executes the Success icon 1276 to complete the activation process. After the Dev 106 has been activated successfully into the network as mentioned above, it is preferably that the Dev 106 sends the confirmation message 1274, 1292/1296 and initialization icon 1290/1294 to the handset 102 for the user to respond. The user then executes initialization icon 1290/1294 in setting up all user's information and the handset's parameters into Dev's memory as described in FIG. 19/20. Optionally user can manually enters Dev's phone number into his/her handset for communication with said Dev via its screen display inputs (not shown) when the network does not support such mechanism as shown in 1266.

FIG. 14 illustrates a preferred activation example of embodiment 1400 of the present invention for auto/home application. The user preferably has an option to start the Dev activation, as shown in the handset's screen 1402, either via OTA (Over The Air) Activation selection 1416 (as described in detail in FIGS. 12, 15A-17A), Manual (Manual Activation) selection 1413), HIA (Handset Imitation Activation) selection 1419 or HAA (Handset Assist Activation) selection 1418. Handset Assist Activation (HAA) allows user (when HAA icon 1418 is checked and Ok icon 1415 is then executed by the user) to activate the Dev using his/her handset, communicating directly via said handset with the cellular provider/provision server without the Dev interacting with the provider/provision server (as was in the case of the OTA activation of FIG. 12).

The user starts out the HAA by filling Provider/Provision server's activation web address 1424, Activation User ID 1426 and Activation password 1428 along with the handset phone number 1429. The user then executes Ok icon 1430 making the handset navigate to screen 1436 showing the handset transmitting the activation request to the cellular provider/provision server 1439 and the name of the provider 1441. The screen also shows the handset sending the correct activation password 1440 and receiving the user account information 1442 (or Dev/account phone number) and 1444 along with the UTAID 1446 (also in block 1506A/1506B of FIG. 15A/15B, block 1506A/1606B of FIG. 16A/16B, block 1506A/1706A of FIG. 17/17A) from the service provider/provision server 112. The handset then navigates to screen 1450 displaying the communication (transmission) of its phone number (1454), acc information 1456, UTAID 1458 and activating command 1460 to the Dev (also in block 1508A/1508B of FIG. 15A/15B, block 1508A/1608B of FIG. 16A/16B, block 1508A/1708A of FIG. 17/17A). The handset also acknowledges receiving and saving the MSK from the Dev 1459 (also in block 1509A/1509B of FIG. 15A/15B, block 1509A/1609B of FIG. 16A/16B, block 1509A/1709B of FIG. 17/17A). The handset in turn, receives the Dev's Activation key and ID parameters 1461 (also in block 1510A2 of FIG. 15A, block 1610A2 of FIG. 16A, block 1710*a* of FIG. 17), and passes the activation key 1462 and said parameters 1463 to the provider/provision server (also in step 1510A4 of FIG. 15A, step 1610A4 of FIG. 16A, step 1710*c* of FIG. 17). The handset then receives the activation confirmation (along with Dev assigned phone number 1466 and Dev activation/registered service ID parameters 1465) from the provider/server (also in block 1514A2 of FIG. 15A, block 1614A2 of FIG. 16A, block 1714*a* of FIG. 17), and passes them (confirmation and Dev phone number, service ID parameters) to the Dev 1467 (also in step 1514A4 of FIG. 15A, step 1614A4 of FIG. 16A, step 1714*c* of FIG. 17). As soon as the Dev 106 receives the confirmation and parameters from the handset, it saves all these parameters in its memory (also in block 1516A/1516B of FIG. 15A/15B, block 1616A/1616B of FIG. 16A/16B, block 1716/1716A of FIG. 17/17A), recycles its power (also in block 1519A/1519B of FIG. 15A/15B, block 1619A/1619B of FIG. 16A/16B, block 1719/1719A of FIG. 17/17A or does a power-on reset 249 FIG. 2/3/4), and then registers into the network. The Dev then transmits a message 1492/1496 and initialization icon 1290/1294 to the registered handset where its user confirms 1476 and executes initialization icon 1490/1494 in setting up all user's information and the handset's parameters into Dev's memory as described in FIG. 19/20.

The Dev preferably transmits several messages, one at a time within one hour of each other, to the handset until it receives the acknowledgement from its user. Otherwise if it has not received any within 24 hours, the Dev deletes handset phone number from its memory and the user has to restart the activation again.

FIGS. 15A-17A show more in detail of the handset screens 1220/1420, 1236/1436, 1250/1450 and 1270/1470, the interaction between the handset 102, Dev 106, and the Provision Server/Provider 114.

The present invention presents three methods of activation, such as: NAM (Name Assignment Module), SIM (Subscriber Identity Module) and ModSIM (Modified SIM). The present invention also supports the systems and methods of activation not yet known to the inventor, still under development and/or not yet developed as technology advances and keeps on improving, and the Dev 106 can be specifically designed to work with any cellular service providers to comply with their specification and requirement.

Figure 15A:
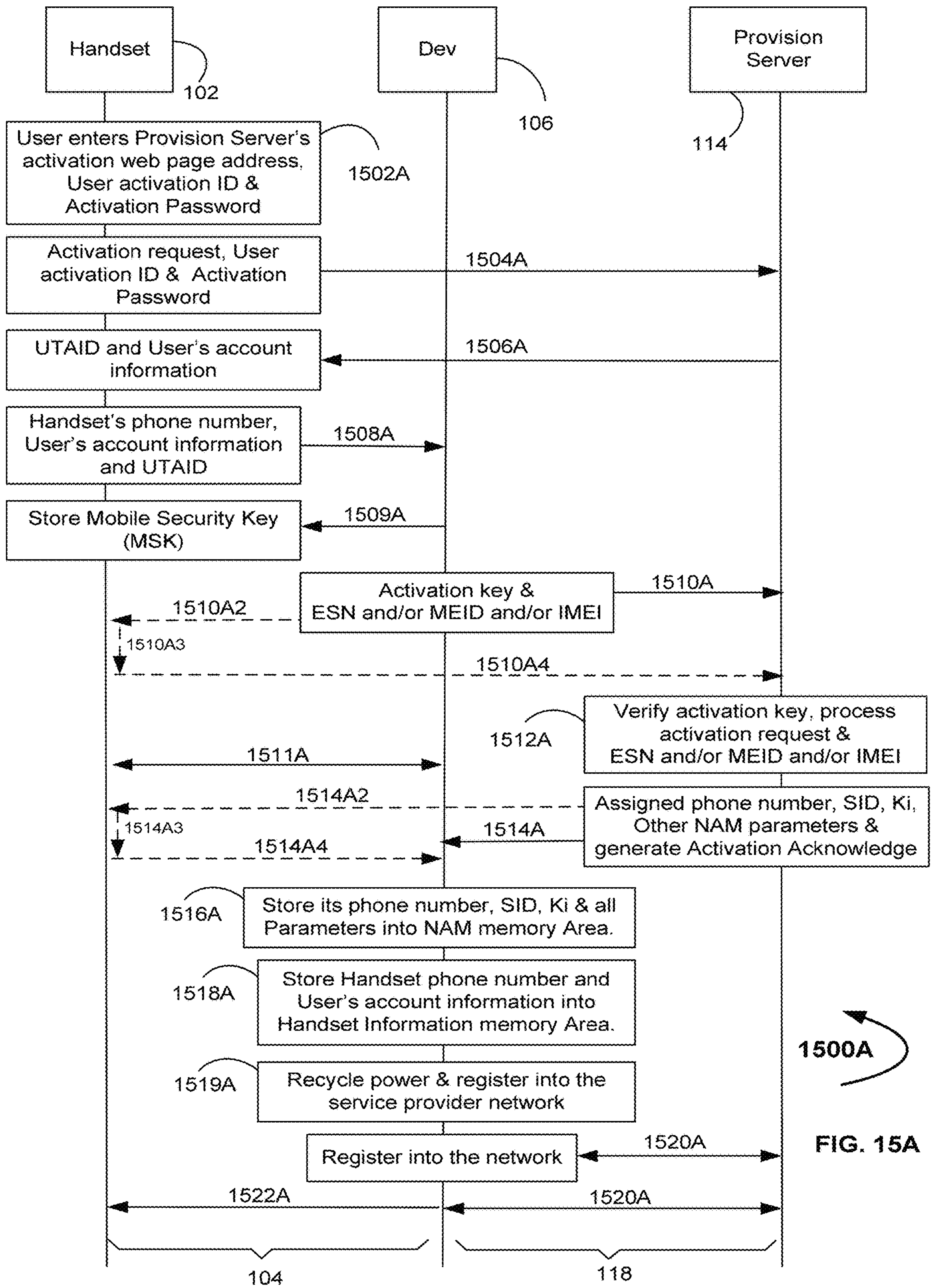
FIGS. 15A-18D show preferred examples of present invention, in having Dev 106 activated into a network.
Figure 15B:
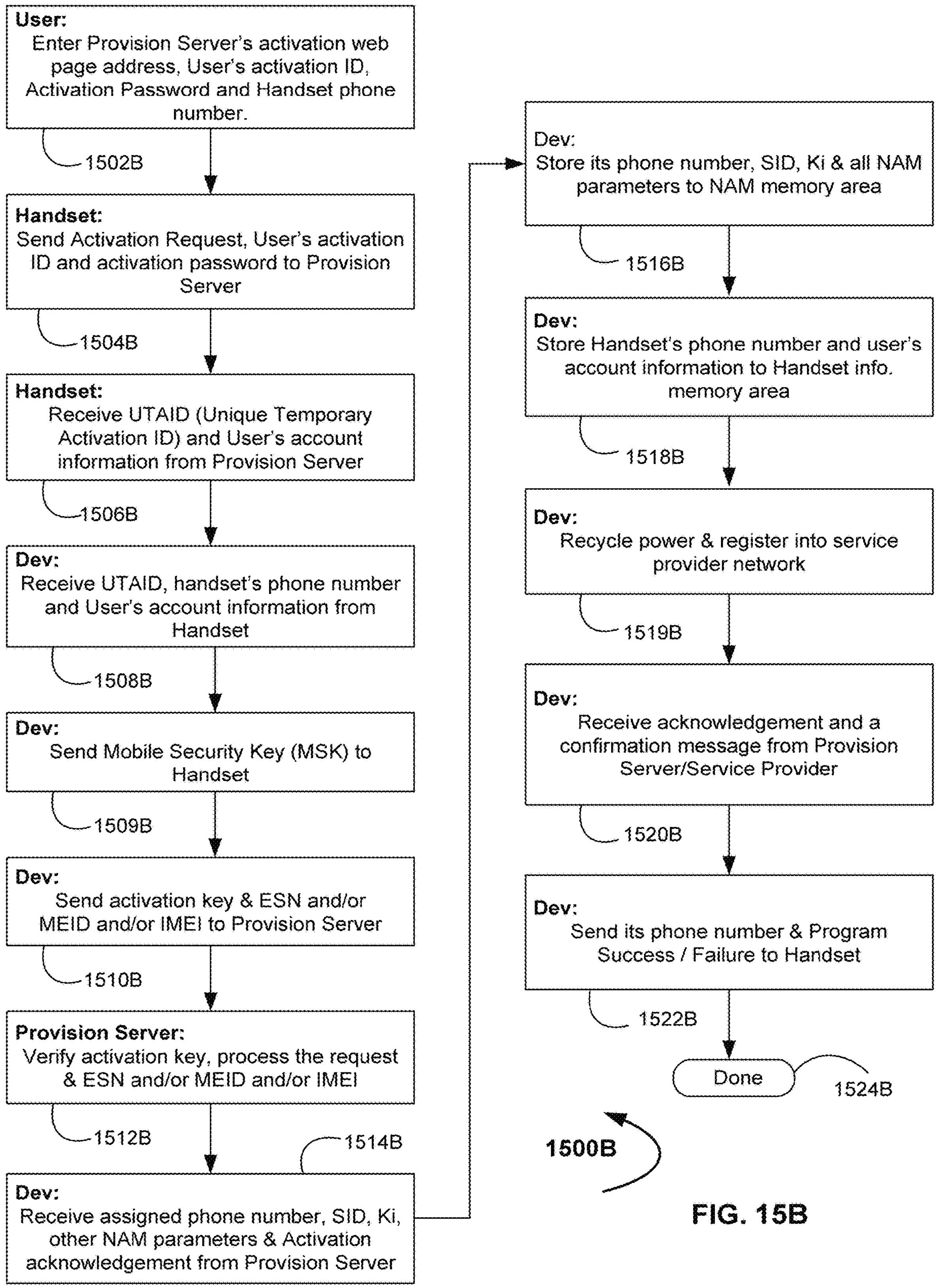

FIGS. 15A and 15B illustrate preferred activation examples of embodiment 1500A and 1500B of the present invention in having the Dev 106 activated in the Name Assignment Module (NAM) storage memory area which is already pre-programmed with an ESN/MEID/IMEI value.

It starts out at step 1502A/1502B (which is equivalent to screen 1220/1420 in FIG. 12/14), where the user enters the handset's phone number, the service provider/provision server IP address, user's activation ID, the activation password, and executes the command Ok icon 1230/1430. The handset 102 then transmits the activation request and activation password 1240/1440 (FIGS. 12/14) and 1504A/1504B, then receives the UTAID from the service provider/provision server 1246/1446 and 1506A/1506B. The handset 102 transmits its phone number, user's account information, and the UTAID to the Dev 106 in steps 1254/1454, 1256/1456, and 1508A/1508B.

The Dev 106 preferably starts the OTA activation by transmitting the activation key and ESN/MEID/EMEI (Electronic Serial Number/Mobile Equipment Identifier/International Mobile Equipment Identifier) 1510A/1510B. Step 1510A illustrates Dev transmitting its activating parameters to the Service Provider/Provision Server during the OTA (FIG. 12) while during the HAA (FIG. 14), the handset receives said activating parameters from the Dev (step 1510A2), then transmits them to the Service Provider/Provision Server (step 1510A4). The Service Provider/Provision Server 112/114 receives, processes and verifies the activation key is correct and is able to associate the activation key with the user's account information in its server database 1512A/1512B. The Provision Server 114 then preferably transmits the assigned phone number, all other parameters, and the activation acknowledgement 1514A/1514B to the Dev 106. Step 1514A illustrates Dev transmitting the assigned phone number, all other parameters, and the activation acknowledgement the Service Provider/Provision Server during the OTA (FIG. 12) while during the HAA (FIG. 14), the handset receives said activating parameters and activation acknowledgement from the Service Provider/Provision Server (step 1514A2), then transmits them to the Dev (step 1514A4).

(**The remaining NAM parameter are the System ID, Access Overload Class, Group ID Mark, Initial Paging Channel, Lock Code, local use flag, A/B system selection, MIN mark flag . . . )

The Dev 106 then stores the NAM parameters into its NAM storage memory area 1516A/1516B and the handset 102 phone numbers and the user's account information into its Handset Information memory area 1518A/1518B. The Dev 106 then recycles its power (or does a power-on reset 249 in FIG. 2/3/4) and then registers into the network 1519A/1519B as are known to those of ordinary skill in the art. The activation is successful when it receives confirmation acknowledgement 1520A/1520B from the service provider 112; in other words it is able to connect to the network.

Figure 19:
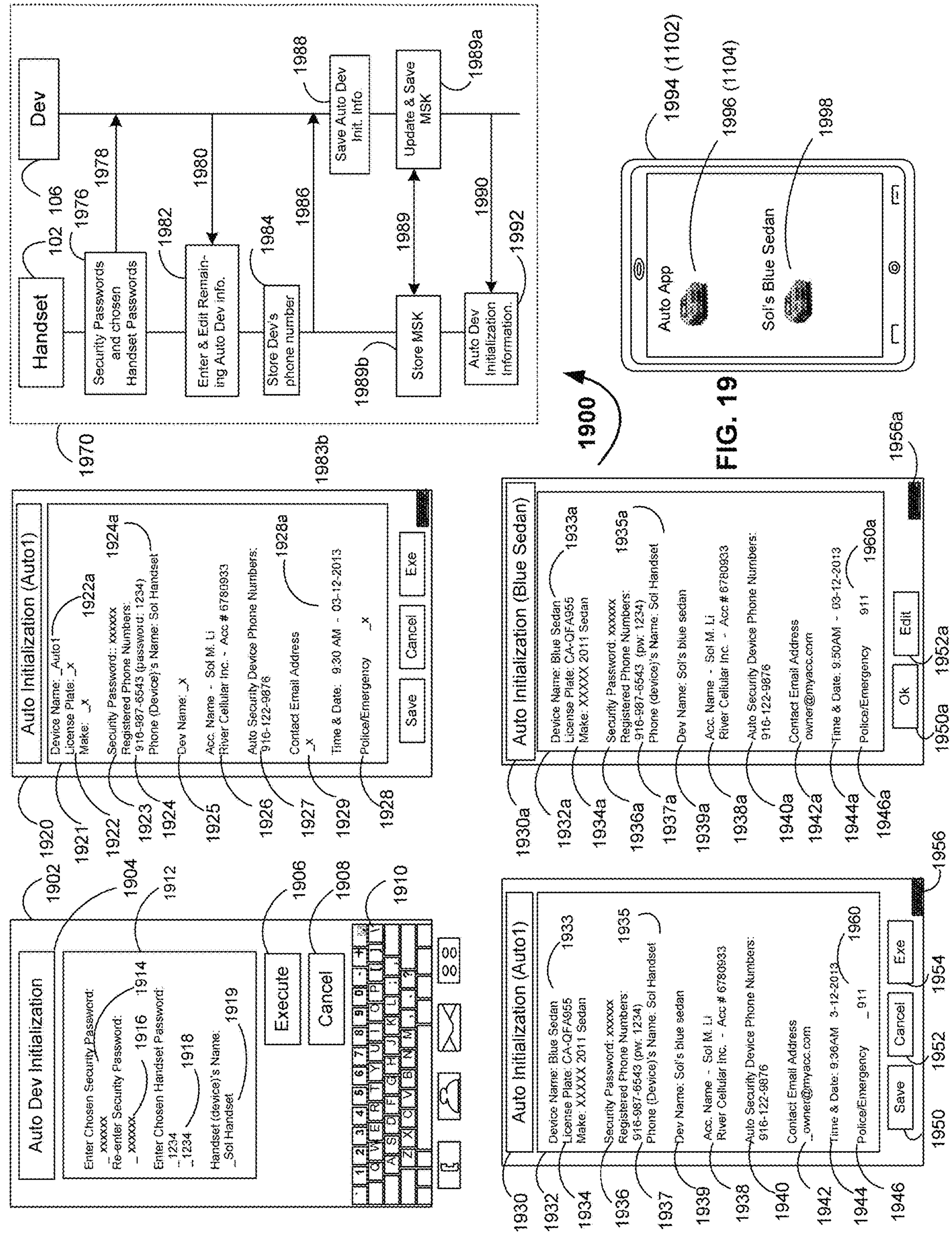
FIG. 19/20 shows a preferred example of handset's screen displays and a flow diagram, presenting the Dev 106's initial file with user information and the communication interaction of said handset and said Dev, relating to the present invention in the auto/home application.
Figure 20:
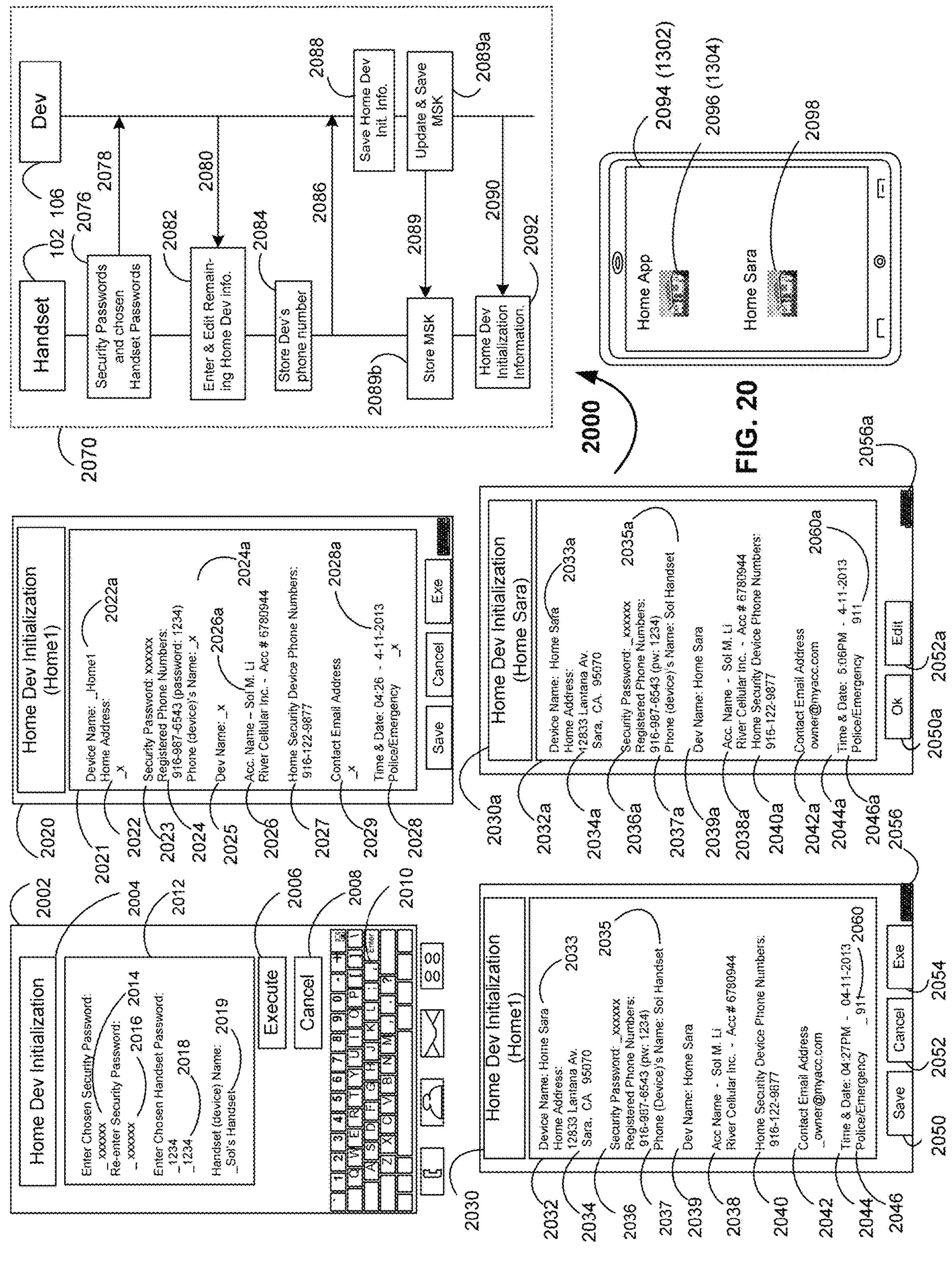

During the activation process, the Dev 106 preferably communicates (via SRC 104) its progress status with the handset 102 as shown previously on screen 1250/1450, step 1511A, and finally via the cellular network 118 the confirmation text message 1522A/1522B also as shown on screen 1292/1492 along with Dev Initialization icon 1290/1490 or 1294/1494. The user preferably then executes said icon to start the Dev initialization process on his/her handset 102 (as shown in FIGS. 19 and 20), in order for said handset 102 to communicate and utilize all the Dev's functions and capabilities. If the user fails to do the initialization right away, preferably the Dev 106 will periodically sends the same initialization message and icon to the user's handset until it receives the confirmation response from said user.

Figure 16A:
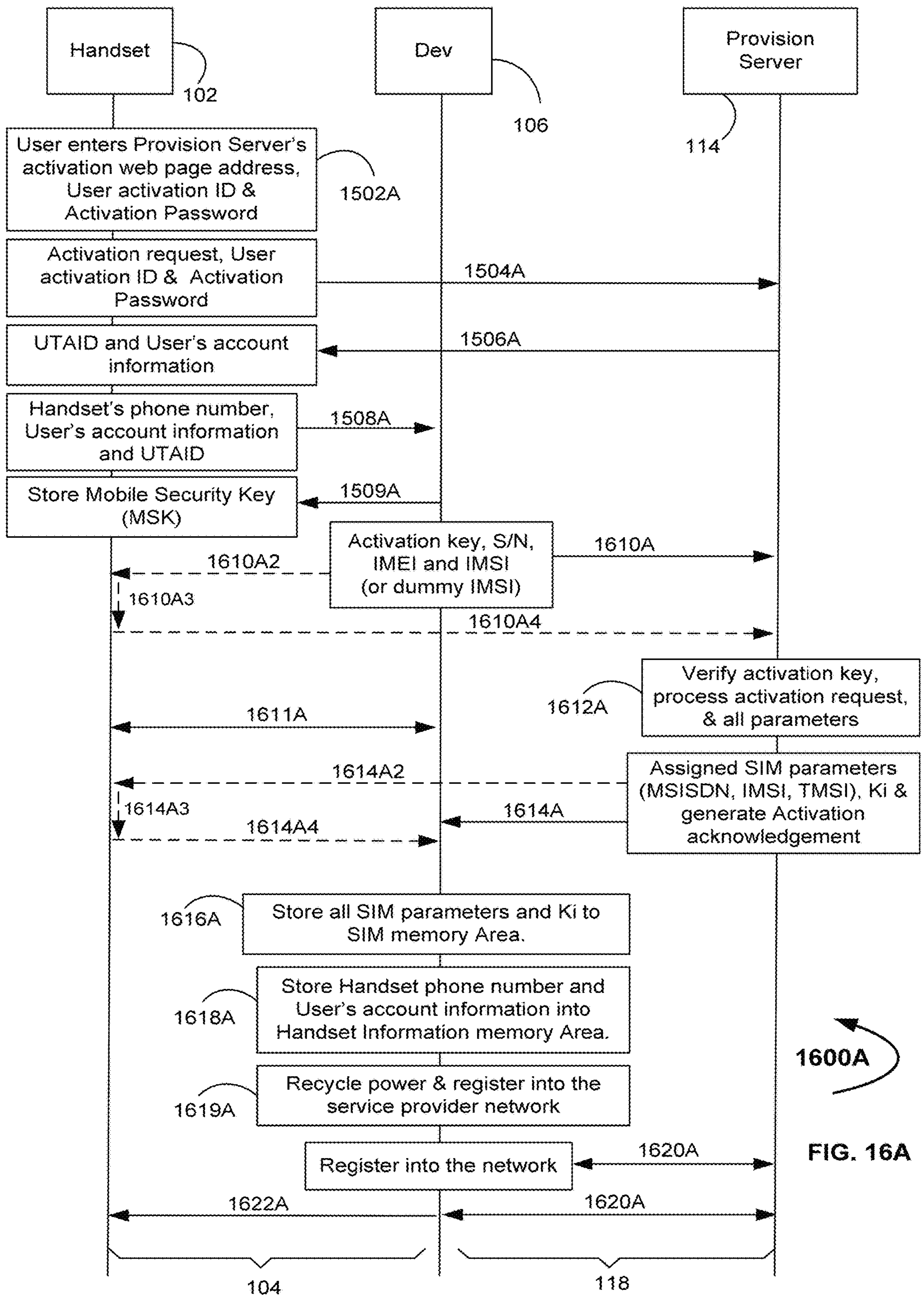
Figure 16B:
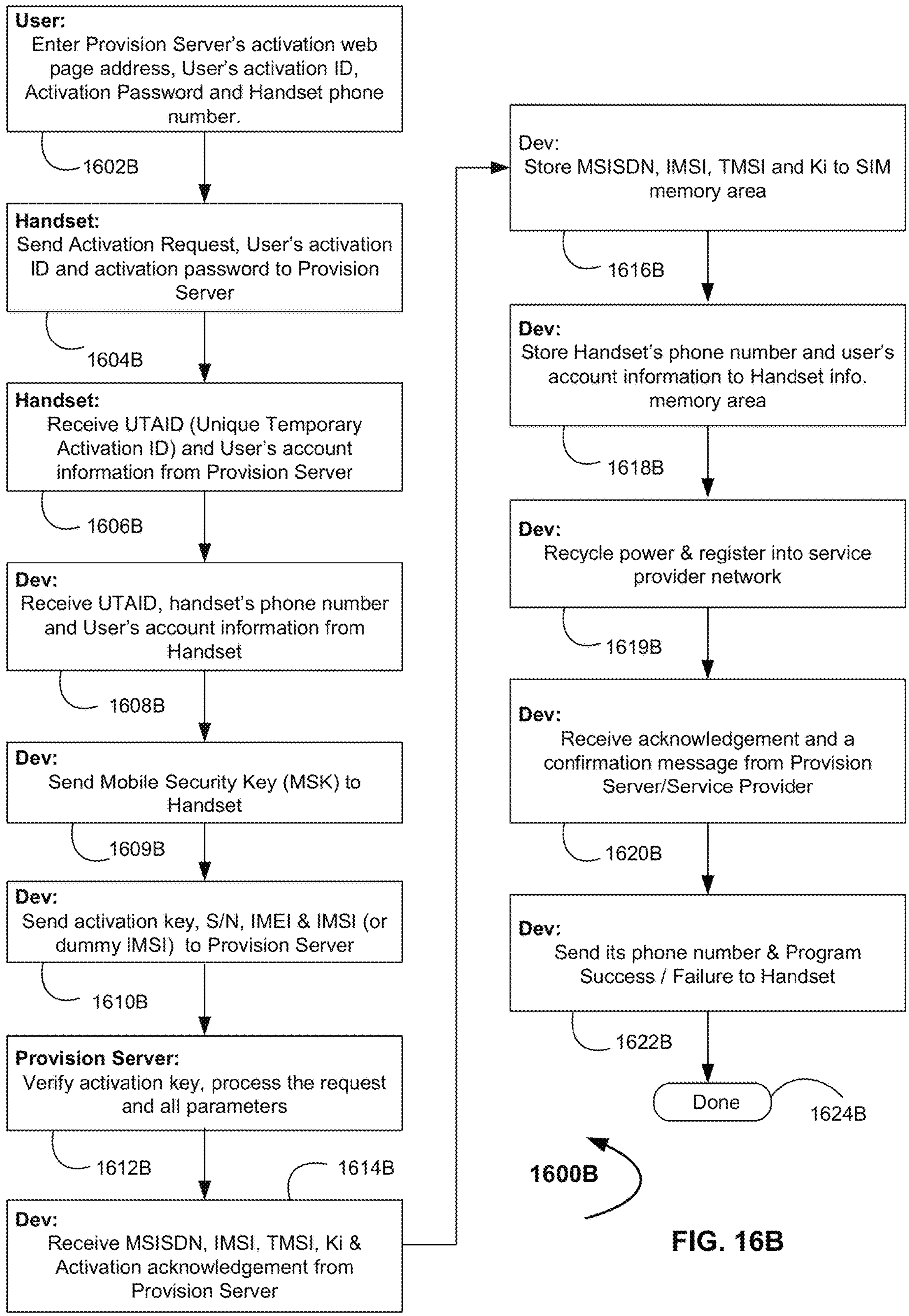

FIGS. 16A and 16B illustrate preferred activation examples of embodiment 1600A and 1600B of the present invention in having the Dev 106 activated in the Subscriber Identity Module (SIM) storage memory area.

The Dev 106 is not like the typical mobile handset which along with its SIM module is issued or manufactured by the cellular service provider or its affiliated third parties. These mobile handsets already have the Serial Number and IMEI (International Mobile Equipment Identity) recorded into the handsets' memory or in print inside the handset by the battery, IMSI (International Mobile Subscriber Identity) programmed into the SIM modules, a Ki (authentication key), encryption key, possibly an ICCID, and thus are associated with said cellular service provider; and therefore can be easily activated into the service provider network, at initial power-up. The SIM module also functions as a storage device and thus contains personal information, such as: user phone directory, text messages, pictures, etc.

The Dev 106 on the other hand is not tied to any cellular service provider and thus will be designed to support preferably by way of software downloading and/or updating in order to work with any cellular service provider.

The Dev 106 is designed each with its own unique IMEI and a SIM storage memory area containing a minimum amount of preprogrammed parameters such as a dummy IMSI (or optionally IMSI derived in the UTAID issued by the service provider during pre-activation). This would allow any service provider to supply the remaining parameters to store into its SIM memory during the activation process. The user therefore, can choose, pick, and change service provider at any moment. Thus the Dev's SIM contains a minimum amount of pre-activation parameters as in this exemplary embodiment, an IMEI or a SN (serial number so it can be associated with the Dev 106), an IMSI value which it uses during the activation for identification. And of course, the activation key as was mentioned earlier, so the service provider can associate it with the user/subscriber. Or the Dev is preferably factory programmed into its NVRAM (non-volatile random access memory) or EEPROM (blocks 266 FIG. 2/3) with SIM parameters such as: IMEI (International Mobile Station Equipment Identity), ESN/MEID (Electronic Serial Number/Mobile Equipment Identifier), IMSI (International Mobile Subscriber Identity), TMSI (Temporary Mobile Subscriber Identity), MSISDN (Mobile Subscriber ISDN Number) and so for. These parameters are transmitted by the Dev to the Service Provider/Provision Server during the OTA (FIG. 12) or HIA (FIG. 18A) activation, or to the handset which transmits them to the Service Provider/Provision Server during the HAA (FIG. 14) activation. They can be retrieved by the user via Dev IDs command (1146/1346 in FIG. 11/13) to provide to the Service Provider/Provision Server during Manual activation command 1852B, screen 1842B in FIG. 18B.

It starts out similarly as described in steps 1502A/1502B, 1504A/1504B, 1506A/1506B and 1508A/1508B in FIG. 15A/15B.

The Dev 106 then continues the OTA activation by transmitting the activation key, IMEI, and dummy IMSI 1610A/1610B. Step 1610A illustrates Dev transmitting its activating parameters to the Service Provider/Provision Server during the OTA (FIG. 12) while during the HAA (FIG. 14), the handset receives said activating parameters from the Dev (step 1610A2), then transmits them to the Service Provider/Provision Server (step 1610A4). The service provider/provision server 112/114 receives, processes, and verifies that the activation key is valid and it is able to associate the activation key with the user's account information in its server database 1612A/1612B. The server then transmits the SIM parameters preferably, such as: the assigned phone number (or MSISDN—Mobile Subscriber ISDN number), IMSI, TMSI (Temporary IMSI), Ki (Authentication key), and the activation acknowledgement 1614A/1614B to the Dev 106. Step 1614A illustrates Dev transmitting the SIM parameters, and the activation acknowledgement the Service Provider/Provision Server during the OTA (FIG. 12) while during the HAA (FIG. 14), the handset receives said SIM parameters and activation acknowledgement from the Service Provider/Provision Server (step 1614A2), then transmits them to the Dev (step 1614A4**).

The Dev 106 then stores the SIM parameters into its SIM storage memory area 1616A/1616B, the handset 102 phone numbers and the user's account information into its Handset Information memory area 1618A/1618B. The Dev 106 then recycles its power (or does a power-on reset in FIG. 2/3/4) and then registers into the network 1619A/1619B, as are known to those of ordinary skill in the art. The activation is successful when it receives a confirmation acknowledgement 1620A/1620B from the service provider 112; in other words it is able to connect to the network.

During the activation process, the Dev 106 preferably communicates via SRC 104 its progress status with the handset 102 as shown previously on screen 1250/1450 and step 1611A, and finally via the cellular network 118 the confirmation text message 1622A/1622B, (also as 1292/1492, shown on inbox screen 1280/1480) along with Dev Initialization icon 1290/1490. The user preferably then executes said icon 1290/1490 to start the Dev initialization process on his/her handset 102 (as shown in FIGS. 19 and 20) in order for said handset 102 to communicate and utilize all the Dev's functions and capabilities. If the user fails to do the initialization right away, preferably the Dev 106 will periodically sends the same initialization message and icon to the user's handset until it receives the confirmation response from said user.

Figure 17:
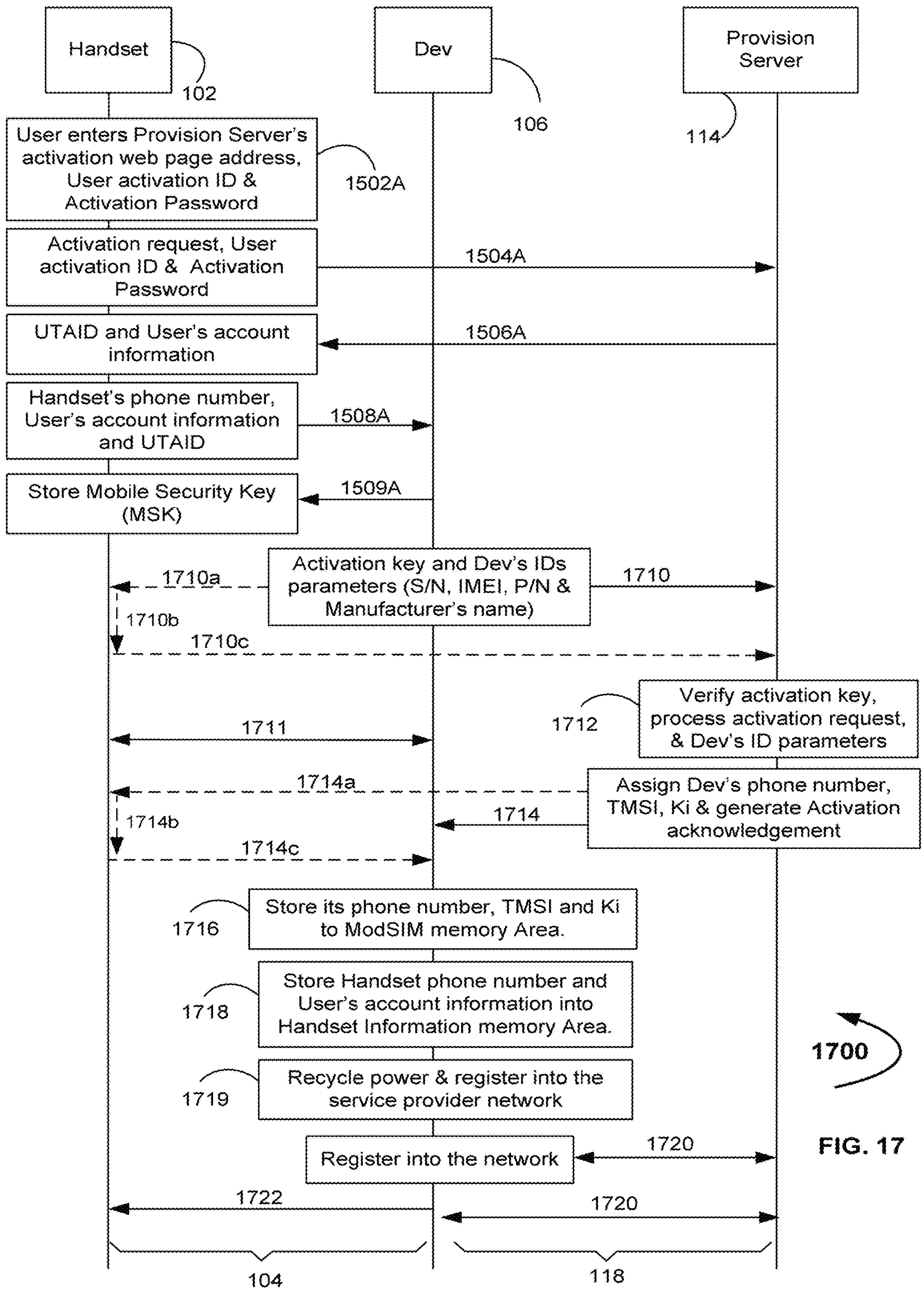
Figure 17A:
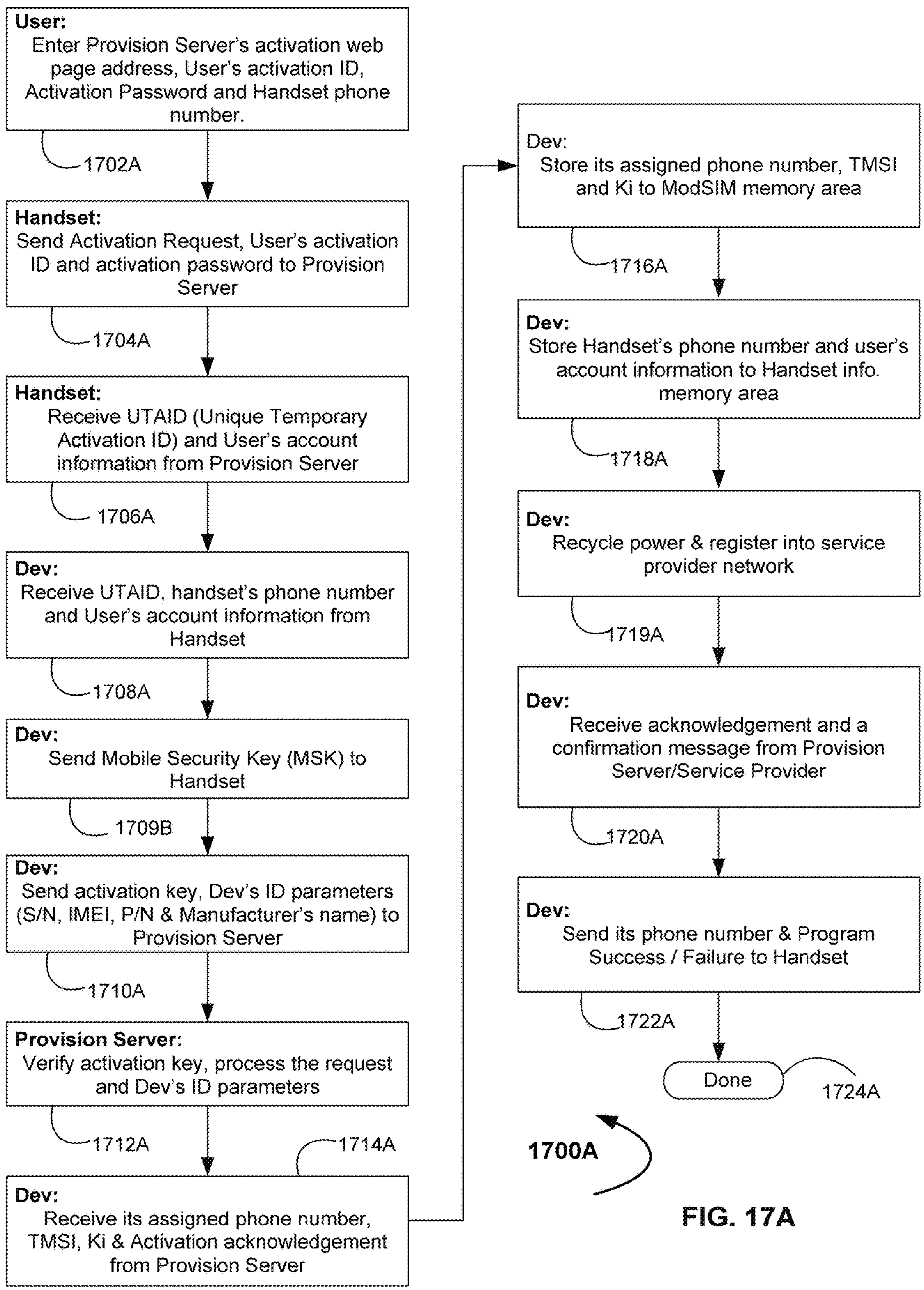

FIGS. 17 and 17A illustrate preferred activation examples of embodiment 1700 and 1700A of the present invention in having the Dev 106 activated in the Modified Subscriber Identity Module (ModSIM) storage memory area.

The ModSIM activation is similar to the SIM's but is simpler. The Dev 106 transmits only its ID parameters and the activation key (derived from the UTAID) to the Provision Server which receives, processes and associates said ID parameters with said Dev and said activation key with the subscriber. The Provision Server then generates the registration acknowledgement and sends back to the Dev, its (ODA) assigned telephone number, TMSI and the Ki.

The Dev 106 starts out similarly as described in steps 1502A/1502B, 1504A/1504B, 1506A/1506B and 1508A/1508B in FIG. 15A/15B.

The Dev 106 then continues the OTA activation by transmitting the activation key, its ID parameters (Dev's S/N, part number, manufacturer's name) 1710/1710A. The service provider/provision server 112/114 receives, processes, and verifies that the activation key is valid, and it is able to associate said activation key with the user's account information in its server database 1712/1712A. The server then transmits the ModSIM parameters preferably, such as: the assigned phone number, TMSI (Temporary IMSI), Ki (Authentication key), and the activation acknowledgement 1714/1714A to the Dev 106.

The Dev then stores the ModSIM parameters into its ModSIM storage memory area 1716/1716A, the handset 102 phone numbers and the user's account information into its Handset Information memory area 1718/1718A. The Dev 106 then recycles its power (or does a power-on reset in FIG. 2/3/4), and then registers into the network 1719/1719A, as are known to those of ordinary skill in the art. The activation is successful when it receives a confirmation acknowledgement 1720/1720A from the service provider 112; in other words it is able to connect to the network.

During the activation process, the Dev 106 preferably communicates (via SRC 104) its progress status with the handset 102 as shown previously on screen 1250/1450 and step 1711; and finally via the cellular network 118 the confirmation text message 1722/1722A; (also as 1292/1492 shown on inbox screen 1280/1480) along with Dev Initialization icon 1290/1490 or 1294/1494. The user preferably then executes said icon 1290/1490 or 1294/1494 to start the Dev initialization process on his/her handset 102 (as shown in FIGS. 19 and 20) in order for said handset 102 to communicate and utilize all the Dev's functions and capabilities. If the user fails to do the initialization right away, preferably the Dev 106 will periodically sends the same initialization message and icon to the user's handset until it receives the confirmation response from said user.

The Dev 106 in the home application (as represented by the hardware and software block diagrams in FIGS. 3 and 6) is a stationary device. In other words, it normally does not need to do roaming. There preferably exists a mechanism or a method such as a bit/flag in the subscriber account, so the service provider can distinguish it from a typical mobile device which does roaming; and therefore few service provider's resources are allocated to support it, which in turn can lower the service cost to users/customers in the home application. The Dev 106 (in home application unlike in vehicle and robotic applications), in turn, does not have to broadcast its presence periodically, as in this method, since its registration (identity data) stays (resides) with the same MSC/VLR in the service provider's network.

FIG. 18A illustrates a preferred activation example of embodiment 1800A of the present invention where the user preferably has an option to start the Handset Imitation Activation selection (when in FIG. 14, HIA icon 1419 is checked and Ok icon 1415 is then executed by the user) allows the Dev to temporarily take over the functionality of the handset so the Dev can connect to said handset's service provider network in order to start its activation. The user enters the activation information on the handset screen which is then transmitted (via SRC) to the Dev; required activation information such as: Service Provider/Provision Server's activation website address 1806A, Activation User ID 1808A and Activation password 1810A along with user's handset phone number 1814A (screen 1802A) are entered on the handset via keyboard 1820A. When Ok icon 1812A is executed, it makes the handset pass said data to the Dev via SRC steps 1824A, 1826A and 1828A. The Dev then sends back to the handset MSK 1830A and acquires IMSI or TMSI (step 1832A) which it transmits to the cellular service provider 1834A and in return, the provider requests for the authentication key 1836A. The Dev requests authentication key from handset (1838A), receives (1840A) and transmits it 1842A to the server and is able to connect to the network (thus using said handset's service account and said handset device service IDs). The handset at this time ceases its cellular activities temporarily (by not transmitting or broadcasting IMSI, TMSI and only resumes said activities after being informed by the Dev of its activation completion 1868A/1870A or after a certain timeout period e.g., less than 5 minutes). The Dev connects to the network 1844A, is online to the Service Provider/Provision Server website 1846A, transmits the activation request, User ID and password to the Service Provider/Provision Server 1848A. After User ID and password are verified and passed 1850A by the Service Provider/Provision Server, the Dev then receives from the Service Provider/Provision Server the user's personal (i.e., subscriber's name, address, . . . ) and account information (account number, service plan, rate, . . . ) 1852A, UTAID and from which it derives the activation key and other parameters 1854A. The Dev then transmits said activation key, device information to Service Provider/Provision Server 1856A (NAM) or 1858A (SIM) which transmits back activation acknowledgement, phone number and NAM parameters 1860A or SIM parameters 1862A. The Dev then stores all NAM 1864A or SIM 1866A to its memory. It then recycles power (power-on reset) and connects to said network. The Dev informs the handset of its activation completion 1868A/(thus the handset can resume its cellular network activities) and transmits to handset inbox 1870A the Initialization icon 1886A/1888A and text messages 1882A/1884A. The Dev preferably transmits several messages, one at a time within one hour of each other, to the handset until it receives the Initialization icon acknowledgement (1888A) from its user; otherwise if it has not received any within 24 hours, the Dev deletes handset phone number from its memory and the user has to restart the activation again. The user then executes icon 1886A/1888A to start the initialization process as described in FIG. 19/20. After the initialization is finished, the user is able to fully communicate with the Dev via his/her handset.

According to Wikipedia.com, IMSI (15 digits long or less) consists of MCC (Mobile Country Code—3 digits), MNC (Mobile Network Code—2/3 digits European/North American standard) and MSIN (Mobile Subscription Identification Number within the network's customer base).

Figure 18B:
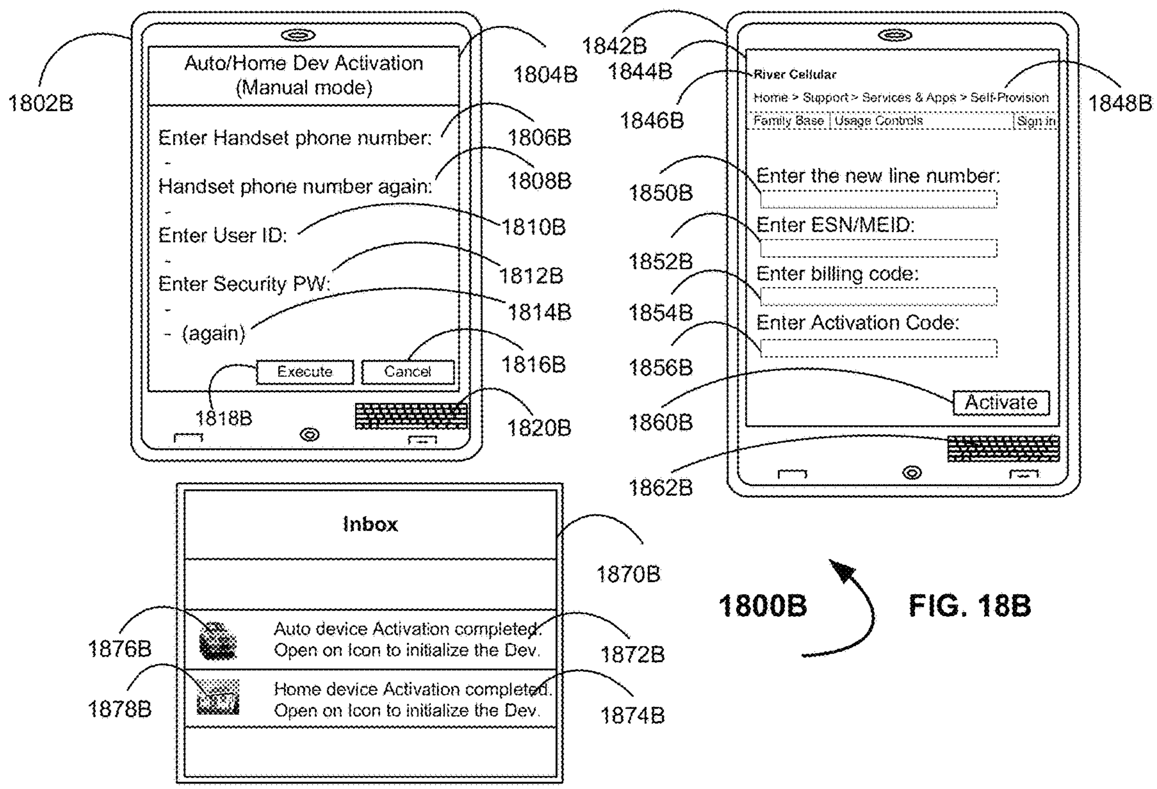

FIG. 18B illustrates a preferred activation example of embodiment 1800B of the present invention where the user preferably has an option to start the Manual Activation selection. This activation (NAM) is simple and quick as in the case where the user wants to add a line (phone number to the Dev) to his/her existing account with the current service provider who is already in possession of the user's personal and account information. In order to prepare for the activation, the user either contacts customer service or makes an online request for an additional line. The customer service representative will ask for his/her existing main cellular number, customer's address, tax ID (i.e., last 4 digits of social security number, in the USA) and in return, provides the user his/her Dev's new number and the activation code preferably via text messages to his/her handset. Next the user starts the activation by selecting Man icon 1413 and executes Ok icon 1415 (FIG. 14) making the handset navigate to screen 1804B where he/she enters the handset phone number 1806B, 1806B (twice), user ID 1810B, password 1812B, 1814B (twice). The user then executes 1818B making the handset transmit said information to the Dev which in turn transmits back a MSK to the handset which stores it in its memory. The user then goes online to the Service Provider/Provision Server website 1848B (screen 1842B) in order to have to Dev provisioned/activated. The user enters the request information such as: Dev's new phone number 1850B and activation code 1856B (previously texted to his/her handset by the service representative), the Dev's ESN or MEID (retrieved by executing Dev IDs icon 1146/1346 of FIG. 11/13 and the values are as shown in 2826B of FIG. 28B) and the account billing code 1854B and then executes Activate icon 1860B. Within a short time later, the user will receive a message 1872B or 1874B in the inbox informing him/her that the Dev is connecting to the network. The user then executes icon 1876B/1878B to start the initialization process as described in FIG. 19/20. After the initialization is finished, the user is able to fully communicate with the Dev via his/her handset.

Figure 18C:
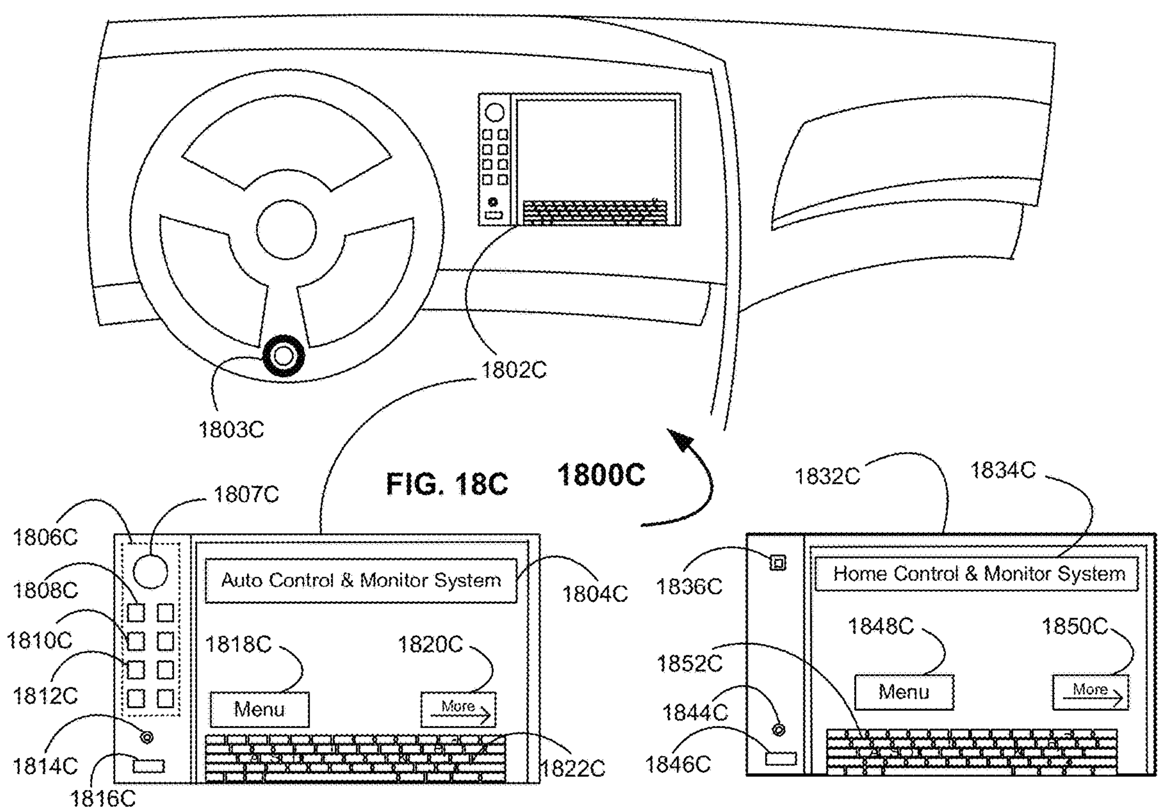
Figure 18D:
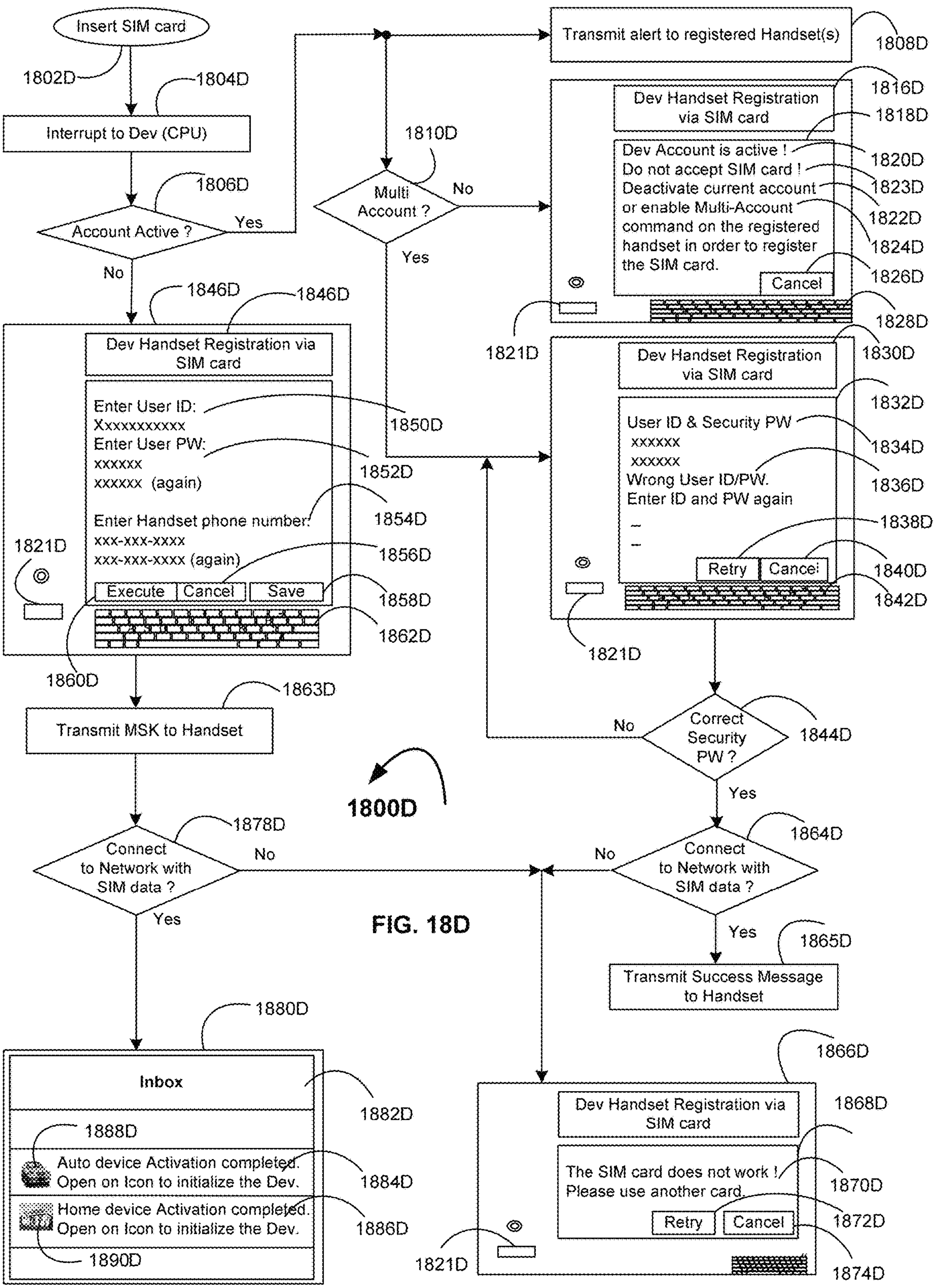

FIG. 18C illustrates a preferred activation example of embodiment 1800C of the present invention where the Dev is equipped with a display (via video connector 272 FIG. 2/3/4) so the user can see what is going inside the Dev (Control and Monitor System or M/C). The Dev (auto) display screen 1804C is turned on when the user starts the car ignition key and selects the M/C button 1812C while the Dev (home) display is always on as soon as the Dev is power-on 1836C. Setting up and programming the Dev can then be optionally done through its hard keypad 1806C (auto application) and soft keyboard 1822C (auto/home application). Furthermore, dashboard console display is used to display commands up which its Dev can communicate, control and monitor other Devs as in the case of a police officer using screen 4232B in FIG. 42B FIG. 18D illustrates a preferred activation example of embodiment 1800D of the present invention where the user preferably has an option to start the Dev registration by inserting a valid SIM/USIM card 1802D through the SIM card connector 1821D. The Dev (CPU) then receives an external interrupt 1804D wherein it verifies if its account is active or not 1806D. If the Dev's account is active, it checks to see if Multi Account (block 1810D) is selected. If the Dev is not in Multi Account mode (Multi Accounts icon 1179/1379 of FIG. 11/13 has not been executed in the user's handset), it displays a message 1823D telling the user that he/she cannot register the Dev using said SIM card since its current account is active (display message 1820D). The Dev also informs the user to deactivate the current account (display message 1822D if it is the only existing account) or the user can enable the Multi Account mode (display message 1824D) in order to register said SIM/USIM card. It also sends a text message to the user's registered handset alerting him/her of said action (1808D). If the Dev is in Multi Account mode (block 1810D), it prompts the user to enter user ID and security password 1834D (screen 1830D) and if said user ID and password are correct 1844D, the Dev attempts to connect to the network with said SIM/USIM card (parameters) 1864D. If the Dev is unable to connect to the network, it navigates to screen 1866D informing the user know that said SIM/USIM has failed (1870D); otherwise it navigates to screen 1865D where it transmits a text message to his/her registered handset 1865D allowing the user to communicate with Dev from now on with said SIM/USIM card. If user fails to provide the correct password 1836D (entry screen 1832D) after the limited entries (e.g., three attempts), the Dev will provide a password recovery process where the user can recover his/her password in his/her email (not shown).

If the Dev does not contain any active account (in block 1806D), it sets up a new account by requesting the user to enter his/her user ID 1850D, password 1852D and Handset phone number 1854D, the user then executes 1860D making the handset transmit via SRC said information to the Dev and said Dev tries to connect to the network using said SIM/USIM card parameters (SIM card is usually programmed to work with one specific carrier while USIM/Universal SIM will work with any carrier). In return, the Dev transmits the MSK to the handset 1863D in order to associate said key to the handset from this point moving forward. The Dev tries to connect to the network 1878C and if it is not able to connect to the network, it navigates to screen 1866D letting the user know that said SIM/USIM has failed 1870D; otherwise it navigates to screen 1880D where it informs that a text and Initialization icon have been transmitted to his/her handset 1884D/1886D where user confirms and executes Initialization icon 1888D/1890D which navigates the handset to Initialization screens as described in FIG. 19/20 so the user can initialize said Dev.

Activation parameters, device ID parameters, activation acknowledgement parameters (such as: ESN, MEID, IMEI, SID, Ki, MSISDN, IMSI, TMSI, S/N, manufacturer name and so for) previously and hereby cited, in no way are limited to or restricted to the one(s) presented but may include other parameters or can be other parameters which are not present, as are known to those of ordinary skill in the art.

Multi account feature (1179/1379 of FIG. 11/13) allows users to have a plurality of accounts residing in the Dev at any time, with only one active account, which is either default or previously chosen, can be used at a time. This allows the user to use the most preferable account with a new particular carrier by connecting the Dev into said carrier network without having to deactivate said Dev from the current existing network. In other words, the user can always select the new network for the Dev or revert back to any existing accounts when it is advantageous for him/her to do so. Furthermore, each account preferably will have different Dev account IDs, such as the Dev's phone number and/or MSK, account number and the likes, assigned to it during the activation/registration and each account parameters are stored in both Dev and handset memories and each account in its own separate memory area 542/642, 548/648 and 550/650 for the Dev, and 752A/752B for the handset. Therefore, it makes the communication between the handset (or anyone of its registered mobile/wireless/wired devices) and the Dev fast and uncomplicated since the apps in both the Dev and the handset fetch separate parameters of each account when said account is being utilized during their communication, as commonly practiced by those of ordinary skill in the art.

It is preferable that the user will be prompted to choose which account to deactivate or delete when the Dev contains a plurality of accounts. When the Dev no longer contains any accounts (all accounts are deleted), it is also preferable that all user's personal and account information is removed from memory and therefore allows a new user to program into the Dev his/her new personal and account information.

FIGS. 19 and 20 illustrate preferred application examples of embodiments 1900 and 2000 of the present invention. This exemplary embodiment presents preferred steps taken by a user in his/her handset to initialize his/her personal information and handset parameters into the Dev 106 after said Dev has been successfully activated and registered into a cellular network.

The user starts by executing the Initialization icon 1290/1490/1886A/1876B, or 1294/1494/1888A/1878B (he/she received in the inbox, screen 1280/1480/1880A/1870B of FIG. 12/14/18B) that makes the handset 102 navigates to the handset's Auto/Home Device Initialization screen 1902/2002. Next, the user enters his/her chosen account security passwords (1914/2014 and 1916/2016), handset chosen passwords 1918/2018, then executes 1906/2006 that makes the handset 102 transmit the command and information (also in steps 1976/2076 and 1978/2078 of flow diagram 1970/2070) to the Dev 106 which processes the command and verifies that the two passwords, which each entered twice are identical (as routine practice for identification). The Dev 106 then sends back the requested information which the handset 102 displays on screen 1920/2020. It shows the handset's phone number 1924/2024 (that the handset passed to it previously during the activation process) and the handset password, service provider name and account information 1926/2026, Dev phone number 1927/2027, Dev security password 1923/2023 and user name (1925/2025). The user needs to fill out the remaining information and upon completion it is presented as shown in screen 1930/2030.

In screen 1930/2030 (also as shown in step 2082), the user enters car make and model, License Plate 1934 (for Auto Dev) or house address 2034 (for Home Dev), account security password 1936/2036, registered phone numbers 1937/2037 and its password, account name and service provider account number 1938/2038, Dev phone number 1940/2040, email address 1942/2042 for password recovery, emergency center phone number 1946/2046, and a plurality of other required information (not shown for clarity purpose and ease of presentation as are known to those of ordinary skill in the art). The user then executes the Exe icon 1954/2054 making the handset 102 store the Dev's phone number 1984/2084 into its memory and transmit the command and information (shown in step 1986/2086) to the Dev 106 which processes and saves them into its memory 1988/2088. The Dev also updates the encrypted MSK 1989*a*/2089*a* and transmits it 1989/2089 to the handset which stores it in its memory 1989*b*/2089*b*. Updating the MSK lets the Dev find out when an unwanted handset or device had been snooping around during the prior activation because said device attempts to communicate with it using the old expired MSK; then Dev can alert its registered handset of such activity. The Dev 106 then transmits 1990/2090 back the information 1992/2092 as shown in screen 1930*a*/2030*a*, which the user can re-edit again 1952*a*/2052*a* or finishes the initialization process by executing 1950*a*/2050*a*. Device Name (1933/2033) lets user edit Dev's name so said name can be saved under said Dev (1998/2098 in screen 1994/2094) allowing user to know right away which Dev to deal with, as in the case where a plurality of Devs (Dev 1996/2096 and Dev 1998/2098) reside in or are being controlled and monitored by his/her handset. For example, the user might have two vehicles (Blue Sedan and White Coupe) or multiple homes such as: Home Sara and Home Vacation.

The Police and Emergency phone number 1946/2046 (in US and Canada 911 step 1960/2060—Mainland China 110 and 119, Hong Kong 999—EU 112—Taiwan, Japan, South Korea, France 119, India 100 and 101, Mexico 066 and 068, Brazil 190 and 193) will be called and sent voice and text messages by the Dev 106 when the air bag 226 (FIG. 2) is inflated or its house is on fire (smoke alarm) 304 (FIG. 3), as well as to other registered handsets 102. The Email addresses 1942/2042 are for the password recovery when the user forgets the account security password. The Dev 106 then sends the password and email address to the Email Server 116 and has it emailed to the stored email address 1942*a*/2042*a* for the user to recover his/her password. The Dev phone number 1926/2026 (phone number 916-122-9876/916-122-9877) is used and stored (in step 1984/2084) by the handset application software into the handset memory so the handset application uses the number to communicate with the Dev 106. In other words, all handset's cellular commands (including the one forwarded to and be executed by the second or third party) to the Dev are always encoded with said Dev phone number. At the present time, said phone number may or may not be encrypted and it is preferable that the cellular service provider industry accommodates the encryption of said phone number (so said phone number will be then encrypted in this invention accordingly) in order for said phone number not to be exposed to a third party and also to make it harder for hackers who are always on the prowl for any network breaches.

Figure 21A:
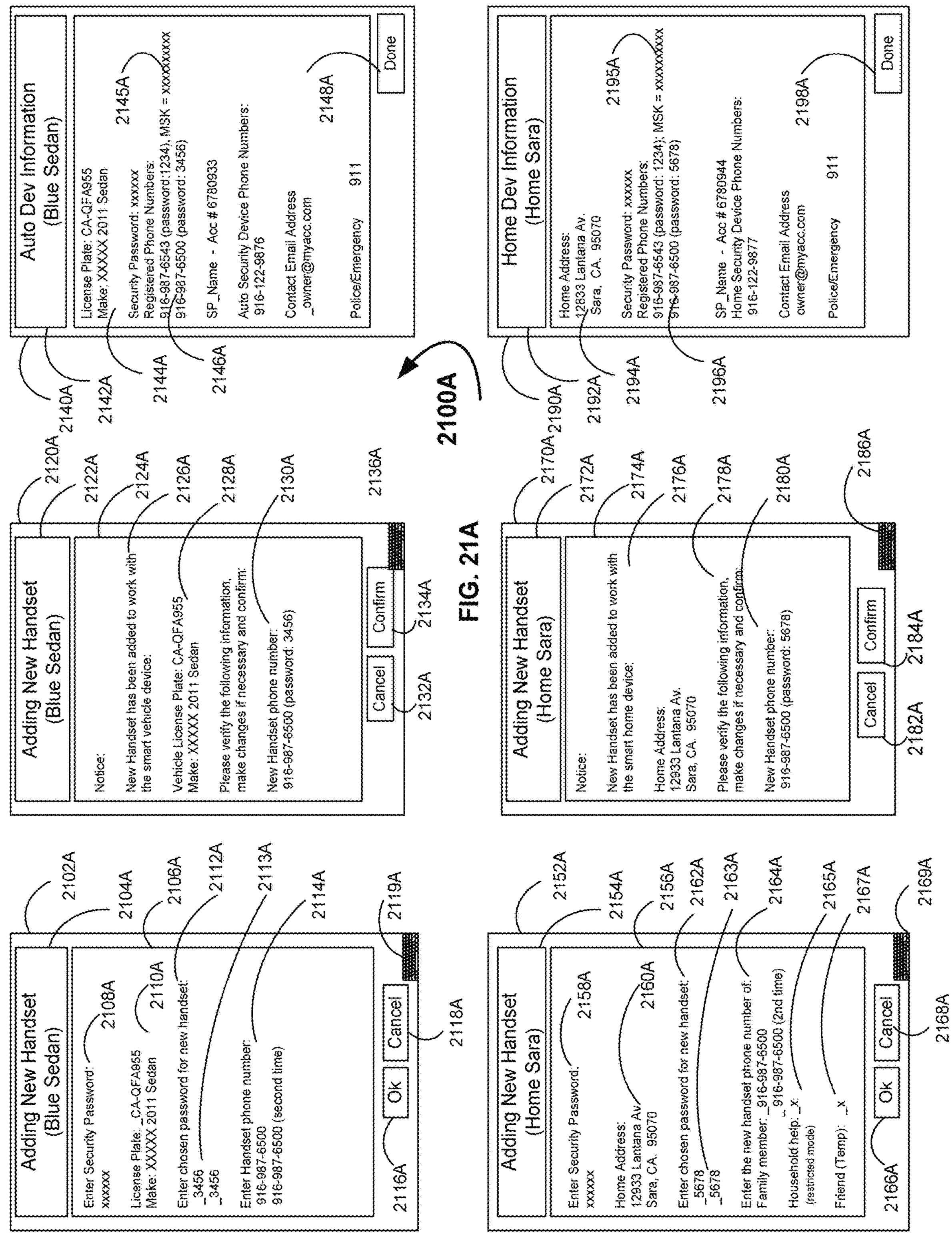
FIG. 21A shows a preferred example of handset's screen displays of a registered handset 102, adding (e.g., registering) a new handset into the Dev 106. After being added, the new handset 102 signs in, and thus registered into the Dev 106, and is able to control the Dev as much as the registered handset 102, relating to the present invention.

FIG. 21A illustrates a preferred application example of embodiment 2100A of the present invention. This exemplary embodiment presents preferred steps taken by the user in his/her handset to add (register) a new handset 102 into the Dev 106.

The user can add a new handset 102, which will be registered into the Dev 106. After the addition (registration) the new handset 102 will have all the controlling, programming, and monitoring capability as the registered handset 102.

The user executes the Add Handset icon 1172/1372 in screen 1150/1350 (FIG. 11/13), making his/her handset navigate to the Adding New Handset menu as shown on its screen 2102A/2152A, which prompts the user for the account security password entry. The user enters the account security password 2108A or 2158A and executes the Ok icon, making the handset transmit the command and data to the Dev 106 which verifies and process the data. If the account security password matches, the Dev 106 then sends back the vehicle/home information 2110A/2160A and prompts the user for the new handset chosen password 2112A/2162A. The user then enters the new handset chosen password 2113A/2163A. For the auto application, a single handset category 2114A is required for user's new phone number input. While for the home application, three categories, such as: family member phone entry 2164A, household help (i.e., maid service) phone entry 2165A, and friend or temp member phone entry 2167A; out of which the user only chooses one to enter the new handset phone number. In this exemplary embodiment, let us assume the user enters his/her family member's handset phone number 2164A and then executes the Ok icon 2116A/2166A making the handset 102 transmit the command and data to the Dev 106. The Dev 106 verifies and processes then transmits back the data to the handset 102, which displays them in screen 2120A/2170A for the user's verification. The user then executes the Confirm icon 2134A/2184A which makes the handset 102 transmit the confirmation back to the Dev 106, which processes and updates its device information file in memory, and sends it back to the handset 102 which stores it in its own memory and displays it in its screen 2140A/2190A. The user can always retrieve and view or request the up-to-date device information as described later in FIG. 28. The Dev 106 also sends instruction messages with the application download link and the Sign-In icon 2214 (which contains its phone number), as shown on screen 2202 of FIG. 22, to the added handset 102 whose user can start the signing-in as illustrated in FIG. 22.

Figure 21B:
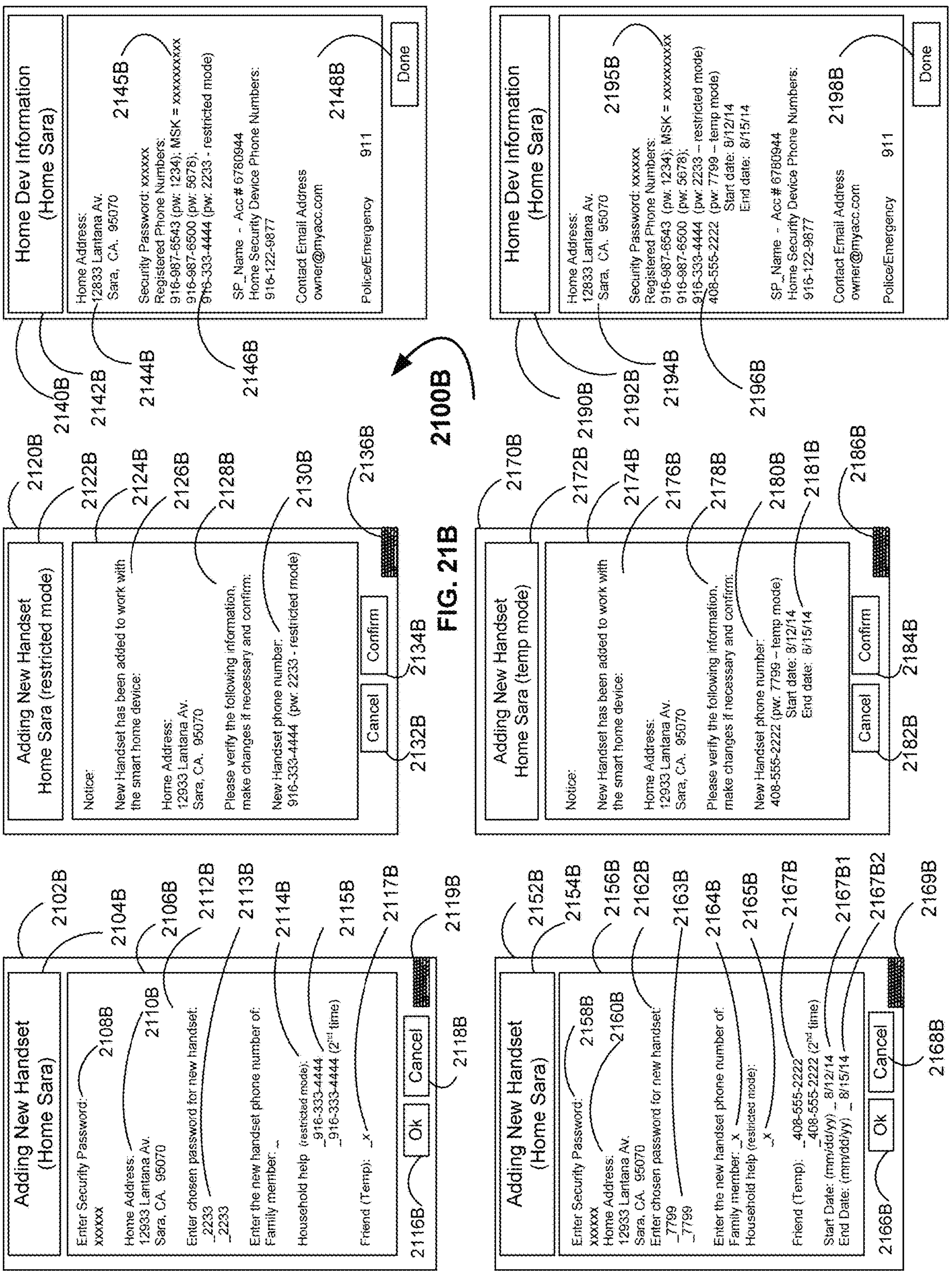
FIG. 21B shows preferred examples of handset's screen displays of a registered handset 102, adding 2 new handsets one after another into the Dev 106. After being added, the first new handset 102 signs in, thus registered into the Dev 106, and is restricted into controlling a limited function of the Dev 106. Similarly, the second handset 102 also signs in temporarily and its ability to control the Dev 106 terminates on a certain programmable date, relating to the present invention.

FIG. 21B illustrates a preferred application example of embodiment 2100B of the present invention. This exemplary embodiment presents preferred steps taken by a user in his/her handset to add (register) in a new handset 102 into the Dev 106 in the restricted or temporary mode.

It presents a case where the user either has entered a household member handset's phone number 2165A (in screen 2152A of FIG. 21A), which takes his/her handset to screen 2102B, which contains the just entered handset's phone number for household help 2115B. Or the user has entered a friend (temp) handset's phone number 2167A (in screen 2152A of FIG. 21A) which takes his/her handset to screen 2152B, which contains the just entered handset's phone number for friend (temp) 2167B. The user then executes Ok icon 2116B/2166B making the handset 102 transmit the command and data to the Dev 106. The Dev 106 verifies and processes, then transmits back the data to the handset 102 which displays them in screen 2120B/2170B for user's verification. Screen 2120B presents the added handset is in restricted mode while screen 2170B presents the added handset is in temporary mode. The user then executes the Confirm icon 2134B/2184B, which makes the handset 102 transmit the confirmation back to the Dev 106, which processes and updates its device information file in the memory, and sends it back to the handset 102, which also preferably stores it in its own memory. The user can always retrieve, view, or request the up-to-date device information (as described later in FIG. 28). The Dev 106 also sends the instruction messages with the application download link and the Sign-In icon 2214 (which contains its phone number), as shown on screen 2202 of FIG. 22, to the added handset 102 whose user can start the signing-in as illustrated in FIG. 22.

Temporary registered handset 102, such as: the one owned by a friend, a guest or a neighbor who has the temporary access to the house, is preferably programmed with a starting date (2167B1) and time (not shown), ending date (2167B2) and time (not shown), and its access privilege to the house is as a normal registered handset' s102. It has no capability of registering another handset 102 into said Dev 106 or no capability of activating the Dev 106 into a new network. It will be automatically removed (deregistered) from the Dev 106 on its expiration date (2167B2).

Household help member's handset 102 is preferably restricted in its functionality to only be able to turn on or turn off the house security alarm for entry or exit into the house or the premises, entering and exiting on a certain time and day of the week (not shown). It will not be able to command the Dev 106 to control, observe or monitor anything else; and to have no capability of registering another handset 102 into the Dev 106.

This embodiment preferably allows a user of the Dev 106, away from home (near or far), or on business trip or on vacation somewhere, to remotely add (register) his/her friend's handset 102, using his/her own registered handset 102, to the Dev 106. This allows the friend to use his/her own handset 102 to enter and exit to stay at the user's house, for any programmable duration. The user preferably can also even keep track of the time and date of the ins and outs of said friend (not shown), or a household help member (not shown) by executing the List Handset In & Out Activity icon 1342 in screen 1320 of FIG. 13. The household help member or the friend can preferably always remove from his/her handset 102, the software application associated with the Dev 106 when it is no longer needed.

FIG. 22 illustrates a preferred application example of embodiment 2200 of the present invention. This exemplary embodiment presents preferred steps taken by a user in his/her newly added handset 102 to sign in said handset 102 into the Dev 106.

The user of the recently added (registered) handset 102 receives (step 2242 inflow diagram 2240) in its inbox (screen 2202) a notification 2204 from the Dev 106 that he/she needs to download the application 2210, and then signs in 2212 in order for his/her handset 102 to work with the Dev 106. The user first executes the application URL (2210) for the app download, also is shown in step 2244 (download link 2210 whose app downloading steps were described previously in screens 920/1020, 940/1040, 960/1060, and 980/1080 of FIG. 9/10). After the application has been downloaded, in step 2246 (assuming his/her handset does not contain such app; otherwise the user just signs in), the user then executes the Sign In icon 2214 (also shown in step 2248) which navigates the handset 102 to screen 2220 where the user enters his/her correct handset password 2226 (which is the same password the user of the adding/registering handset had assigned 2113A/2163A on screen 2102A/2152A of FIG. 21A or 2113B/2163B on screen 2102B/2152B of FIG. 21B). The user finally executes (Execute icon 2228) allowing the handset 102 to store the Dev's phone number into its memory 2250 (in graph 2240) and transmit the acknowledgement to the Dev 106. The Dev receives the acknowledgement 2252 and then transmits (step 2254) the notification (2262) to the user of the registering handset 102*r* (in flow chart 2240) as shown in screen 2260. From now on, the sign-in handset 102 and the Dev 106 can communicate with each other (2256).

Figure 23:
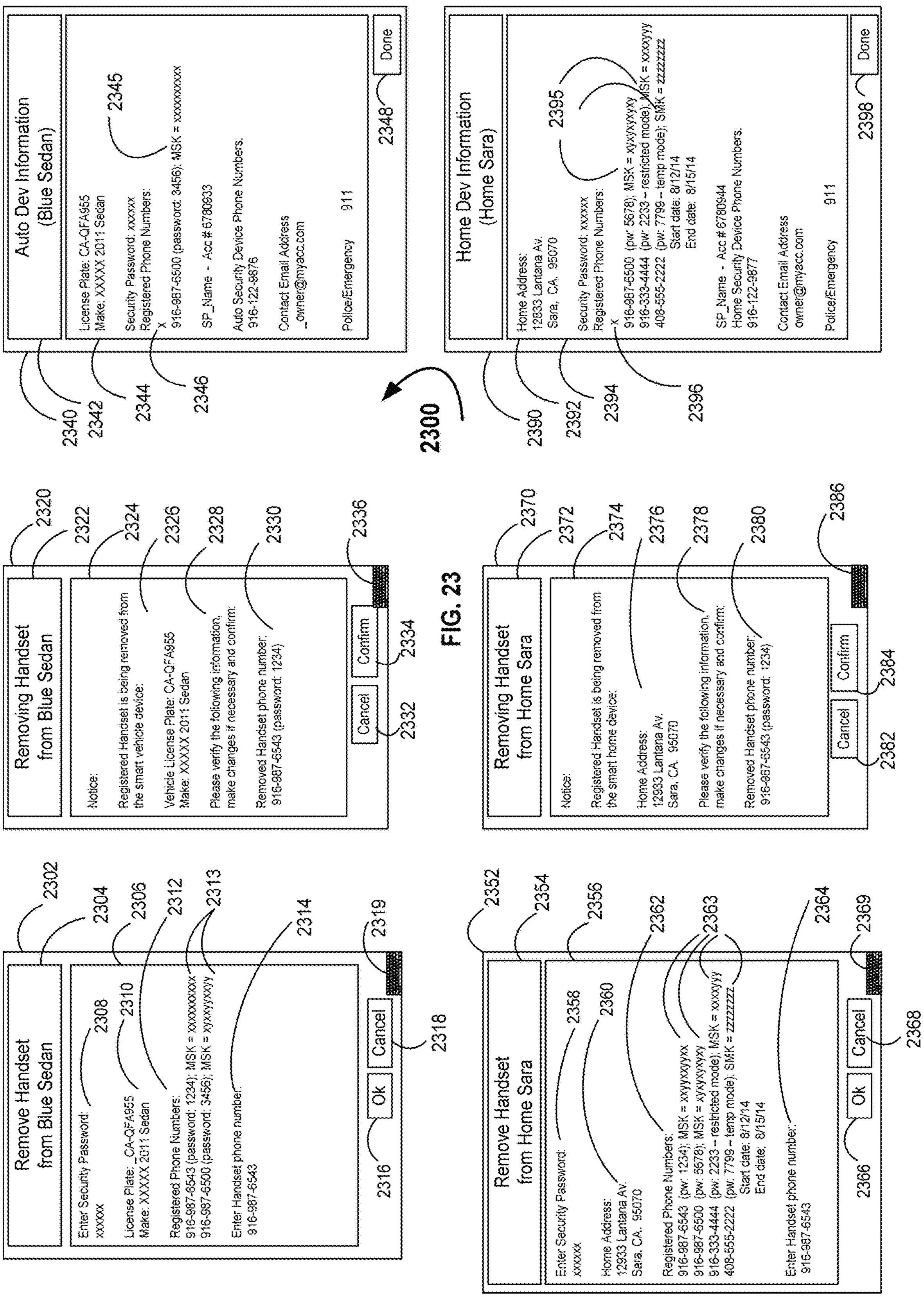
FIG. 23 shows a preferred example of handset's screen displays of a registered handset 102, in removing (e.g., deregistering) another registered handset from the Dev 106, relating to the present invention.

FIG. 23 illustrates a preferred application example of embodiment 2300 of the present invention. This exemplary embodiment presents preferred steps taken by a user in his/her handset 102 to remove a registered handset 102 from the Dev 106.

The user executes the Remove Handset icon 1176/1376 in screen 1150/1350 of FIG. 11/13, making his/her handset navigate to the Remove Handset menu as shown on its screen 2302/2352, which prompts the user for the account security password entry. The user enters the account security password 2308/2358 and then executes the Ok icon 2316/2366 making the handset 102 transmit the command and data to the Dev 106 which verifies and processes the data. If the account security password is correct, the Dev 106 transmits back the Dev's auto/home information 2310/2360 and its registered handset phone numbers 2312/2362, then prompts the user for the phone number of the handset 102 being removed 2314/2364. The user enters the being removed handset's phone number 2314/2364 then executes the Ok icon 2316/2366 making the handset 102 transmit the command and data to the Dev 106. The Dev 106 verifies and processes the data, then transmits them back to user's handset 102 (screen 2320/2370) for confirmation 2328/2378 and 2330/2380. The user then confirms 2334/2384, making the handset 102 transmit the confirmation to the Dev 106 which verifies, processes and update its device information, and sends it back to the handset 102 (2340/2390) showing that the handset 102 has been removed 2346/2396. FIG. 23 also showing mobile security keys (MSKs) associated with each registered devices is for illustration only as in 2313, 2345, 2363 and 2395 and 2145A/2145B, 2195A/2195B of FIG. 21A/21B. In other words, there is no need for the Dev to communicate these encrypted parameters to the user.

Figure 24A:
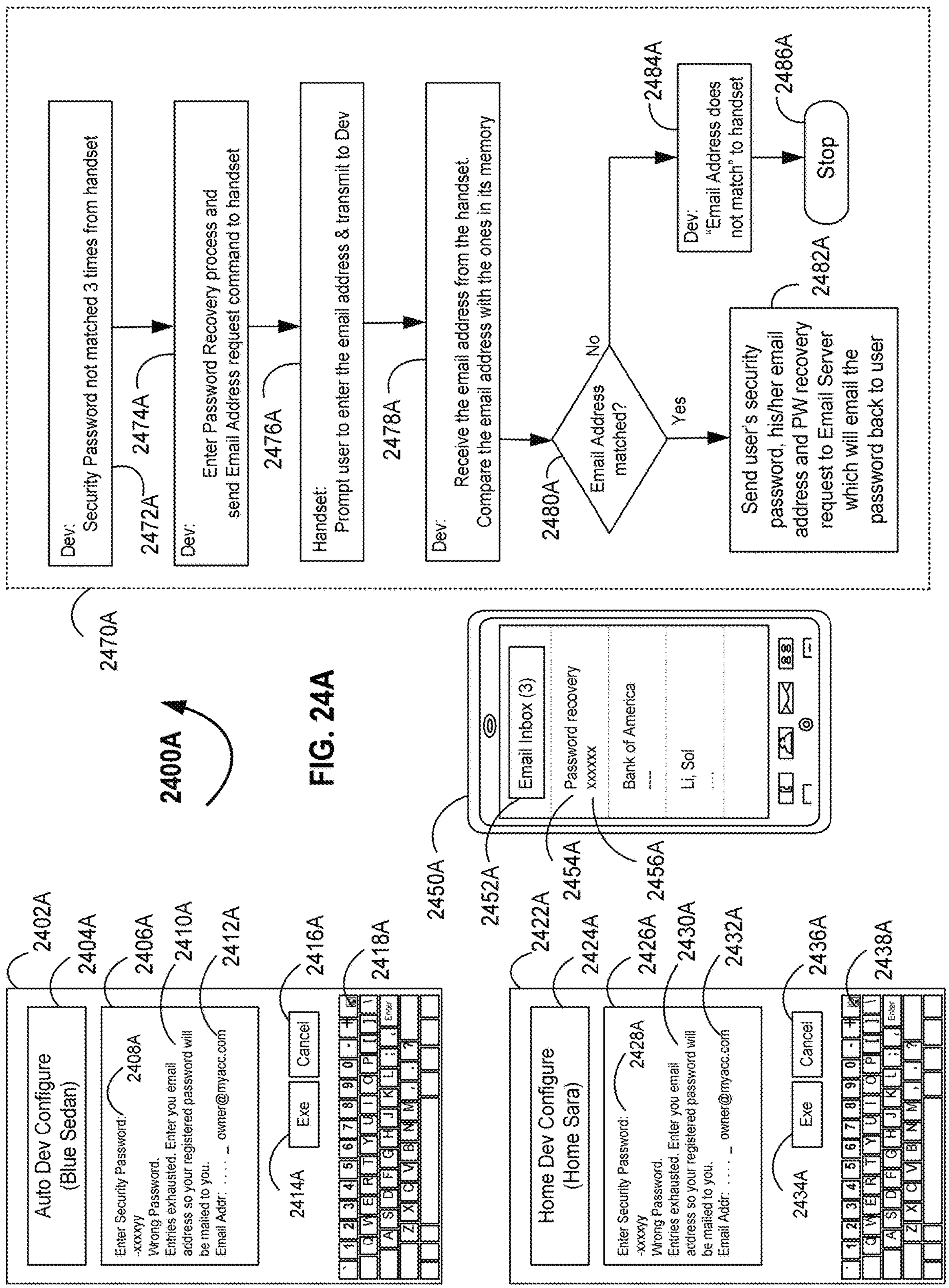
FIG. 24A shows a preferred example of handset's screen display and flow chart, presenting the user password recovery application of Dev 106, relating to the present invention.

FIG. 24A illustrates a preferred example of embodiment 2400A of the present invention. This exemplary embodiment presents preferred program flow of the Dev 106 password recovery when the user fails to enter to the correct password more than the allowed attempts (i.e., three attempts).

It illustrates a password recovery mechanism when the user fails to enter the correct password, and thus will be able to receive it back in his/her email account from the email server. An example where password recovery can happen is when a user wants to view or edit the Auto/Home Device Configuration command as represented by icon 1156/1356 of FIG. 11/13.

After the user executes the Auto/Home Device Configure icon (1156/1356 of FIG. 11/13), making his/her handset 102 transmit the command to the Dev 106 which processes said command and sends the response back to said handset 102 which displays the Auto/Home Device Configure command as shown on its screen 2402A/2422A. It requires the account security password entry 2408A/2428A from the user and if he/she fails after three times 2410A/2430A (also in step 2472A of flow diagram 2470A), the Dev 106 enters the email recovery process by sending the password request command 2474A to the handset 102, which prompts 2410A/2430A the user for his/her email address 2412A/2432A. The user enters the email address, and then executes the Exe icon 2414A/2434A, making the handset 102 transmit the command to the Dev 106 which receives and processes (step 2478A). If the email address is verified 2480A and does not match, the Dev 106 sends "Email address does not match" message 2484A to handset 102 and stop 2486A. If Email address matches, the Dev 106 transmits the password recovery command along with the user's email address 2482A, and the password to the mail Server 116 for password recovery. The user can then check his/her email (2452A of screen 2450A) and retrieve the password (2456A).

Figure 24B:
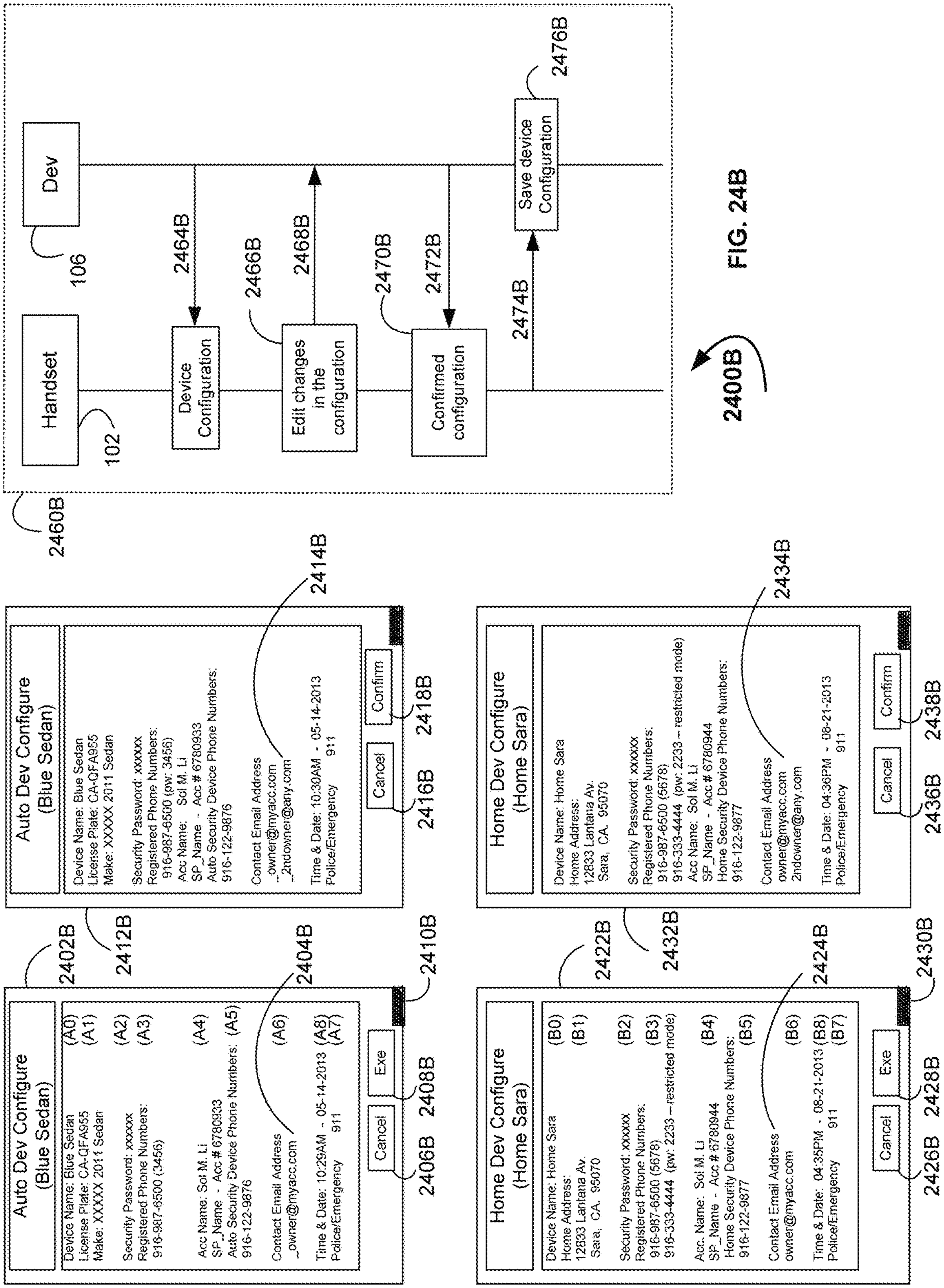
FIG. 24B shows a preferred example of handset's screen displays and a flow diagram, presenting the configuration (command) of Dev 106, relating to the present invention in the auto/home application.

FIG. 24B illustrates a preferred application example of embodiment and 2400B of the present invention. This exemplary embodiment presents preferred steps taken by a user in his/her handset 102 to configure the Dev 106 with any changes in personal and or handset information.

It presents the continuation of screen 2402A/2422A, where in this case the user entered the correct account security password 2408A/2428A which was transmitted by the handset 102 to the Dev 106 as described previously in FIG. 24A. The Dev 106 transmits back 2464B (in diagram 2460B) its device configuration data to the handset 102 which displays it on screen 2402B/2422B. Some preferable information (not all) is shown, such as: Dev's name (A0/B0), vehicle ID information (A1)/home address (B1), account security password (A2/B2), registered handset phone numbers and its passwords (A3/B3), user name and account number (A4/B4), Dev phone number (A5/B5), email address (A6/B6), Time and Date (A8/B8) and emergency center phone number A7/B7. The user preferably can edit to change information on screen 2402A/2422A (also shown in step 2466B) any information but the registered handsets' phone numbers (A3/B3) and Dev's phone number (A5/B5). Let us assume that the user edit changes (step 2466B) by adding a second email address 2404B/2424B and executes Exe icon 2408B/2428B making the handset 102 transmit the command and data to the Dev 106 (step 2468B). The Dev 106 then processes the data and sends it back (step 2472B) to the handset 102 for user confirmation (screen 2412B/2432B and step 2470B) showing a second email address (2ndowner@any.com) has been added (2414B/2434B) into the configuration/device file. The user then confirms 2418B/2438B making the handset 102 transmit the confirmed data back (step 2474B) to the Dev 106 which saves it in its memory (step 2476B).

Figure 25:
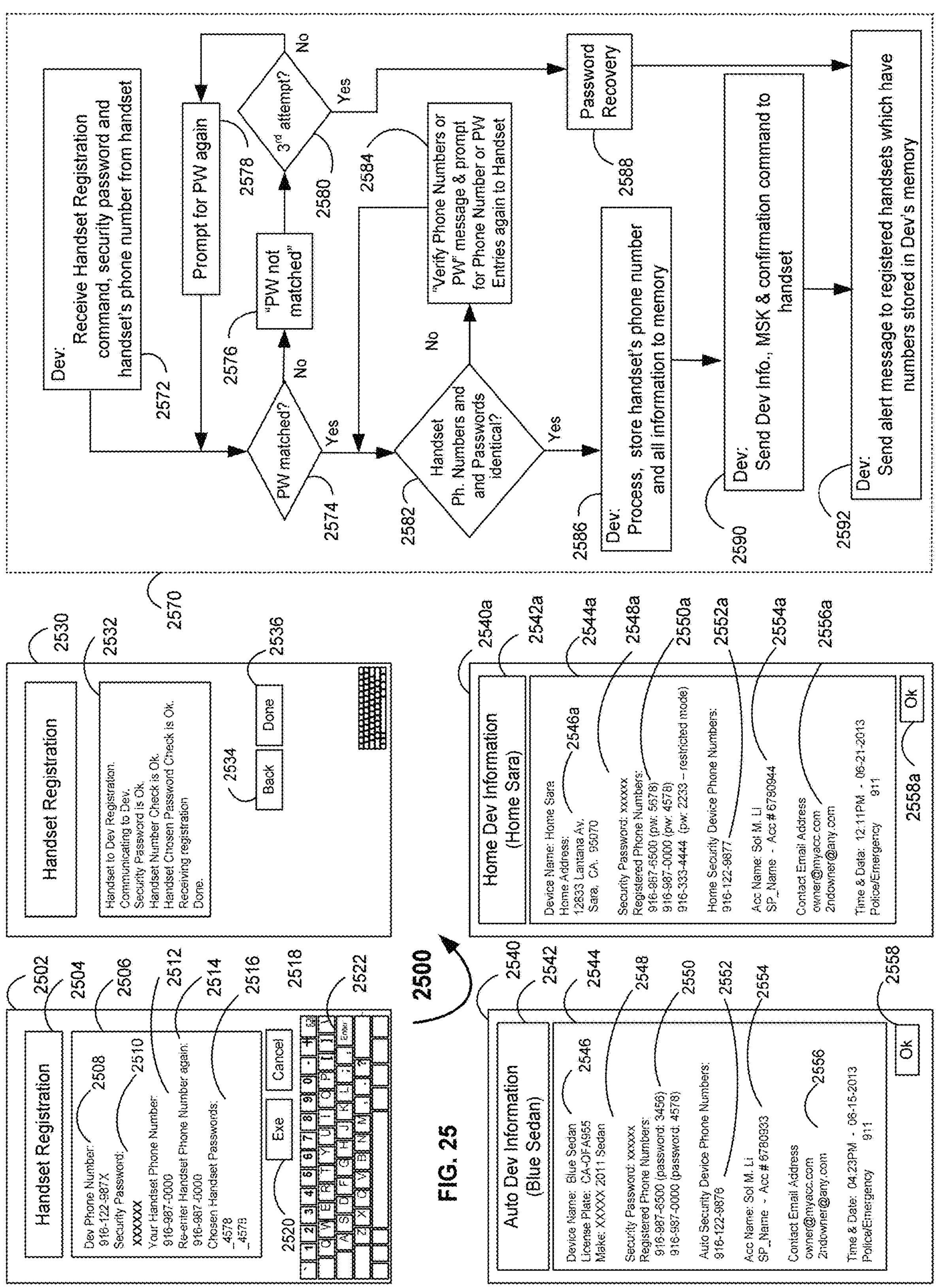
FIG. 25 shows a preferred example of handset's screen displays and a flow diagram, presenting the Handset Registration of a new handset 102 to Dev 106, relating to the present invention in the auto/home application.

FIG. 25 illustrates a preferred example of embodiment 2500 of the present invention. This exemplary embodiment presents preferred steps taken by a user in his/her new handset 102 to register said handset 102 to the Dev 106.

This feature allows the user to register anew handset 102 if he/she lost his/her only registered handset. Let us suppose that the user lost his/her old handset (phone number 916-987-6500 in 2410C/2440C) and bought a new one (phone number 916-987-0000). The user then registers the new handset 102 into the Dev 106. This feature thus allows a new handset 102 to be registered into the Dev 106 in case the old registered one is no longer available. With the newly registered handset 102, the user can use it to remove (deregister) the lost handset 102 as was previously described in FIG. 23. Also as mentioned earlier, he/she needs to download the application (and activation) online in order to run the application and uses the related commands/icons to register his/her handset 102 into the Dev. He or she does not have to be in the vicinity (within the SRC range) of the Dev 106 since it already registered with the network. The requirement is that the user knows the Dev's phone number and its security password in order for his/her handset 102 to transmit the command and data to the Dev 106 to begin the registration. The person who has the possession of the lost handset, if it is the case, will be notified of the registration as shown in step 2592, and on the handset's screen 2650 (of FIG. 26) but will not be able to prevent it since he/she does not have the account security password to enter as shown at 2666 (FIG. 26).

The user executes the Handset Register icon 1158/1358 in FIG. 11/13, making his/her handset navigate to the Handset Registration menu as shown on its screen 2502. In area 2506, the user enters the Dev phone number 2508, the account security password 2510, the handset phone number twice (2512 and 2514) and the chosen handset password twice (2516). The user then executes the Exe icon 2520 making the handset 102 transmit the command and data to the Dev 106 which receives and processes said information (2572 in chart 2570).

From here on, the inventor will skip, (on occasion,) the handset screen display messages (2510) which prompt back and forth the communication between the handset 102 and the Dev 106 for the required account security password entries and retries. He also will skip, (on occasion,) the handset screen display messages, such as: the phone numbers not matched and the reentries, or the chosen handset passwords not matched and the reentries, (for ease of presentation,) as are known to those of ordinary skill in the art.

While the Dev's requirement for account security password and handset password might be overlapped for certain common functions, each type of password is required (for the user's protection) in order for the Dev to perform its separate operations. They (functions requiring the account security password) are for the Dev's structure functions such as: handset registration, handset addition or removal, device configuration, device information, handset locator, toll fee payment setup, route and speed tracking, home alarm configuration, home appliances/equipments addition and removal, and the like. And the handset password is for the Dev's operation functions such as: vehicle/home control, program, monitor and view, engine status, home appliances/equipments operations, vehicle locator, and the like.

Flow chart 2570 shows the program flow of the Dev 106 when it executes the Registration command transmitted by the handset (screen 2502). It starts at step 2572 when it receives the command and the data, then verifies that if the account security password (PW) is correct 2574. When the account security password is correct, the Dev 106 checks to see if the handset phone numbers entered two times 2512 and 2514 are identical and so are the chosen handset passwords 2516 (in step 2582). The Dev 106, at the same time, transmits the registration process status to the handset (screen 2532, to keep the user informed). If they all are, the Dev 106 proceeds to process the command and stores all information (including the handset's phone number step 2586) into its memory. It then sends a confirmation command or the Auto/Home Dev Information 2540/2540*a* (in step 2590) to the handset 102 to confirm its completion 2558/2558*a*. When the account security password does not match, the Dev 106 transmits the message "PW not Matched" (step 2576) to the handset 102 and lets it attempt 3 times (step 2580) and if it fails, the Dev 106 goes to password recovery 2588 and also sends messages to other registered handsets 102 informing them of the action (step 2592). This feature allows users to be informed if there is any illegal registration from an unauthorized source. If the handset phone numbers or handset's chosen password entries are not identical, the Dev 106 goes to step 2584 requiring the user to re-enter the information.

FIG. 26 illustrates a preferred example of embodiment 2600 of the present invention. This exemplary embodiment presents preferred steps taken by a user in his/her new handset 102 to register said handset 102 into Dev 106 via the SRC network.

Chart 2602 presents a new handset 102 attempting to activate/register with the Dev 106, and the screen display 2650 of a registered handset 102 receiving the alert of said attempted activation/registration. The activation/registration starts at 2604 when the Dev activation button is pushed. The Dev 106 checks to see if its current account is active 2606; and if the account is not active (either has not been activated, or has been deactivated or has not been able to register into the network for the last 30 days, for example), it sends the inquiry message to the activating/registering handset 102 (2608). If the Dev 106, within some short amount of time, is getting no response back 2610, it sends messages 2614 to said handset 102 indicating that said handset 102 user needs to download the application (app) software to activate and communicate with the Dev 106 (these steps have already been presented in FIGS. 8 and 9/10). If in step 2610 the Dev 106 gets the proper response back from the handset 102, then the activation starts 2612 (as illustrated in FIGS. 11/13, 12, 14, 15A-17A which already presented one or the plurality of ways of activating the Dev 106). All the communication between the Dev 106 and the activating/registering handset 102 in this figure uses SRC (Short Range Communication), such as: either Bluetooth, wireless USB, NFC, WI-FI, infrared, wireless LAN, wireless radio frequency (RF) technology, or countless short-wave communication as are known to those of ordinary skill in the art and it is as shown in 104 FIG. 1.

If the Dev 106's account is active (in other words, it is registering/connecting to the network), it sends messages "You need the right software to run this application" (2616) to the registering handset 102. The user either downloads the application (app) online 2618 (by typing in the URL of the App Server 906/1006 on his/her handset's screen, and hits the screen keyboard return, as shown previously on screens 920/1020, 940/1040, 960/1060 and 980/1080 of FIG. 9/10), if his/her handset 102 does not contain the software. Or the user just runs his/her handset's existing application 2620 (as shown previously on the handset screen 2502 of FIG. 25 after its user executed the Handset Register icon 1158/1358 in FIG. 11/13).

At step 2621, the Dev 106 checks to see if any registered phone numbers exist in its memory. If no registered phone numbers exist in its memory, while the Dev 106 is being active, meaning it is containing a SIM card module (270 of FIG. 2/3/4) in its slot (and that was the reason it did not have to go through the normal activation process, as illustrated in FIGS. 11/13 to 12, 14, and 15A to 17A in order to be able to register into a network). At step 2623, (thanks to the presence of the SIM card,) the Dev 106 is connecting to the network, but a first handset's phone number has to be registered into said Dev's memory in order for these two devices to communicate with each other. The Dev 106 prompts the user of the new handset for his/her chosen security passwords (2623) and verifies if their entries are identical step 2625. If the security password entries are identical, the Dev 106 prompts for the handset phone number entries and its chosen handset password entries at step 2627, then proceeds to verify them at step 2640.

At step 2624, (there are registered phone numbers in the Dev's memory, meaning the Dev 106 went through the normal activation and registration process,) the Dev 106 receives the handset registration command, account security password, handset numbers and chosen handset passwords from the registering handset 102. The Dev also alerts (step 2622) by sending messages 2654 to the owner of the registered handset 102 of this attempted registration (as shown on his/her handset screen 2650).

At screen 2650, the owner of the alerted handset 102 can see the nature of the alert 2652 (Sol's Blue Sedan/Home Sara), the message 2654, time and date 2656, the registering handset/mobile phone number 2660. The owner can speed up the registering process by entering the correct password 2666 in order to be able to select Ok icon 2658 to allow it, or No icon 2662 to stop it (the password is required here preferably to make sure that he/she is the real owner of the handset). This makes his/her handset 102 transmit the command to the Dev 106, which receives it either in 2626 or in 2644 (chart 2602).

Back in chart 2602, the Dev 106 verifies if the account security password (indicated by 1936*a*/2036*a* in screen 1930*a*/2030*a* of FIG. 19/20) is ok. From this point on and thereafter, if the Dev 106 receives the "OK" command in step 2626 from one of the handsets 102 (executed by 2658 icon in screen 2650), it proceeds to verifies the handset phone number and its password entries (they were both entered twice to prevent typing mistakes) to see if they identical 2640 (without going through the account security password entry verification 2630). If the Dev 106 receives a "No OK" step 2644 from one of the handsets 102 (executed by 2662 in screen 2650), it will stop the process right away step 2636. Nevertheless, if the Dev 106 receives no messages from a registered user, it proceeds to verify the account security password 2630 (since the owner might have lost his/her only handset 102 and wanted to register a new one). If the password is not ok, the Dev 106 prompts for another entry 2628. If the entry still fails at the third attempt 2632, the Dev 106 proceeds to the password recovery process step 2634 (described in FIG. 24A) and finally to goes to stop (step 2636). If the account security password passes, the Dev goes to handset phone number entry and handset password entry verification step 2640 to verify if their twice entries and identical. If their twice entries are not identical, it prompts for re-entry step 2638; or if they are, it proceeds to allow the handset 102 to start the registration 2642; as already described in FIG. 25.

Figure 27:
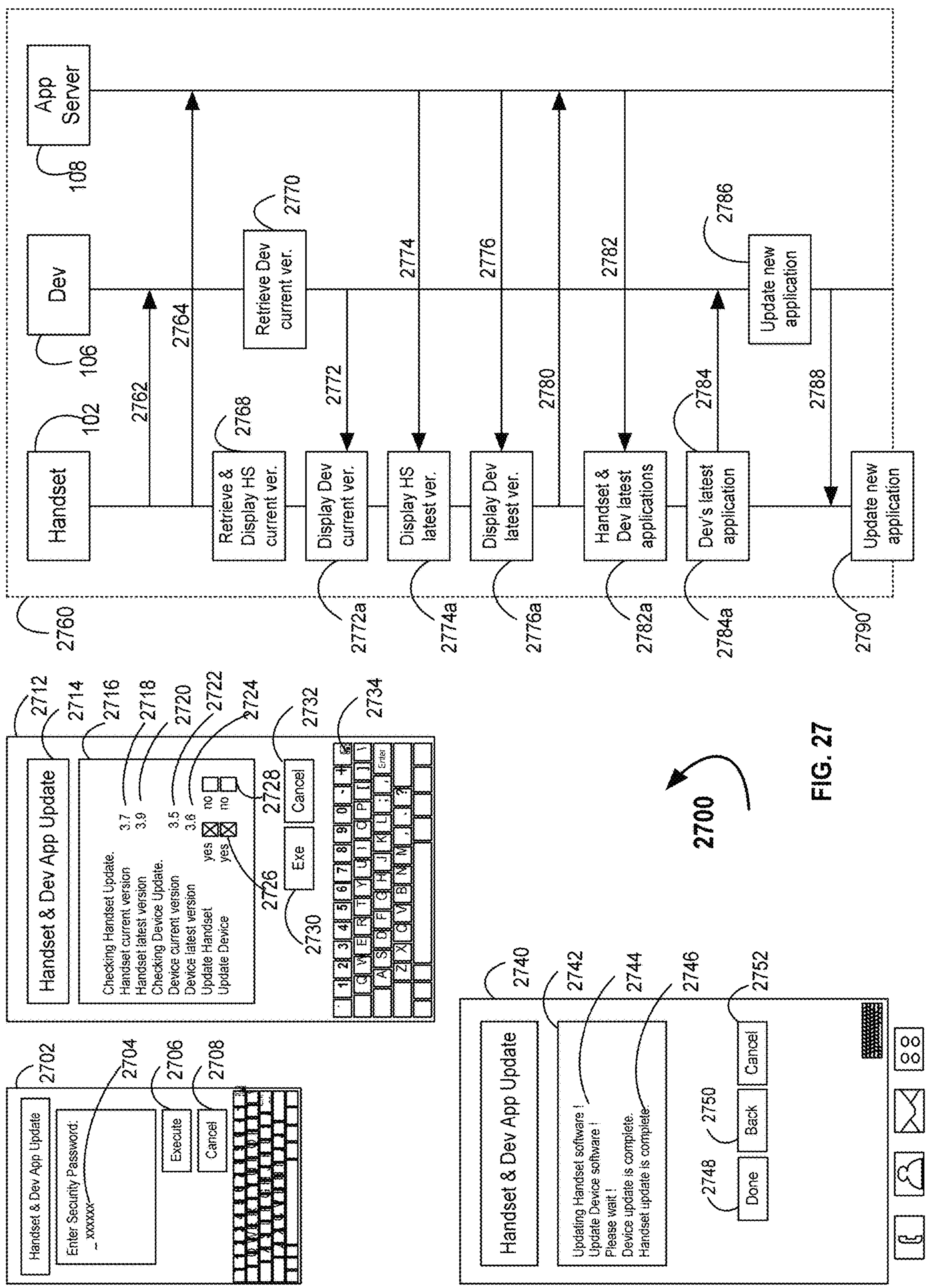
FIG. 27 shows a preferred example of handset's screen displays and a flow diagram, presenting the App Update between handset 102 and of Dev 106, relating to the present invention.

FIG. 27 illustrates a preferred example of embodiment 2700 of the present invention. This exemplary embodiment presents preferred steps taken by a user in his/her handset 102 to update said handset 102 and the Dev 106 applications.

The user executes the Handset and Dev App Update icon 1164/1364 of FIG. 11/13, making his/her handset navigate to the Handset and Dev App Update command as shown on its screen 2702. The handset prompts the user to enter the account security password (this embodiment assumes the handset already retained/stored the URL of the App Server for the convenience of the user, otherwise it will also prompt the user for the App Server' URL 906/1006 of FIG. 9/10). When the password 2704 matches (otherwise the Dev 106 proceeds to password recovery as in FIG. 24A) with the one in its memory, the handset 102 navigates to screen 2712 and transmits the app version query command to the Dev 106 (step 2762) and the App Server 108 (step 2764) which both send back the version information steps 2772, 2774 and 2776 respectively as displayed by the handset 102 in screen 2716: the handset current ver. 2718/2768, handset latest ver. 2720/2774*a*, Dev current ver. 2722/2772*a* and Dev latest ver. 2724/2776*a*. When the user wants to update to the latest app version 2726 and executes the Exe icon 2730, making the handset 102 transmit the app download command to the App Server 108 (step 2780), and receives (step 2782) the downloaded copies of the latest application (2782*a*) from the App Server 108. The handset 102 then transmits the Dev's latest version app (2784*a*) and the app update command to the Dev 106 (step 2784). When the Dev 106 receives the command and the latest version app, it updates its application to the latest version app 2786 and then sends back to the handset 102 the acknowledgement 2788. Next the handset 102 updates its application to the latest version 2790. The updated information of both the handset 102 and the Dev 106 is displayed by the handset 102 in screen 2740. Alternatively, the Dev 106 can download the latest version app directly from the App Server 108 when it receives the app update command from the handset 102.

FIG. 28A illustrates a preferred application example of embodiment 2800A of the present invention. This exemplary embodiment presents preferred steps taken by a user in his/her handset 102 to retrieve and view the Dev's device information.

The user executes the Dev Info icon 1166/1366 in the Auto/Home Dev Facility Menu 1150/1350 (FIG. 11/13), making his/her handset 102 transmit the device information query command to the Dev 106 which processes said command and sends the response back to said handset 102, which displays the Auto/Home Device Information as shown on its screen 2810A/2840A. It shows the Dev type Car ID information/Home address 2813A/2843A and 2816A/2846A, service provider (carrier) name 2817A/2847A, account security password 2818A/2848A, registered phone numbers 2820A/2850A and passwords, account name and number 2822A/2852A, Dev's phone number 2824A/2854A, email addresses 2826A/2856A, Emergency center phone number 2828A/2858A and some Dev identification numbers 2829A/2859A.

FIG. 28B illustrates a preferred application example of embodiment 2800B of the present invention. This exemplary embodiment presents preferred steps taken by a user in his/her handset 102 to retrieve and view the Dev's ID information.

The user executes the Dev IDs icon 1146/1346 in the Auto/Home App Menu 1120/1320 (FIG. 11/13), making his/her handset 102 transmit the Dev IDs query command to the Dev 106 which processes said command and sends the response back to said handset 102, which displays the Auto/Home Device Information as shown on its screen 2810B/2840B. It shows the Dev Manufacturer name and model 2816B/2846B, Dev Car/Home application 2818B/2848B, its Hardware/Software version 2820B/2850B, serial numbers 2822B/2852B, ESN value 2824B/2854B, MEID value 2826B/2856B, SIM S/N 2828B/2858B, IMEI 2830B/2860B and some other Dev identification numbers.

The user can also retrieve the Dev IDs via Dev keypad 1822C/1852C and display 1802C/1832C of FIG. 18C by inputting #06# (as presently practiced in the industry). In the case where the Dev has not been activated or been inactive (and is not equipped with a display), the user needs to push and hold the activation button while executing the Dev IDs retrieving command in order for the Dev to transmits via SRC its ID information to his/her handset, The combination of holding the activation button and executing the ID command simultaneously would prevent other users from obtaining said information since they do not have physical access to the Dev.

The Remote Access icon 1167/1367 of Auto/Home Dev Facility Menu 1152/1352 of FIG. 11/13 preferably allows the user to program the Dev 106 via his/her handset 102 (tablet or any wearable, mobile device) in order for said handset to have remote access to all of the Dev's functions. In other words, the handset screen and all its keyboard soft-keys take the place of the Dev's screen and all its keyboard soft-keys. The user does this by executing Remote Access icon 1167/1367 making the handset 102 transmit the command to the Dev 106. The Dev 106 verifies, and processes the command, then transmits back the affirmative response to the handset 102 which then displays the Dev's startup screen on its (handset's 102) display. From then on, every action on the handset screen, such as: execution of an icon, soft-keyboard control-key, return-key, esc-key, and the likes will make the handset 102 transmit said action (along with any data) to the Dev 106 as if the user uses the Dev itself. The Dev then reacts, responds and/or executes each one of said commands along with the information and transits back the result to the handset 102. In this case, the handset takes over the Dev 106 functionality, meaning the handset's display is in place of the Dev's display; the user then has complete control over the Dev 106 from a remote distance by executing the handset screen soft-keyboard and associated icons.

The user, via his/her handset, is then able run diagnostics on the Dev, set up its initial parameters, clean up any redundancy, obsolete accounts and files, update its software and apps, navigate the Dev online (the Internet via cellular connection), install/remove 3$^{rd}$ party apps and the likes. When the user is done with these functions, executing the Esc key or Done icon (not shown) will allow the Dev to abort or save its new parameters and to recycle its power (initialization reset). This feature will be aborted by the Dev 106 with a screen warning if there is no screen activity by the user after 5 minutes, for instance. To provide foolproof protection against hostile sources from having access to this critical feature, a secondary security measure is recommended such as requirement for an additional physical access to the Dev (execution of its button/keypad) or two-factor authentication while executing the Remote Access icon 1167/1367.

Figure 29:
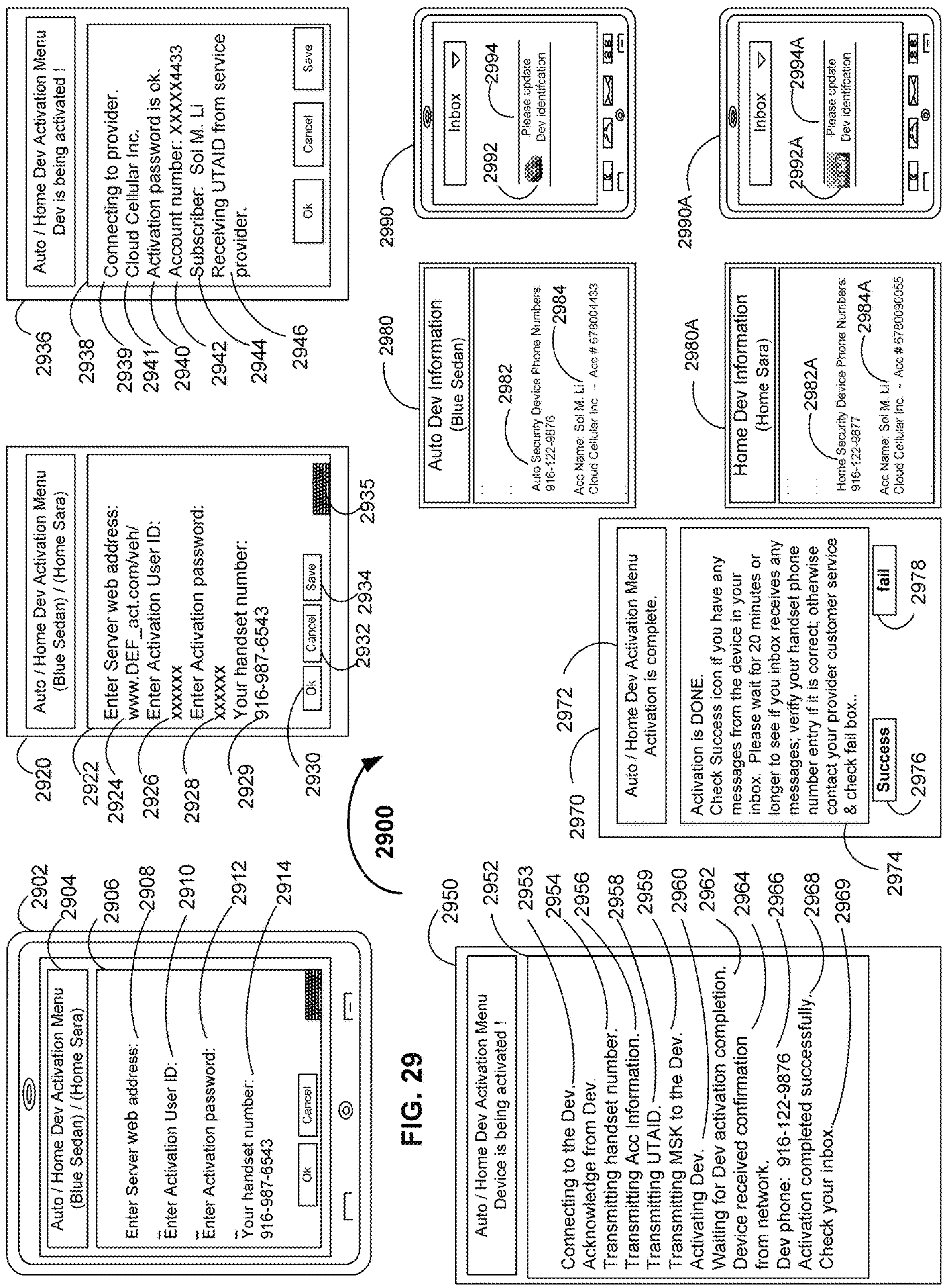
FIG. 29 shows a preferred example of handset's screen displays of present invention, in having the active Dev 106 activated into another network, in auto/home application (in a case where the user picks/switches cellular service to a new provider).

FIG. 29 illustrates a preferred application example of embodiment 2900 of the present invention. This exemplary embodiment presents preferred steps taken by a user in his/her handset 102 to activate his/her currently registered Dev 106 into the network of a new cellular provider when he/she decides to switch to said provider.

This embodiment shows when the user decides to switch the cellular service of the Dev 106 to a different (second) cellular service provider, he/she has to have the Dev 106 activated into the new network. It is preferable that the user has his/her Dev 106 activated into the new (second) service provider's network before he/she has the Dev 106 disconnected from the existing (first) service provider's network. In other words, the Dev 106 should still have access to the current network while the user is having it (Dev 106) activated into a second network. As soon as the Dev activation into the new network is completed, the user can have the Dev 106 disconnected from the current (first) service provider's network. This allows the user to use the handset 102 in communicating with the Dev 106 during activation via cellular network instead of via the SRC 104 medium (in other words, he/she can activate the Dev 106 anywhere instead of having to be in the vicinity of the Dev 106 as done previously).

The activation process begins, after the user executes the Activate icon 1154/1354 of the Auto/Home Dev Facility Menu 1150/1350 (FIG. 11/13), making his/her handset navigate to the Vehicle/Home Activation menu, as shown its screen 2902. The rest of the activation procedure is identical as shown in FIG. 29, which is nearly identical to FIG. 12 with the exception that the Dev 106 already contained handset's phone numbers 2914; where as the user had to enter it 1214 in screen 1202 of FIG. 12 and the Dev receives the MSK 2959 from the handset thus recognizing said handset. As soon as the Dev is activated and able to register and connect into the new network with the user confirming command success to the Dev 106 (by executing the Success icon 2976), the Dev 106 sends its Device Information (screen 2980/2980A) containing its phone number, which the handset stores and uses from then on in its communication with the Dev 106. The Dev's cellular service to the current network can then be disconnected (no longer active) and from here on the Dev 106 communicates with other mobile devices (handsets) 102 in the new network. The Dev's information file (screen 2980/2980A) contains the same programmed data. In other words, there is no need for the user to reinitialize or reconfigure the Dev 106. Preferably the only difference is the new account number 2984/2984A (plus the name of the new service provider 2941 "Cloud Cellular" instead of "River Cellular" 1241/1441 of FIG. 12/14) and possibly the Dev has been assigned a different phone number 2982/2982A. The Dev also preferably sends command(s) to the other handset(s) as shown in the forms of the icon 2992/2992A in the inbox(es) (screen 2990/2900A) along with messages 2994/2994A informing the user(s) to update his/her (their) handset(s) with the Dev's (new) number.

FIG. 30 illustrates a preferred application example of embodiment 3000 of the present invention. This exemplary embodiment presents preferred steps taken by a user in his/her handset 102 to program, retrieve, view and monitor the Dev Auto Control and Monitor system.

The user executes the Auto Control & Monitor icon 1132 in the Auto App Menu 1120 of FIG. 11, making his/her handset navigate to the Auto Control and Monitor Menu as shown on its screen 3002. The Auto Control and Monitor Menu 3004 presents the user with the Control icon 3014 which the user uses to control the vehicle accessories (screen 3050), such as: to turn the alarm on/off 3052, to lock/unlock doors 3054, to sound the horn 3056, to turn the ignition on/off 3058 and the emergency lights 3060. The Status icon 3018, which the user uses to view the status of the vehicle at the moment, is shown in handset screen 3020/3036. The Monitor icon 3006 is the input of the cameras (216 of FIG. 2) in the vehicle which the user can use to monitor real time of what's happening around and inside the vehicle (as shown in screens 4180B and 4190B of FIG. 4100B).

Chart diagram 3070 shows the interaction between the handset 102 and the Dev 106 as discussed in screen 3050. Take for example when Alarm icon 3052 is selected (screen touched) by the user, the handset 102 sends the alarm "toggle command" to the Dev 106 (In this example, the inventor adds the Service Provider 112 to show that as always, the Dev 106 has to have access to the network in order to communicate with the handset 102 and other devices) as shown in step 3072 of graph 3070 via the cellular network when the handset 102 is not in the vicinity within the Dev 106's SRC medium range. On the other hand, when both the Dev 106 and the handset 102 are within their SRC medium range, they preferably select to communicate with each other via the SRC communication network, which can be faster and preferably just as secure since built-in protection, such as: the handset's phone number and/or MSK has been encapsulated into the data streams and, if necessary, the owner's account security password has been also preferably encrypted.

If the Alarm was on before the Dev 106 receives the command from the handset 102 or voice command, it will toggle and send the "Alarm is OFF" 3053 shown in step 3073. Step 3072 corresponds to the icon Alarm selection 3052; step 3073 corresponds to the message "is OFF" 3053. Step 3074 corresponds to the icon Doors selection 3054; step 3075 corresponds to the message "Are locked" 3055. Step 3076 corresponds to the icon Horn selection 3056; step 3077 corresponds to the message "Sounding" 3057. Step 3078 corresponds to the icon Ignition selection 3058; step 3079 corresponds to the message "Engine OFF" 2359. Step 3080 corresponds to the icon Emergency Lights selection 3060; step 3081 corresponds to the message "are OFF" 3061.

Figure 31:
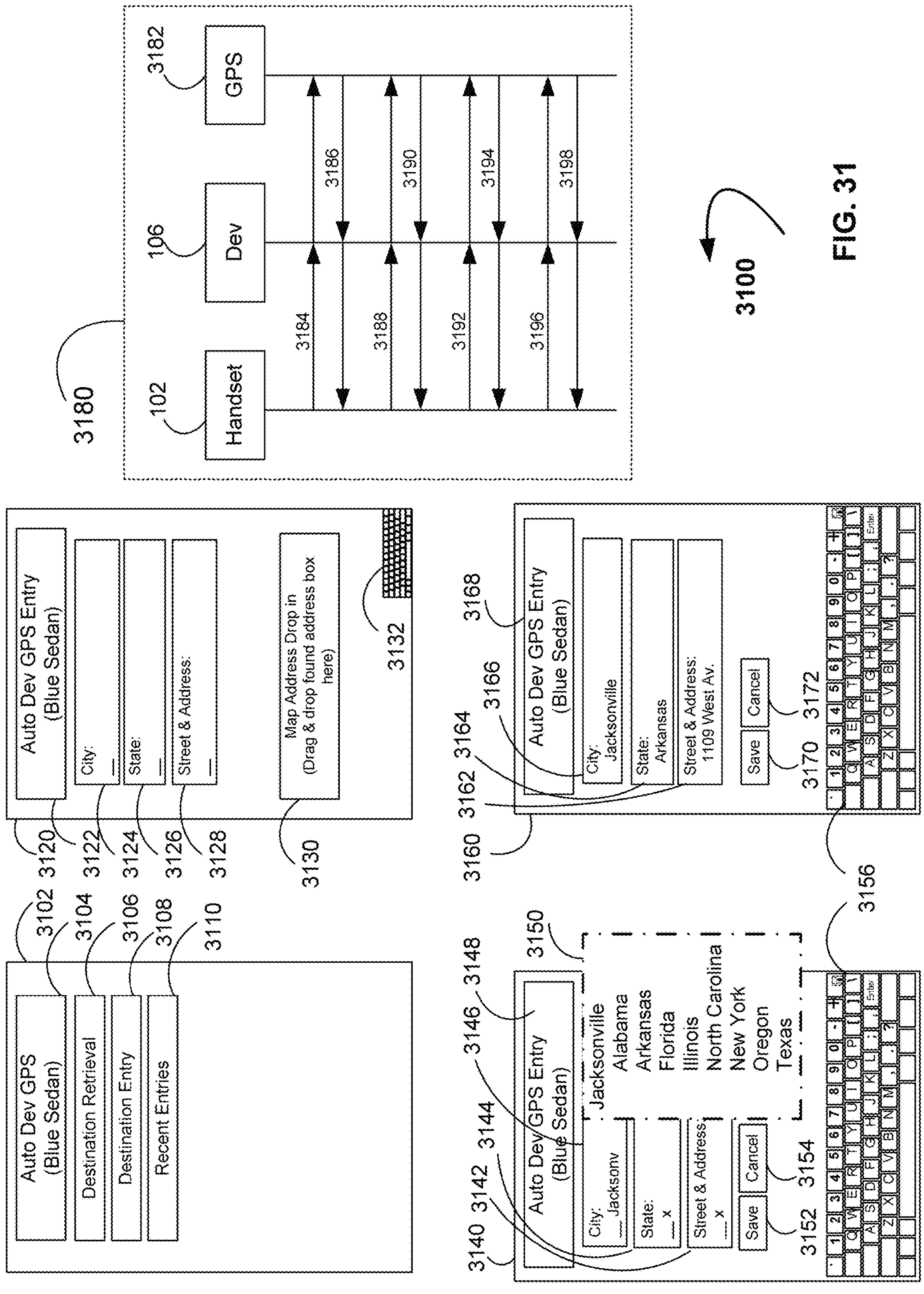
FIG. 31/32 shows preferred examples of handset's screen displays and a flow diagram, presenting the GPS entries of Dev 106, relating to the present invention in the auto application.

FIG. 31 illustrates a preferred application example of embodiment 3100 of the present invention. This exemplary embodiment presents preferred steps taken by a user in his/her handset 102 to retrieve, view, and enter information into the Dev GPS system.

The user executes the GPS icon 3008 (FIG. 30), making his/her handset 102 transmit the command to the Dev 106, which in turns processes said command and passes it to the GPS 3182, receives the response from said GPS 3182, processes said response and passes it back to the handset 102, which displays the Auto GPS menu, as shown on its screen 3102. It shows the Auto GPS menu 3104 comprising the GPS address Destination Entry 3108, the Destination Retrieval 3106, and the Recent Entries icons 3110. The GPS Destination Entry and the Destination Retrieval allow the user to enter and retrieve the GPS location addresses without seating at the driver's seat.

To enter the location addresses to the GPS, the user first selects the Destination Entry icon 3108, making the handset 102 navigate to screen 3120. The user then enters City 3124, State 3126, Street and Address 3128 using keyboard 3132 for data inputs. When the user enters the name of the city 3146, the handset 102 transmits the information preferably in real-time (IM) to the Dev 106 which passes the information to the GPS 3182 which in turn responds with a pop up hint screen 3150 (when the number of characters, making the city name narrows to dozen or less of potential matched names) via the Dev 106 as presented in screen 3140. After all the address information is done, executing the Save icon 3170 will make the handset 102 send the information and the command to the Dev 106 which passes it to the GPS 3182 to save all the information in screen 3160 to the GPS memory.

Graph 3180 shows the interaction between the handset 102, the Dev 106 and the GPS 3182 (Service Provider 112 is omitted here for ease of presentation). In graph 3180, the Dev 106 acts like a conduit, translating and passing the information back and forth between the handset 102 and the GPS 3182. Step 3184 corresponds to passing the city name 3166 from the handset 102 to the Dev 106 and to the GPS 3182. Step 3186 is the corresponding the response from the GPS 3182 to the Dev 106 and then to the handset 102. Step 3188 corresponds to passing the State name 3164 from the handset 102 to the Dev 106 and to the GPS 3182. Step 3190 (if any) is the corresponding response from the GPS. Step 3192 corresponds to passing the Street and Address 3162 from the handset 102 to the Dev 106 and to the GPS 3182. Step 3194 (if any) is the corresponding response from the GPS 3182. Step 3196 corresponds to the command Save icon 3170 from the handset 102 to the Dev 106 and to the GPS 3182. And finally step 3198 (if any) is the corresponding response from the GPS 3182. Alternatively, steps 3184, 3188, 3192 and 3196 can be combined into one single step (or all the GPS information in one packet) to the Dev 106 and gets a single response back 3198 from the Dev 106. The steps and ways presented in the present invention are one or more of many applications which accomplish the same goal and should not be limited as the only way as are known to those of ordinary skill in the art.

Figure 32:
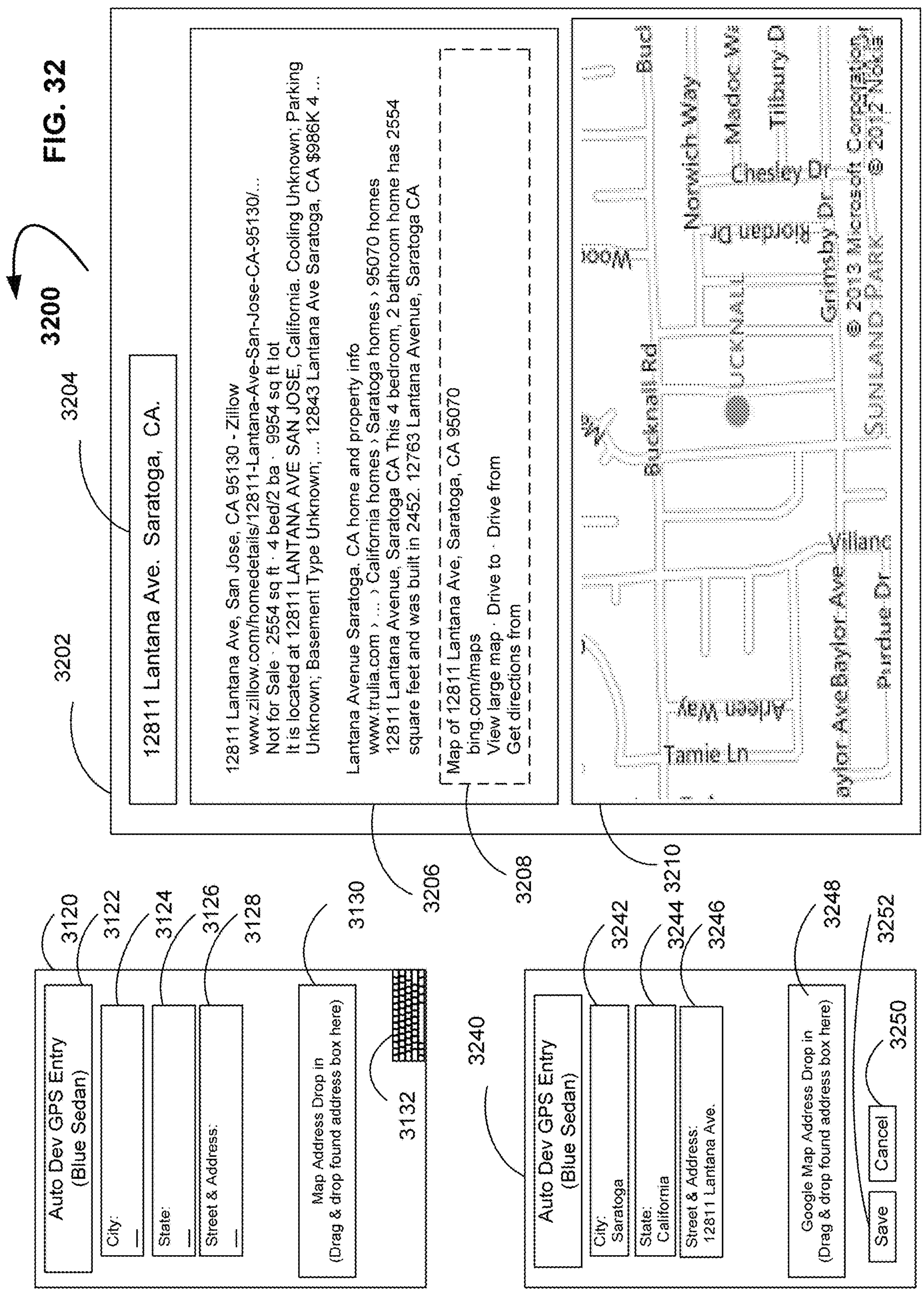

FIG. 32 illustrates a preferred application example of embodiment 3200 of the present invention. This exemplary embodiment presents preferred steps taken by a user in his/her handset 102 to retrieve, view, and enter the graphical information into the Dev GPS system.

The handset's screen display 3120 is repeated here to show an alternative way for the GPS entry using the drag and drop icon 3130. The user can use his/her handset 102 to Google search an address location 3204 and gets the search results 3206 and 3210. He/she then just copies and drags the information in 3208 over, then drops it into the icon 3130 which the handset 102 decodes and translates into Street and Address 3246, City 3242, and State 3244. The user then selects the Save icon 3252 to have the handset 102 transmitted the information to the Dev 106 which passes it over to the GPS 3182 as demonstrated in flow diagram 3180 of FIG. 31.

FIG. 33 illustrates a preferred application example of embodiment 3300 of the present invention. This exemplary embodiment presents preferred steps taken by a user in his/her handset 102 to program, set up pay account and view the activity listing of the Dev Toll Fee Payment system.

The user executes the Toll Fee Pay Account icon 1134 (FIG. 11), making his/her handset 102 transmit the command to the Dev 106 which processes said command and sends the response back to said handset 102, which displays the Toll Fee Pay Account menu as shown on its screen 3302. It shows the Toll Fee Pay Account menu 3304 with the Account Pay Setup 3310 (used to set up a toll fee pay account), Account Pay Cancel 3312 (used to cancel an existing toll fee pay account), Account Activities 3306 (to display various existing toll fee pay accounts and activities), and On Demand Toll Pay Acc Setup 3314 (to pay on demand from any toll fee collector on/from this account). Of course the driver 3752 can always elect to pay in cash. Screen 3320 and 3350 show examples of how the setup is done. Just as mentioned in the preceding and proceeding figures of this invention, examples such as these are not the only one resolution since there exist many ways to accomplish the respective applications, as are known to those of ordinary skill in the art.

Screen 3320 is the result of the user selecting the Account Pay Setup 3310 which the handset 102 navigates to after transmitting the command to the Dev 106 which responds back with the Account Pay Setup 3322. The user fills out with the Payee's web page link address 3324 in the payee's Account Pay Setup 3322 and then selects the Exe icon 3326 which the handset 102 executes and opens the Payee's webpage being displayed on screen 3330. This is where the user completes the required information, such as: his/her Bank Name 3334, Account Number 3336, Account Type 3338, and Account Name & Address 3340. He/she then selects the Exe icon 3348 which makes the handset 102 transmit the information to the payee's computer/server (not shown) to process the account payment information. When the Payee' computer/server (not shown) responds back the completion (screen 3350), it shows the Payee's name 3356 and its name code 3370, the amount it will charge 3358, the payment code 3362, the payer code 3364, and the payer's payment information 3366 and 3368. The user then executes the Ok icon 3372 making the handset transmit the confirmation to payee's computer/server, and the command (including the completion data screen 3350) to the Dev 106 which processes and saves the required payment setup data in its memory. The Dev 106 preferably transmits back the completion and confirmation to the handset (not shown). Other personal information, such as: user's phone number (not shown), and the like might be required, as are known to those of ordinary skill in the art.

Screen 3380 showing the Account Pay Activities allows the use to view past account activities, when the user selects the icon 3306 which the handset 102 navigates to after transmitting the command to the Dev 106 which responds back with the information as shown. It shows Payee's name 3384, individual payments 3386 and 3390 and total monthly payments 3388 and 3392.

Figure 34:
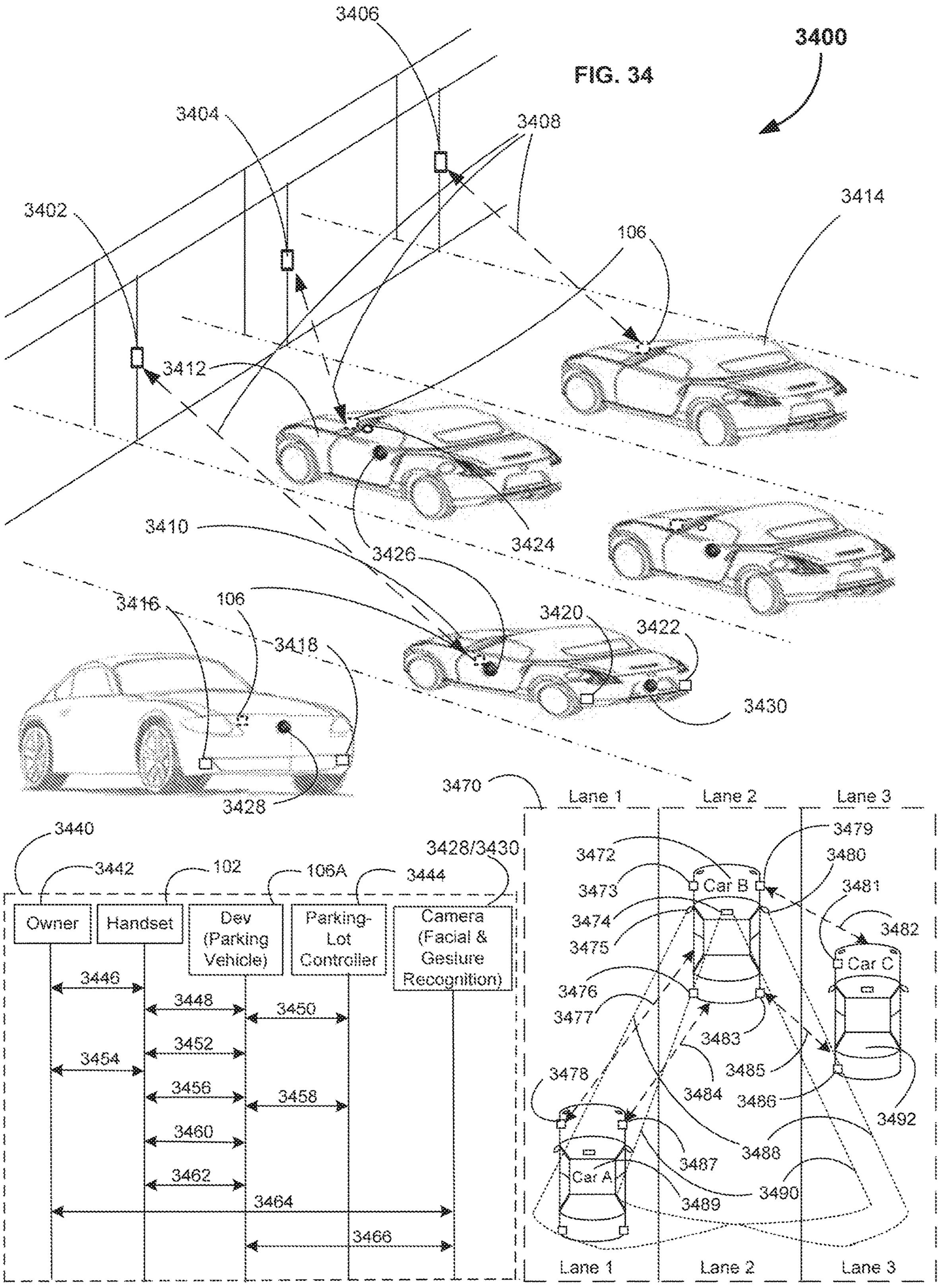
FIG. 34 shows an example of a toll collecting station with vehicles containing Devs/appliances 106. It also shows a preferred flow diagram presenting the interaction of various devices and program flow of Dev 106 during self-park and self-pickup processes. It also shows a preferred example of Dev equipped vehicles on a road, interacting with one another, relating to the present invention in the automobile application.

FIG. 34 illustrates a preferred example of embodiment 3400 of the present invention. It shows a general view of the pay toll stations where cars 3410, 3412 and 3414 with the Devs 106 under their hoods completing the toll fee transaction with toll collectors/transceivers 3402, 3404 and 3406. The medium 3408 is preferably WIFI or SRC 104 (Short Range Communication) devices, such as: NFC 258, Bluetooth 260, wireless/wire USB 262 and other wireless radio frequency (RF) technology. The transaction data is preferably encrypted as agreed between the Dev 106 and the payee's computer/server (not shown) during setup as mentioned in 3320, 3330 and 3350 in FIG. 33.

Figure 35:
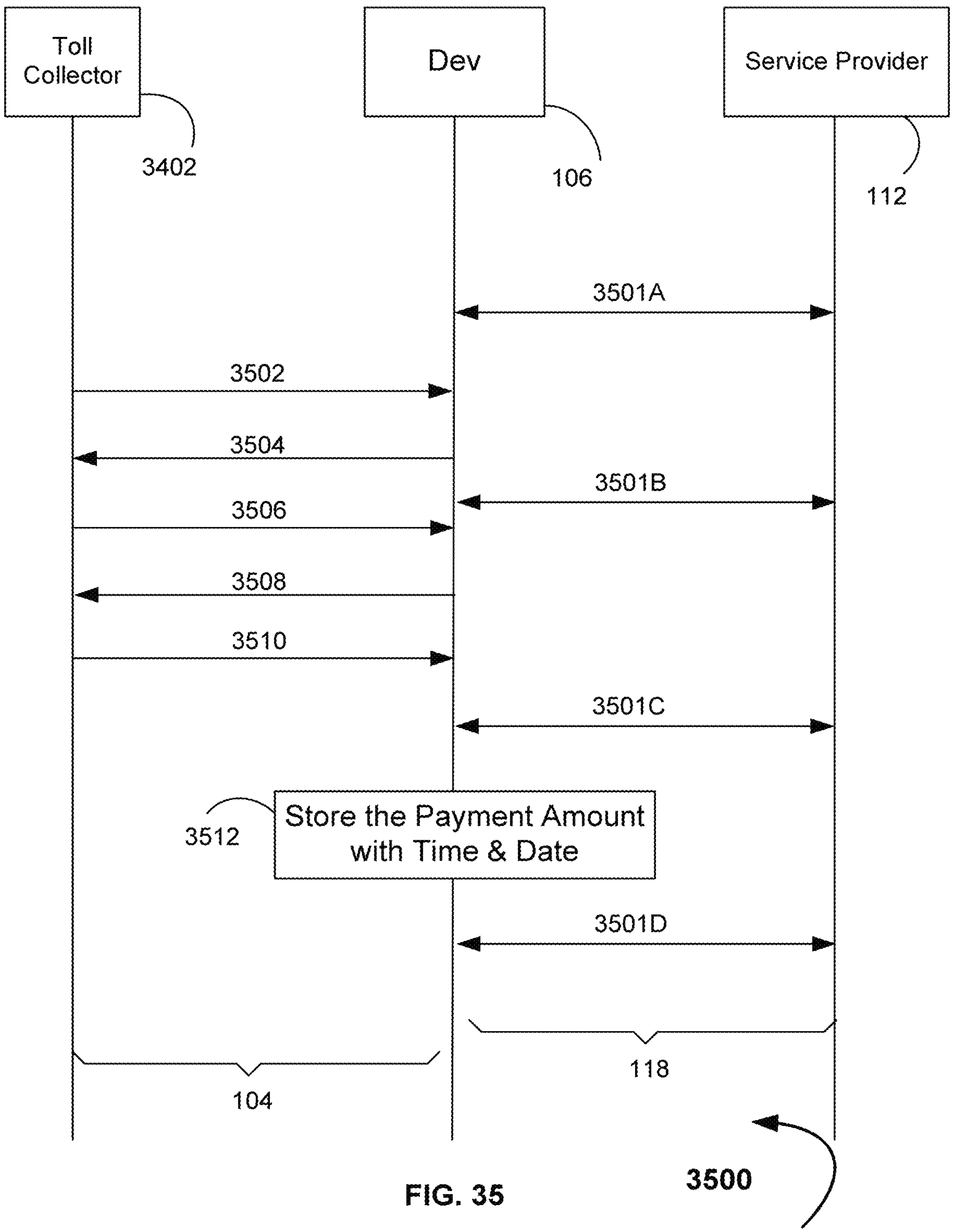
FIG. 35 shows a preferred example of a flow diagram, presenting the interaction of various devices during a toll collection, relating to the present invention in the automobile application.
Figure 36:
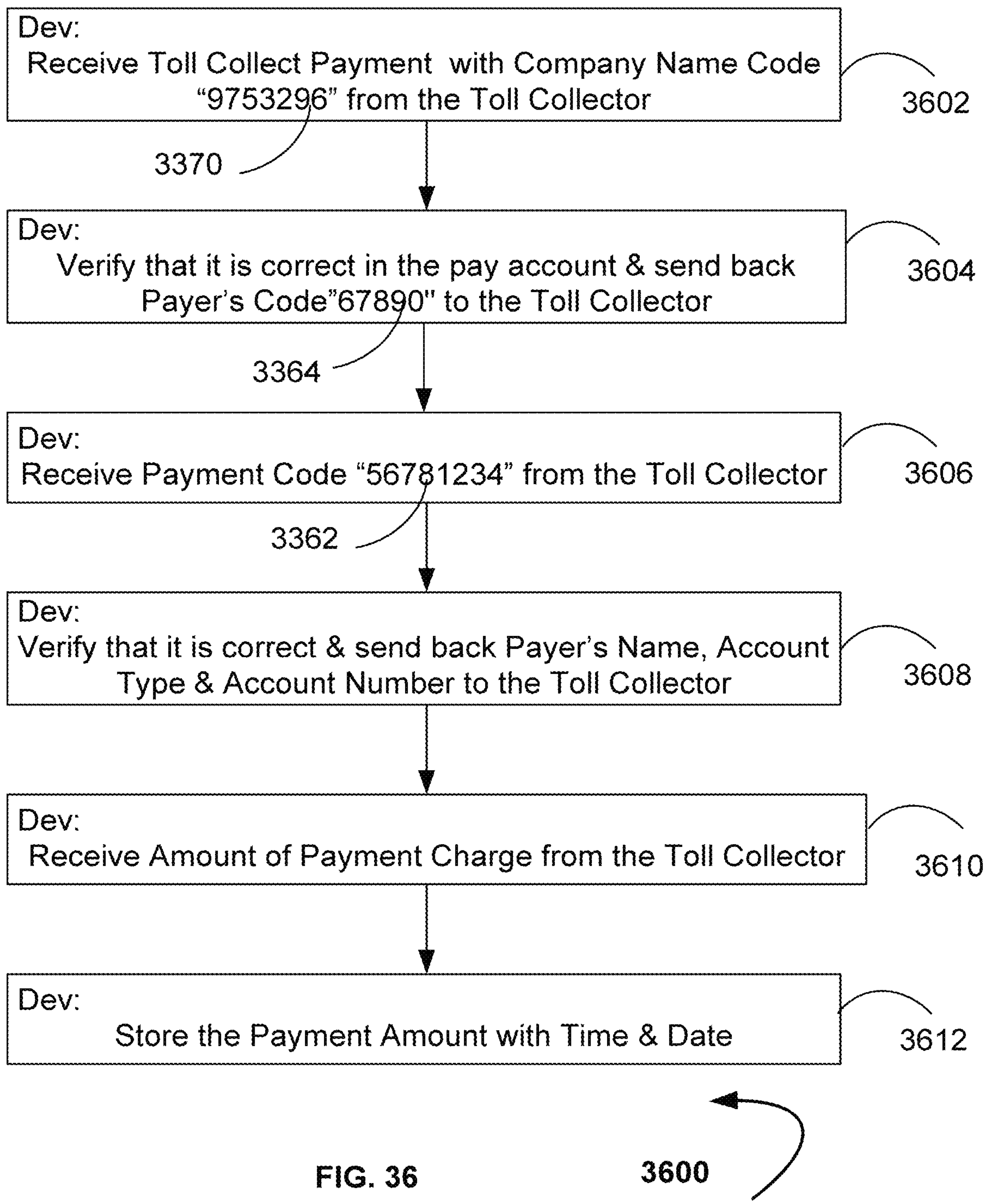
FIG. 36 shows a preferred example of a flow chart presenting the programming flow of Dev 106 during a toll fee collection, relating to the present invention in the automobile application.

FIGS. 35 and 36 illustrate preferred examples of embodiments 3500 and 3600 of the present invention. They show the transactions taking place between the Devs 106 (residing in cars 3410, 3412 and 3414) and the Toll Collector 3402, 3404 and 3406 as illustrated in FIG. 34.

As the car 3410 approaches within communicating distance of the Toll Collector 3402, the Dev 106 (in car 3410) receives data signal "Toll Collector Payment" as shown in step 3502/3602 from the Toll Collector 3402. As the Dev 106 receives the Company Name Code "9753296" 3370 of FIG. 33 and again shown in step 3602 of FIG. 36 from the Toll Collector 3402, it verifies that code "9753296" matches with one in its pay account 3370 in screen 3350 of FIG. 33. It then sends back the acknowledgement with the Payer Code "67890" (the payer transaction identifier) in 3364 (FIG. 33) and in step 3504/3604 to the Toll Collector 3402. It then receives the Payment Code (the transaction identifier) "56781234" in 3362 (FIG. 33) and again shown in step 3506/3606. The next two steps complete the transaction with the Dev 106 sending the owner's name and its pay account information in steps 3508/3608 to the Toll Collector 3402 and the Dev 106 receiving the charging payment amount in steps 3510/3610 from the Toll Collector 3402. In steps 3512/3612, the Dev 106 stores the payment with the time stamp in its memory storage after the transaction is completed. Steps 3501A, 3501B, 3501C and 3501D just show normal activities going on between the Dev 106 and the Service Provider 112 (so it can be connected to other registered handsets) while the toll collecting is taking place which use a different transmission medium.

FIG. 37 illustrates a preferred example of embodiment 3700 of the present invention. This exemplary embodiment presents preferred steps taken by a user in his/her handset 102 to program and set up the pay account for on-demand payment of the Dev Toll Payment system.

The user executes the On Demand Toll Pay Acc. Setup icon 3314 in FIG. 33, making his/her handset 102 transmit the command to the Dev 106, which processes said command and sends the response back to said handset 102, which displays the On Demand Toll Pay Account Setup as shown on its screen 3702.

It shows an alternative way of how to set up another type of toll payment. It also shows how the Dev 106 conducts and allows the transaction to take place when the toll payment is demanded by any toll payment collector with the voice acknowledgement or no voice acknowledgement from the driver 3752. The user fills out in screens 3702 the information, such as: user's Bank Name 3708, Account Number 3710, Account Type 3712, Account Name & Address 3714, acknowledgement "yes" or "no" for the non-voice acknowledgement selection 3716 of the audio input (voice confirmation) from the driver 3752 and the result is as shown in 3720. The user then selects the Exe icon 3738, making the handset 102 transmit the command and all the information to the Dev 106 which responds back with its processed information as shown on the handset screen 3740 "Voice Activate Toll Pay Executing! Please wait!" 3742. When the Dev 106 is done, it transmits the setup information to the handset's screen as shown in 3744, the user then executes Done icon 3746 to complete the account set up.

Flow diagram 3750 shows the transaction taking place between the Dev 106, the Toll Collector 3402 and the Driver 3752, while the chart 3770 shows the Dev 106's programming flow. It starts out in step 3753, showing the Dev 106 verifying that some amount of driving time has already taken place before the toll collection can take place just to prevent fraud (where toll collection cannot possibly happen when the car has been stationary for quite some time). In step 3754 (also shown in step 3774), the Dev 106 receives the "toll payment demand" from a toll collector 3402. The Dev 106 then outputs an audio (via speaker) 3756 (also shown in step 3776) letting the driver know the toll fee and gets the "Yes" acknowledgement 3758 (3778) from the Driver 3752. The Dev 106 then sends the account name, account number and address to Toll Collector 3402 (steps 3760 and 3780) and receives payment acknowledgement (steps 3762 and 3782) from the Toll Collector. The Dev 106 then announces the transaction completion (steps 3764 and 3784) to the driver, and finally stores the transaction record in its memory in (steps 3766 and 3786).

Figure 38:
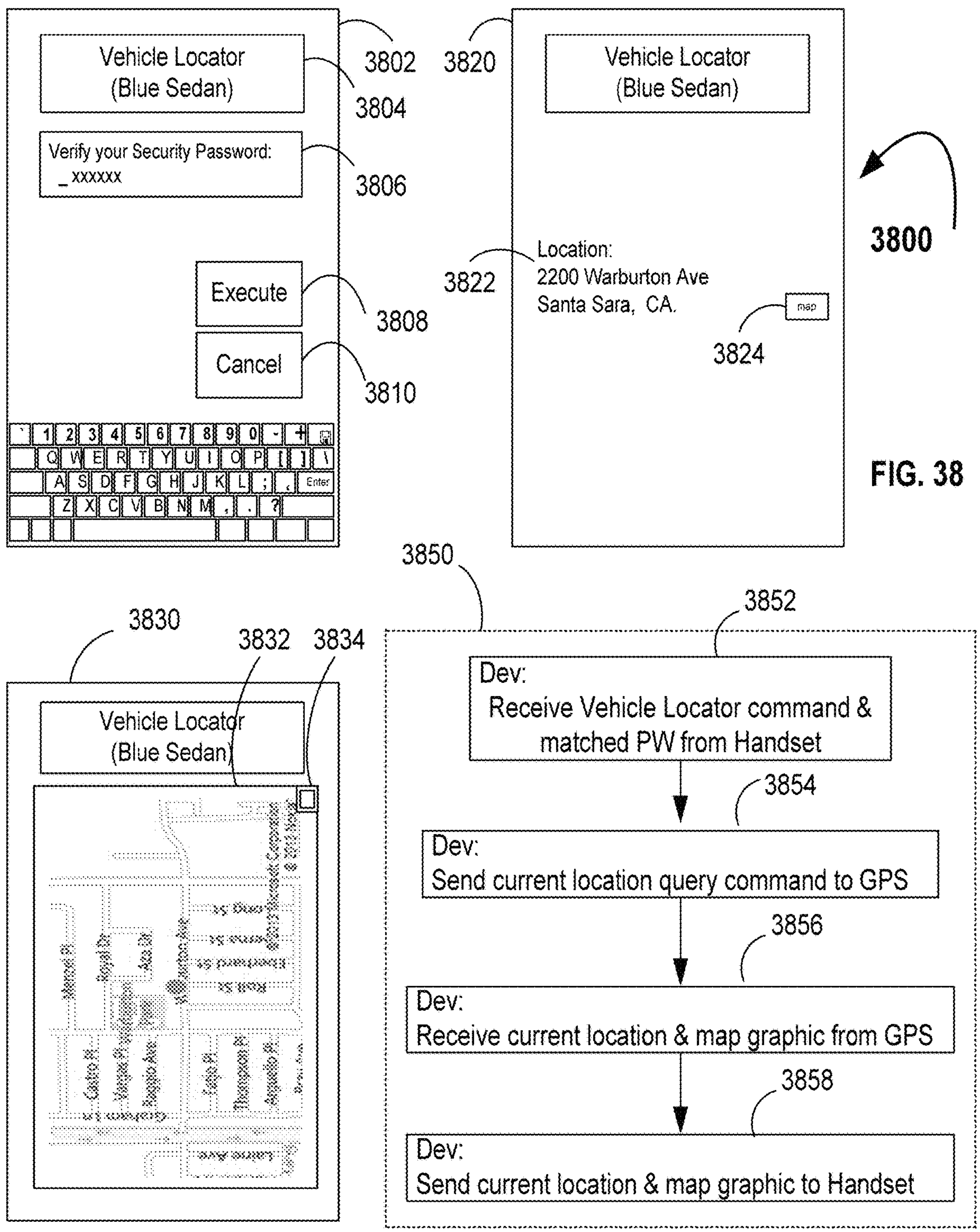
FIG. 38 shows a preferred example of handset's screen displays and a flow chart, presenting vehicle locator of Dev 106 relating to the present invention in the automobile application.

FIG. 38 illustrates a preferred example of embodiment 3800 of the present invention. This exemplary embodiment presents preferred steps taken by a user in his/her handset 102 to locate his/her vehicle (controlled by the Dev 106) remotely via his/her handset.

The user executes the Locator icon 3016 in FIG. 30, making his/her handset 102 transmit the command to the Dev 106, which processes said command and sends the response back to said handset 102, which displays the Vehicle Locator command as shown on its screen 3802. It shows the Vehicle Locator command 3804 which lets the user find the vehicle's (Dev 106) current GPS location. The user fills in the required account security password 3806, and the handset 102 transmits it to the Dev 106 after the Execute icon 3808 is selected. The Dev 106 receives the password 3806 and the command (also shown in step 3852 of chart 3850). The Dev 106 then verifies if the security password matches with the one stored in its memory, and if it does, the Dev 106 translates the command to the GPS's command format, and then sends it to the GPS 3182 (step 3854). The GPS 3182 transmits the response back to the Dev (step 3856) which translates said response and sends it to the handset 102 (step 3858) which displays the information as shown on screen 3820. Screen 3820 shows where the car is located at that moment 3822 and the graphic icon 3824, when expanded will show the detailed map 3832 as shown on screen 3830.

Figure 39:
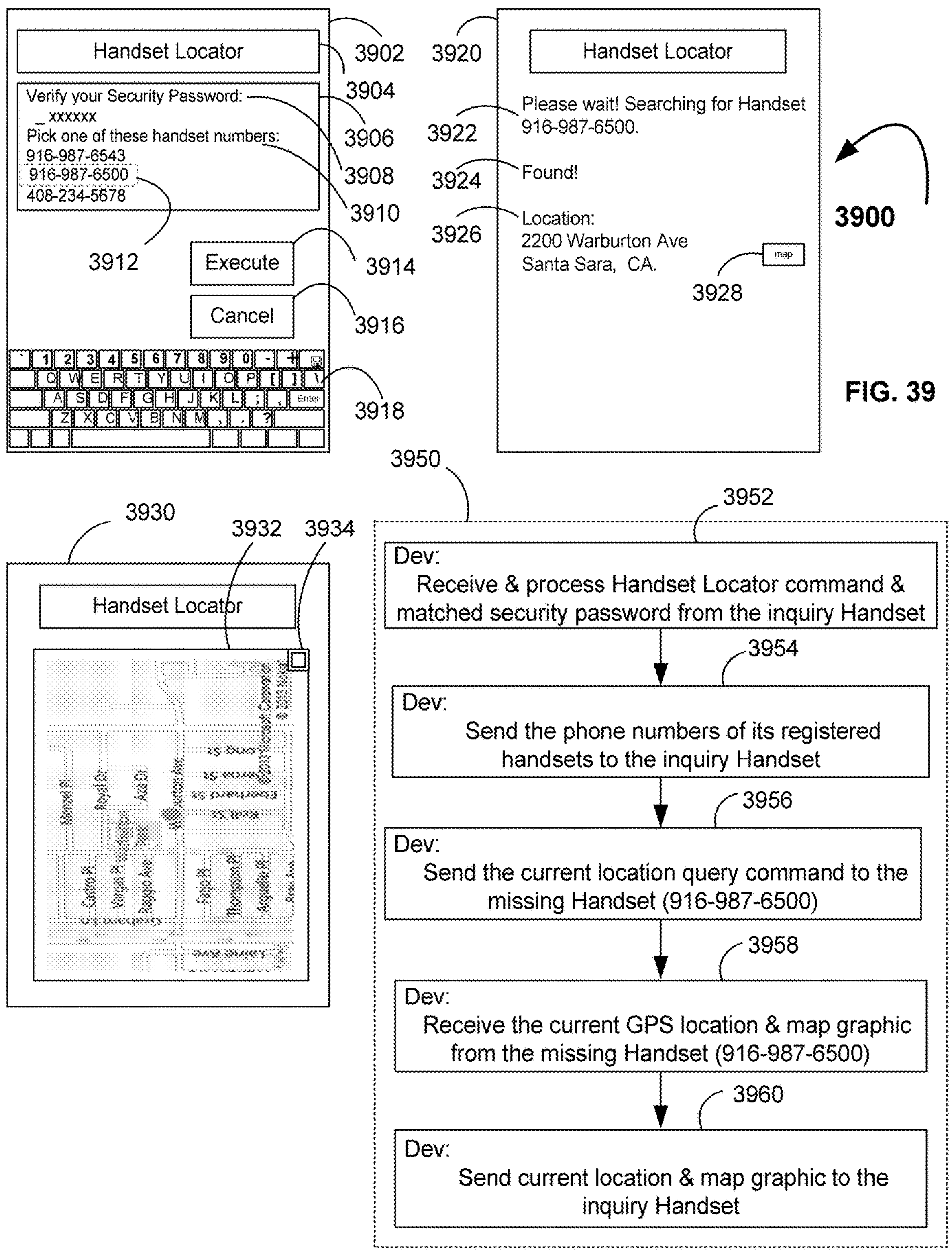
FIG. 39 shows a preferred example of handset's screen displays and flow chart, presenting an inquiry handset's (102) screen interactions with Dev 106, in locating a missing handset 102, relating to the present invention.

FIG. 39 illustrates a preferred example of embodiment 3900 of the present invention. This exemplary embodiment presents preferred steps taken by a user in his/her handset 102 to locate a missing registered handset 102 via his/her registered handset.

The user executes the Handset Locator icon 1170/1370 (FIG. 11/13), making his/her handset 102 transmit the command to the Dev 106, which processes said command and sends the response back to said handset 102, which displays the Handset Locator command as shown on its screen 3902. After the user enters the right security password 3908 and selects the Execute icon 3914 making the inquiry handset 102 send the command and the password to the Dev 106. The Dev 106 receives and processes (as shown in step 3952 of flow chart 3950) and sends back the currently registered handsets 3910 (step 3954), In this example, the user decides to search for the missing handset 102 (phone number 916-987-6500) by highlighting it 3912 in area 3906, then selecting Exe icon 3914 again, making the inquiry handset 102 (for example, whose phone number is either 916-987-6543 or 408-234-5678) transmit the handset locator command and the required data to Dev 106. The Dev 106 processes the data, then transmits the handset locator command to the missing handset 102 (phone number 916-987-6500) in step 3956, and also transmits back its searching its status 3922 to the inquiry handset 102, as shown onscreen 3920. When the Dev 106 receives the GPS position of the missing handset 102 from said handset (3958), it sends the information 3960 back to the inquiry handset 102, which displays its location 3926 accompanied by the icon 3928. The inquiry handset 102 displays the graphic location of the missing handset 102 (3932 of screen 3930) after the icon 3928 is executed (expanded).

This embodiment restricts the Dev in searching and locating only its registered handsets 102, for practical and security reason. Application and operation software residing and operating in handsets (as well as in the Dev 106) preferably can also be designed and modified in the App Server (for downloading and updating into handsets 102 and Devs 106), which can render this embodiment application more general and universal; and it will allow the users of smart handsets 102 to locate their missing smart handsets 102 via another smart handset 102 as long as the missing handsets still utilize their old phone numbers.

Furthermore, there exists a unique identifier associated with each smart handset (such as—handset/device ID parameters 542/642), which is transmitted and stored in the cellular phone service provider database when said handset got activated and registered in said cellular service provider. Therefore, there exists a method when a missing handset can be traced by a search engine (i.e., software residing in the cellular service provider's computers/servers) with the aid of said missing handset's unique identifier provided by a handset 102 or a PC (computer) to the cellular service provider's computers/servers. And from said identifier, the missing handset's current (new or different phone number) can be translated (looked up) by said computers/servers, and thus said missing handset can be located.

Figure 40:
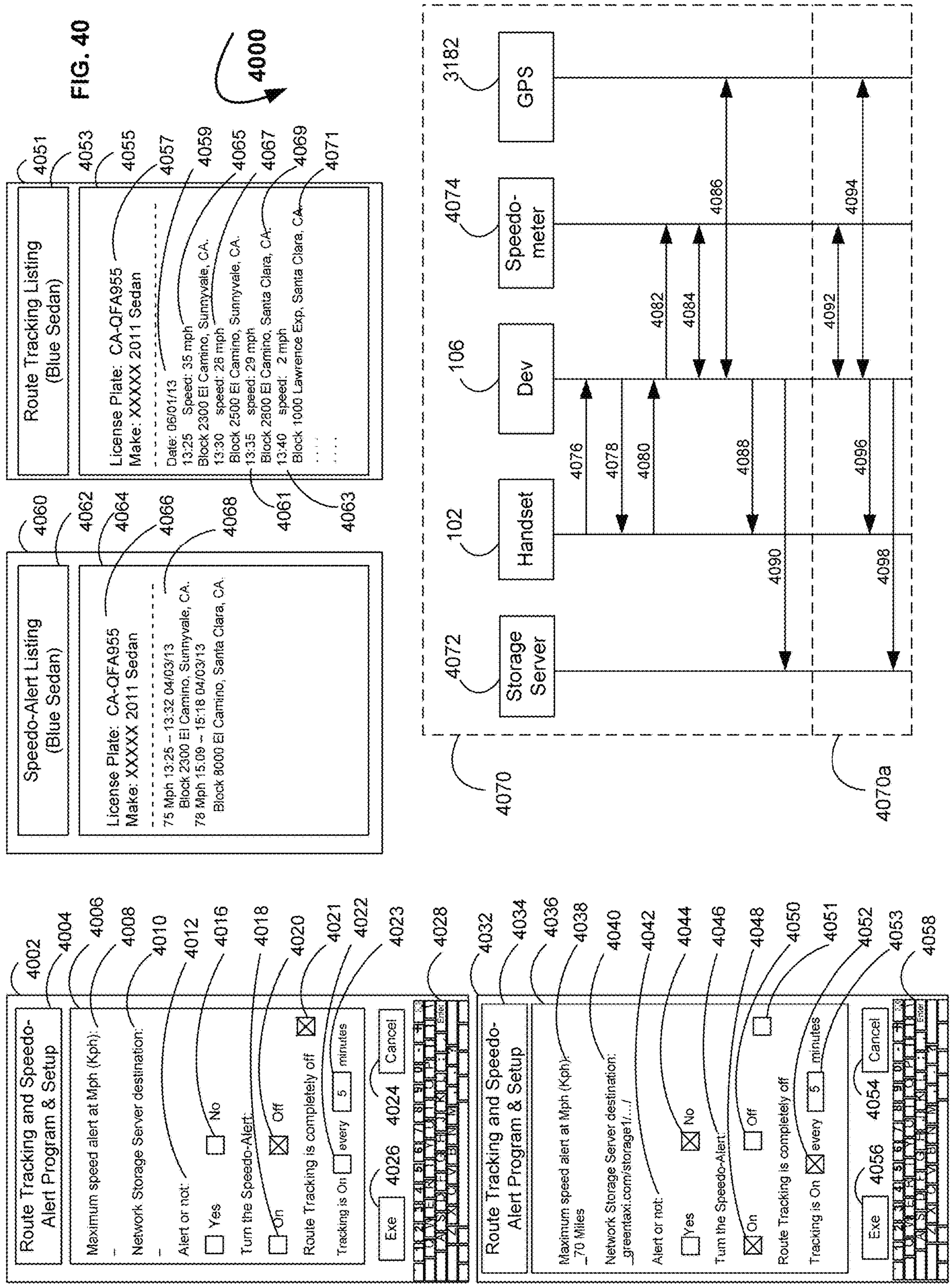
FIG. 40 shows a preferred example of handset's screen displays and flow diagram, presenting the Route Tracking and Speedo-Alert Program and Setup, the interaction of various devices. The displays also show the Route Tracking and Speedo-Alert listings of the Dev 106, relating to the present invention in the automobile application.

FIG. 40 illustrates a preferred example of embodiment 4000 of the present invention. This exemplary embodiment preferably allows a user to program and set up the vehicle route tracking, and maximum speed limit at when and where, so the Dev 106 will record the data. The user then, can review the data and if the alert option is selected, he/she will be informed though his/her handset, when the maximum speed occurs. The data can also be stored into the company storage system or user's private cloud 4904 of FIG. 49/51/53/54 for long term storage keeping.

The user executes the Route Tracking & Speedo-Alert icon 3010 (FIG. 30), making the handset 102 transmit the command (step 4076 in Chart 4070) to the Dev 106, which processes said command and sends the response back to said handset 102 (step 4078), which displays the Route Tracking and Speedo-Alert Program & Setup as shown on its screen 4002. It shows the Speedo-Alert and route tracking as being off (disabled) 4020 and 4021. In area 4006, entries such as: Mph (Mile per hour) or Kph (Kilometer per hour) 4408, network storage server destination-storage system where the Dev 106 stores the speed data (4010), over-speed-limit alert or no alert selection to the user's handset (4012), Speedo-Alert being on 4018 or off 4020, and the route tracking being off 4021 or on 4022. When the tracking is turned on 4022, the user can enter how many in minutes (4023) the tracking is sampled by the Dev, which obtains the time and date from the RTC 240 (FIG. 2), the speed from the Speedo-meter 4074 and the location from the GPS 3182. The user then enters data which are illustrated in screen 4032 where, for example, the user sets: the maximum speed limit at 70 Mph (4038), storage server destination 4040, no immediate alert 4044 to user's handset 102, Speedo-Alert being On 4048, and the route tracking On 4052 with the sample every 5 minutes 4053; then completes the programming by executing the Exe icon 4056, making the handset 102 send the command and information to the Dev 106 (step 4080 in Chart 4070).

The Dev then communicates the maximum speed (step 4082) to the Speedo-meter 4074. From now on (until the Speedo-Alert being turned off 4020 and 4050), whenever the vehicle is in motion, the Dev 106 gets interrupted by the Speedometer 4074 as soon as the speed goes over the speed threshold or under the speed threshold in step 4084. The Dev 106 keeps track of the time and day of the interruptions (via RTC 240 of FIG. 2), and obtains the GPS locations by communicating and acquiring them (step 4086) from the GPS 3182. The handset user, therefore, can retrieve and view the record of over-speed-limit, its duration, and the locations. This preferred embodiment is very useful, when the principal user of the vehicle Dev 106 wants to find out the driving habit of other drivers who may be driving too fast. It can also apply to the car rental, taxi, trucking companies and the like which can keep track of the driving route of their vehicles, by having the Dev's tracking turned on (4052). This allows the Dev to take one tracking sample every 5 minutes (as is in this case) by obtaining the speed from the Speedo-meter 4074 (step 4092 of Chart 7070*a*) and the location from the GPS 3182 (step 4094). The tracking record be can viewed later by the user (step 4096) or downloaded at the end of the day into the Storage Server 4072 (step 4098) for company's bookkeeping, as are known to those of ordinary skill in the art.

Handset 102 (whose user programmed the Dev 106) is able to view the over maximum speed history (as shown in screen 4060) by executing the Speed-alert Listing icon 3012 (in screen 3002 of FIG. 30). This feature allows the Dev 106 to build up a history of where, when, and how long each duration, the vehicle exceeded its programmed speed limit. It displays the vehicle license plate 4066, speed limits, time, date, and its duration 4068.

Route Tracking Listing 4051 allows the user or the company to view (by executing Route Tracking Listing icon 3013 in screen 3002 of FIG. 30,) the daily routing of the vehicle when its tracking is enabled 4022/4052. It shows the driving record of the vehicle, such as: license ID 4057, the date 4059, time 4061, location 4069, and speed 4065, which can be useful when the user/owner wants to know how his/her vehicle is being used (or just the driving record of his/her vehicle).

The Dev can also alert its owner of potential carbon dioxide poisoning when the vehicle is accidentally left idle with its engine on in a closed environment (i.e., garage) for long period of time. The Dev detects if the car engine is on by reading the vehicle On/Off engine input, if said vehicle is idle by reading the speedometer value when the timer does not expire in 10 minutes or more. The Dev then transmits message to user's handset informing said user that the engine will be turned off if no response coming back from said user. Furthermore, the Dev only transmits if it detects that there is no driver or movement in the driver seat or it then transmits a beeping sound in order to get the response from the driver that if there are no existing issues, as in the case where there is heavy traffic jam or the driver comes to a resting stop without turning off the engine.

Furthermore, the Dev also lets the user self-park his/her car while visiting a business premise such as restaurant or the like if the vehicle is equipped with self-park technology. This feature allows the user to make the stop at the nearest entrance instead of having to find a parking lot, The user then exits the vehicle and commands the Dev to self-park (by executing icon 1138 of screen 1120 in FIG. 11) said vehicle making the Dev transmit the command to the vehicle's Self-Parking layer (block 549) which directs said vehicle to the available parking space. When the user is ready to leave, he/she picks his/her vehicle by executing icon 1140 making the handset transmit the command to the Dev which in turn communicates said command to the vehicle's Self-Parking Controller layer which turns on its engine and self-drives said vehicle to pick up the user. During this time, the Dev communicates the user's real-time position/location and his/her walking direction to the Self-Park layer which in turn directs said vehicle to the nearest possible user's location.

Illustration 3440 of FIG. 34 presents the Owner/Driver 3442 using (step 3446) Handset 102 to communicate with the (Parking Vehicle) Dev 106A (by executing the Self-Parking icon 1138 of the Auto App Menu Screen 1120 of FIG. 11) in order to self-park his/her car. As soon as the Dev 106A receives the self-parking request command step 3448 from the Handset 102, it turns on its engine (if the engine is off), executes its Self-Parking layer (block 549 of FIG. 5) making the Dev 106A transmit (step 3450) said command to the Parking-Lot Controller (block 3444). The Parking-Lot Controller 3444 communicates step 3450 its available parking spot GPS location to the Dev 106A which proceeds to park its vehicle (via its GPS guidance). The Dev then communicates back (step 3452) to the Handset 102 letting (step 3454) the Owner 3442 know that his/her vehicle is finally parked. As the Owner 3442 is ready to leave, he/she, using (step 3454) his/her Handset 102 (by executing Self-Pickup icon 1140 in the Auto App Menu Screen 1120 of FIG. 11) to communicate (step 3456) the self-pickup request command to the Dev 106A in order to retrieve his/her car. As soon as the Dev 106A receives the self-pickup request command, it executes its Self-Pickup layer (block 549 of FIG. 5) which starts its engine and informs (step 3458) the Parking-Lot Controller 3444 that its vehicle is vacating its parking space. It then communicates (self-pickup response step 3460) with the Handset 102 letting the Owner 3442 know that it is going to pick him/her up. As the Owner exits the establishment, walking out to the place where he/she expects to pick up his/her vehicle, the Dev 106A keeps on communicating (step 3462) with the Handset 102 in order to keep track of where the Owner 3442 is in real-time and the Owner 3442, in turn via his/her handset's GPS map (transmitted by the Dev 106A), can see where his/her vehicle is at any moment in real-time. The user's handset's screen real-time GPS map shows him/her the way where the nearest convenient location is, the times it takes for each (the Handset/Owner 102/3442 and the Parking Vehicle 106A) to reach said destination, so he/she can be by the (Parking Vehicle) Dev 106A in a shortest time possible (screen images not shown). As soon as the Dev 106A gets to its desirable parking location and comes to a full stop, it transmits the alert in audio to the Handset 102 informing the Owner 3442 of its pickup location. Illustration 3440 also present cases where the user is able to command by gesturing (step 3464) to his/her Parking Vehicle Dev 106A (via its vehicle front/rear Camera 3428/3430 equipped with Facial & Gesture Recognition hardware (block 275 of FIG. 2) when his/her facial features and hand gestures are within video input range of said device) in order for it (Dev 106A) to move its vehicle closer to his/her pickup location (in case when a nearest pickup space opens up or is available). The Dev 106A receives (step 3466) the gesture data from its video device (Camera 3428/3430), it then processes said data (executed by its Gesture Recognition layer 551 of FIG. 5) and finally moves the vehicle nearer to its Owner 3442 as commanded.

Illustration 3470 of FIG. 34 presents that Cars A, B and C are traveling in Lanes 1, 2 and 3 and their positions are relative to one another respectively. When Driver B (of Car B 3472) attempts to change from its position in Lane 2 to Lane 3 and if he/she only relies on his/her right Side-mirror 3480 and Rear-view mirror 3474 to check if there is any following vehicle behind coming up on Lane 3, he/she will run into Car C 3492 since Car C is in Car B's blind spot (outside both Car B's Side-mirror view envelope 3488 and Rear-mirror view envelope 3490). He/she needs to turn his/her head over his/her right shoulder in order for him/her to see the presence of Car C. Dev 106B (of Car B 3472) will preferably alert the presence of said vehicle (in this instance the presence of Car C 3492 via its front and rear sensors 3479 and 3483 and/or the presence of Car A 3489 via its rear sensors 3476 and 3483 when either of them is preferably within 100 feet or 30 meters or less in its vehicle's vicinity) by an audio sound and communicates and displays their respective positions on its vehicle (Car B 3472) Dashboard Display (1802C of FIG. 18C). In case when Drive B still attempts to change to Lane 3, Dev B (of Car B 3472) will sounds off an alert and prevents said action by communicating its prevention command to the vehicle's steering wheel controller/mechanism (not shown). Likewise, Dev A (of Car A 3489) also alerts its driver the presence of Cars B and C (via its front sensors 3478 and 3487) by displaying their respective position on its own vehicle Dashboard (Car A 3489) Display (1802C of FIG. 18C). Dev C (of Car C 3492) also alerts its driver the presence of Cars A and B (via its front and rear sensors 3481 and 3486) by displaying their respective positions on its own vehicle Dashboard (Car C 3492) Display (1802C of FIG. 18C). Furthermore, communication between one another among Devs A, B and C via SRC media, allows their respective controlled vehicles to display, on their dashboard GPS screens (1802C of FIG. 18C), their respective positions along each car make and model numbers (refer to 1933 and 1934 in FIG. 19). The Dev 106 preferably also displays (on its dashboard screen) when another vehicle appears at visible distance in front (detecting via its front sensors 3416 and 3418) and issues a too close of a distance warning beep to its driver in order to keep his/her vehicle at a safe following distance (i.e., the three second rule—at least 3 seconds behind another vehicle to maintain a safe trailing distance at any speed). It also preferably prevents speed acceleration when its vehicle comes into within said distance by transmitting "no acceleration" or "slow down" commands to the vehicle's accelerator (not shown). Furthermore, the Dev 106 preferably can stop the vehicle in order to prevent acts of terror by its driver such as using the vehicle in mowing down a crowd of people. The Dev 106 accomplishes by using its Artificial Intelligence (AI) block 555/655 of FIG. 5/6 along with its sensors (i.e., interior cameras, biometric sensors in observing, detecting and discovering the driver's unusual behavior before him/her being able to endanger the safety of his/hers, passenger[s] and any nearby person[s]. The application also applies to the driver who might suffer a heart-attack, intoxicated or under the influence [alcohol, drugs] while driving or about to commit said major crime) on his/her facial expression, increase/decrease in heartbeats, heavy sweating, excessive trembling. It then transmits the "stop" command to the vehicle's Speed Controller (not shown) when the Dev 106 senses a sudden acceleration (via Speed Pedal input 215 of FIG. 2) and/or at least one of its sensors (i.e., 3416, 3418, 3420, 3422, 3428, 3430, 3473, 3476, 3479 or 3483) detects the presence of movable or stationary objects (i.e., pedestrians) in front or a sharp and sudden (vehicle) swerve which can cause an impact such as a collision, jumping off the curb, running over large objects.

Figure 41A:
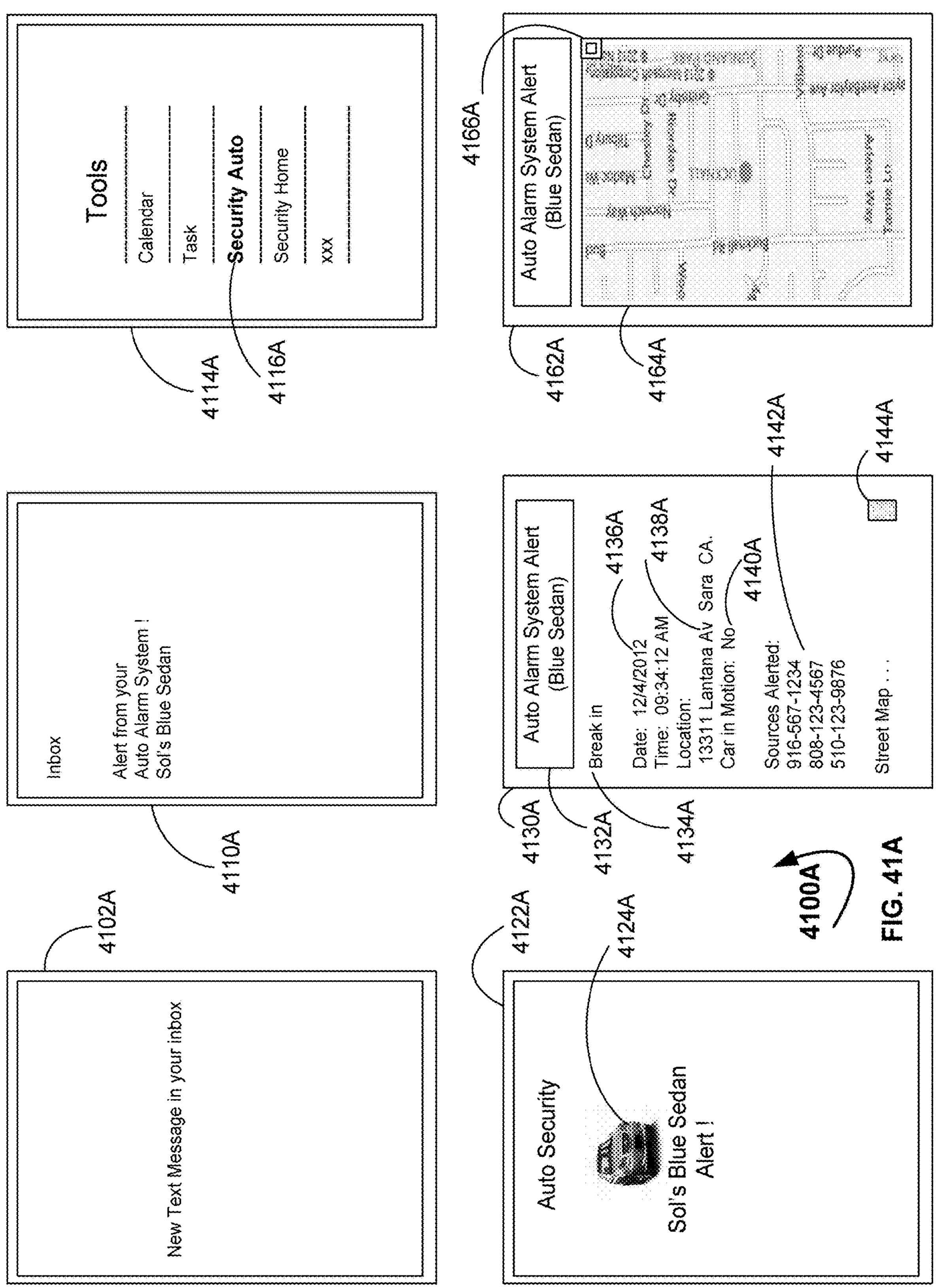
FIG. 41A shows a preferred example of handset's screen displays, presenting an alert from Dev 106 to handset 102, when an unauthorized event occurs, relating to the present invention in the automobile application.

FIG. 41A illustrates a preferred example of embodiment 4100A of the present invention. This exemplary embodiment presents preferred screen displays of the user receiving an alert in his/her handset, when an unexpected or unauthorized event happens to his/her vehicle.

The Dev 106 sends to the handset 102, a message in the handset's inbox 4102A which notifies the user that an unauthorized event happened to his/her vehicle, such as: a break-in, collision, or its removal from its parked location. The user navigates the handset 102 to the Tools screen 4114A, and selects Security Auto 4116A to find out the auto alert 4122A from the Dev 106. When the auto alert icon 4124A is executed by the user, the handset 102 navigates to screen 4130A, which contains the event information, the Dev 106 just transmitted along and among others with the alert message 4110A. Screen 4130A information includes the cause—the Break in 4134A, date and time 4136A, the location 4138A, if the car is being moved or not 4140A. It also lists the phone numbers of the registered handsets having been alerted 4142A. The icon 4144A lets the user see the graphical map where the event took place 4164A as shown in screen 4162A.

Figure 41B:
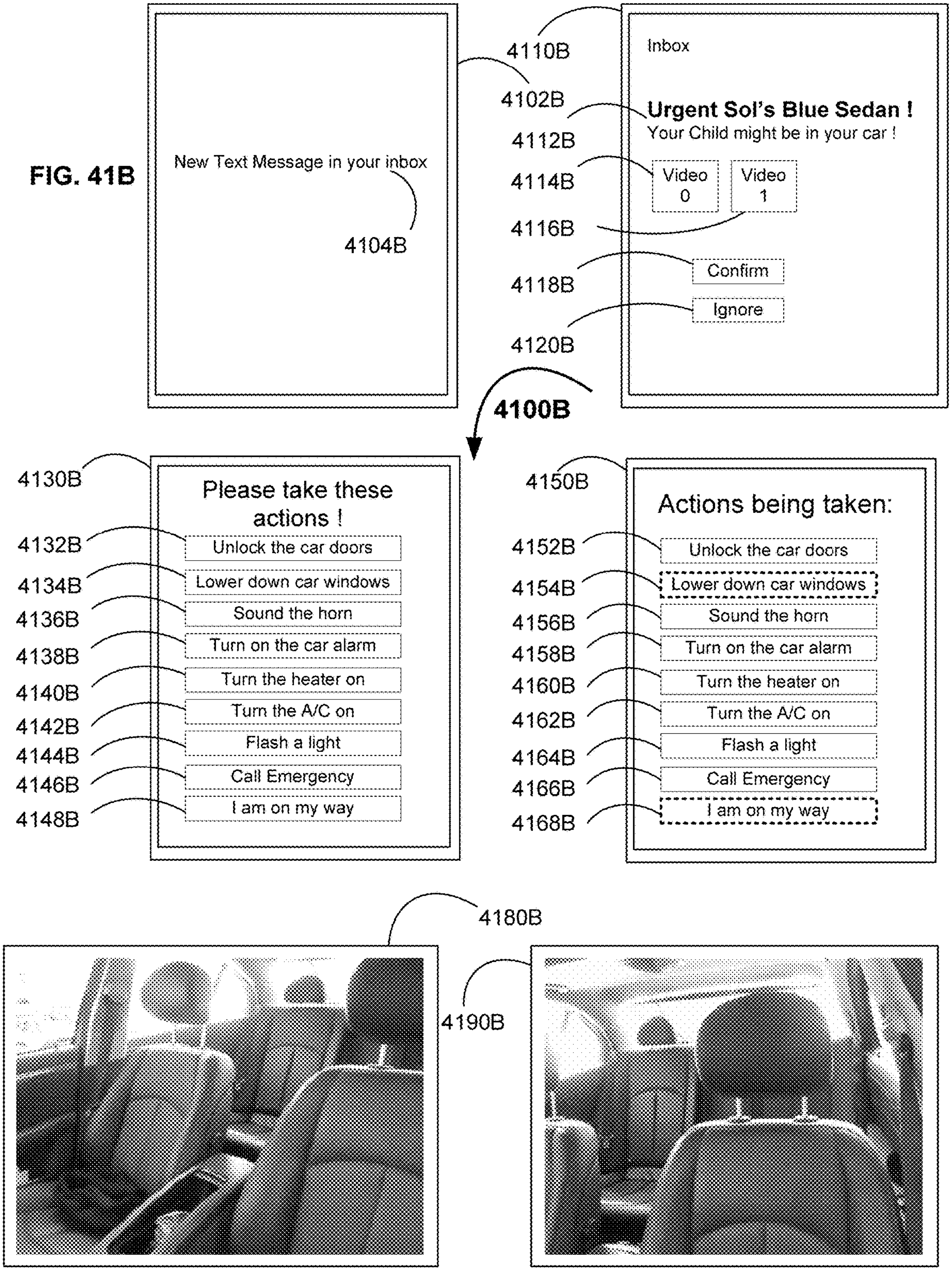
FIG. 41B shows a preferred example of handset's screen displays, presenting an alert from Dev 106 to handset 102, when an unusual event occurs, relating to the present invention in the automobile application.

FIG. 41B illustrates a preferred example of embodiment 4100B of the present invention. This exemplary embodiment presents preferred screen displays of the user receiving an alert in his/her handset when a potentially life threatening or event may occur in his/her vehicle.

The Dev 106 sends to the handset 102, a message in the handset's inbox 4104B, which notifies the user that an abnormal and potentially dangerous situation, such as a child or pet accidentally left in his/her parking vehicle for a certain period of time. The user then can, when he/she views the message 4112B along with the Video icons 4114B and 4116B, make the appropriate decision. Video icons 4114B and 4116B let the user see the inside view of his/her vehicle 4180B and 4190B through the car interior camera, so he/she knows for sure if the situation is real or not. If there is neither a child nor a pet left in the vehicle, the user then executes the Ignore icon 4120B, which will be transmitted by the handset 102 to the Dev 106; therefore the Dev 106 stops alerting or stops sending messages (or may alert several more times every 5 minutes before completely stopping). If there is a child or a pet accidentally left inside, then the user executes the Confirm icon 4118B for confirming the alert in the alerting screen 4110B, which will be transmitted by the handset 102 to the Dev 106, which sends back the immediate actions to be taken (screen 4130B) by the user in his/her handset 102. Screen 4130B lists actions, such as: unlock the car door 4132B, lower down car windows 4134B, sound the horn 4136B, turn on the car alarm 4138B, turn the heater on 4140B, turn the A/C on 4142B, flash a light 4144B, call emergency center 4146B, and the driver is on his/her way 4148B. When the user/driver, in this example, selects the Lower down car windows and the "I am on my way" icons (4134B and 4148B) which will be transmitted by the handset 102 to the Dev 106, which sends back the statuses of said actions 4154B and 4168B being taken as shown on screen 4150*b*.

FIG. 42A illustrates a preferred example of embodiment 4200A of the present invention. It presents steps taken to monitor the vehicle engine status and the Dev's responses when the Panic icon or vehicle emergency button is pushed.

It illustrates the Engine Status Menu 4222A when a user executes the Engine Status icon 4210A (where the Auto App Menu 4204A is repeated here from screen 1122 of FIG. 11 for reader's convenience), making the handset 102 send the corresponding command to the Dev 106, which communicates with the Engine Conditions I/O 205 (FIG. 2), and reads back its engine status and passes the information back to the handset 102, as displayed in screen 4220A. The handset 102 displays the vehicle engine and accessory conditions 4222A which it receives from the Dev 106.

Fuel Level icon 4224A indicates how much fuel is in the tank (not shown).

Electrical icon 4226A shows the vehicle's electrical condition (not shown).

Oil Level icon 4228A indicates if any oil needs to be added (not shown).

Tire Condition icon 4232A informs user of the tire pressure and thread thickness (not shown).

Last Service icon 4234A displays the date of the most recent service of the vehicle (not shown).

Brakes icon 4236A indicates brake-pads and if they need to be replaced (not shown).

Lights icon 4238A tells the user(s) which lights are out or not working (not shown).

Battery Level icon 4240A tells the user(s) the battery level or how many miles left on the remaining charges (mileage remaining balance) in case of electric car.

When the Panic icon 4214A is selected, it makes the handset 102 transmit the command to Dev 106, which will turn on the car Alarm Speaker (220 FIG. 2) and the emergency lights immediately. The Dev 106 also sends back their statuses to the handset 102 which displays the Alarm Speaker and emergency light as being ON (not shown). The Panic icon 4214A preferable functions like a toggle input. In other words, if it is selected again, the handset 102 will transmit the command to the Dev 106, which will then turn off the car Alarm Speaker (220 in FIG. 2) and emergency lights; and also send back their statuses to the handset 102 which will display the statuses as being OFF (not shown).

FIG. 42B illustrates a preferred example of embodiment 4200B of the present invention. It presents a third party controlling and monitoring the first party Dev temporarily from said third party's handset and/or third party's own Dev (Dev, i.e., in his/her vehicle). The control and monitor command is transmitted by the first party Dev or by its user's handset (second party) so third party (police) can have temporary control of the effected vehicle (first party) where the safety of the public is in great danger.

It illustrates the menu to control (accompanied with a flowchart) said vehicle which has been transmitted and appears on the pursuing policeman's handset (mobile device) 4202B and/or the dashboard console display 4232B of the police vehicle (correspondingly in flowchart 4250B are policeman's handset 102A and police vehicle PCMD "Program Control and Monitor Device" or Police Dev 106A) whereby said officer can have temporary control of said vehicle (Owner car PCMD) 106 in order to manage the situation. Screens 4202B and 4232B illustrate the command screen appearing on the pursuing police officer's mobile device 102A and/or on the console display of the pursuing police vehicle (police vehicle Dev/PCMD) 106A. Flowchart 4250B illustrates communication between various devices for such scenario, in case of emergency, such as the vehicle (Owner car PCMD) 106 is being hijacked or reported stolen while it is being driven dangerously without regard for public safety. The owner (handset 102) reports by calling police emergency center 4252B (in flowchart 4250B where in the USA and Canada, the emergency dial code is 911 as shown by 1960*a* in screen 1932*a* of FIG. 19) indicated by arrow 4254B and executes a third-party control and monitor command (icon 1132, screen 1120 of FIG. 11) on his/her handset 102 which transmits the said command (indicated by arrow 4255B to said police emergency center 4252B and also transmits a temporary encrypted MSK 4255Ba to the Affected Dev (Owner car PCMD) 106 (The temporary encrypted MSK associated with a third-party control and monitor command has to be transmitted to the affected Dev (Owner car PCMD) 106 in order for said Dev 106 to verify the MSK validity against said third party 102A/106A commands indicated by arrows 4262B and/or 4266B). The police emergency center 4252B then forwards it (arrows 4258B and 4260B) to the nearest possible police officer(s), either to his handset 102A and/or to his police Dev (police vehicle PCMD) 106A; or the victim driver executes the panic button hidden nearby in the vehicle making the affected Dev (Owner car PCMD) 106 transmit said third-party control and monitor command 4256B (embedded with a temporary MSK) to the police emergency center 4252B which forwards it (4258B and/or 4260B) to the nearest possible police officer(s) 102A and/or 106A, or the affected Dev (Owner car PCMD) 106 transmits said third-party control and monitor command 4256B (embedded with a temporary MSK) itself to the police emergency center 4252B while it detects the erratic and dangerous driving behavior of the driver (running red lights, excessive speed, driving on the wrong way, causing impact to the vehicle without stopping) via its corresponding vehicle accessory inputs. When the alerted policeman starts pursuing said vehicle, he/she executes the command making police vehicle Dev (let's call it: "police Dev" 106A) communicate and then receives from said vehicle's (affected vehicle's Dev, let's call it "affected Dev" 106) graphic map showing its (affected Dev) real-time interactive location which is displayed on police vehicle console display (not shown) and/or audio description announced on the police vehicle speaker (not shown) making the action of pursuing more efficient. The pursuing officer communicates with the affected vehicle by executing on his/her display, as shown on screen 4202B (officer's handset/mobile device) and/or 4232B (police vehicle display console), accompanying with the vehicle description and license plate 4206B/4236B. The police officer can observe the driver of the affected vehicle by executing Camera icon 4208B/4238B making the officer's handset/(police Dev) 102A/106A transmit the command 4264B/4268B to the affected Dev 106 which transmits back 4264B/4268B the image via its car interior camera (not shown). The police officer can also turn on the emergency lights and/or horn of the affected vehicle by executing Emergency Lights icon 4216B/4246B and/or Horn icon 4218B/4248B. The police officer can also attempt to speak to the driver by executing Speaker icon 4214B/4244B making the officer's handset/(police Dev) 102A/106A transmit the command to the affected Dev 106 which establishes the two-way communication with its affected vehicle speaker by receiving and transmitting audio data between two parties (not shown). The police officer can also take the urgent step of stopping the affected vehicle by executing icon 4212B/4242B making the officer's handset/(police Dev) 102A/106A transmit the command to the affected Dev 106 which makes the affected vehicle come to a complete stop and engine turned off. The 3$^{rd}$ party control and monitor is of limit in time and temporary by nature (and always accompanied by app download web link so a third-party (non-Dev owning-user can do an app download and run the software) meaning as soon as the police officer resolves the problem and executes Done icon (not shown) or navigates his/her device to another task, the affected Dev 106 is notified by said device 102A/106A and will not accept any more any commands from said devices 102A/106A. Third party controlling and monitoring command can also be programmed to be effective on a certain date, time and duration. This feature allows the owner to loan a car to a friend in such a way that the friend can only have possession of it for a certain date, time and duration.

FIG. 42C illustrates preferred examples of embodiment 4200C of the present invention. It presents a monitoring menu where the owner can program the Dev to keep track of the driving behavior of a driver of his/her vehicle and the data is safely and securely stored into his/her private cloud storage block 4904 in Chart 4220C (also in FIG. 49). He/she can also program the Dev to be informed when the vehicle weight exceeds its maximum load limit 4252C or to take part in a traffic flow monitor program during rush hours. When the user executes Driving Behavior (monitor) icon 1142 (FIG. 11), the handset navigates to Driving Behavior Monitor menu, screen 4202C where the user can check to be aware that if the seat belt is being fastened 4206C, running on red light 4208C, failing to stop at stop sign 4210C, turning right on red light without a complete stop 4212C, speeding excessively in a speed bump area 4214C. Chart 4220C shows the interaction between the Dev 106, driver's handset 102C, owner's handset 102 and various intelligent traffic controllers such as: Stop sign controller 4222C, Speed bump controller 4224C, Red (Traffic) light controller 4226C and the user's private Cloud storage 4904. The Dev, during a driving routine, first communicates (indicated by 4228C) with the driver's handset 102C and thus recognizing his/her identity. The Dev keeps track of time (via RTC 240, FIG. 2) and location (via GPS 3182, FIG. 31) and stores these data into its memory, during the entire trip, of said misbehaviors: seat belt being fastened, failure to a complete stop at a stop sign (by communicating 4230C with smart Stop sign controller 4222C), running on red light (by communicating 4234C with Traffic light controller 4226C), slowing down on streets with speed bumps (by communicating 4232C with Street Bump controller 4224C and its Speedo-meter 4262C), stopping before turning right on red light (or turning left in countries such as: India, Japan, UK, China's SAR Hong Kong, Australia, New Zealand, Singapore, Thailand, Malaysia, Indonesia). At the end of the day, the Dev transmits said data 4238C to the owner's handset 102 which transmits it 4239C to the owner's private cloud 4904 via his/her home Dev (not shown). Communicating with Smart Stop sign, Smart Traffic light and Smart Street bump controllers means these devices are being equipped with wireless SRC components which allow them to broadcast their red/green status and speed limit to the Dev.

The Dev can also inform the owner 4246C when the vehicle weight exceeds its maximum load limit when it receives the information 4244C from its built-in vehicle digital scale (weighing device) 4242C. This feature can be programmed when the user executes Load Limit icon 1144 (FIG. 11) and then checks at box 4254C with vehicle maximum load limit value entered at box 4256C.

The Dev can also be programmed to participate in the traffic monitor website after the user executes Traffic Monitor icon 1148 (FIG. 11) making the handset navigate to the Traffic Flow Monitor menu, screen 4260C. The user fills out the Traffic Monitor website address 4264C, checks mark the selections such as: speed 4266C, location 4268C, time 4270C and the likes such as: day of the week, morning start time, end time, evening start time, end time and frequency (not shown). It starts out during morning and evening rush hours, as shown in Chart 4280C, when the Dev 106 periodically communicates 4286C with the handset 102. During rush hours as programmed in the Traffic Flow Monitor menu 4262C, the Dev reads its present location 4294C (input from GPS), current speed 4290C (input from speedometer) and time 4292C (reading from RTC 240 in FIG. 2) and transmits the data 4298C to the Traffic monitor 4284C website 4264C.

Furthermore, the Dev can detect if the driver is driving on the wrong side of the street by getting the precise vehicle GPS location thus informing said driver of the case. The Dev also transmits the information to the highway patrol office allowing its officer(s) to monitor it and take measure to deal for a safe outcome. The police officer then informs and alerts other drivers of potential danger ahead. Said Dev can also command the vehicle to a complete stop if the driver continues on driving.

The Dev can also detect if the driver is intoxicated while attempt to drive by detecting his/her blood alcohol content/concentration (BAC) via a foolproof vehicle-equipped breath detector. It then prevents the driver from turning on the car engine and also informs other registered users of the problem. The effected vehicle can only be driven again when the Dev no longer detects any alcohol level within the law or it receives instruction by another registered user or a designate driver who has to answer successfully to some unlocked answers to the Dev in order to enable said Dev again so he/she can drive said vehicle.

The Dev 106 preferably can also allow the user to lock/unlock the car door, car trunk, start and drive his/her vehicle without using the car key. The user can use his/her handset to communicate with the Dev or use voice commands directly to the Dev (with the handset in his/her possession or in the vicinity—enabling the Dev to recognize said registered handset via encrypted SRC/WIFI communication; thus its user either uses voice or handset input commands) in controlling his/her vehicle such as: lock/unlock the car door, car trunk, turn on/off lights, starting the vehicle engine (with or without a car key) or the likes. The Dev can also optionally be programmed (toggling the EN 1163_a_ of the Door Unlock Announcer icon 1163 of the Auto Dev Facility Menu 1150 in FIG. 11) to automatically unlock the vehicle when at least one of its smart sensors detects the driver (with his/her registered handset in possession or in the vicinity) approaching its driver-side door.

This feature allows the driver to get into the car, start its engine and drive it without using a physical vehicle key. The Dev is then to announce in audio "the door is unlocked now" for his/her convenience when he/she approaches the driver-side door. The Dev also smartly locks the door back, sensing (via its door smart sensor input) that the owner (his/her handset) steps away from the vehicle. This same feature can also be applied to the home application of Dev 106 (toggling the EN 1363_a_ of the Door Unlock Announcer icon 1363 in Home Dev Facility Menu 1350 in FIG. 13) where its user comes home (with his/her handset in possession), approaches his/her house entry, with the door speaker (Dev 106) then announcing: "The door is unlocked!" when he/she is within steps from it. The Dev also smartly locks the door back, sensing (via its door smart sensor input) that the owner (his/her handset) steps away from the door deciding not going in for any reason.

Optionally, the user can input his/her facial recognition feature or fingerprint into his/her handset via its camera or scanner (executed and processed by the handset's Biometrics layer 731A/731B of FIG. 7A/7B) in place of his/her user ID and password, in communicating with the Dev 106. The user utilizes this feature by executing the Biometric Activation icon 1169/1369 (of the Auto/Home Dev Facility Menu 1152/1352 of FIG. 11/13) which makes the handset 102 navigate to another handset screen (not shown) where he/she is able to input his/her biometrical data (i.e., at least one of his/her facial features or fingerprints per handset biometric command instruction) in the handset's screen designated areas (via the handset camera or scanner and screen command icons). The handset then processes, stores the biometrical information and associates said information with its user's personal and or mobile payment account in its memory. The handset also transmits said biometrical information to the Dev 106 which processes and if the biometrical information is verifiable per the Dev's biometric requirement (via its Facial Recognition & Gesture Circuitry 275 of FIG. 2/3 and executed by its Biometrics layer 527/627 of FIG. 5/6), stores the said information and associates said information with its user's personal and or mobile payment account in its Memory (264 of FIG. 2/3/4). From then on, the user, instead of entering his/her user ID and password (when required or prompted), inputs his/her Biometrics (i.e., Facial Features, Fingerprints) into his/her handset to communicate with the Dev and then is able to communicate with said Dev via the handset's command icons or voice input commands or directly via the Dev's video and/or audio inputs.

Furthermore, the user can input his/her facial recognition feature or fingerprint(s) directly into the Dev's video inputs (216/312 of FIG. 2/3) or the Dev's Auto Accessories (i.e., Camera 3426 of FIG. 34) or Dev's Household Devices (i.e., Big-Screen TV 5009 of FIG. 50) by executing the Handset's Biometric Activation icon 1169/1369 (of the Auto/Home Dev Facility Menu 1152/1352 of FIG. 11/13) which makes the handset 102 navigate to another handset screen (not shown) letting the user the option either inputting his/her biometric parameters via the handset screen (as mentioned in the preceding paragraph) or inputting said biometric data directly into the Dev's video scanning inputs (or Auto Accessories/Household devices). The Dev 106 then processes and if the biometrical information is verifiable per the Dev's biometric requirement (via its Facial Recognition & Gesture Circuitry 275 of FIG. 2/3 and executed by its Biometrics layer 527/627 of FIG. 5/6), stores the said information and associates said information with its user's personal and or mobile payment account in its (Memory 264 of FIG. 2/3/4). The Dev 106 also lets user to enter both the biometric commands (via voice and or video devices) and input his/her biometric features (facial and or fingerprints) directly into its one of its video devices (i.e., Big-Screen TV 5009 of FIG. 50 equipped with video and audio input capability) by transmitting its biometric command screen (with corresponding command/status icons) to said video device (Big-Screen TV 5009) as long as the registered handset 102 is in the vicinity. As soon as the user completes the biometric commands and data (facial and or fingerprints), the Dev 106 then processes the information. If the biometrical information is verifiable per the Dev's biometric requirement (executed by its Biometrics layer 527/627 of FIG. 5/6), the Dev 106 stores the said information and associates said information with its user's personal and or mobile payment account in its Memory (264 of FIG. 2/3/4). From then on, the user, instead of entering his/her user ID and password (when required or prompted), inputs his/her Biometrics (i.e., Facial Features, Fingerprints) into one of the Dev's video inputs and then is able to communicate with said Dev via its video (i.e., Big-Screen TV 5009 of FIG. 50) with command icons, hand gestures or voice input commands. The user is also able to communicate with Dev via the handset's command icons or voice input commands.

During its usage, the Dev first verifies said user's biometrical data via its corresponding Facial & Gesture Recognition Circuitry 275 of FIG. 2/3 and Biometrics layer 527/627 of FIG. 5/6. The user is then able to use his/her handset 102 either via handset soft-key and/or icon inputs or voice commands to communicate with the Dev 106 in order to control and monitor his/her household appliances (or auto accessories) remotely anywhere. The user is also able to use his/her voice commands to communicate with the Dev 106 directly (via its video and audio inputs) in order to control his/her vehicle equipment accessories (or household appliances). The user is also able to use his/her voice commands and command icons to communicate with the Dev 106 via one of its associated household appliances (i.e., Big-Screen TV equipped with Video and Audio I/O) in order to control his/her other household appliances.

One of the preferred examples: The user is able, directly via one of the Dev's Video Input devices (i.e., Driver Side Door Camera 3426 of FIG. 34) to have his/her facial features inputted/taken as he/she approaches the vehicle. After the Dev receives (from its driver door Camera 3426) processes and verifies said video information, it unlocks its car door(s), outputs said door unlock audio announcement "Doors are unlocked" and thus allows the user to have complete access to said vehicle. When at the driver seat, the driver/user has complete control of the vehicle (such as turning on/off its engine, the radio, locking/unlocking its doors, trunk, rolling down its windows, inquiring GPS locations) without the car key via audio commands to the (Dev's) steering wheel mounted Audio Input (Microphone 1803C of FIG. 18C or 3424 of FIG. 34). The Dev processes said audio input (decoded by its Voice Recognition Circuitry 279 of FIG. 2/3 and processed by its Voice Recognition layer 525/625 of FIG. 5/6) and from then on, it will respond to all the driver's recognizable audio commands. The driver is then able to drive the car away (or to have it driven him/her away, in case of a self-driving vehicle).

Another preferred example: The handset's (102) Biometrics layer 731A/731B, lets its owner (customer) pay after receiving goods and services from 3rd Party Providers by verifying its owner's biometrical input data and then (the handset' 102 App) associates said data with its owner's handset 102 mobile payment account. The handset 102 then transmits said account information to the Dev which (via its 3rd Party Apps) conducts and completes the customer's payment transaction.

The Dev 106 preferably can also detect, as somebody or something approaching its vehicle, attempting to plant hostile or harmful devices: such as GPS tracker, explosive device, narcotic drug and the like, via the Alien Device Detection layer (block 521 in FIG. 5). Said software layer constantly runs its Cameras (216 in FIG. 2), recording video images of every movement, logging 5 minutes before and 10 minutes after (or a programmable duration of time) when at least one of its Cameras or Video Inputs 216 and smart motion video Sensors 221 in FIG. 2 (for example: Smart Motion Video Sensors: 3416, 3418, 3420 and 3422 in FIG. 34) detect any movement, at its peripherals, leading to physical contact(s) on its body surface or underneath its frame. The Dev then transmits said video to its user's handset(s) for verification. The Dev can also detect, via the Alien Device Detection layer (block 521 in FIG. 5), a GPS tracking device by using its Frequency Hopper circuitry (block 263 of FIG. 2) and via at least one of its (Ext. Device) Sensors (block 221 of FIG. 2, blocks 511, 511A & 511B of FIG. 51), as are well known to those of ordinary skill in the art, to detect the constant presence of 3rd Party Device emitting out at least one of the repeated cellular device identifiers such as: TMSI, IMSI, MEID, IMEI, ESN or the likes) for a period longer than normal when the vehicle is both in parking position (the driver's handset no longer present) and on the move. The Dev then transmits the findings to its user's handset, allowing said owner for a thorough visual inspection on his/her vehicle. Furthermore, the Dev alerts its owner/driver one last time as he/she approaches its vehicle ready to get in when its latest alert has not had any response from said owner/driver. The Dev is also able to detect, via its Radio Freq Finder layer (block 611 of FIG. 6) and via at least one of its (Ext. Device) Sensors (block 331 of FIG. 3, 511A & 511B of FIG. 51), any External Tracking Device at home and if it detects the presence of said device, the Dev will transmit the information to its user's handset and thus starting up the search of its existence by its owner/user.

The Dev 106 preferably can also employ facial recognition technology, as are well known to those of ordinary skill in the art, via at least its Facial& Gesture Recognition logic block 275 and Video 272 in FIG. 2/3, controlled and decoded by its Biometrics layer (527/627 in FIG. 5/6) to record images of persons of interest who, more than one or multiple of times, are suspected of snooping or loitering around and his/her precise location within its vicinity via its Sensors (block 321 of FIG. 3, devices 5011, 5011A & 5011B of FIGS. 50 & 51) and decoded by its Sensors layer (659 in FIG. 6). The Dev then transmits said images to its user's handset allowing said owner to review if said persons might be persons of interest, pose danger to his/her family or they are friends or associates not to be monitored anymore in the future.

The Dev 106 preferably can also alert the vehicle owner (executed by its Hostile Party Detection App block 521 of FIG. 5) if any attempt is made to plant an adverse object: alien or harmful device such as GPS tracker, explosive device, illegal substance or the likes, by detecting any foreign presence via its external smart audio, video, radio and frequency Sensors (Video Inputs block 216 of FIG. 2), Radio Frequency Finder (block 269 of FIG. 2/3 especially for home application) and/or especially, in the case of a GPS tracker, via its Frequency Hopper block 263 of FIG. 2 (i.e., TMSI, IMSI detector). It records the video of any object moving toward its vehicle or within the vehicle peripheral leading to a physical contact. The Dev can also, via its Cameras (Video I/O block 272 of FIG. 2/3), employs Facial& Gesture Recognition Technology block 275 of FIG. 2/3, as are well known to those of ordinary skill in the art, to record images of persons of interest who, more than one occasion (or determined number of times), snoop around in its vicinity. It then transmits said recorded video to the owner's handset for his/her visual verification, determination and elimination.

The Auto Dev offers a program feature to intercept its driver's registered handset incoming calls while he/she is driving. When this feature (Call Intercept icon 1139 in Auto App Menu 1122 of FIG. 11) is turned on (On 1139*a*), the Dev 106 executes the command as soon as the vehicle is in motion, by transmitting (via SRC i.e., Bluetooth 260 of FIG. 2) to its driver's handset (Handset D) a command inquiring about its Mobile Subscriber Identity (at least one of parameters: S/N, TMSI, IMSI, IMEI or the likes). The Dev then, as soon as it receives its inquiry parameter, transmits said information to the cellular service provider which requests the authentication key from the Dev which then requests said information (i.e., session key) from the driver's handset (Handset D). The Dev is able to connect to the Handset D's cellular service network as soon as it obtains the information from Handset D and transmits the authentication key to the cellular service provider. It then takes over the functionality of driver's handset, intercepting calls coming from outside intending for Handset D and optionally transmitting the texts back informing the callers that its driver is driving and therefore will not answer any calls or messages. As soon as the vehicle comes to a complete stop, the Dev 106 stops the handset's functionality (ceasing handset's cellular subscriber identification and assuming its own identification or continuing its own identification) while the handset 102 (Handset D) resumes its normal operation connecting back to its cellular service network.

The Auto Dev can be programmed to keep track of or follow another Auto Dev during a travel trip together or a rendezvous on the road. Driver A programs his/her Dev (Dev A, follow-vehicle) via his/her handset 102A (Handset A) so his/her vehicle can meet and follow driver B's car (Dev B, lead-vehicle) in order to keep track of each other while both of them travel together or want to meet each other on the road. Driver A starts out by executing the Drive-Pool icon 1145 in the Auto App Menu (FIG. 11) on his/her handset (Handset A) 102 which responds by navigating to another screen with information where the driver A fills it with driver B's handset's phone number and then executes the Ok icon (not shown). The handset 102A then transmits said information to the Dev A which processes and transmits the information along with Drive-Pool request command (with its hidden enclosed phone number and temporary (time-limited) MSK associated with said command) to driver B's handset (Handset B) allowing him/her to confirm or not confirm said command (not shown). Driver B has a choice of Ok or Not Ok icons from said information. If driver B chooses the Ok icon, his/her handset 102B (Handset B) will forward the Drive-Pool response command to Dev B (of his/her vehicle). Dev B, as soon as it receives the Drive-Pool response command from Handset B, it is able to connect to Dev A (with Dev A's identical time-limited MSK associated with its acknowledge command) and transmits to Dev A the Drive-Pool acknowledge command along its dynamic GPS map which contains the Dev B's current location (as Dev A's floating/moving GPS destination). From then on, Dev A (vehicle A) with its constantly refreshed GPS map (from Dev B and with Dev B GPS location as its destination) will guide the Driver A with its GPS direction instructions in order to follow Driver B. Dev B (vehicle B), in turn with its GPS map, either showing or not showing its travel destination, will include the received real-time GPS location of Dev A (vehicle A). When vehicles A and B finally are within short distance of each other, they both inform their drivers (drivers A and B) of said event (i.e., via GPS audio alert). From then on, Dev A's GPS guidance follows exactly the GPS guidance of Dev B or until either one of them is cancelled or discontinued (and thus their communication enabled connection MSK is no longer valid) by its respective driver either via Handset A or Handset B. This application is also useful where the first police car (Lead-Vehicle) chases some other vehicle in close pursuit while some other police vehicles (Follow-Vehicles) would like to join in to back up their fellow officer. By activating this (Devs') command feature automatically within their Dev equipped police vehicles in order to follow the Lead-Vehicle (without requiring to have an OK acknowledgement back from said Lead-Vehicle), the Follow-Vehicles' GPS can precisely guide their police officer drivers to wherever the Lead-Vehicle is at any moment and thus can speed up their backup. At present, the Follow-Vehicle officer has to visually follow the Lead-Vehicle or listen via radio where the Lead-Vehicle is when it is out of sight. Furthermore, the human relay radio instruction announcement (to the pursuing police officer) of where the Lead-Vehicle location is has some built-in delay and might not be always as accurate.

The Auto Dev can preferably to communicate with the Traffic Controller at a cross street intersection which monitors both cross traffic and incoming traffic at said intersection. The Traffic Controller, via its Cross Traffic Monitoring cameras, can see clearly, for instance, a runner running full-speed ahead without stopping into crossing traffic while its Incoming Traffic Monitoring cameras at the same time can see the Dev's vehicle arriving within its view. A scenario where at the traffic intersection, the Intersection Traffic Controller's Cross Traffic camera is able to see a car running the red light (for some unknown reason) is about crossing into said intersection while the Incoming Traffic camera can see the incoming vehicle (Dev 106) half block away with its driver keeping on a constant speed, into said intersection, without realizing a potential accident is about to happen if it has not been warned of said scenario. Therefore, it is preferable that the Dev 106 is able to communicate with the Intersection Traffic Controller in order for it (Traffic Controller) to be able to transmit an alert to the Dev 106 so its driver is aware and thus slows down or if needed, comes to a complete stop. For example, The Traffic Controller transmits an alert to the Dev's vehicle via its SRC network making the Dev display it on the vehicle's Dashboard Display (screen 1802C/1832C in FIG. 18C) along with an audio sound warning its driver of said potential accident. This also applies to the case where a distract jogger or a confused child crossing the incoming traffic at a blind spot by the intersection. It also applies to where the (Dev 106) Driver absentmindedly keeps on speeding steadily ahead while the red traffic light is on and thus can be alerted by the Traffic Controller of said scenario several hundred yards/meters ahead before heading into the intersection. The Traffic Controller accomplishes by transmitting the alert to the Dev (via its strategically located SRC medium I/O devices) and making the Dev sound off the video and audio alarms to its driver; and therefore the driver is able to come to a complete stop. It also applies to where the Dev Driver, not being aware that he/she is dozing on and off, keeps on driving and thus can be alerted by the Dev itself via its Facial Recognition camera (Microphone & Video 1803C of FIG. 18C or 3424 of FIG. 34) and the Dev thus sounds off an audio alarm so that its driver is waken up out of his/her unknowing sleep. This also applies to a self-driving vehicle since not all of its sensors can cover some of the blind spots at some intersections because there might be a blocking wall, some overgrown bushes or even some unexpected presence of things like illegal parked cars or trash containers, not yet removed/retrieved by their owners. The unexpected presence of said foreign objects might render self-driving car's sensors from detecting any moving objects, all at a sudden, popping out from behind; while the Intersection Traffic Controller, with its multi-angle positioned cameras, is able to transmit the warning to the Dev of said scenario. The alert can also be about a just happened accident, a freshly falling object, a slowing-down traffic or a parked vehicle without any of its emergency lights on. The Dev also can alert its driver to give way to emergency vehicles such as: fire truck, ambulance, emergency police vehicle or the likes.

FIGS. 42D1 and 42D2 illustrate preferred application examples of embodiment 4200D1 and 4200D2 of the present invention. It presents one handset screen 4202D, where the user (lessee) using the Server App (Car Rental App, one of 3$^{rd}$ Party Apps block 613 in FIG. 6), from the car rental website, transmitted from an App Server 4258D (of Flowchart 4280D), books and selects (4222D, 4226D, 4230D or 4234D) a rental car (4220D, 4224D, 4228D or 4232D) from the choice of suppliers 4210D. After he/she is done booking (after going over several handset screens [not shown]) of the rental vehicle: deciding on its make and model to his/her choosing, checking and signing off on the online lease agreement (not shown), the App Server 4258D generates a unique one-time, time-limited and time-stamped MSK (time-limit is based length of the lease) and transmits it to both his/her handset 102 and the (rental car) Dev 106B (assuming the user's handset phone number has been provided during the online checkout process [not shown]). The MSK identifier 4287D lets the Dev 106B recognize the user 4252D as the intended driver during the SRC communication between said Dev 106B and said user's handset 102 when he/she is in the vicinity (within SRC range) or inside said vehicle. Optionally, the App Server transmits to more than one intended leased vehicle MSK to his/her handset allowing the user/lessee a choice of more than one vehicle. Optionally, when each leased vehicle with its own MSK permanent assigned (by the App Server), there is no need for the App Server to transmit it to each vehicle, but only to transmit the one-time and time-limited MSK to the user's/driver's handset 102. As soon as he/she drives away with the leased vehicle, its Dev 106B transmits the information to the App Server 4258D which updates the lessee/user 4252D leasing information with its vehicle identification.

Flowchart 4280D illustrates various interactions from the browsing and booking of the rental car to its picking, using and returning processes by a user. The user 4252D using his/her handset 102, step 4282D browses and books a rental vehicle while online, step 4284D, in a car rental service website (App Server 4258D). After he/she is done deciding on the chosen vehicle, paying the fee and signing off the agreement (not shown), the App Server's app 4258D (Server App) generates a unique one-time, time-limited and time-stamped MSK 4287D; and transmits it to both the user's handset 102, step 4286D and the (rental car) Dev 106B, step 4288D (step 4288D optionally is not needed if the rental car Dev 106B has already been assigned a permanent MSK). The MSK 4287D is the verification key during SRC communication, step 4292D between the (rental car) Dev 106B and user's handset 102; thus confirms said user 4252D with his/her Handset 102 as the lessee (when said Handset 102 is in the vicinity or inside said rental vehicle). The user 4252D then commands the Dev 106B via his/her handset 102, also step 4290D and 4292D or directly through voice commands step 4294D (via Audio Input 3424 of FIG. 34 or voice-activated microphone 230 of FIG. 2, its associated Hands-Free software layer 532 and Voice Recognition layer 525 of FIG. 5) in making said Dev 106B performing tasks such as: locking/unlocking car doors, car trunk, turning on/off engine ignition (with or without a car key), turning on/off lights, driving the car and the likes. When the user finally returns the rental car back to the Rental Company, all the device one-time and time-limited MSKs 4287D are rendered invalid by the Dev 106B. Vehicle usage information such as mileage, driver license information, driving time, driving duration, start and stop locations, odometer reading, gas tank level and the likes are transmitted back to (step 4296D) the company 4258D for account and bookkeeping (for storage) purposes by the Dev 106B via cellular network or some other long-distant network. At present time, the company receives said information from an attendant recording it on his/her handheld device. This Dev is also very useful to law-enforcement agencies to verify (by retrieving said vehicle usage information) if truck-drivers who drive their long-haul vehicles across long distances to comply with rule and regulation in order to keep them to perform at their best and safest environment.

The Dev 106 preferably can offer a user (lessee) who already booked a rental car, the moment he/she steps out from an airport terminal or train/bus station, the convenience of having his/her rental car ready to be picked up at or nearest to the exiting terminal. Currently the user has to pick it up from the car rental parking garage which can be a shuttle ride away and possibly has to wait for a long queue at its check-out station. The user 4252D as previously described in Handset Screen 4202D can, for example, using his/her Handset (step 4283D in Chart 4281D) connects to (step 4289D) the rental car's App Server 4258D to have its rental car to be self picked up (self-driven) at the designated location. The user then provides, at handset screen 4285D, the request information such as: lease reference number (assuming his/her handset 102 containing said previously lease reference number and other rental information), his/her handset phone number, pickup time and date, pickup location address and the likes (not shown). As soon as the user finishes providing said information and transmits it back (step 4289D) to the App Server 4258D, it transmits the processed information (step 4291D) to the Dev 106B (the rental car per user's request as previously described in Screen 4202D). The Dev 106B then transmits (step 4293D) the confirmation to said Handset 102. At the precise amount of time (i.e., 20 minutes, depending on how long it takes for the self-pickup rental vehicle to be driven from its parking station to its pickup location) before pickup time, the Dev 106B starts its (leased) vehicle engine, executes its Self-Pickup layer (block 549 of FIG. 5) and drives its vehicle to the designated location. As soon as the user 4252D arrives at the terminal/station, the Dev 106A connects and transmits to his/her handset 102 a GPS map guiding him/her to its pickup location and interactively updating each other locations and the time duration to get to said pickup location. When the pickup vehicle (Dev 106A) reaches its parking space, the Dev 106A transmits its location to the user's handset 102 with its GPS location blinking. When the user's Handset 102 is within SRC range of the rental vehicle, the Dev 106A alerts him/her with its blinking headlights and or its sounding horns.

Illustration 4240D (prior art) presents one handset screen among many (not shown) applied to Uber Technologies Inc. where a user uses its Ride-Sharing App (i.e., Uber or Lyft in the USA, Didi Chuxing in China or Ola in India) to request a sharing ride from said company. On the demo screen 4240D, the user can see the Google map 4242D where the ride pickup 4241D and his/her destination 4243D are located. He/she also sees how much the ride costs 4244D ($23.98 or $25.24), his/her existing stored charged account 4246D and the ride request execution button 4248D.

There preferably exists a mechanism or a method offering, after the above said user (customer) has completed the request of said sharing ride, an added assurance that even though he/she knows he/she will arrive at the correct destination; he/she may mistakenly get into the wrong vehicle without realizing it; or worse being mistakenly charged for a ride he/she did not take, or lastly, falling victim to a looming criminal (for getting into a wrong car). The mechanism also protects the driver from picking up the wrong passenger unknowingly or also being endangered by criminal activity (by wrongly picking him/her up). The illustration process 4250D starts when the user 4252D, using his/her handset 102 step 4260D, requests a sharing ride from the Ride Sharing Co. website (App Server 4254D). After he/she is done requesting the ride 4262D, the App Server (app) 4254D generates a unique one-time, time-limited and time-stamped MSK 4265D; and transmits it to the user's/passenger's handset 102, step 4264D, to the (ride-sharing) Dev 106A step 4266D and the ride-sharing driver's handset 102A, step 4268D. (Steps 4266D and 4268D are not needed if the ride-sharing Dev 106A and the ride-sharing driver's handset 102A have already been assigned a permanent MSK). The MSK 4265D is the verification key during SRC communication between the (ride-sharing) Dev 106A and user's handset 102, step 4270D, and/or between the ride-sharing driver's Handset 102A and user's handset 102, step 4272D, when the user 4252D with his/her Handset 102 approaches (or in the vicinity of) the ride-sharing (Dev 106A) with the ride-sharing driver 4256D with his/her Handset 106 sitting inside. When the communication step 4270D between the Dev 106A and the user's handset 102 is verifiable; and at the same, the communication step 4272D between the ride-sharing driver's handset 102A and the user's handset 102 is also verifiable; both devices (user's handset 102 and ride-sharing driver's handset 102A) then signal confirmation to the user 4252D (step 4274D) and ride-sharing driver 4256D (step 4276D) by the user inputting (into his/her handset) a counting number of either audio sound, light flashing or the like and expecting to receive the right confirming count number (of audio sound, light flashing or the like) back (from said vehicle). After the user is dropped off, the entire device one-time and time-limited MSKs 4265D are rendered invalid and the ride information is transmitted by the Dev 106A back to the ride-sharing company (App Server 4254D) for accounting and billing verification.

The time-stamped MSK 4265D lets the company keep track of when (and where via Dev reading its GPS [Blocks 208 in FIGS. 2 and 3182 in FIG. 31/40/42C] data input) the passenger pick-up/drop-off, the trip duration. It also alerts the company and customer when the passenger fails to show up for any reason. It also prevents a customer from boarding a wrong ride, or for practical purposes, allows last-minute swapping rides of two customers, because they have already gotten to two wrong (opposite) vehicles (thanks to their handset screen output alerts), because correcting their mistakes would cause them more inconvenience than just swapping their ride with the check-off agreement (not shown) in their handset screens to continue their journey. The Dev 106A or the ride-sharing driver's handset 102A (in the case where his/her cab is not equipped with a Dev) will transmit the ride information to the ride-sharing company (App Server 4254D) for accounting and receiving purposes.

The Dev 106 preferably functions as a ride payment-charging instrument for the ride-sharing/taxi driver. The Dev 106 communicates with the handset of a customer or one of the riders inquiring about its credit payment information as soon as the passenger(s) settle into the cab (via SRC medium) and receives back said inquired information. As soon as the ride gets to its destination, the Dev 106 transmits, via cellular network, the fare payment transaction to its bank account center and a copy to the passenger's handset and said passenger is able to examine the receipt to verify the validity of said transaction. The driver does not have to run the credit card of his/her customer as being the norm as is currently. The copy of said transaction is stored on the customer's handset which can also transmits it for long term storage on his/her Private Cloud 4904 in FIG. 49/50.

The Dev 106 preferably can also allow the user, who loans out his/her car to a friend or relative (i.e., borrower), to program the Dev remotely via his/her handset to restrict borrower's usage of said vehicle to a time limit. The user does this by executing on his/her handset display the Auto Loan Out icon 1149 (of Auto App menu 1122 of FIG. 11) which takes his/her handset to a new screen containing related information (not shown) the user then can fill out, where under "handset phone number", enters the friend's handset phone number; and where under "time and date", enters the time and date on which his/her friend has to return the vehicle. The user then executes Ok icon making the handset 102 transmit the command and data to the Dev 106.

The Dev 106 verifies and processes the information, then transmits the user's previously completed data back to the handset 102, which displays them (not shown) for user's verification. The user then verifies and executes the Confirm icon, which makes the handset 102 transmit the confirmation back to the Dev 106, which processes and executes said information and command. The Dev then generates a unique one-time and time-limited MSK command and transmits it to the borrower's handset (informing that he/she can have possession of its vehicle), which then stores said MSK to its memory.

The borrower, from then on, is able to use his/her handset (by then is temporarily registered into the Dev and can thus communicate with each other with said MSK as validation key) or voice commands (with the handset in his/her possession or in the vicinity) to utilize the borrowed vehicle such as: to lock/unlock the car door, car trunk, car trunk, start/stop engine (with or without of car key), drive the car and the likes. When the length of the borrowing period expires, the Dev invalidates its MSK and the borrower cannot use said car any longer because his/her handset and the Dev no longer have valid communication.

FIG. 43 illustrates a preferred application example of embodiment 4300 of the present invention. It presents steps taken to configure the various input and output connections of the Home Alarm System controlled by the Dev 106 via a handset 102 into more descriptive terms.

The handset 102 navigates to screen 4302, showing the Home Control and Monitor menu 4304 after the user screen-flips to the Home App Menu 1320 and selects the Home Control & Monitor icon 1326 (in FIG. 13). The handset 102 then navigates to screen 4320 when the user selects the Alarm Configure icon 4306, which makes the handset 102 send the command to the Dev 106 which sends back the configuration information as shown on said screen 4320. Screen 4320 presents the factory default home alarm security system configuration, showing the Door/window entries (4324), Motion Inputs 4328, Loud Speakers/Horns 4330 and Cameras 4332, which are all in numeric terms. The user then uses finger movement by slightly touching on the display to move screen up/down, left/right or uses icons to scroll up 4334, down 4384, left 4344, right 4352 to get to the configured information. When Door/windows entry #1 icon (4326) is selected for configuration, the handset 102 navigates to screen 4340 as it sends command and receives information back from the Dev 106. Using keyboard 4348, the user can edit the entry into a descriptive name in 4342, such as Entry 1 into Main (main entry), in order to make it more recognizable; and the final result is as shown in screens 4360, 4370 and 4380. (T symbol allows some timer delay in disabling the alarm when designated entry is used.)

Figure 44:
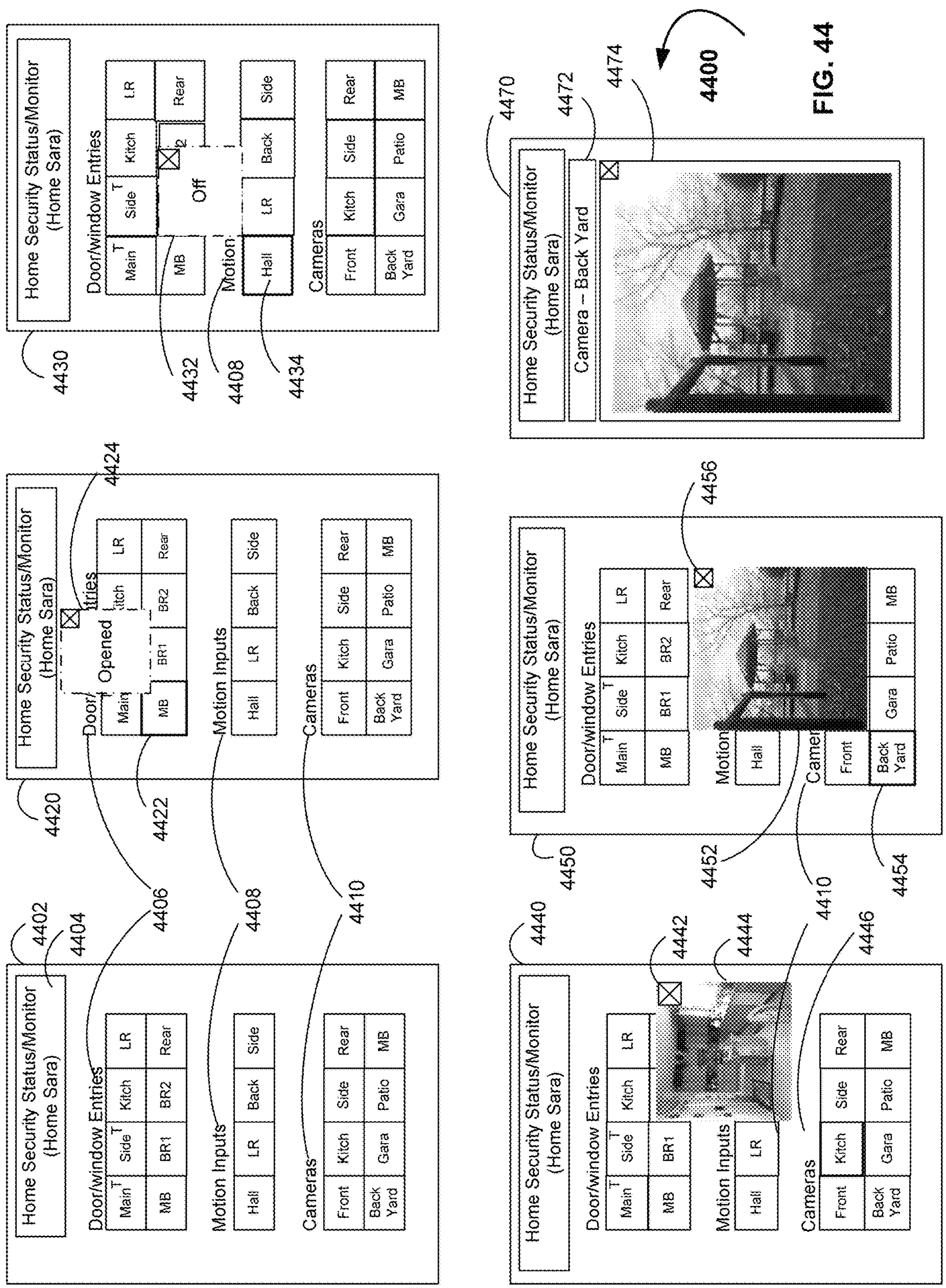
FIG. 44 shows a preferred example of handset's screen displays, presenting the status and monitoring of home alarm function of Dev 106, relating to the present invention in the home application.

FIG. 44 illustrates a preferred application example of embodiment 4400 of the present invention. This exemplary embodiment presents preferred steps taken by a user in his/her handset to monitor and view his/her home environment (controlled by the Dev 106) via his/her handset.

The user executes the Status/Monitor icon 4310 (FIG. 43), making his/her handset 102 transmit the command to the Dev 106, which processes said command and sends the response back to said handset 102, which displays the Home security Status/Monitor information, as shown on its screen 4402. The user can check the status by selecting/highlighting individual icon/entry as shown in 4422 with pop up screen 4424 saying the MB (Master Bedroom) window is opened or the Hall icon 4434 (Motion) detector is off 4432. The user can also monitor in real-time camera inputs by selecting the Kitch icon 4446, which displays it in the pop up kitchen window 4444. The Back Yard icon 4454 and its pop up window 4452 can be expanded, by the user touching the screen 4452 which the handset 102 displays as shown in full screen 4474 or closing it by executing close area 4456.

FIG. 45 illustrates a preferred application example of embodiment 4500 of the present invention. This exemplary embodiment presents preferred steps taken by a user in his/her handset to program, control and monitor his/her home security system (controlled by the Dev 106) remotely via his/her handset.

Figure 47:
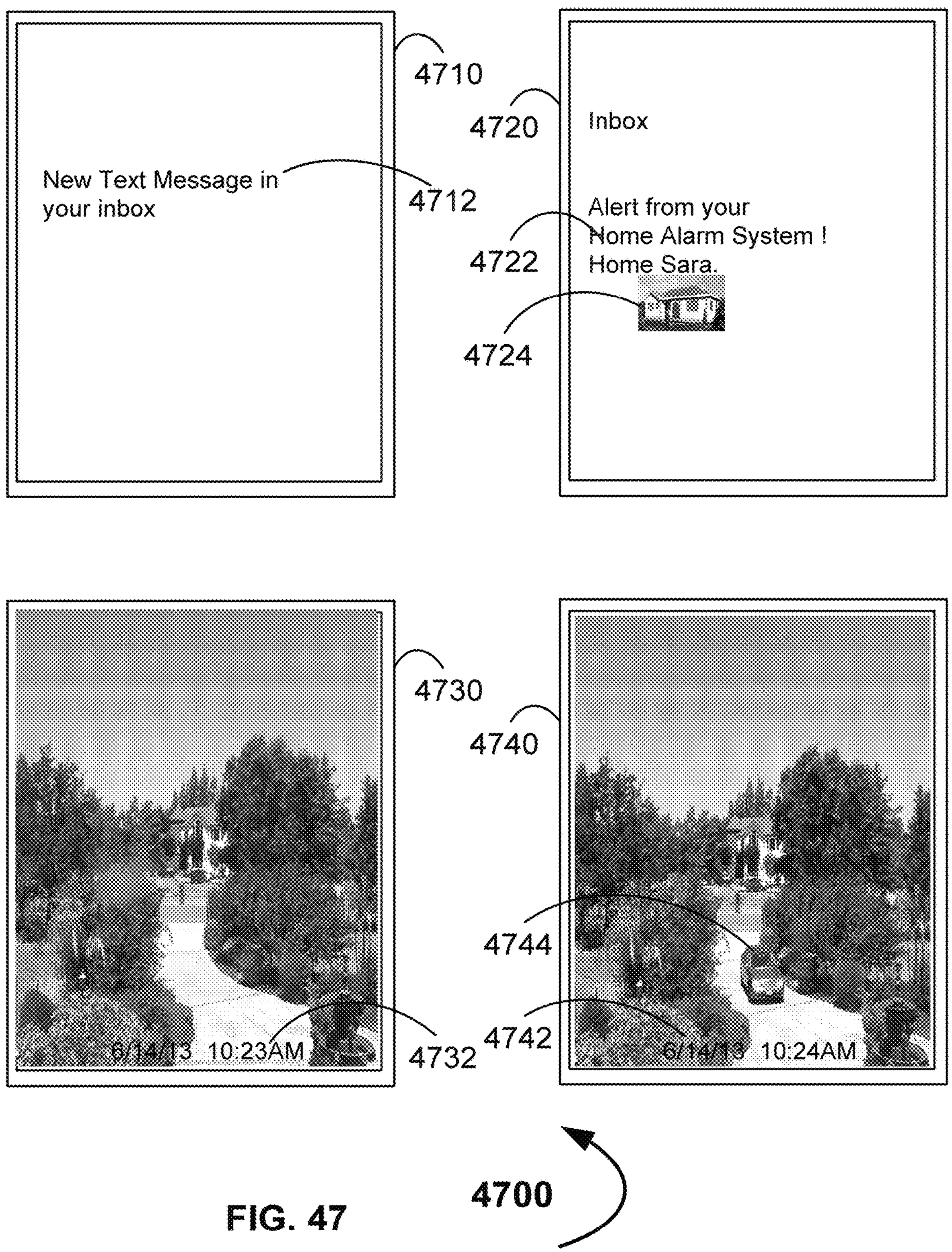
FIG. 47 shows a preferred example of handset's screen displays, presenting an alert from Dev 106 to handset 102, when a camera event takes place, relating to the present invention in the home application.

The handset 102 navigates to screen 4502 when the Program/Control icon 4308 (FIG. 43) is executed by the user, making the handset 102 transmit the command to the Dev 106, which sends back the control information to the handset 102 which displays it on 4502. This feature allows the user to use either the keyboard control key 4506 or keypad control key 4536; so either the keyboard 4508 or keypad 4546 can be used to control and program the Dev 106 for the home security functions. Screen 4502 shows that the home security system is off and not ready 4504. The user can find out more by pushing the Program icon 4548, which makes the handset 102 display the cause "Master Bedroom . . . opened" 4534 after it gets the information back from the Dev 106. The Dev 106 can bypass the Master bedroom entry when the user selects the bypass icon (command) 4568, which causes the handset 102 to display Bypass choices 4564 among which, box 4566 is selected, to bypass the Master Bedroom which makes the handset 102 send said command to the Dev 106. The user can finally turn the alarm on using his/her handset 102 by selecting the Camera Motion Alert icon 4570 and the Activate Alarm Away icon 4574, which make the handset 102 navigate to screen 4580, showing the alarm is on and away (all interior motion detection is on) plus Camera Motion detection 4582. The user can always disarm (turn the alarm off) by using either the OFF icon 4556 or the On/Off icon 1336/1338 (FIG. 13). The Camera Motion Alert icon 4570, (when enabled,) will alert user when there are any changes in any camera/video inputs 312 (FIG. 3), while the Camera Motion Sound icon 4572 also let the user make sound to scare off potential intruders. The Dev 106 will send a message and the videos of the camera input changes 4570 to user's handset 102 to alert of any activity outside of the house (as shown in FIG. 47). The Camera Motion Alert 4570 is used in cases where the owner wants to know when a truck is making a delivery, a gardener taking care of the landscape or a neighbor stopping by picking up the mail, while Camera Motion Sound 4572 will also make sound to defer any unwanted guests, while the family is being away.

FIG. 46 illustrates a preferred example of embodiment 4600 of the present invention. This exemplary embodiment presents preferred screen displays when user receives an alert in his/her handset, when an unexpected or unauthorized event happened to his/her home.

The handset 102 navigates to screen 4602 informing the user of a message and alert information data from the Dev 106 in the inbox 4606. The user scrolls to screen Tools 4612 and selects Security Home 4614 to find out said information in the home alert, screen 4622, from the Dev 106. When the home alert icon 4624 is executed by the user, the handset navigates to screen 4632 which contains event information the Dev 106 just sent along and among others with the alert message 4606. It shows BR2 (Bedroom 2) 4638 is where the break-in happened and Hall and LR (Living Room) motion detectors 4640 also detected it. Screen 4652 shows the pop-up icon 4656 when the BR2 icon 4638 is selected, detailing the time and date. Screen 4660 shows the pop-up icon 4664 when either the SPK1 or SPK2 icon 4642 is selected, detailing the time the alarm sounded 4668, and the alerted phone numbers (4672) the alarm sent messages to.

FIG. 47 illustrates a preferred example of embodiment 4700 of the present invention. This exemplary embodiment presents preferred screen displays when user receives an alert in his/her handset when a video camera detects changes around his/her house.

The handset 102 navigates to screen 4710 informing the user of message 4712 and alert information data (video) 4722 from the Dev 106 in the inbox 4720. The user finds out by executing the House icon 4724 which contains several camera shots, showing screen changes, when user flips/scrolls through—from screen 4730 (taken 6/14/13 at 10:23 AM) to screen 4740 with an object 4744 (taken 6/14/13 at 10:24 AM) 4742. This alert takes place when the user turned the alarm on with the Camera Motion Alert icon 4570 enabled as previously done in FIG. 45.

Figure 48:
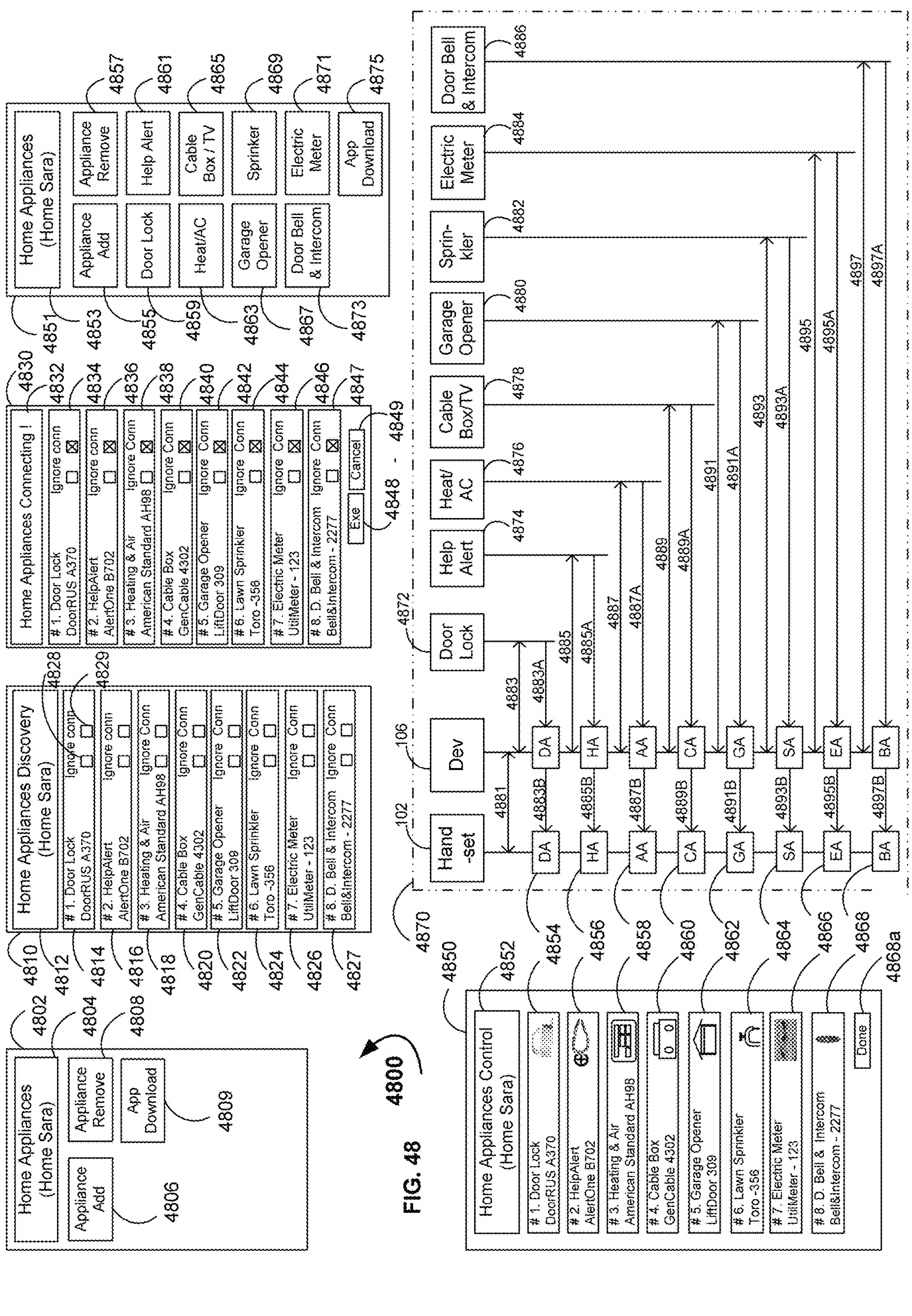
FIGS. 48-49 show preferred examples of handset's screen displays, flow charts and diagrams, presenting the household appliance addition/configuration by Dev 106, relating to the present invention in the home application.
Figure 49:
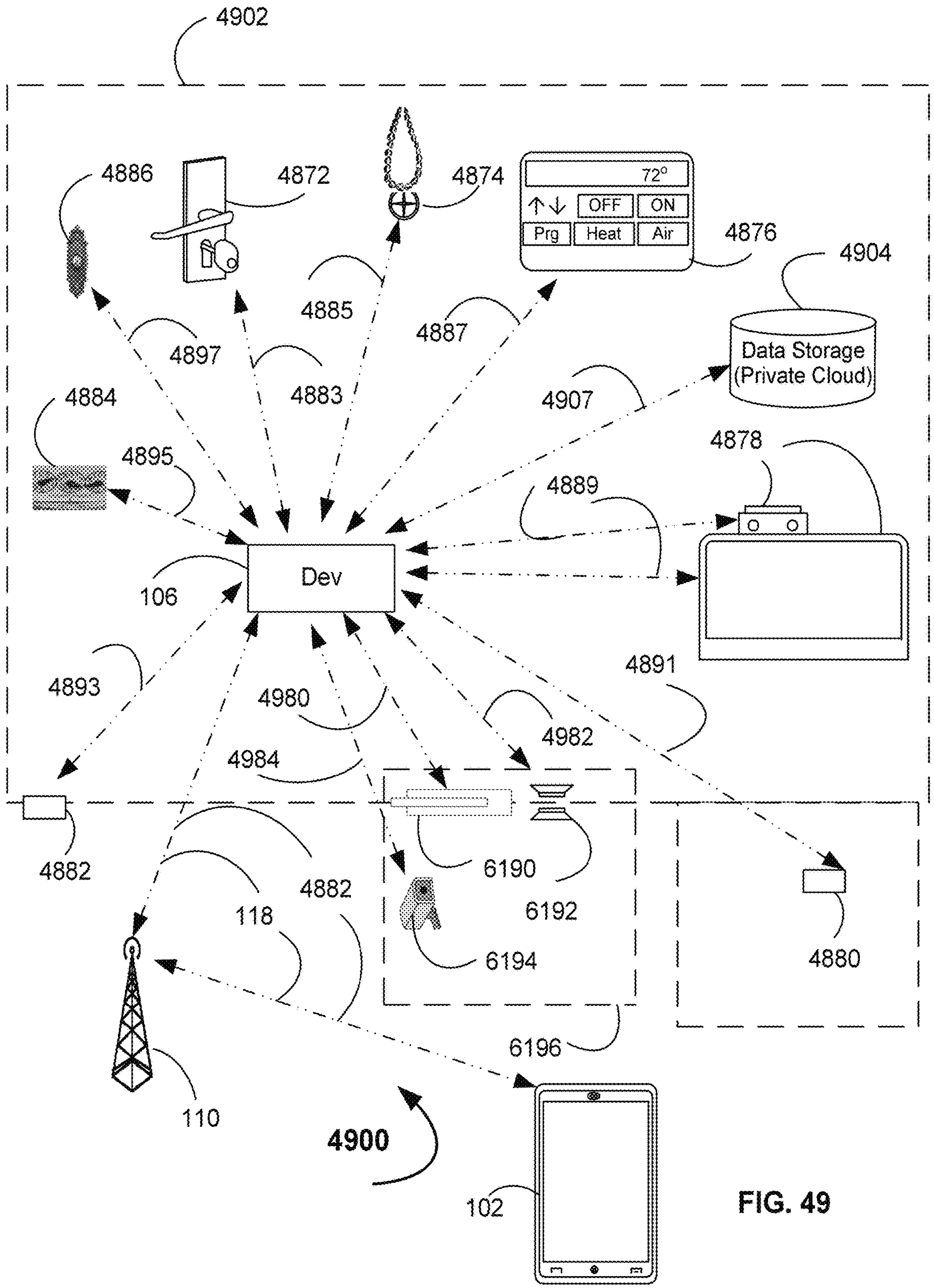

FIGS. 48 and 49 illustrate a preferred application example of embodiments 4800 and 4900 of the present invention. The exemplary embodiment 4800 presents preferred steps taken by a user in his/her handset to add household appliances/equipments into the Dev's Home Control and Monitor System, while the exemplary embodiment 4900 presents the communication interaction of these devices within the SRC network (except Wi-Fi).

The user executes the Household Appliances icon 1344 (FIG. 13), making his/her handset 102 transmit the command to the Dev 106, which processes said command and sends the response back to said handset 102, which displays the Household Appliances menu, as shown on its screen 4802. The Home Appliances menu 4804 lets the user add (4806) home appliances/equipments or accessories that he/she can control remotely using the handset 102, or remove 4808 them when they are no longer in use, when he/she is at home or away from home.

The user executes the Appliance Add icon 4806 which makes the handset 102 send the command to the Dev 106, which processes and transmits back the appliances/equipments it discovers on screen 4810. This feature allows the handset 102 to command the Dev 106 either to ignore 4828 or connect 4829 the Entry Door Lock 4814, Help Alert 4816, Heating and Air conditioning 4818, Cable Box 4820, Garage Opener 4822, Lawn Sprinkler 4824, Electric Meter 4826 and Door Bell & Intercom 4827, by selecting and checking appropriate boxes as shown in Home Appliances Discovery screen 4830. The user then executes Exe icon 4848, making the handset 102 send the command to the Dev 106, which processes and transmits back the corresponding software applications: Door Lock 4854, Help Alert 4856, Heat/Air 4858, Cable Box/TV 4860, Garage Opener 4862, Sprinkler controller 4864, Electric Meter 4866, and Door Bell & Intercom 4868, from said appliances as shown in the Home Appliances screen 4850. The user then executes the Done icon 4868*a* which makes the handset 102 navigate back to screen 4802, as being shown as screen 4851. In screen 4851, the Home Appliances menu 4853, comprises the eight newly additional household appliances controlling icons: Door Lock 4859, Help Alert 4861, Heat/Air 4863, Cable Box/TV 4865, Garage Opener 4867, Sprinkler controller 4869, Electric Meter 4871 and Door Bell & Intercom 4873. The Door Lock 1332, Unlock 1334 and the Garage Opener icons 1340 are also copied by the Dev's Home App 604 into the Home App Menu 1322 to make it more convenient (it requires fewer screen steps) for the user to navigate to, when he/she needs to use said function.

Chart diagram 4870 and FIG. 49 show the interaction between the handset 102, the Dev 106 and all the appliances—Door Lock 4872, Help Alert 4874, AC/Heat controller 4876, Cable Box/TV 4878, Garage Opener 4880, Sprinkler 4882, Electric Meter 4884, and Door Bell & Intercom 4886 (and the like, such as: Water Meter, Heating and Cooking Gas Meter). It starts at step 4881 when the Dev 106 communicates with the handset 102, after it receives the Home Appliances Connecting command from the handset 102 and after the user executes the feature as shown in screen 4830.

The Dev 106 connects and communicates with the Door Lock step 4883 (also shown as the communication link/medium 4883 in FIG. 49), and receives its software application step 4883A which the Dev 106 also passes its copy to the handset step 4883B, showing in the form of the icon 4854 (DA).

The Dev 106 connects and communicates with the Help Alert step 4885 (also shown as the communication link/medium 4885 in FIG. 49), and receives its software application step 4885A which the Dev 106 also passes its copy to the handset step 4885B, showing in the form of the icon 4856 (HA).

The Dev 106 connects and communicates with the AC/Heat controller step 4887 (also shown as the communication link/medium 4887 in FIG. 49), and receives its software application step 4887A which the Dev 106 also passes its copy to the handset step 4887B, showing in the form of the icon 4858 (AA).

The Dev 106 connects and communicates with the Cable Box/TV step 4889 (also shown as the communication link/medium 4889 in FIG. 49), and receives its software application step 4889A which the Dev 106 also passes its copy to the handset step 4889B, showing in the form of the icon 4860 (CA).

The Dev 106 connects and communicates with the Garage Opener step 4891 (also shown as the communication link/medium 4891 in FIG. 49), and receives its software application step 4891A which the Dev 106 also passes its copy to the handset step 4891B, showing in the form of the icon 4862 (GA).

The Dev 106 connects and communicates with the Sprinkler step 4893 (also shown as the communication link/medium 4893 in FIG. 49), and receives its software application step 4893A which the Dev 106 also passes its copy to the handset step 4893B, showing in the form of the icon 4864 (SA).

The Dev 106 connects and communicates with the Electric Meter step 4895 (also shown as the communication link/medium 4895 in FIG. 49), and receives its software application step 4895A which the Dev 106 also passes its copy to the handset step 4895B, showing in the form of the icon 4866 (EA).

It is preferably that the Electric Meter 4884 is embedded or equipped with an identifier (such as S/N, location address) in its communication with any wireless device and also during the Dev's home appliances discovery phase (not shown in screen 4810) so it can be distinguished by the user from the ones of his/her neighbors.

The Dev 106 connects and communicates with the Door Bell & Intercom step 4897 (also shown as the communication link/medium 4897 in FIG. 49), and receives its software application step 4897A which the Dev 106 also passes its copy to the handset step 4897B, showing in the form of the icon 4868 (BA).

The communication medium, in this case, between the Dev 106 and the appliances (Door Lock 4872, Help Alert 4874, AC/Heat controller 4876, Cable Box/TV 4878, Garage Opener 4880, Sprinkler 4882, Electric Meter 4884, and Door Bell & Intercom 4886), is in SRC (Short Range Communication) network 104; while the communication between the Dev 106 and the handset 102 can be either through SRC or cellular network 118.

Alternatively, the software applications which were transmitted previously from the household appliances to the Dev 106 and to the handset 102 (in graph 4870), such as: Icons: DA 4854, HA 4856, AA 4858, CA 4860, GA 4862, SA 4864, EA 4866, and BA 4868 preferably can be the URLs (app download address links or hyperlinks), which the user then uses to download the appropriate online applications into his/her handset 102, which then transmits them to the Dev 106.

The user can also download the household applications online, using App Download icon 4809/4875 on handset display screen 4802/4851.

Similarly identical steps preferably can be applied to the Integrated Smart Pet Door 6196 (its Door 6190, Speakers 6192, and Cameras 6194), the Private Cloud 4904 and a plurality of other household appliances/equipments, by the handset via the Dev 106, to discover and connect to said appliances/equipments, and receive the applications or hyperlinks from these devices. The handset user then will be able to program, control, and monitor these household appliances/equipments via his/her handset 102.

Figure 50:
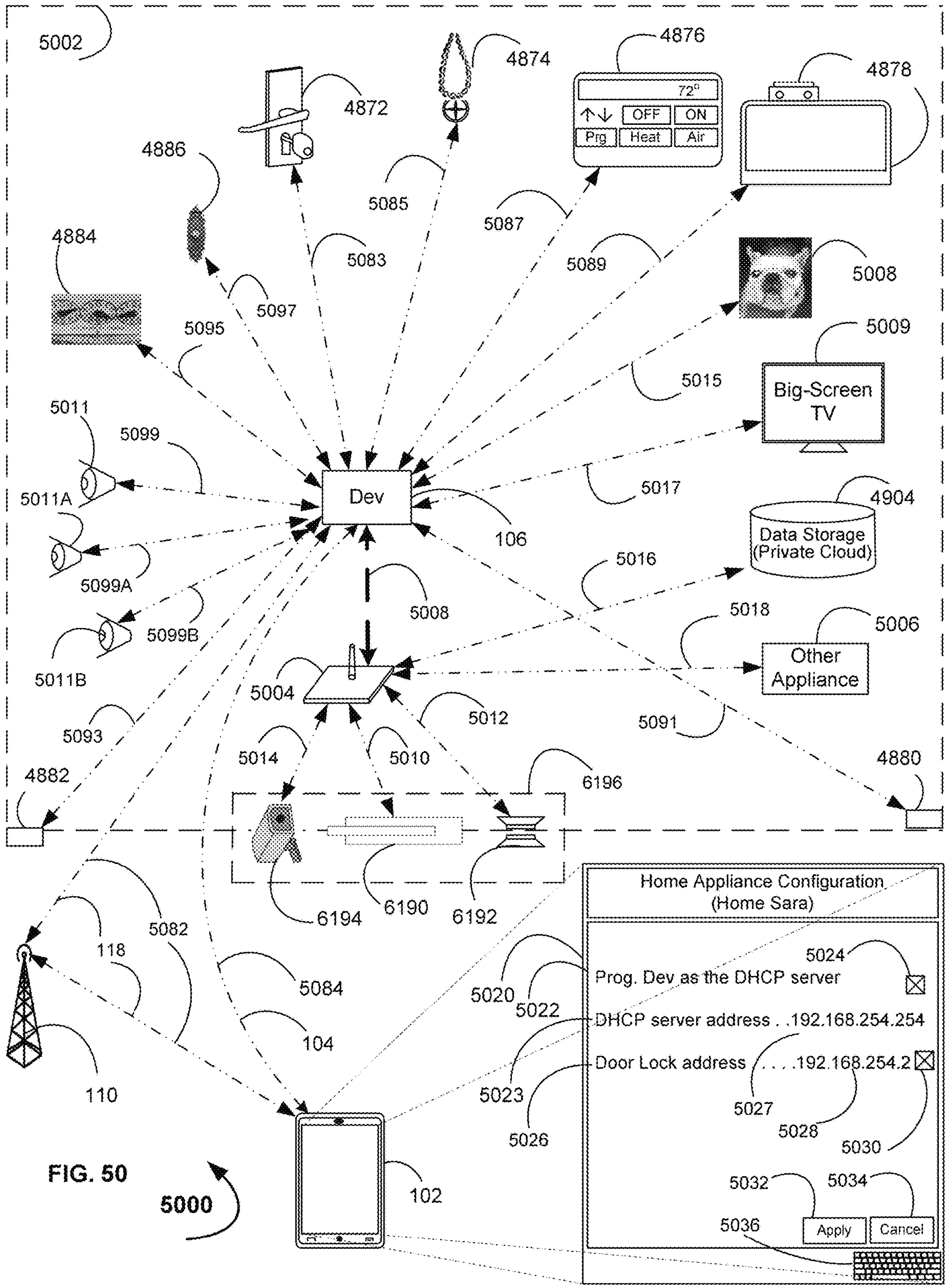
FIG. 50 shows a preferred example of the Dev and its household appliances are being configured to form a private wired/wireless LAN network.

FIG. 50 illustrates a preferred application example of embodiments 5000 of the present invention in a private (closed) wired/wireless LAN (Local Area Network) network. The exemplary embodiment 5000 presents preferred steps taken by a user in his/her handset, by executing the Home Appliance Configuration icon 1373 (in the Home Dev Facility Menu 1350 of FIG. 13), in order to configure the Dev 106 as a DHCP server (as shown in line 5022 by checking box 5024) and its household appliances or premises equipment (Door Lock 4872, Help Alert 4874, AC/Heat controller 4876, Cable Box/TV 4878, Garage Opener 4880, Sprinkler 4882, Electric Meter 4884, and Door Bell & Intercom 4886, Integrated Smart Pet Door 6196 [its Door 6190, Speakers 6192, and Cameras 6194], Digital Dog 5008, Big-Screen TV 5009, Private Cloud 4904, sensors/detectors (5011, 5011A & 5011B) and Other Appliance 5006 which can be a servicing robot, a dishwasher, a stove, a wine cellar, a solar water heater, a swimming pool heater, a refrigerator, a washing machine, a clothing dryer, main water valve shutoff or the like) as clients/hosts.

The hub extender 5004 extends the wireless connection 5008 to the Dev 106, allowing the Dev 106 better wireless coverage of the appliances, in this example, such as: Integrated Smart Pet Door 6196, Private Cloud 4904 and Other Appliance 5006 which are at the harder to reach areas of the Dev's wireless LAN network generated by the Wired/wireless Switch/Router 280 in FIG. 2/3/4. The Wired/wireless Switch/Router 280 (shown in FIG. 2/3/4 as a separate entity) is used by the Dev 106 (via its LAN connector 253*b*) as its communication hub connecting/communicating (to all the Dev's household appliances or premises equipment) through its wireless LAN transmission. The Wired/wireless Switch/Router 280 can also be incorporated alternatively as internal component of the Dev 106. Not shown in FIG. 50 are Switches/Routers and some other devices in order for the ease of the presentation.

The execution of Home Appliance Configuration icon 1373 (FIG. 13) makes the Dev's DHCP & Web-Server layer (519/619 of FIG. 5/6) execute its function configuring the Dev as a Dynamic Host Configuration Protocol (DHCP) server which will assign its available IP addresses dynamically to the household appliances or premises equipment as soon as one of them is powered on and connected to its LAN network (device provisioning). The detailed description and their protocols (DHCPv4/DHCPv6) are beyond the scope of this invention as they are available online (refer to RFC 1541/3315—Dynamic Host Configuration Protocol for IPv4/IPv6 for more information) and are also known to those of ordinary skill in the art. A brief DHCPv4 description of the process known as DORA (Discovery, Offer, Request and Acknowledge) followed by a brief DHCPv6 of how the Dev and its household appliances is given below in order to have a picture of how a server (Dev) and its clients (household appliances) interact during this (provisioning) process. In this example, Door Lock (DHCP host/client) 4872 broadcasts its DHCPDISCOVERY message 5083 (containing at least its MAC (Media Access Control) address as soon as it is powered on) to the DHCP server. The Dev 106 (DHCP server) responds its DHCPOFFER message 5083 (actually responds by broadcasting as indicated by signals: 5083, 5085, 5087, 5089, 5091, 5093, 5095, 5097, 5015, 5017 and 5008) with at least the DHCP server's IP address i.e., 192.168.254.254 (shown in 5027 of handset screen 5020) and one or more of its DHCP parameters (i.e., client's MAC address, its offering IP address, Subnet mask, Lease Duration, Standard gateway, Proxy configuration and the likes). The Dev also transmits (via either cellular network 118/5082 or SRC network 104/5084) its server and client IP addresses (5027 and 5028) to the user's handset as shown on its screen 5020. The Door Lock 4872 (DHCP client) broadcasts a DHCPREQUEST message 5083 indicating it selecting the Dev as its DHCP server by specifying the server identifier (typical IP address of the server, i.e., 192.168.254.254). The Dev then responds by sending a DHCPACK message 5083 granting the connection (lease) to the client (Door Lock) 4872 with the lease information containing at least the Door Lock leased IP address i.e., 192.168.254.2 (5028) or any other configuration information that the client (Door Lock 4872) might have requested. Handset screen 5020 presents IP addresses 252.168.254.254 (5027) and 252.168.254.2 (5028) in IPv4 format for ease of this example presentation.

In the Host Configuration Protocol v6 (DHCPv6) example, Door Lock (DHCPv6 host/client) 4872 sends a Solicit message 5083 to locate DHCP servers. In response, the Dev (DHCP server) 106 sends an Advertise message 5083 to indicate that it is available for DHCP service. Door Lock 4872 sends a Request message 5083 to request configuration parameters, including at least an IP (Internet Protocol) address from the Dev (DHCP server). Finally, the Dev (DHCP server) 106 sends a Reply message 5083 containing assigned IP addresses and configuration parameters to the Door Lock. There are potential two more messages from the DHCP client to the DHCP server such as: Renew message to extend the lifetime on its assigned IP address from the Dev and Rebind message (not applicable in the invention) to extend the lifetime on its assigned IP address from any available server.

The Dev 106 also supports Static IP addressing as well as the Internet of Things (IoT), Internet Plus and Industry 4.0. Similarly, other devices (Help Alert 4874, AC/Heat controller 4876, Cable Box/TV 4878, Garage Opener 4880, Sprinkler 4882, Electric Meter 4884, Door Bell & Intercom 4886, Integrated Smart Pet Door 6196 [its Door 6190, Speakers 6192, and Cameras 6194], Digital Dog 5008, Big-Screen TV 5009, Private Cloud 4904, sensors/detectors [5011, 5011A & 5011B] and Other Appliance 5006) preferably, when powered up, will broadcast their IP address requests and receive their IP addresses by the Dev (not repeating here for ease of presentation). The Dev, functioning as a Dynamic Host Configuration Protocol (DHCP) servers and its household appliances or premises equipment in home application (or vehicle equipment accessories in auto application) functioning as DHCP hosts/clients, offer a webpage-like interface between the Dev 106 (server) and its hosts/clients in a closed-loop LAN or "Private WIFI Network" as are well known to those of ordinary skill in the art.

By functioning as a DHCP server or web server, the Dev 106 frees the owner from having to have an Internet connection and thus not having to pay extra for said service. In other words, no Internet connection is necessary. Communication between the Dev and one or more of its household devices or office/business/commercial/industrial equipment (or vehicle equipment accessories in auto application), in other words, its Connected Devices or "Connected Devices", is through the private LAN network or SRC (i.e. WIFI) network and therefore shields these devices from being breached by unwanted guests (via the Internet or public WIFI). Communication between the Dev and one or more of its registered handsets 102 is via the cellular network (with its encrypted and dynamic MSK embedded in the communication data control stream) and thus allows the user to communicate, control and monitor these Connected Devices only via the said Dev. This architecture increases the level of security/protection and offers better alternative than the technology currently on the market where unwanted users can breach the Control and Monitor System (via the Internet) just by having its correct user ID and password.

Figure 51:
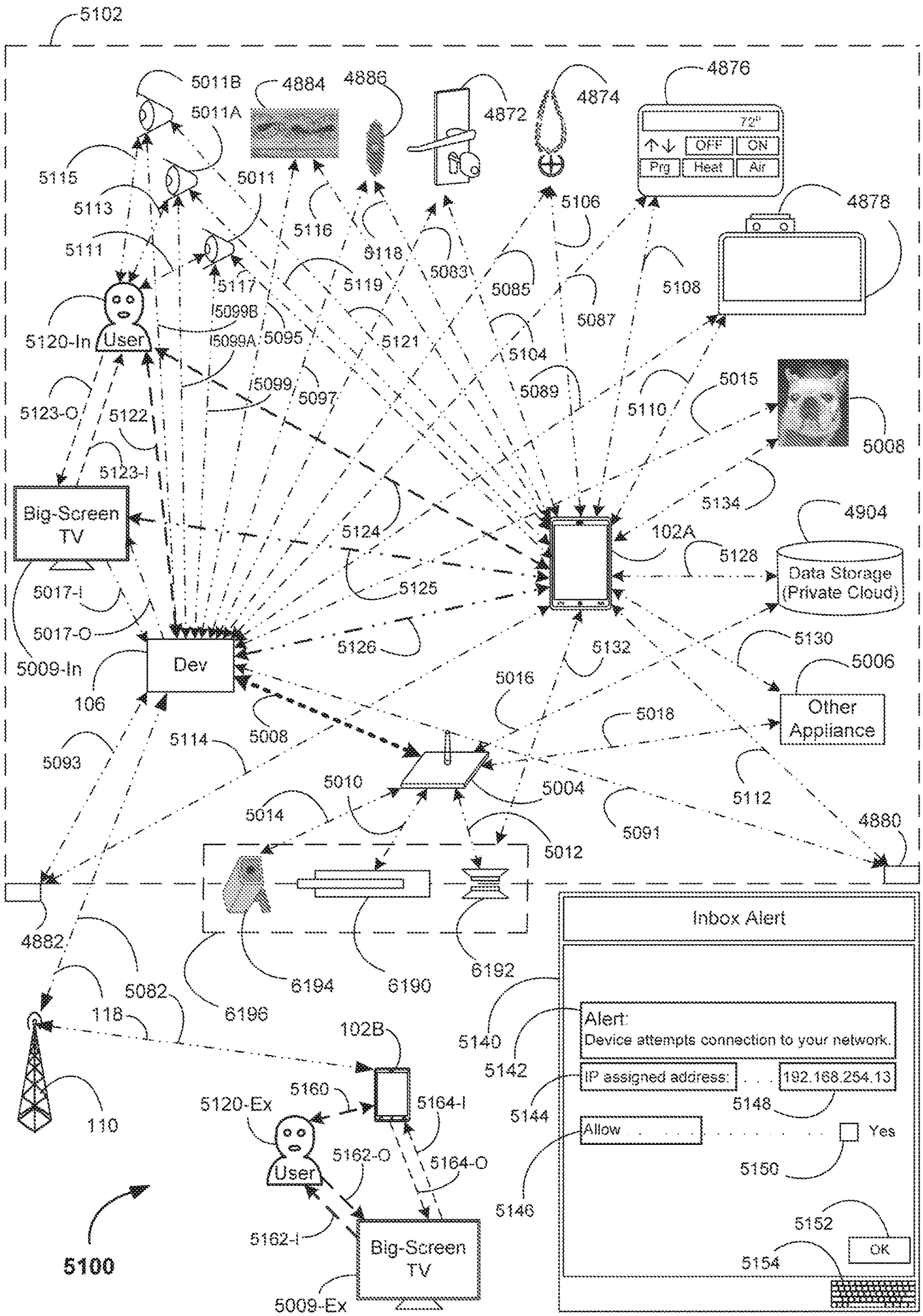
FIG. 51 shows a preferred example of the communication between the Dev, the User, the handset and the plurality of the household appliances within its private wired/wireless LAN network along with a separate alert from the Dev to the user's handset when an device attempts to connect the Dev's network, relating to the present invention in the home application.

The Dev 106 (in FIG. 51), functioning like a web server, allows its owner/user the ability to go online (similarly acting like an internet hot spot but offers a much bigger size, real electrical power supply, higher data bandwidth and more powerful antenna along with a faster network adapter [both cellular and SRC] resulting in wider and faster coverage to its Connected Devices, since unlike the smart phones or Smartphones, the Dev not being constrained by the smart phones or smartphones with their smaller, thinner physical size, limited physical container, rechargeable battery power, tiny hidden antenna thus its "passive" WIFI range and the plurality of their added communication and interfacing activities), via at least one of its Connected Devices (i.e. PC, notepad, Internet-capable TV/displays, video/audio input/output devices [i.e. microphones, speakers] and the likes), doing his/her daily work/needs and or entertainment such as: Internet browsing, online gaming, video/media messaging (i.e. Whatsapp by WhatsApp Inc., Wechat by Tencent Holdings Limited, etc.), "video calling/conference calling" (resulting in bigger, clearer and realistic real-size image on a flat-screen TV (i.e. video/audio-capable devices or Communication Devices: Big-Screen TV 5009—In equipped with video/audio and touch-screen input/output capability), streaming media (i.e. including video and music) and the likes. All these communication tasks are initiated by the Dev's owner/user by executing the appropriate command/status icons on one of its (Dev) Communication Devices's screen display (i.e. Big-Screen TV 5009-In, PC 1321 of FIG. 13) or on one of its registered handsets (i.e. Handset 102A) resulting in all its corresponding commands/statuses and data being communicated (transmitted and received) via the Dev's Cellular Internet (link 118/5082) connection. The owner/user (5120-In) executes said command/status either through (Connected Device, i.e. Big-Screen TV 5009-In) touch-screen command icons (not shown), or hand gesture inputs (decoded by Dev Facial & Gesture Recognition circuitry 275 of FIG. 3) while within its covered vicinity, or remotely via (not shown) a remote controller (links 5123-I and 5123-O) or via his/her Handset 102A (link 5124) which in turn communicates with the Big-Screen TV 5009-In directly via link 5125 or indirectly via link 5126 through the Dev 106 via links 5017I/O as shown (FIG. 51). There is no need for a separate internet connection and thus saving its owner the monthly internet servicing fee to an internet third-party provider. Similarly in the auto application, the backseat passengers in the vehicle can go online, streaming media such as video or music, video calling/conference calling on a flat screen TV (i.e. mounted behind the vehicle front seats); or in the case of a self-driving car, all its occupants will be able to enjoy said technology and its entertainment.

The Dev's Big-Screen TV (5009-In) video calling/conferencing (controlled and decoded by its Video Call/Conf layer block 553/653 of FIG. 5/6) accords the owner a more realistic real-life experience while talking, viewing and interacting remotely in individual or in group (i.e. all members of one family talking remotely to mother/grandma in their living-room setting or a classroom conference call setting with a remote instructor) with others (on the other line) which he/she cannot obtain via his/her current small handset 102 (smart phone) or laptop or desktop PC. Please refer to both FIG. 51 and FIG. 60B (flow diagram 6021) for the following two preferred examples: video call/conference and inter-video/audio commands. One ($1^{st}$) example (the Dev video call/conference command) by its owner/user is when he/she executes, using his/her Handset 102A (FIG. 51/60B), the Video Call/Conf icon 1133/1333 (illustrated in its screen Auto/Home App Menu 1120/1320 of FIG. 11/13) while he/she is either on call with another caller (i.e. Handset 2, block 6023 and step 6027 of FIG. 60B) or before he/she makes (dials) said call (step 6031). Executing Video Call/Conf icon (1133/1333 in FIG. 11/13) makes the Handset 102A transmit (step 6029, FIG. 60B or link 5126, FIG. 51) the video call/conference command to the Dev 106. The Dev then transmits (step 6033, FIG. 60B or link 5126, FIG. 51) back to his/her Handset 102A the icon(s), embedded with its/their own IP address(es) not shown, indicating the available Connected Device(s) or more specific Communication Devices (i.e. video/audio input/output communication and control capable devices such as: TVs, Big-Screen TVs, intelligent displays, microphones, speakers). He/she then selects/picks the icon or one or a plurality of the icons (and executes the Ok icon) making the Handset 102A do either one of the following two actions: 1. The Handset 102A routes (internally or via its Router 280 as shown in FIG. 2/3/4) its connecting call, step 6035 (with the Handset 2 6023) to Big-Screen TV (5009-In FIG. 60B assuming the owner picked said device icon) via its WIFI network (Handset 102A possesses the Big-Screen TV IP address since it obtained said TV IP address from the selected icon: It extracted from the selected icon the selected Big-Screen TV IP address). The Handset 102A cellular communication (step 6037) with Handset 2 (6023) from now on is the video call/conference connection (step 6037-*b*) taking place on the Big-Screen TV (5009-In) being routed (step 6037-*a*) by the Handset 102A via the WIFI network; in other words, the call with Handset 2 (no longer input/output communicated on Handset 102A) is now the video call/conference taking place on the Big-Screen TV (5009-In). 2. The Handset 102A transmits the selected icon(s) chosen by the owner/user (with its/their embedded IP address/addresses where the video call/conference takes place) back to the Dev 106 (step 6039, FIG. 60B or 5126, FIG. 51). The Handset 102A then transfers the connecting call (with Handset 2) to the Dev 106 by transmitting/signaling (i.e. call transfer not shown) to the Service Provider 112 (as supported and provided by the current cellular technology, as are known to those of ordinary skill in the art) making the Handset 102A communication (connection 6035) with Handset 2 (6023) from then on, transfer to the Dev 106. The Dev 106 then communicates/connects (4041) with Handset 2 (6023) by routing (step 4041-*a*; routing either internally or via its Router 280 as shown in FIG. 2/3/4) its cellular connection, i.e. communication data (step 4041) to and from (via its WIFI or WLAN network) to the Big-Screen TV (5009-In FIG. 60B) as the video call/conference (step 4041-*b*) communication. From then on, the user is able to video conference with Handset 2 owner (6023) via his/her Big-Screen TV (5009-In). Step 6035 (connected call between Handset 102A and Handset 2) is to indicates the continuation of call 6027 or the result of the calling/dialing (step 6031) from Handset 102A to Handset 2. The Dev also supports additional added outside callers and any of its available Communication Devices which can be brought onboard during any of its video call/conference in session via one of said device's touch-screen/keyboard/keypad inputs or via Handset 102A (not shown).

Optionally, the owner is able to execute the Video Call/Conf command via one of the Dev's Communication Devices (i.e. TV2 6025) and lets the Dev 106 (in place of his/her Handset 102A) make and connect the call to the outside party (i.e. User2 or Handset 2 6023) as illustrated in flow diagram 6043. The owner, in this illustration via TV2 (6025) browses through its menu (its screen menu interaction and the result back and forth communication: commands and responses between TV2 and Dev 106, will all be represented by step 6045 for ease of presentation and with no screen graphic representation) making TV2 communicate with the Dev 106 and then receives from it the Home App Menu (similarly as illustrated in Screen 1320 of FIG. 13). He/she then executes the Video Call/Conference icon to start the command. TV2 then transmits the command to Dev 106 and receives back the Big-Screen TV 5009-In icon along with the (fill-out call phone number) buttons where the owner then fills in at least with one call number, i.e. Handset 2 number (or a plurality of phone number in case of several external calls) and with the Big-Screen TV 5009-In icon "not selecting" in the Video Call/Conference and then executes the "Ok" icon making TV2 transmit its request to the Dev 106 (end of step 6045). The Dev 106 then makes the call (i.e. dials) to Handset 2 (step 6047). Finally the call/conference connects to (step S049) to the Handset 2 (6043) and its communication is directed and routed in/out (step S049*a*) by the Dev 106 to/from TV2 on the Dev's WIFI network (connection—step S049*b*). The Dev also supports additional added outside callers and additional available Communication Devices which can be brought onboard during any of its video call/conference in session (not shown).

The other one ($2^{nd}$) example (the Dev inter-video/audio command) is when the owner would like, using the Dev's inter-video/audio command (controlled and decoded by its Inter-video/audio layer 649 of FIG. 6), to communicate within its Communication Devices within member(s) of his/her family or monitor other video/audio input/output via his/her handset 102 or via one of its Communication Devices, i.e. Big-Screen TV (5009-In) while he/she is within the Dev vicinity (his/her house). The owner/user either executes, using his/her Handset 102A, the Inter-video/audio icon 1331 (Handset screen Home App Menu 1320 of FIG. 13) making the Handset 102A (in flow diagram 6081) transmit said command (step 6085) to the Dev 106 and receives from the Dev 106 the icons (indicating the available Communication Devices; i.e. conference-capable devices: video displays, microphones, speakers and the likes). The owner/user then selects the icons for the inter-video/audio (inter-monitoring) and executes the (Ok icon) command making the Handset 102A transmit (step 6085) said information back to the Dev 106. The Dev 106 from then on connects, directs and manages all said inter-video/audio communication with said selected devices (assuming Big-Screen TV (5009-In), TV2 (6025) and TV3 (6083) are chosen for this example). From then on, the owner can control, view and talk/listen (flows 6095 and 6099) at one device (i.e. Big-Screen TV) to/from the other two devices: TV2 (6025) and TV3 (6083) while the second member can control, view and talk/listen (flows 6095 and 6097) at the $2^{nd}$ device (TV2) to/from the other two devices: Big-Screen TV (5009-In) and TV3 (6083) while the third member can control, view and talk/listen (flows 6097 and 6099) at the $3^{rd}$ device (TV3) to/from the other two devices: Big-Screen TV (5009-In) and TV2 (6025). The inter-video/audio communication (flows 6095, 6097 and 6099) between these Three Devices (Big-Screen TV—5009—In, TV2—6025 and TV3—6083) is better presented by flows 6089, 6091 and 6093 since it (the communication) is actually received by the Dev 106 (from Three Devices) and routed (to Three Devices) by the Dev 106 via its WIFI network during the inter-video/audio communication. In other words, the Dev 106 controls and executes the commands (from Three Devices) while also directs (routes internally or via its Router 280 in FIG. 2/3/4) their input/output communication data within its WIFI network. The owner is also either able to start the inter-video/audio communication (or inter-monitoring) by executing said command via one of the Dev 106's Communication Devices (video display device via its touch-screen input, i.e. input of the Big-Screen TV 5009-In) making said display device transmit (step 6087) said command to the Dev 106. The communication (step 6087) between Big-Screen TV and the Dev 106 allows the owner to control and choose (on the Big-Screen TV screen display) which Communication Devices for said the inter-video/audio communication by marking/checking the received icons and he/she then executes the related inter-video/audio command. From then on, assuming Big-Screen TV (5009-In), TV2 (6025) and TV3 (6083) are chosen for this example, the inter-video/audio communication and its control (illustrated by flows 6095, 6097 and 6099 or better by flows 6089, 6091 and 6093) take place within these Three Devices within the Dev's WIFI network controlled, responded and routed (routed internally or via its Router 280) by the Dev.

Furthermore, not having its "Connected Devices" (i.e., its associated household appliances/office equipments or auto accessories) connecting/communicating directly to the Internet (normally serviced by their product servers as provided by the current technology) will protect the owner's/user's private information from being breached, viewed, distributed, and or in possession (stored) by third-party vendors. The Dev is therefore the only device (acting like the exclusive gatekeeper) between its registered handsets and its "Connected Devices"—programming, controlling, monitoring, directing, routing, viewing, retrieving and storing its owner/user private information in its respective storage (Data Storage 4904, FIGS. 59, 60 and 61) allowing its owner/user total control of his/her personal data.

Static IP addressing demands more effort because it requires human intervention but it provides better protection against network security problem than dynamic IP addressing does during provisioning. The user does this by executing Static IP addressing icon 1171/1371 in Auto/Home Dev Facility Menu 1150/1350 of FIG. 11/13 making the handset 102 transmit the command to the Dev 106. The Dev 106 verifies and processes said command, then transmits back the IP-address map (not shown) to his/her handset, showing its IP address availability where the user picks and checkmarks which available IP address for which appliance (i.e., household appliances in home application or vehicle equipment accessories in auto application; let's say Appliance A in this case), The user then executes the Confirm icon (not shown), which makes the handset 102 transmit the confirmation back to the Dev 106, which processes and executes said command and information. The Dev then transmits a command (i.e., ping command, for instance) via said IP address to Appliance A and waits for a response for testing purpose. The Dev will transmit to the user's handset the success response if it receives a response from Appliance A within its timeout period. If the Dev does not, it will transmit to the user's handset a response asking the user to verify if the assigned static IP address to the appliance (Appliance A) matches the selected one. It is also preferable that the Dev 106 generates and transmits a unique dynamic MSK to each one of its appliances during this provisioning and it will be embedded in subsequent communication between the Dev 106 and said appliance in order to prevent unwanted devices from masquerading as legitimate Connected Device in order to breach the Dev's private appliance network.

The Digital Dog 5008 is actually one or plurality of wired/wireless speakers receiving commands from the Dev 106 in order to provide a real dog barking sounds to scare off potential prowler(s). The user can turn the Digital Dog 5008 on or off by toggling the handset's Digital Dog icon 1347 with the EN 1347*a* (in Home App Menu 1322 of FIG. 13) indicating it is enabled or DIS (not shown) as disabled. The user can also make the Digital Dog 5008 bark when executing Digital Dog Bark icon 1339. As soon as the Dev senses (via its smart Gesture, video Sensors 321 of FIG. 3) somebody within its peripheral or knocking/ringing the door/doorbell, it will transmit the barking commands to the Digital Dog 5008, which outputs a burst of real dog barking sounds, which vary (randomly to mimic sounds of a real dog) depending on the numeric values of each command. The barking command (transmitted by the Dev 106 to the Digital Dog 5008) can consist of data whose values indicate its intensity, frequency, pitch and duration. If more than one speaker is used, the Dev 106 will simulate that the dog is running around the house while barking and generate the barking intensity in order to impersonate that of a real big dog. The Dev also transmits the alerts and any affected movement recorded by its video inputs to the handset(s) of its users. It also connects the audio communication with its user's handset so he/she can inquire about the unexpected presence.

Similarly, in the auto application, the vehicle external devices preferably can be configured and each accessory or sensor such as: wire/wireless Cameras 216 and Smart Motion Sensors 221 of FIG. 2, Smart Motion Video Sensors (blocks 3416, 3418, 3420 and 3422, of FIG. 34), Audio Sensors (3424 of FIG. 34), Facial Recognition Cameras (3426, 3428 and 3430 of FIG. 34), Built-in vehicle scale (4242C of FIG. 42C), Other Auto Accessory Interface and the likes can be assigned a static IP (or a dynamic IP) accordingly.

FIG. 51 illustrates a preferred application example of embodiments 5100 of the present invention. The exemplary embodiment 5100 presents the interaction between the Dev 106, the User (5120-In) and his/her handset 102A when the latter two are within the Dev's wireless range coverage (i.e., "the User 5120-In" inside his/her home). The User (5120-In) either utilizes the handset 102A, via its screen display inputs, to communicate with the household/premises devices (Door Lock 4872, Help Alert 4874, AC/Heat controller 4876, Cable Box/TV 4878, Garage Opener 4880, Sprinkler 4882, Electric Meter 4884, Door Bell & Intercom 4886, Integrated Smart Pet Door 6196 [its Door 6190, Speakers 6192, and Cameras 6194], Digital Dog 5008, Big-Screen TV (5009-In), Private Cloud 4904, sensors/detectors [5011, 5011A & 5011B] and Other Appliance 5006) via the Dev 106 with its wireless LAN communication link 5126.

The User (5120-In) utilizes his/her voice, talking (link 5124) directly to the handset 102A which communicates with the Dev 106 (controlled and decoded by its Voice Recognition layer block 625 in FIG. 6) via its wireless LAN communication link 5126, in order to control and monitor his/her household/premises devices (i.e., link 5083 to Door Lock 4872, link 5085 to Help Alert 4874, link 5087 to AC/Heat controller 4876, link 5089 to Cable Box/TV 4878, link 5091 to Garage Opener 4880, link 5093 to Sprinkler 4882, link 5095 to Electric Meter 4884, link 5097 to Door Bell & Intercom 4886, link 5008 with 5010, 5012 and 5014 to Integrated Smart Pet Door 6196 [its Door 6190, Speakers 6192, and Cameras 6194], link 5015 to Digital Dog 5008, link 5008 with 5116 to Private Cloud 4904 and link 5008 with 5118 to Other Appliance 5006).

The handset can also communicate separately and directly to each one of these household/premises devices (without via the Dev) as shown via wired/wireless or combination of wired and wireless LAN communication links 5104 to Door Lock 4872, 5106 to Help Alert 4874, 5108 to AC/Heat controller 4876, 5110 to Cable Box/TV 4878, 5112 to Garage Opener 4880, 5114 to Sprinkler 4882, 5116 to Electric Meter 4884, 5118 to Door Bell & Intercom 4886, 5134 to Digital Dog 5008, 5128 to Private Cloud 4904, 5130 to Other Appliance 5006 and 5132 to Integrated Smart Pet Door 6196.

The User (5120-In) can also communicate directly to the Dev 106 (as long as his/her registered handset is in the vicinity or his/her biometric features, i.e., facial and or fingerprint inputs, have been verified by the Dev 106 through one of its video inputs 216/312 of FIG. 2/3, by its Biometrics layer 627 of FIG. 6, against its stored biometrical data) via its HF Speaker microphone & voice activated Circuitry (block 230 of FIG. 2/3/4) as shown via voice commands 5122 whose inputs to the Dev are decoded by its Hands-Free Audio I/O & voice-activated layer 532/629 and Voice Recognition layer block 525/625 as shown in FIG. 5/6 in order to control and monitor its auto accessory or household/premises devices. One such example is the user (5120-In) speaking 5122 "Dev turn on the TV" to the Dev 106 in order to turn on the Cable Box/TV 4878. The Dev 106 (The voice command 5122 is executed and decoded by the Dev's Voice Recognition layer block 525/625 in FIG. 5/6), in turn, communicates said command 5089 to turn on the TV to the Cable Box/TV 4878. The Dev 106 then communicates 5122 back to the User (5120-In) via its speaker (executed by its Voice Response Synthesizer 557/657 of FIG. 5/6) that the Cable Box/TV 4878 is turned on "The TV is on".

The User 5120-In is also able to communicate with the Dev 106 via a Big-Screen TV (5009-In) preferably with Video, Audio and Touch Screen capability (Link 5023-I/O). The Big-Screen TV (5009-In) acts like a DHCP client to the Dev server 106 as previously presented in FIG. 50 via wired/wireless LAN connection 5017 (5017-I/O). An example is a Big-Screen TV (5009-In) which, located in the user's bedroom/living room, is able to offer him/her a better prospective (because of its big screen display) while interacting/interfacing with the Dev in viewing, controlling and monitoring its household appliances (versus via the handset 102A or versus directly to the Dev 106 via one of its embedded Audio/Video Inputs). As the User starts talking (Link 5123-O) in front of the Big-Screen TV (5009-In), the Big-Screen TV communicates both the user's facial features and voice inputs (Link 5017-I) to the Dev 106 which then verifies, decodes and processes said information. If the user's biometric information is verifiable, the Dev will transmit (Link 5017-O) in audio data message (for example "Hi, I am the Dev. May I help you?") to the Big-Screen TV and a video display presenting the panoramic view and command icons of its monitoring household environment. The user then is able to command the Dev either by speaking to the Big-Screen TV (Link 5023-O), hand/head Gesture or executing its touch-screen command icons. From then on, the Big-Screen TV transmits (Link 5017-I) audio, gesture commands and or command icon inputs from the user, to the Dev 106. The Dev decodes and processes these commands (via Voice Recognition circuitry 279, Facial & Gesture Recognition circuitry 275 of FIG. 3 and executed by Voice Recognition layer 625, Facial & Gesture Recognition layer 651 of FIG. 6) and passes them to its appropriated appliance(s). The Dev then transmits (Link 5017-O) back the statuses and responses from said appliance(s) to the Big-Screen (TV 5009-In) which transmits them via its audio output and displays them via its video output.

The User 5120-Ex (externally away from home) is also able to utilize the handset 102B, far away from home, via its screen display inputs, to communicate with the household/premises devices (Door Lock 4872, Help Alert 4874, AC/Heat controller 4876, Cable Box/TV 4878, Garage Opener 4880, Sprinkler 4882, Electric Meter 4884, Door Bell & Intercom 4886, Integrated Smart Pet Door 6196 [its Door 6190, Speakers 6192, and Cameras 6194], Digital Dog 5008, Private Cloud 4904 and Other Appliance 5006) via the Dev 106 with its cellular communication link 118/5082. Or the User (5120-Ex) utilizes his/her voice, far away from home, talking (link 5160) directly to the handset 102B, in order to communicate with the household/premises devices (Door Lock 4872, Help Alert 4874, AC/Heat controller 4876, Cable Box/TV 4878, Garage Opener 4880, Sprinkler 4882, Electric Meter 4884, Door Bell & Intercom 4886, Integrated Smart Pet Door 6196 [its Door 6190, Speakers 6192, and Cameras 6194], Digital Dog 5008, Private Cloud 4904 and Other Appliance 5006) via the Dev 106 with its cellular communication link 118/5082. This feature thus lets the user communicate and control all the household devices (premises equipment) or household Internet of Things (IoT) via a single device (his/her handset) screen inputs or its voice command inputs remotely from any place.

The User 5120-Ex (when away from home) is also able to communicate with the Dev 106 via a Big-Screen TV (5009-Ex) preferably (Link 5162-I/O) with Video, Audio and Touch Screen capability (i.e., in a motel room) which allows the user to give audio, hand/head motion and or touch-screen commands to the Dev via said Big-Screen TV (5009-Ex). The TV is mirrored via its connection (i.e., USB C-to-HDMI cable 5164 (5164-I & 5164-O); USB stands for "Universal Serial Bus" and HDMI is for "High-Definition Multimedia Interface") from his/her handset 102B which is able to generate said mirror when it detects the connection or else when he/she executes the Mirror TV icon (1335 of the Home App menu 1322 of FIG. 13) which will make said handset 102B mirror its screen on said Big-Screen TV (5009-Ex). The handset 102B then will direct the commands, statuses, responses and data flows between these two devices (Big-screen TV and the Dev 106). In other words, the handset 102B receives (Link 5164-I) the user's audio or touch-screen commands from the Big-Screen TV (5009-Ex), transmits said commands to the Dev 106 (Link 118) which processes (decodes audio video and data commands via Voice Recognition circuitry 279, Facial & Gesture Recognition circuitry 275 of FIG. 3 and executed by Voice Recognition layer 625, Facial & Gesture Recognition layer 651 of FIG. 6)) and communicates these commands to its appropriate appliance(s). The Dev 106 then communicates back the responses and statuses (Link 118) from its appliance(s) to the handset 102B which transmits (Link 5164-O) the information (either in Audio and or Video forms) to the Big-Screen TV (5009-Ex).

Handset screen 5140 presents inbox Alert 5142 (transmitted by the Dev 106) to the user of an attempt (assigned IP address 192.168.1.13, line 5148) to connect to the Dev's network. It then lets him/her verify if said connection is allowed. It is only allowed after him/her checking box 5150 and then executing Ok button 5152.

The Dev 106 also supports voice recognition (executed by its Voice Recognition layer 525/625 of FIG. 5/6) and allows the user to make change on its default name and the names of its appliances in order to make them more user-friendly and easier to comprehend to its user. The User (5120-In) for instance, is able to change the Dev's default name "Dev" into "Lisa" and any of its appliances to more descriptive names to make them easier and more specific to remember (i.e., Entry or Dining Light instead of Light #1 or Light #2). The following table contains preferred samples of Dev input voice commands in column I (Question inputs from the user=>Qx=Question x) and their corresponding responses in column II (outputs from the Dev=>Ax=Answer x). The explanation follows the table.

TABLE 1

List of examples of Dev Voice Commands and its Responses.

| Column I. Voice Input Commands (from user) | Column II. Voice Output Responses (from Dev) |
|---|---|
| Q1. "Dev" Hi! | A1. Hi! |
| Q2. What do you do? | A2. ? |
| Q3. "Dev" What do you do? | A3. I control and monitor your house/business premises. |
| Q3a. "Dev" What do you control? | A3a. I control and monitor your house/business premises. |
| Q4. "Dev" List Appliances you control? | A4. I have "Appliance #1", "Appliance #2" and "Appliance #3". |
| Q4a. "Dev" Your Appliances? | A4a. I have "Appliance #1", "Appliance #2" and "Appliance #3". |
| Q4b. "Dev" What are your Appliances? | A4b. I have "Appliance #1", "Appliance #2" and "Appliance #3". |
| Q4c. "Dev" What do you have? | A4c. I have "Appliance #1", "Appliance #2" and "Appliance #3". |
| Q5. "Dev" status of "Appliance #1". | A5. "Appliance #1" is locked. |
| Q6. "Dev" unlock "Appliance #1". | A6. "Appliance #1" is now unlocked. |
| Q7. "Dev" change "Dev" to "Lisa". | A7. You want to change Dev to Lisa. |
| Q8. Yes/"Dev" yes. | A8. "Dev" is now "Lisa". |
| Q9. "Dev" Hi! | A9. ? |

TABLE 1-continued

List of examples of Dev Voice Commands and its Responses.

| Column I. Voice Input Commands (from user) | Column II. Voice Output Responses (from Dev) |
|---|---|
| Q10. "Lisa" Hi! | A10. Hi! |
| Q11. "Lisa" change "Appliance #1" to "Entry Door". | A11. "Appliance #1" is now "Entry Door". |
| Q12. "Lisa" change "Appliance #2" to "Dining Room light". | A12. "Appliance #2" is now "Dining Room Light". |
| Q13. "Lisa" change "Appliance #3" to "Thermostat" | A13. "Appliance #3" is now "Thermostat". |
| Q14. "Lisa" turn "Dining Room Light" on. | A14. Dining Room Light is now on. |
| Q15. "Lisa" status of "Appliance #2"? | A15. No such appliance! |
| Q16. "Lisa" List appliances you control? | A16. I have "Entry Door", "Dining Room Light" and "Thermostat". |
| Q17. "Lisa" status of "Entry door"? | A17. "Entry Door" is now unlocked. |
| Q18. "Lisa" lock "Entry Door"! | A18. "Entry Door" is now locked. |
| Q19. "Lisa" status of "Thermostat"? | A19. "Thermostat" is off. |
| Q20. "Lisa" set "Thermostat" to 72° F. | A20. "Thermostat" is set to 72° F. |
| Q21. "Lisa" status of all appliances? | A21. "Entry Door" locked, Dining Room Light on and "Thermostat" is set to 72° F. |

Table 1 explanation: Line1: Q1 of column I presents the default Dev's name "Dev" which is the only recognizable default word the Dev will only responds when being addressed to, in the beginning, as is shown in the Dev's answer A1 in column II. Line2: The Dev will not respond to command lacking its name (in order to make sure that it is the intended object being addressed to by the user). Line3 and line3a: show the Dev answering what its function is. Line4, line4a, line4b and line4c: list (various ways) the names of appliances when being asked about them. Line5 and line6: shows the status of appliance #1 before (locked) and after said appliance has been issued unlock command to the Dev (unlocked). Line7 and line8: shows the Dev's name being commanded to change to "Lisa" with a confirmation. Line9 and line10: shows the Dev only responds to the new name "Lisa" and not "Dev". Line11, Line12 and line13: the Dev is commanded to change the names its appliances from "Appliance #1" to "Entry Door", "Appliance #2" to "Dining Room Light" and "Appliance #3" to "Thermostat". Line 14 and line15: the Dev is commanded to turn the Dining Room Light on and verified that the Dining Room Light old name is no longer in use. Line16: the Dev lists the new name of its appliances. Line17 and line18: the Dev lists the Entry Door as being unlocked and it is commanded to lock the Entry Door. Line 19 and line 20: the Dev lists the status of the Thermostat is being off and is commanded to set its temperature to 72° F. Line 21: the Dev lists the status of all of its appliances.

Furthermore, each one of the users has the option, with his/her registered handset in the vicinity or has his/her facial features and or fingerprints inputted into and recognized by the Dev, change (tailor) the name of the Dev per his/her personal liking and still is able to command the Dev in turning on or off the appliances (for example, Lisa for previous user as shown in Table 1, while Debbie is a more preferred name for the second user). The Dev Voice Recognition layer (block 525/625 of FIG. 5/6) is able to be programmed so it only listens to voice of each user in the family (per his/her registered handset) meaning each user has to program the Dev at least once so his/hers is in its Voice Recognition database if he/she so desires. In general, any user can turn the Voice Cmd All icon on (icon 1361*a* of Home Dev Facility Menu 1352 of FIG. 13) so the Dev will listen to the commands from anybody in the case where the user has guests come visiting.

The user preferably has the option to program the Dev, as indicated in the previous paragraphs, in listening/obeying to his/her voice input only in turning on/off the appliances or listening to anybody by turning on the Voice Command All button 1361*a* in FIG. 13. Each user within the family/company is able to program the Dev in changing its name to his/her liking (for example; to Debbie for his/her use while Lisa name is for the previous user as shown in Table 1).

Voice Recognition Record icon 1165/1365 of FIG. 11/13 allows the user to use the Dev to input his/her voice into the Dev Audio input (block 277 of FIG. 2/3) in words, phrases and sentences so its Voice Recognition layer (block 525/625 of FIG. 5/6) is able to recognize his/her voice without his/her having the handset in the vicinity whenever he/she wants to communicate with the Dev. An example is the user executing the Voice Recognition Record icon 1165/1365, and then starting speaking into the Dev's audio input 277 (microphone) per the Dev audio instruction. When everything is finished, he/she executes the Voice Recognition Record icon 1165/1365 again to complete the training and from then on, he/she can command the Dev and there is no need for his/her handset to be nearby. This feature allows the user to unlock his/her car/house amongst other things without having the registered handset in possession. The voice recognition per user is valid as long as his said handset is in use (registered). As soon as said handset is no longer in use or reported lost by the user to the Dev, the Dev will invalidate all said information.

Figure 51A:
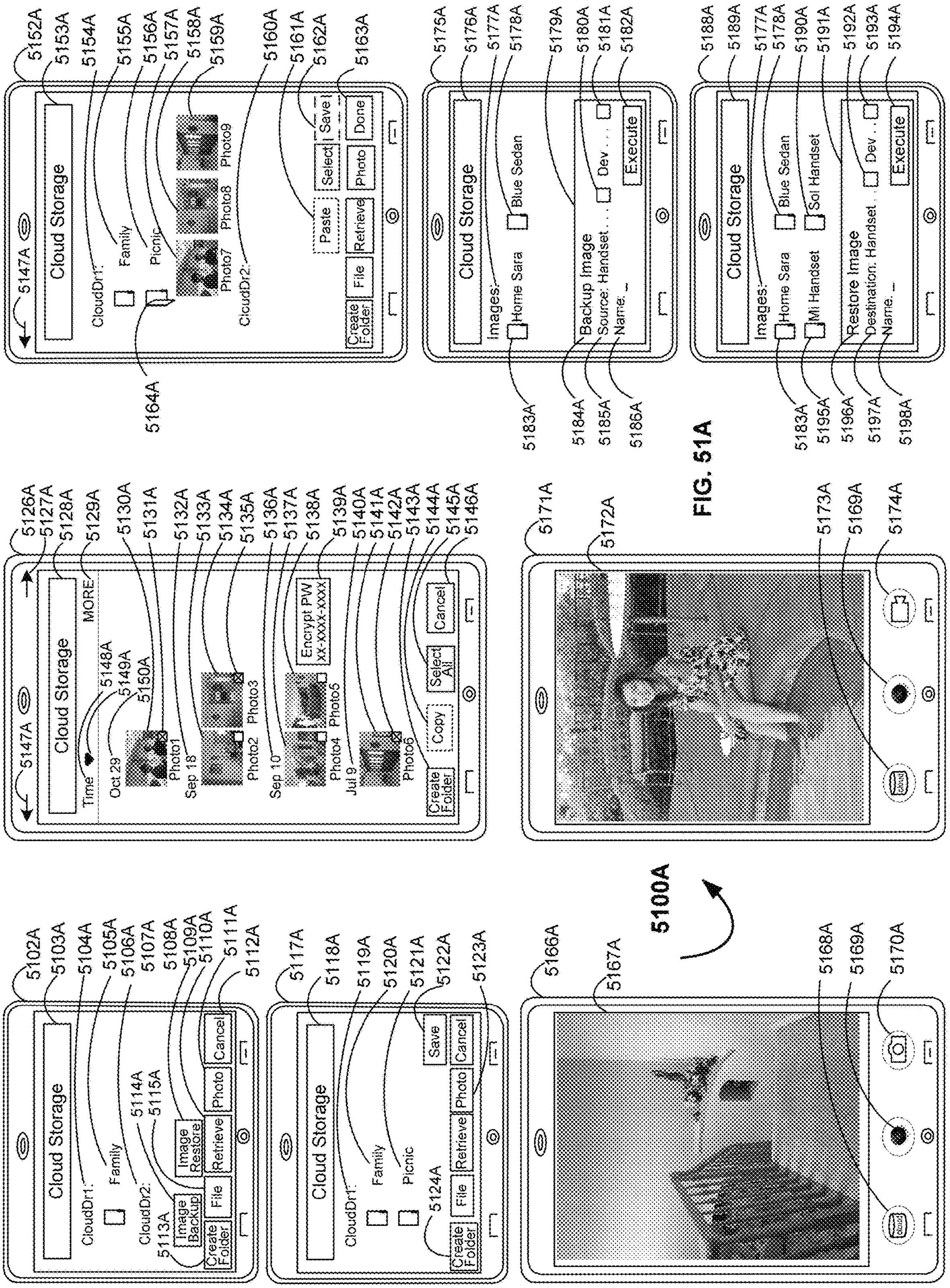
FIG. 51A shows a preferred example of handset's screen displays, interfacing with the Dev's private cloud storage (via its file and directory folders) in order to store or recall photos (files) to or from said private cloud storage. It also shows a photo and a video taken by a handset while being transmitted in real-time to the Dev's private cloud storage, relating to the present invention in the home application.

FIG. 51A illustrates a preferred application example of embodiments 5100A of the present invention. The exemplary embodiment 5100A presents the handset screens (executed by its Cloud Storage App 739B of FIG. 7B) during the interaction between the Dev 106 (executed by its corresponding Cloud Storage App 639 of FIG. 6) and the handset 102 when the user wants to store/transfer photos residing in said handset to his/her Data Storage (Private Cloud 4904 in FIG. 49/50/51). He/she can also store/retrieve other documents such as files, journals, notes to/from his/her Private Cloud 4904. The Cloud Storage icon 1359 of Home Dev Facility Menu 1352 of FIG. 13 allows the user to program the Dev 106 via his/her handset 102 (tablet or any registered device) in order for said handset to have remote access to cloud storage functions. The user does this by executing Cloud Storage icon 1359 making the handset 102 transmit the command to the Dev 106 which responds by transmitting back its cloud storage directory to the handset 102 as shown in its display 5102A. The Cloud Storage directory 5103A shows it consists of two storage drives: CloudDr1 5104A consisting of Family folder 5105A and CloudDr2 5106A as being empty. The Cloud Storage screen 5103A offers functions where the user can create new directory folder by executing Create Folder icon 5113A, load (and search) handset 102 documents by executing File icon 5115A, retrieve directories and documents from the Private Cloud 4904 by executing Retrieve icon 5110A, load (and search) handset 102 photo by executing Photo icon 5111A, backup Dev/Handset images by executing Image Backup icon 5114A and restore Dev/Handset images by executing Image Restore icon 5109A.

In the example, the user creates a new directory folder "Picnic" by executing Create Folder icon 5113A making the handset display a Drop-Down entry (not shown) where he/she enters "Picnic" in order to create said Folder 5121A making the handset 102 navigate to another display as shown in Screen 5117A. The user then saves/transfers the handset photos by executing Photo icon 5123A which makes the cloud storage program load the handset photo album into the handset display as shown in Screen 5126A where the user chooses by selecting/touching photos such as: Photo1 5130A, Photo3 5134A and Photo6 5141A. The user has the option of encrypting these photos with a password with Encrypt PW icon 5139A before executing the Copy icon 5144A which makes the handset navigate to Screen 5152A. Handset Screen 5152A shows the user selecting the Picnic Folder 5164A and then executing Paste icon 5161A in order to store Photo7 5157A, Photo8 5158A and Photo9 5159A in the directory Picnic 5156A. The user then executes the Save icon 5162A making the handset 102 transmit the information and the command to the Dev 106 in order for the Dev 106 to store said information to the Private Cloud 4904.

The Dev also preferably allows the user to store the photo or video being taken by his/her registered handset into the Private Cloud 4904 in real-time as shown in Handset Screen 5166A. The handset's picture is immediately transmitted to the Private Cloud 4904 as the user takes picture (in Photo Mode 5170A) while enabling the Cloud icon 5168A or, as shown in Handset Screen 5171A, when the user runs video (in Video Mode 5174A) while enabling Cloud icon 5173A.

The Dev also preferably allows the user to backup or restore its stored image or of the registered handset's when he/she executes the Handset's Image Backup icon 5114A or Image Restore icon 5109A in Screen 5102A. Executing Image Backup icon 5114A will make the handset 102 transmit the command to the Dev which transmits back the stored images on its Cloud Storage as shown in Handset Screen 5175A where Images of Home Sara 5183A and Auto Blue Sedan 5178A already had been backed up. In this case, the user is asked to fill out if the Backup Image (Source 5185A) is either of the Handset (by checking Box 5180A) or of the Dev (by checking Box 5181A). The user also has to give the Backup Image a Name 5186A (by filling the blank). After the required information is finished, pushing the Execute icon 5182A will make the handset 102 transmit the command to the Dev. The Dev either communicates with and then stores its image to the Cloud Storage (Source Dev box 5181A) or it communicates with the handset and receives the handset's image and then stores it to the Cloud Storage (Source Handset box 5180A).

Executing Image Restore icon 5109A will make the handset 102 transmit the command to the Dev which transmits back the stored images on its Cloud Storage as shown in Handset Screen 5189A where Images of Home Sara 5183A, Auto Blue Sedan 5178A, Mi Handset 5195A and Sol Handset 5190A already had been backed up. In this case, the user is asked to fill out where to restore the image (Destination 5196A) is either to the Handset (by checking Box 5192A) or to the Dev (by checking Box 5193A). The user either fills out the name 5198A or by touching one of the Backup icons (5183A, 5178A, 5195A and 5190A) will make the handset fill out the Image Name 5198A. Executing Execute icon 5194A will make the handset transmit the command to the Dev. The Dev either communicates with and then retrieve the chosen image from the Cloud Storage and either restore its own image (Destination Dev box 5193A) or it communicates with the handset and transmits said image to the handset which then restores its own image (Destination Handset box 5192A).

Figure 52:
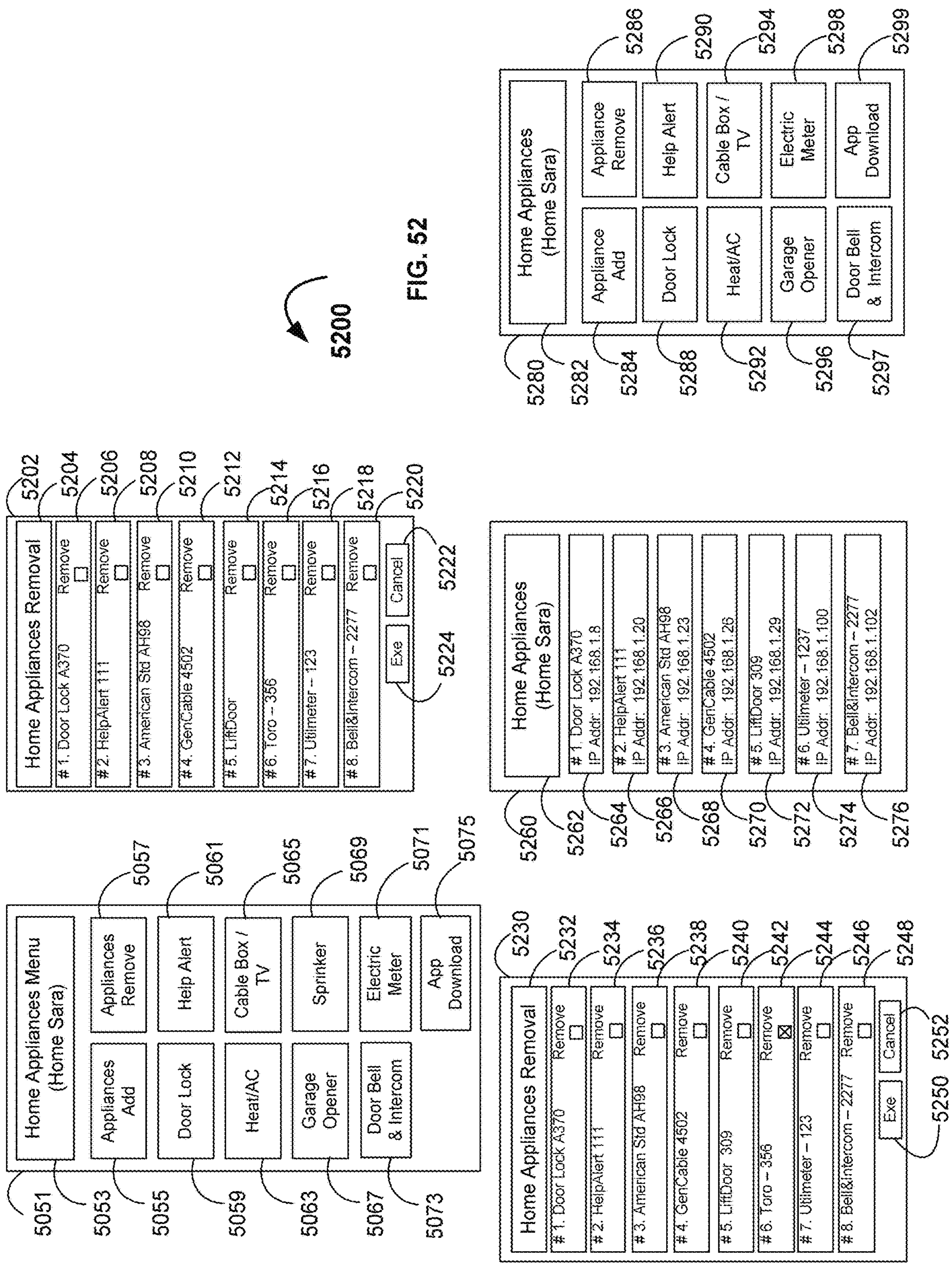
FIG. 52 shows a preferred example of handset's screen displays, presenting a house-hold appliance removal by Dev 106, relating to the present invention in the home application.

FIG. 52 illustrates a preferred application example of embodiment 5200 of the present invention. This exemplary embodiment presents preferred steps taken by a user in his/her handset to remove a household appliance/equipment from the Dev's Home Control and Monitor system.

This feature allows user to remove appliance devices from the menu as selected by highlighting the Appliance Remove icon 5057, which makes the handset 102 navigate to screen Home Device Removal 5202. The user then can select devices to be removed by screen touching appropriate remove boxes such as: Door Lock 5206, Help Alert 5208, Heating and A/C 5210, Cable Box 5212, Garage Door Opener 5214, Sprinkler 5216, Electric Meter 5218, and Door Bell & Intercom 5220. The handset screen "Home Device Removal" 5230 shows Device #6—Sprinkler 5244 (Toro-356) being selected to be removed. When user executes the Exe icon 5250, making the handset 102 transmit the command to the Dev 106 and wait for the Dev's completion response. When the handset 102 receives the response back from the Dev 106, it means the lawn sprinkler (application software) has been removed from the Dev 106. The handset 102 then removes the sprinkler application software from its memory. The Home Appliances menu 5282 shows its updated content with the sprinkler no longer the listed as a house-hold device. (The handset software preferably will not remove the device software application until the Dev 106 completes its removal function—thus prevent partial removal of the application software and maintain synchronization between the Dev 106 and the handset 102).

The preferred hardware connector interfaces: Other Auto Accessory Interface (block 227 of FIG. 2), Other Household Appliances/Premises Equipment Accessory Interface (block 327 of FIG. 3) and Other Robotic Accessory Interface (block 427 of FIG. 4) allow 3$^{rd}$ Party Peripherals the interface connection to the Dev in order to expand the Dev functionality, such as communicating, monitoring, directing and/or controlling these additional 3$^{rd}$ Party Devices. The External Apps block 513 of FIG. 5 is the memory space (block 264 of FIG. 2) allocated to additional applications, which the Dev executes in order to extend its functionalities associated with said additional apps in the Auto Application. The 3$^{rd}$ Party Apps block 613 of FIG. 6, likewise, is memory space (block 264 of FIG. 3) allocated to 3$^{rd}$ party application executed by the Dev, in order to provide the interface to 3$^{rd}$ party devices in the Home/Business/Institution Application i.e., additional 3$^{rd}$ party implementations such as: Taxi Hailing App, Vending Machine App, Supermarket App, Restaurant App, Ride-Sharing App, Car Rental App, Cash Register App, Gas Station App, Battery Recharging App, Credit Payment App, Mobile Payment App, Crypto-Currency Payment App, Work Day App, Conference/Meeting App, Parking Station App, Hotel/Motel App, Classroom App, Child-Care Nursery App, Workshop/Training App, Dining Room App, Subway App, Bus/Train App, Amusement Park App, Sport Stadium App, Movie Theater App, Passenger Plane App, Hospital App (Nursing/doctor Station App), Cruise Ship App, VoIP App, Auto Dealership App, Goods Delivery App and the likes. The Dev is therefore provided by the appropriate software apps, a smooth path of communication in order for it to implement functions such as controlling, monitoring, directing and/or communicating with these corresponding additional components.

Correspondingly, the preferred 3$^{rd}$ Party App icon 1341 of Home App Menu 1322 in FIG. 13, with a pull-down menu arrow 1341*a* (or 1325*a* in the PC 1321), provides the user (i.e., employee of 3$^{rd}$ Parties/Companies providing said service) the interface where he/she can communicate with the Dev via a handset 1302/102, PC 1321 or similar device.

The PC 1321 (preferably via its Intranet connection with the Dev) is a better design and setup platform for the design and layout of the Dev's $3^{rd}$ Parry Apps since it has a much bigger display screen (1321) than the handset (1302). Multiple design windows (1323*a*, 1323*b* and 1323*c*) can be displayed simultaneously so the user/employee can have a better perspective during the design and setup of said $3^{rd}$ party Apps in his/her office using a PC (1321). Also research and reference lookup can be easily searched online due to its popular Windows platform and direct uninterrupted Internet connection while the handset is very restricted due to its compact size and its often call-interrupted Internet via Mobile (Cellular Internet) connection. The handset, on the other hand, can be handy for a quick review or small design modification of the Dev's $3^{rd}$ party Apps while the user is out of office or on the road.

Furthermore, in order to implement each one of these said $3^{rd}$ party applications, a handset/PC preferred $3^{rd}$ Party Apps pull-down window 1345 (of Home App Menu 1322 in FIG. 13) shows a long list of preferable Apps Interfaces (Item 1 Taxi Hailing App—Item 31 Goods Delivery App) supported by the Dev is shown for demo only; the reality is each listed business or industry has its few own specific apps. For example, the taxi company needs only the Taxi Hailing App (pull-down window 1345, Item 1) in order to communicate with the Dev 106 (via a handset 102/1302 or PC 1321) so its employee can perform tasks (executed by Taxi Hailing App, one of $3^{rd}$ Party Apps block 613 of FIG. 6) such as: adding/removing new/old vehicles to/from its fleet, recording/deleting each vehicle and its driver ID information, and so on and so forth. While the vending machine supplier or the supermarket owner has his/her own Vending Machine App (Item 2, pull-down window 1345) or Supermarket App (Item 3, pull-down window 1345) where its employee can program the Dev 106 (via a handset 102/1302 or PC 1321) in order to set up the goods/merchandise such as: categories, name, price, original quantity.

Some Apps such as: Credit Payment App, Mobile Payment App, Crypto-Currency App, Work Day App, Conference Meeting App and VoIP App (items 10, 11, 12, 13, 14 and 29 pull-down window 1345) might be applied to all the companies since they are all applicable to their business needs, such as charging customers for merchandise or service (Credit Payment App, Mobile Payment App, Crypto-Currency App), scheduling a meeting (Conference Meeting App), keeping track of employee working schedules (Workday App) and/or providing onboard cruise ship customers phone connection (VoIP App) while mobile connection is not available on the high sea. The Apps (Dev) also let the user set up an inventory threshold for restocking low-inventory items, track how fast/slow they are being sold and so on and so for. Similarly, the other apps (items 3-31) can be applied accordingly. As always, there is no restriction for $3^{rd}$ party application applied to the Dev 106, as well as enough IP addresses for household appliances or premises equipment connected to its monitoring and/or supervision.

The Dev 106, in essence, besides allowing its user to have access, via his/her registered handset, to its controlled and monitored devices (household appliance in home application, business environment, equipment and its peripheral in business application, and vehicle accessories in auto application), in this case, as a business or institution owner/operator instrument, via its 3rd Party Apps (613 of FIG. 6), extends its (the Dev's) connection to $3^{rd}$ Party Users (customers, visitors, guests, employees, students, passengers and the likes) via their handsets (non-registered but with corresponding Apps), in order to provide them ($3^{rd}$ Party Users) with goods, services, transportation, information technology (direction, training, entertainment, communication), financial transaction services (credit card, mobile payments), e-commerce and the likes. Thus, the Dev forms an eco-system where its owner/operator is able to provide a smooth, efficient, secure, discreet and pleasant experience to its $3^{rd}$ Party Users/Visitors/Customers.

Each of these illustrations (auto, home and robot) is not restricted, each to its own only application, but as mentioned earlier, they can be interchanged and their functions can also be overlapped. For vehicle application, it can also apply to a truck, bus, train, tractor, farm, building or earth-moving equipment, motorcycle, marine boat, motorboat, sailboat, drone, flying vehicle or any motor-driven type (fuel, solar or electric, wind-driven, self-driving or non-self-driving type). For home application, it can also apply to a business structure, commercial/industrial building, supermarket, farm, factory, parking lot, school ground, college campus, movie theater, sports complex arena, shopping center, hospital, amusement park, place of worship or the like. Typically the user, via his/her handset, controls and or monitors his/her Auto Dev or his/her home Dev depending which application he/she uses at the time.

Figure 53:
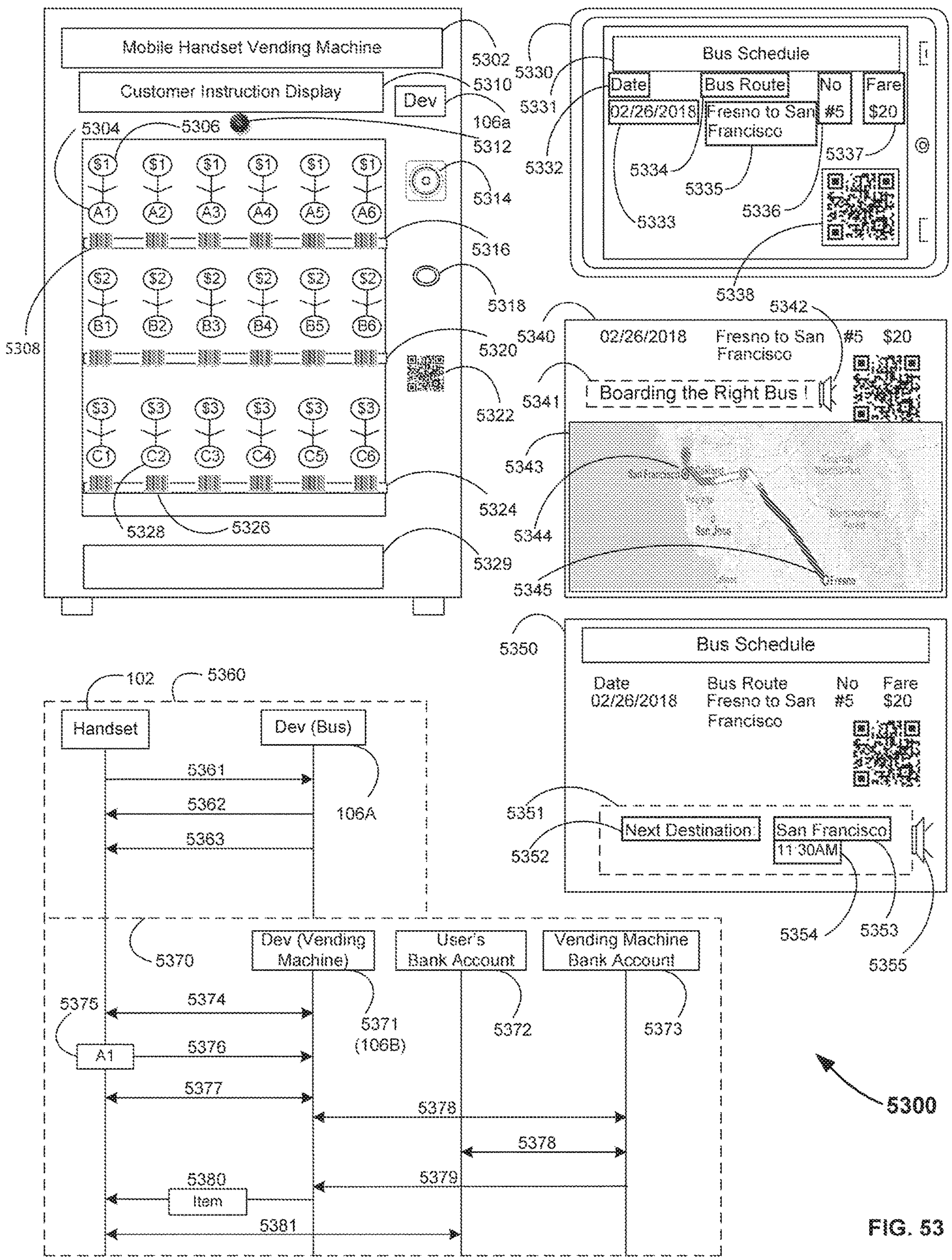
FIG. 53 shows a preferred example of the Dev interacting with a handset and functioning as a vending machine dispensing items and as a bus/train monitor/controller communicating its route information. The Figure also presents preferred charts of these two examples relating to the present invention in the robotic/automobile application.

The $3^{rd}$ Party Apps extend the Dev's function further. A user, via his/her non-registered handset (with or without auto/home application) with the appropriate $3^{rd}$ Party App download, is able to: receive goods and services (i.e., Taxi Hailing App, Vending Machine App, Supermarket App, Restaurant App, Ride-Sharing App, Car Rental App, Gas Station App, Battery Recharging App, Parking Station App, Hotel/Motel App, Auto Dealership App and Goods Delivery App), conduct a payment transaction (i.e., Cash Register App, Credit Payment App, Mobile Payment App and Crypto-Currency Payment App), make a trip (i.e., Bus/Train App and Passenger Plane App), entertain (i.e., Amusement Park App, Sport Stadium App, Movie Theater App and Cruise Ship App) and obtain personal services (i.e., Classroom App, Workshop/Training App, Hospital App, Child-Care Nursery App, VoIP App and Goods Delivery App) from the operator, business owner or merchant of the Business/Institution Dev FIG. 53 illustrates a preferred application example of embodiment 5300 of the present invention. The exemplary embodiment 5300 presents the Dev 106 as a Vending Machine Merchandise Dispenser distributing purchased goods when a customer using his/her handset 102 (with its associated app downloaded and executed by scanning and executing the displayed QR Barcode block 5322) to purchase its displayed items. Vending Machine 5302 represents such preferred example with an embedded Dev 106*a*, Customer Instruction Display 5310 (i.e., instructing buyers how to purchase using their handsets, how to scan the displayed QR Barcode 5322 in order to download the app into their handsets), Speaker 5314, Camera 5312, items to be purchased in Rows 5316, 5320 and 5324. When a customer wants to buy an item such as A1 5304, his/her handset 102 communicates step S374 with the Dev 106B (Vending Machine 5371) via the handset app (executed by Vending Machine App, one of $3^{rd}$ Party Apps block 613 of FIG. 6). He/she then enters A1 (block 5375 as shown in flow diagram 5370) on his/her handset's displayed Order Menu (not shown) or scans barcode 5308 with his/her handset 102 making/letting (by communicating step S376 via SRC network to) the Dev (Vending Machine) 106B inquire and receive (from the handset 102) its mobile payment account information step S377 (via mobile network) associated with owner of said handset. The Vending Machine (Dev 106B)

transmits (step S378) the payer account information to its bank (Vending machine Bank Acc 5373 or its credit account service company/entity), which completes the transaction with the User's (buyer's) Bank Account 5372. The Vending Machine Bank Account 5373 communicates and receives the payment confirmation 5378 from the User's Bank Account 5372. It then transmits the successful transaction step S379 to the Dev (Vending Machine 106B), which finally releases the purchased Item (block 5380) through the Released Box 5329 where the customer is able to retrieve it. The customer's handset 102 and his/her Bank Account 5372 can also optionally reconcile their balances, step S381.

The vending Machine owner can also monitor using his/her handset to communicate with the Vending Machine (Dev 106*a* of 5302). He/she can program the Dev 106*a*, for instance, by setting the weekly sale amount of each item, the sale volume so he/she knows for sure if its location is good and when to restock the sale items without having to physically check the inventory. Furthermore, the Vending Machine 5302 can primarily be cashless and monitored 24 (hours a day) by Video Camera 5312, rendering it less susceptible to theft and break-in damage.

Functioning as a Bus/Train Monitor/Controller where the Dev 106A communicates with its passengers' handsets as shown in Handset Screen 5330. The handset presents the passenger having a bus ticket showing his/her Bus Schedule 5331 for the trip (Bus Route 5334) from Fresno to San Francisco 5335 with Coach Number #5 (5336), the Trip Date 5332 and fare QR Barcode 5338. As the passenger boards the bus, the (Bus) Dev 106A inquires (step S361 in Chart 5360) from his/her Handset 102 the trip ticket (purchase) information and if the received information matches its schedule database, it informs (step S362) the passenger (also as shown in Handset Screen 5340) that he/she is "Boarding the Right Bus!" 5341 optionally accompanied by Audio 5342. The Dev also downloads the Itinerary Map 5343 showing his/her trip with the Boarding Location (Fresno 5345) and Trip Destination (San Francisco 5344) so the passenger can see his/her trip in more graphical detail. As the bus is about to arrive to his/her destination (San Francisco), The Dev again informs (step S363) the passenger via Text 5352 and Audio 5355 as shown in Handset Screen 5350 that the next bus stop will be at his/her destination (San Francisco 5353).

Figure 54:
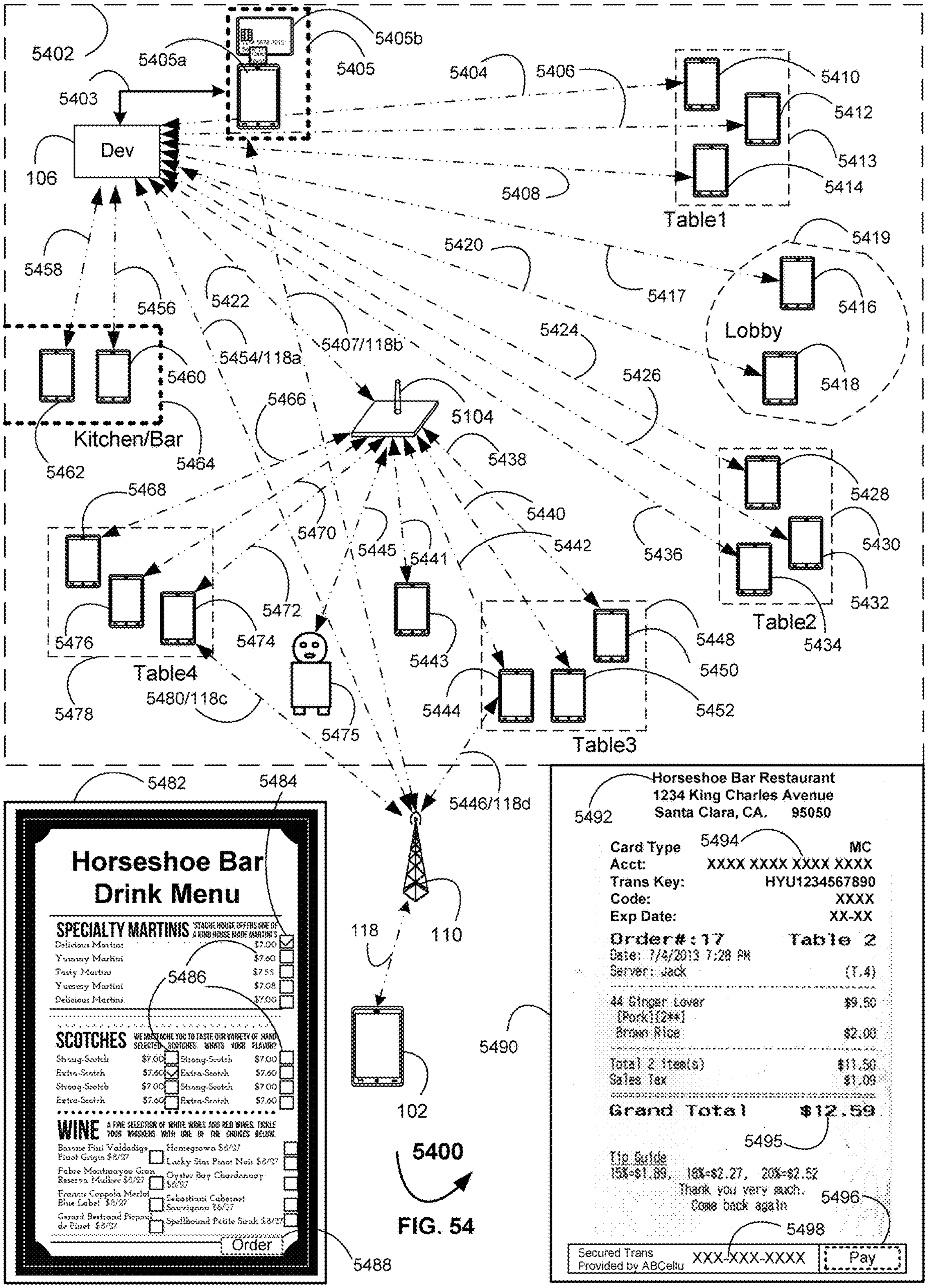
FIG. 54 shows a preferred example of the Dev interacting, in a food service environment (restaurant and/or bar), with a plurality of the handsets of its customers, its service and support staffs, and its owner, in serving their needs, forwarding their orders, transmitting their requests, alerting their attentions, responding to their inquiries and completing their meal payments, relating to the present invention in the business application.
Figures 55A, 55B:
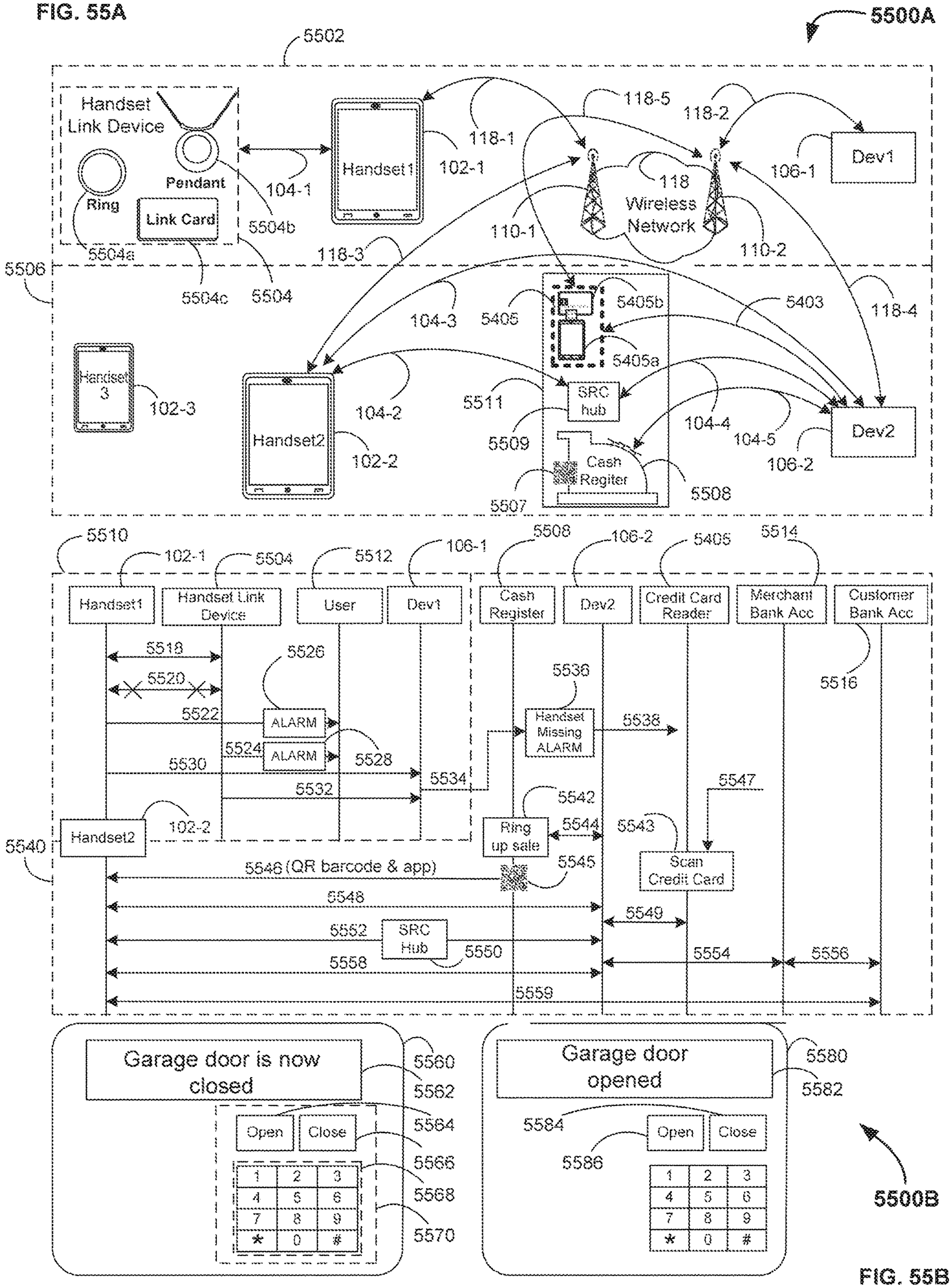
FIG. 55A shows one preferred example of the Dev receiving an alert from one of its users' handsets when said handset lost contact with its Link Device and another example of the Dev interacting with a buyer's handset during a mobile payment transaction. The Figure also presents preferred charts of these two examples, relating to the present invention in the business application.
FIG. 55B shows preferred example of handset's screen displays, presenting the communication between handset 102 and Dev 106, when user uses his/her handset 102 to open or close (via the Dev 106) the garage opener(s), relating to the present invention in the home application.

FIG. 54 illustrates a preferred application example of embodiment 5400 of the present invention. The exemplary embodiment 5400 presents the Dev 106 as a traffic controller, enabler and host in a business environment/establishment, as in the example, a Restaurant/Bar (via its Restaurant App, one of 3$^{rd}$ Party Apps block 613 in FIG. 6) enabling public WIFI connection to any of its (on-premises) customers and its workers (staffs). It then transmits its web pages, menus and other available services to the handsets of its customers via public WIFI network and conducts the payment transactions of said service via the more secured cellular network (in order to protect its customers' financial information). The Dev 106 also functions as a DHCP server while all handsets (of the restaurant/bar customers and its staff) function as DHCP hosts/clients as similarly described in FIG. 50 (Dev 106 assigning the available IP address to each individual handset and connecting each via said IP address). But unlike the example of FIG. 50 (where only exclusive known household/premises appliances are allowed to connect and then controlled and monitored by the Dev itself), the Dev 106, in this scenario, allows any of these handsets to connect to its open (public) network automatically as soon as they are within the restaurant/bar premises (within its WIFI range). The Dev 106 can also function as DHCP host/client, if needed, in conjunction with another DHCP server (if any such as a PC with its high-speed broadband internet modem for better service, higher bandwidth and faster response time), communicating with all other handsets functioning as DHCP hosts/clients, as are known to those of ordinary skill in the art. The Dev preferably can be programmed to reserve a separate "private" IP address range (scope) for its household/premises appliance clients as in shown FIG. 50/51 and a separate "public" IP address range (another scope) for customer and staff handsets as shown in FIG. 54. The Dev is also preferably able to function as a Router periodically broadcasting/multicasting packet advertising its availability.

In this restaurant example, customers with Handsets 5410, 5412 and 5414 are sitting at Table1 5413, customers with Handsets 5428, 5432 and 5434 are at Table2 5430, customers with Handsets 5444, 5450 and 5452 are at Table3 5448 and customers with Handsets 5468, 5474 and 5476 are at Table4 5478. Customers with Handsets 5416 and 5418 have their handsets downloaded with menus (WIFI connections 5417 and 5420) by the Dev 106 (as shown in one of their Handset Display 5482) as soon as they are in the vicinity of the restaurant/bar waiting area (Lobby 5419). Thus they are able to preview their meal and drink selection beforehand. All other customers at Tables 5413, 5430, 5448 and 5478 have also had the Menu 5482 downloaded to their handsets by the Dev 106 and are at various stages of—viewing the Menu Selection 5482, selecting the Menu Choice 5484, 5486 on their Handset Displays 5482, ordering the Menu Selection 5488. For instance, Handset 5410 communicates Menu Selection 5488 to the Dev 106 via WIFI connection 5404. The Dev 106, in turn, transmits his/her order via WIFI connection 5456/5458 to one of its Kitchen/Bar 5464 staff via his/her Handset 5460/5462; while customer (with Handset) 5444 is being served by a Serving Staff 5443 with Handset 5443 (or a Servicing Robot 5475) since the latter (staff with Handset 5443 or Servicing Robot 5475) had been alerted by the Dev via WIFI connection 5441 or connection 5445 when its Kitchen/Bar staff (with Handset) 5460 completed his/her order (of Customer 5444) via WIFI connection 5456 to the Dev; at the same moment, customer with his/her Handset 5428 completes his drink/meal and has the Dev 106 transmitted the Bill connection 5424 into his/her handset as shown on Handset 5490. All the communications in this example up until this point have been handled via the public WIFI network.

When a customer finishes his/her meal and/or drink and is ready to pay by providing his/her Credit Card information 5494 (providing of Credit Card information 5494 is not necessary for customers who are already Home/Auto Dev owners since an encrypted Credit Card Profile already exists in their handsets [as shown in 1211/1411 1211*a*/1411*a*, 1211*b*/1411*b* and 1211*c*/1411*c* of FIG. 12/14] or for customers whose handsets already have PayPal, Alipay, WeChat Pay, WePay, UnionPay, Apple Pay, Android Pay or the like payment information installed). The customer then executes Pay button 5496 making his/her handset transmit via cellular network the encrypted Payment 5498 to the Dev 106 which completes financial transaction to be processed by its Banking Service Provider.

For customers who still prefer to use plastic credit card payment, the Credit Card Reader 5405 with its secure Direct Communication line 5403 and/or its Cellular connection 5407 (or 118*b*) to the Dev 106 allows the Dev to receive the credit account payment information associated with their owners in order to complete said credit payment transactions. Furthermore as always, the restaurant owner can, via his/her handset 102, monitor by communicating with the Dev 106 (steps 118 and 5454) inquiring about the service of his/her staff and customer feedback.

Square Inc. is a financial services, merchant services aggregator and mobile payment company which offers its users a platform to complete their payment transaction also via the cellular network. The user either enters the credit card account information on the platform (handset, tablet), or swipe it with a reader (Square Reader) attached to said platform. The difference between this invention where the Dev (performing the payment transaction via cellular) and Square platform (also performing the payment transaction via cellular) is that the Dev receives the payment information wirelessly and remotely from the customer's handset (or from the Card Reader 5405) while the Square System is itself the platform.

Furthermore, the communication between the Dev and the handset(s) can be at least one in cellular, SRC, WIFI, LAN, satellite and any other forms of wire and wireless networks as previously cited in this invention. In other words, the Dev operates in a complete Ecosystem where it can communicate, control and monitor in a plurality of networks: in cellular network (118 of FIG. 1) when communicating with its owner's handset or conducting a customer's handset mobile financial transaction (steps S366 and S386 of FIG. 53), in satellite network device (in case of emergency with the absence of cellular signal), in private wired/wireless LAN network (block 5002 of FIG. 50) when communicating with its household/premises appliance clients (can also either via SRC network 4902 of FIG. 49), in public WIFI network (block 5402 of FIG. 54) when offering goods and services to its clients/customers, in SRC network (104 of FIG. 1) when communicating with other mobile/non-mobile devices, in audio-communication and or video channels (5122, of FIG. 51) when communicating with a human client and in Big-Screen TV via its audio and or video channels (5123-I)/(5123-O) and (5162-I)/(5162-O) of FIG. 51 when communicating with a human client.

In FIG. 55A illustration, the Dev 106 preferably extends its 3*rd* party function (while its main function, as usual, is to control and monitor the premise other equipment, accessories and its surrounding environment such as: security system, lighting, heating and air conditioning, entry ways, cameras and so for), controlling a cash register (5508 as one of its appliances/equipment) and communicating with a customer's handset (Handset2 102-2 in Enclosure 5506) in conducting and completing his/her payment transaction for goods and services while he/she is at the vicinity of the Cash-Register Counter 5511 (consisting of a Cash Register 5508, QR Barcode Display 5507, SRC hub 5509 and Credit Card Reader 5405). As illustrated in Graph 5540, while the cashier rings up the cost of goods (Ring up sale 5542) or services, the Dev (Dev2 106-2, always in communication [SRC link 104-5] with one of its Cash Register 5508 step S544), requests and receives step S548 (or SRC link 104-3) mobile payment account information associated with the customer's handset (Handset2 102-2) directly and/or wirelessly or via SRC hub (block 5550 or 5509, such as NFC "Near Field Communication, step S552 or SRC links 104-2 and 104-4). When the total is rung up, the Dev (Dev2 106-2) receives the final payment amount from the Cash Register 5508 and transmits (via cellular 118-4) the information to its Banking Service Provider (Merchant Bank Acc 5514) which completes said transaction and transmits back the confirmation (step S554) to the Dev. The Dev (Dev2 106-2) then signals to the handset (Handset2 102-2) of said completion (step S558) and the user is able to verify the result (step S559 or cellular link 118-3) with a copy of the receipt in his/her handset (Handset2 102-2). For (user/customer) handset without the appropriate app, scanning and executing the displayed QR barcode (block 5545) for said app download into his/her handset (Handset2 102-2) is achieved via step S546 (with customer's handset reading the QR barcode 5507 located by the Cash Register 5508).

For customers using the Credit Card Reader 5405 technology, the credit card payment transaction is also shown in Chart 5540. It starts at Step S543 where the Cashier scans his/her Customer's Credit Card 5405*b* through the Credit Card Reader 5405*a* after he/she totals up the payment amount at Step S542. The Cashier then enters the payment amount at Step S547 which makes the Credit Card Reader 5405 transmit payment amount and the credit card account information (associated with the customer) to the Dev2 step S549 (or link 5403 in Enclosure 5506). The Dev2 transmits (via cellular 118-4) said information to (step S554) its Banking Service Provider (Merchant Bank Acc 5514) which completes said transaction and transmits back the confirmation (step S554) to the Dev. The Dev (Dev2 106-2) then signals to the Customer's handset (Handset2 102-2) of said completion (step S558) and the Customer is able to verify the result (step S559 or cellular link 118-3) with a copy of the receipt in his/her handset (Handset2 102-2).

Unlike current technology where a customer has to wave, scan and or tap his/her phone in front of the QR barcode in order to conduct said transaction, the user of this invention, might not even have to produce the handset from his/her pocket/purse. He/she is only near enough to the Cash-Register Counter 5511 so the Dev's SRC appliance 5509 (or any other NFC device) can communicate effectively with his/her handset without being snooped by another unwanted device. The Dev also supports with a Credit Card Reader 5405 for customers who still use the credit card payment method. The card holder's payment information 5405*b* is read via its Reader 5405*a* which then transmits said information via a secure physical connection 5403 or via cellular connection 118-5 (to 118-4) to the Dev which then completes the transaction with its Banking Service Provider 5514.

The Dev 106 preferably can be informed by the user's handset when said handset is being left behind or out of reach of its corresponding link device as shown in Enclosure 5502 and Graph 5510. The Handset Link Device 5504 can be in form of a Ring 5504*a*, Pendant 5504*b*, Link Card 5504*c* or any likewise mobile device (i.e., smart, wearable device, fitness tracker), communicating (step S518 or SRC link 104-1) constantly with the handset (Handset1 102-1). The user starts out by linking the communication (executed by the handset's Handset Link layer 729A/729B of FIG. 7A/7B) between his/her handset 102 and the Handset Link Device 5504 by executing the Handset Link Connect icon 1137/1337 (of the Auto/Home App Menu 1122/1322 of FIG. 11/13) the first time when they are within SRC range of each other. The handset will display (not shown) that the link is established, from then on, they are in continuous SRC communication with each other 5518. When one of them is out of the SRC reach of each other, indicating by broken link 5520, they (Handset1 102-1 and Handset Link Device 5504) all emit a distinct ring sound 5522 and 5524 and or vibration alerting the User 5512 of said event (5526 and 5528). The handset (Handset1 102-1) and/or its link wearable device (Handset Link Device 5504) also transmit an alert (5530 and/or 5532) to the Dev (Dev1 106-1) informing that it (one of them) is being lost or misplaced. The Dev 106-1 will keep track (5534) of the lost device by transmitting its GPS location to other registered handset(s) 5538. When the handset is located, retrieved or completely lost, the user should delete the alert from the Dev (Dev1 106-1) via the Handset Located Command (not shown) in order to erase the Handset Missing ALARM 5536 from the Dev (Dev1 106-1). As routine practiced in the art, this feature can also be turned off (not shown) if necessary.

The Dev 106 preferably functions as a control and monitor system connecting and checking employees (by pinging every 5/10 minutes or a determined amount of time) with their handsets 102 as time-cards (registered each with their own unique MSKs or employee numbers) when they come to work, take a break, time out for lunch, move in/out of the premises and finally go home (programmed via Item 13 Work Day App in 3$^{rd}$ Party Apps 1345 of FIG. 13). It also can register visitors coming to visit (by connecting and downloading the visitor its inquiry forms into their handsets) requiring them to enter the required information on their handsets. It then can keep track of their whereabouts (by pinging every 1 minute or a determined amount of time with the visitors' handsets) while they visit with its employees and each visit time duration.

The Conference Meeting App icon 1167/1367 of Auto/Home Dev Facility Menu 1152/1352 of FIG. 11/13 allows the user to program the Dev 106 via his/her handset (tablet or any device) for meeting scheduling (Item 14 Conference Meeting App in 3$^{rd}$ party Apps 1345 of FIG. 13) in order for the user to arrange, organize, request to attend to or excuse from a meeting with his/her coworkers. When the user executes this icon, the Dev transmits back to the handset an acknowledgment which makes the handset navigate to a screen where the user fills out the information such as: meeting name/subject, time and date, building & room location, names of attendees (each accompanied with a telephone number), how often to remind the attendees on the meeting and the likes (not shown). When the user is done with the information and executes the Ok icon, the Dev communicates the invitation to the handsets of all the attendees (whose names and phone numbers are on the list).

The user is able, via his/her handset, to make changes to the meeting and all the attendees being informed in real-time, such as: rescheduling, cancelling, relocating, adding/removing numbers of attendees and the likes. The Dev then keeps track of the attendance by connecting (via WIFI) with each attendee's handset (through MSKs or employee ID numbers) during the meeting and also lets distant attendees to call in to attend the meeting remotely via overhead displays in the meeting room. The Dev also can video record the meeting for cloud storage, which it can be retrieved later on for viewing.

The Dev 106 preferably functions as a Parking Controller via its Parking Station App (one of 3$^{rd}$ Party Apps block 613 in FIG. 6) for a city sidewalk (curbside) parking, a public building parking, or common lot parking. The parking lot owner or city parking administrator uses the Parking Station icon (Pull-Down Window 1345 Item 15 of FIG. 13) to communicate with the Parking Lot Dev 106 in order to design the layout of the parking area as a two or three-dimension map with each parking lot position on x and y or x, y and z axes relative to its point of origin located on the map south-west corner. Each numerical labeled parking spot is equipped with a smart motion sensor and the whole geographical map can be projected on any overhead screen display for observation and presentation. Each parking spot smart motion sensor is then configured via the (Parking Lot) Dev's Parking Station App (one of 3$^{rd}$ Party Apps block 613 of FIG. 6). Each parking spot smart motion sensor is assigned an IP address statically by the Dev (i.e., via Static IP addressing icon 1171/1371 in Auto/Home Dev Facility Menu 1150/1350 of FIG. 11/13); and together they constitute a private LAN network. As soon as a the driver parks his/her vehicle in one of its parking spots, its sensor marks the spot as occupied, transmits said information and the vehicle (equipped with its own Dev) encrypted mobile payment account information to the Parking Lot Dev 106. As soon as the vehicle leaves its parking location, the parking sensor marks the spot as vacant and transmits said information to the Parking Lot Dev 106 which then completes the parking payment transaction with said vehicle.

Alternatively, the driver marks his/her parking spot number in his/her handset that transmits said information along with the mobile payment account information to the Parking Lot Dev (through its parking smart motion sensor) via its more secured cellular network. All this assuming that the (car) Dev has been transmitted with the URL link (via the Parking Lot Dev transmission) or the user's handset has been scanned with the parking QR code which the user then executes in order to complete the app download and run its application.

This feature helps the city to enforce its parking policy more effectively such as time limit by transmitting its violation to the enforcement department and inform the vehicle owner of said time limit. It also replaces the current costly parking meters, which are also prone to vandalism and fraud. The system truly enforces the parking limit by not allowing the car driver to keep feeding the meter when it is about to expire (in other words, the driver has to move his/her vehicle). For owner whose vehicle not yet equipped with the controlling Dev, he/she enters his/her parking spot number via his/her handset which then transmits said information to the Parking Lot Dev 106 and is charged against the mobile payment account information in said handset.

For high-density parking where the parking is done by a robot controlled and monitored by the Parking Lot Dev 106, the Parking Lot Dev 106 requests the parking payment (mobile payment account associated with the car owner) from and communicates the parking lot information i.e., parking ID (associated with its parking lot number, parking date and time) to the parked car Dev or the driver's handset 102 (when his/her car is not equipped with the Dev). When it is time to retrieve his/her car, the owner needs only to execute the Vehicle Retrieve icon (not shown) on his/her handset 102 which either transmits the command to his/her car Dev 106 which then forwards said command to the Parking Lot Dev 106 or (the handset 102 transmits the command) directly to the parking lot Dev. The Parking Lot Dev 106, in turn, informs the driver via his/her handset when his/her car is ready for pick-up. The parking fee payment information is requested and processed by the Parking Lot Dev 106 from either the parked car Dev or from the driver's handset 102.

The (Parking Lot) Dev 106 will transmit its appropriate available parking spot(s) in form of GPS map via (public) WIFI whose hub extenders (similar to the extender 5004 in FIG. 50) strategically located throughout its service area, to a vehicle Dev's dashboard display (the vehicle equipped with its own Dev) or/and to its driver's handset when its driver is looking for a place to park, depending on its driving location in order to maximize efficiency and thus optimize driving traffic flow.

As for valet parking, the parking attendant, using his/her handheld Parking Meter Device (associated with the Valet Parking Dev 106), scans and communicates with the driver's handset and obtains the mobile payment account information (associated with said handset) and also inputs the driver's Vehicle ID (VID). The attendant then transmits said information to the Valet Parking Dev which verifies said account payment information with its Merchant Bank Account. When the car is ready for pickup, the attendant again uses the Parking Meter Device to scan the VID and transmit it to the Valet Parking Dev which matches it against its previous received information (calculating its parking time/duration) and completes the parking payment transaction associated with the said driver's mobile payment account.

The Dev 106 preferably, extends its function as a school and/or classroom attendant via its Classroom App (one of $3^{rd}$ Party Apps block 613 in FIG. 6). Students registering for a class are assigned with a distinct time-limit student ID number to each of their handsets, tablets, wearable, mobile device or ID card. The course secretary puts together (using the Classroom App in the Pull-Down Window 1345 Item 17 of FIG. 13) a list (registration information from school computer database network) consists of name of the course, classroom number/name, attending students, time and date schedules and the likes. The Dev then can keep track of the student attendance (via their handsets or issued wireless ID devices/tags). The Dev also lets students know (via their handsets) in advance if a course which has been cancelled by its teacher or moved to another classroom without the students arriving at the classroom, then realizing there is not a class for the day or it has been moved to another location. The Dev 106 keeps track of the on-site student roll calls via its WIFI (transmitting the list of attendants to the lecturer's handset, to flat-screen display and/or to administration server), alerts teacher on non-registered students and allows off-site registered students to sign in or attend via the Internet. It also video-records teacher lectures via classroom cameras for cloud storage and transmits the lecture information playback when requested. The Dev 106 can be programmed to disallow any student attendance by invalidating its student ID number.

The Dev 106 preferably, besides monitoring its surroundings for security and protection in a passenger in a subway, school bus or passenger train application, extends its functions as a rider/passenger verification attendant via its Subway App, Bus/Train App (one of $3^{rd}$ Party Apps block 613 in FIG. 6). Passengers/students paying/registering for said transportation are assigned with a distinct ride ID with time-limit, day-limit or ride-count-limit to each of their handsets (or tablets, ID cards, wearable devices or mobile devices) along with seating number, boarding time & date, boarding gate, boarding station. Each of the plurality of Devs is then able to keep track of the boarding passengers (list) via wired/wireless SRC or WIFI network onboard of its vehicle/train/ship, at the boarding station, at boarding gate, at boarding entry or passenger stops. A passenger is able to verify via the handset if he/she is at the right boarding location; and if not he/she will be advised to proceed to the intended destination via the handset's GPS map. The passengers getting onboard are being checked, via wired/wireless SRC or WIFI network, by the onboard Dev for their ticket validity and if they are boarding the right trip. An alarm signal will alert the passenger, attendant or driver that something is wrong with said passenger's ticket. The passengers are able to enter or have their destinations entered on their handsets will be alerted when their destinations have arrived. A map showing the trip being taken is also downloaded, by the onboard Dev, to the passengers' handsets which clearly guide them on their destination.

The Dev 106 preferably, besides monitoring its surroundings for security and protection in a passenger in a cruise ship application, extends its functions as a rider/passenger verification attendant via its Cruise Ship App (one of $3^{rd}$ Party Apps block 613 in FIG. 6). Its passenger registration and check-in are done via its Cruise Ship App (Item 28 of $3^{rd}$ Party Apps pull-down window in FIG. 13) when they are at the registration counter, scanning the QR code or simply aiming their smart phone (handset) cameras at a QR code in order to complete the app download and run its application. Passengers paying/registering for said transportation are assigned with a distinct passenger ID number (with day-limit) to each of their handsets, ID cards, wearable devices or mobile devices. The Dev is also able to keep track of the boarding passengers (list) via its WIFI on its boarding station, boarding gate or boarding entry.

Passengers boarding cruise ship can go online registering their personal and account information via their handsets or PCs. They can even take their own pictures (facial feature) and or scanning their fingerprints via their handsets which then transmit said information to the Cruise Ship Dev. At the boarding gate, the passengers then can be processed with facial recognition or their fingerprint being processed by the Cruise Ship Dev's Biometrics Scanner (via its Biometrics Software layer 627 of FIG. 6) and or verified by the cruise ship personnel. The Dev assigns each passenger's handset a dynamic IP address and its connection lease time is the length of the cruise duration. The Dev also maps the handset's IP address to his/her town room number, thus allowing the passenger to communicate with each other with his/her handsets via VoIP with the room number as the phone number and the number of guests in each room as the extension. Each passenger is able to activate his/her handset connection to the Dev's VoIP by executing the VoIP icon (not shown) while onboard. The Dev then transmits the VoIP information verification back to his/her handset which allows the user to fill out his/her name, guest registration and room/cabin numbers, how many guests in each room and the likes (not shown). The passenger then executes the Ok icon making the handset transmit all the information back to the Dev. The Dev processes the information and if all is ok, transmits back the confirmation response informing the passenger that from then on until the end of the cruise, his/her onboard phone number is his/her room number with the lowest extension number order (#1) assigned to whichever handset is being registered first.

During their time onboard, the passengers can keep in touch using their handsets communicating with another via the VoIP network with the Dev as the Private Branch Exchange (PBX) or Switch Board since there is no cellular service while the ship is on the open sea. All the onboard activities such as fine dining, gift purchasing, entertaining, off-ship excursion can be paid for via their handsets. Each cabin/room on the cruise ship is assigned with a static IP address where the Dev can monitor the in and out of its registered passengers. The Dev can also keep track of the location of its passengers while they are onboard the ship. This will help the cruise ship to replace the current registration system where each passenger has to register and get issued an identification card every time he/she boards the ship. The feature allows the passenger via his/her handset transmitting his/her biometric information via said handset to the cruise ship registration database and it will help speed up the boarding process and improve the overall cruising experience. At the end of the cruise trip, all the information on the handset is erased from its memory after the passenger settles the account payment with the cruise account department.

The Dev 106 preferably extends its functions as a fast food restaurant, drive through or coffee bar where customers' handsets 102 are connected and downloaded with the menu via WIFI when they are in the vicinity of the business establishment. Customers then view the menu and thus are able to choose and transmit the orders to the Dev 106 via the handsets and the payment transactions are completed via the Dev's secured cellular network (with the available encrypted payment information already filled in as shown in 1211/1411 of FIGS. 12/14 and 5498 of FIG. 54 or with their existing credit profile [as shown in 1211/1411 1211*a*/1411*a*, 1211*b*/1411*b* and 1211*c*/1411*c* of FIG. 12/14]). Customers will then be alerted to pick up their orders when said orders are displayed on their handset displays.

The Dev 106 preferably functions as a gasoline station dispensing/recharging fuel/battery to vehicle drivers who stop by a fill/charge up (there is no need for him/her to step out or has his credit card or handset or smart phone scanned by a paying device). The Dev 106 connects and communicates with each of the driver's handset on the mobile payment for the goods and service (accompanied by its phone number) on its screen display via SRC medium and receives said information back via cellular while the driver optionally is able to examine the receipt to verify the validity of said transaction and finishes the transaction with the OK tap on its screen (not shown). There is no need for the customer to wave in order to scan or read the QR code during the payment transaction as currently done in countries where mobile payment is extremely popular such as China. This feature lets driver/customer not to have to run the credit card or have his/her handset scanned by a machine as currently available. The copy of said transaction is stored on the handset which can also transmit it for long term storage on his/her Private Cloud 4904 in FIG. 49/50.

The Dev 106 preferably extends its functions as a Hotel/Motel App allowing the registration personnel to sign in the guests by having them, during check-in, scanned the QR code or simply aimed their smart phone (handset) cameras at a QR code in order to complete the app download and run its application. As soon as the registration personnel total up the registration fee, the Dev 106 requests the mobile payment information from the guests' handsets in order to complete their check-in. After the Dev clears the payment transaction with its payment service vendor, it transmits the room check-in information to the guests' handsets. Optionally, the Dev also transmits the hotel GPS map (this also implied that the GPS map can also applied to College Campuses, Shopping Centers, Amusement Parks, Cruise Ships, Recreation Centers and the likes where their GPS maps are transmitted to the visitors' handsets, in place of currently printed handouts or strategically located fixed directories, thus, useful in allowing visitors quick and inquiring information such as: his/her current location, where/how to proceed to the intended locations, what is going on in certain locations, where the bathroom is located) layout to the handset with the booked room highlighted directing the guest a clear way to his/her room. The Dev also transmits the door key to his/her handset, which lets the guest open the door to his/her room. With all hotel service icons available in their handsets, the guests are also able to inform the hotel personnel via their handsets for room services, not to disturb sign and the like. At the end of their stay, all the handset room information is deemed invalid and erased from said handsets.

FIG. 55B illustrates a preferred example of embodiment 5500B of the present invention. This exemplary embodiment presents preferred steps taken by a user in his/her handset to open or close the Garage Opener of the Dev's Home Control and Monitor system.

The handset 102 navigates to screen 5560 when the user hovers over the handset's Garage Opener icon 4867/5067 for a second or more (until the handset 102 changes screen) presenting remotely the status of the Garage Door Opener 5560. The user then can open/close the garage when he/she is far away from home, and also knows if it is opened or closed as displayed on screen 5562.

Button control 5570 and the display 5562 are controlled by GA software (4862/5062 in FIG. 48/50) which has been transmitted from the Garage Opener 4880 (or downloaded from the web), with one copy into the Dev 106 and one into the handset 102.

On the other hand, the user can open/close the garage door (short range via SRC) by slight touching the Garage Opener icon 4867/5067, or by touching the icon 1340 to open or close the garage, just like the regular garage opener.

Figure 56A:
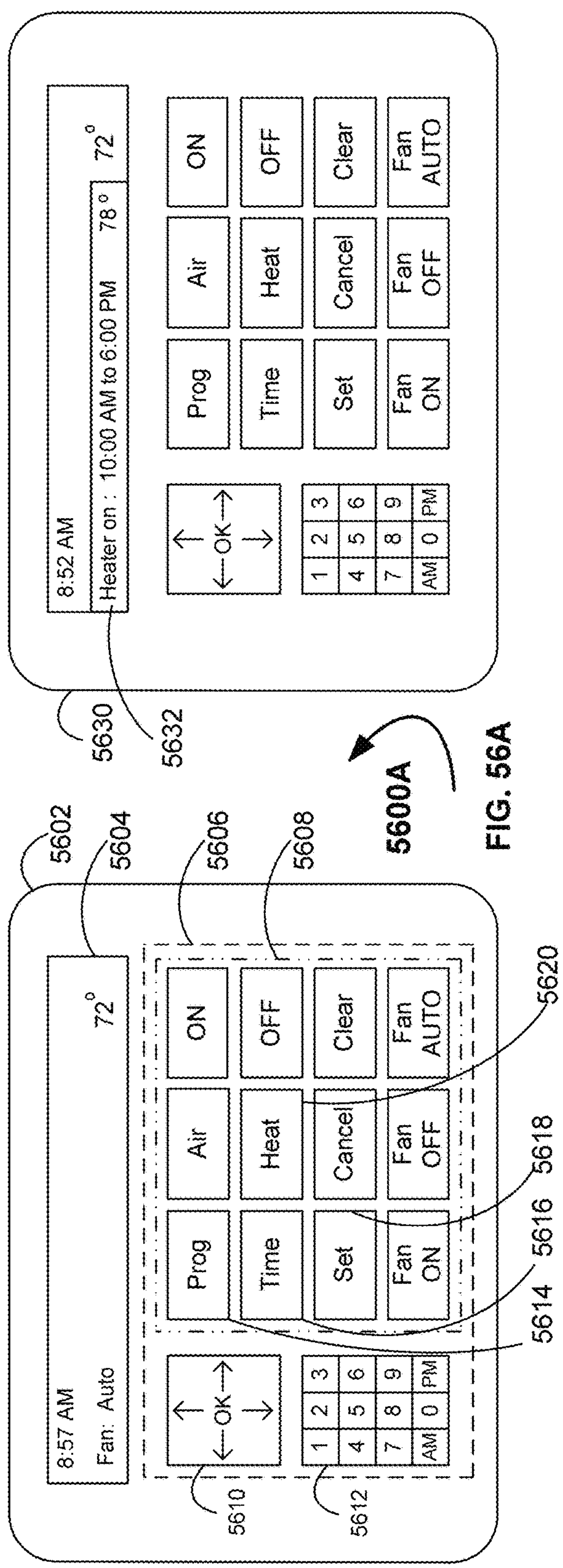
FIG. 56A shows preferred example of handset's screen displays, presenting the communication between handset 102 and Dev 106, when user uses his/her handset 102 to control and program (via the Dev 106) the heating and air conditioning system, relating to the present invention in the home application.
Figure 56B:
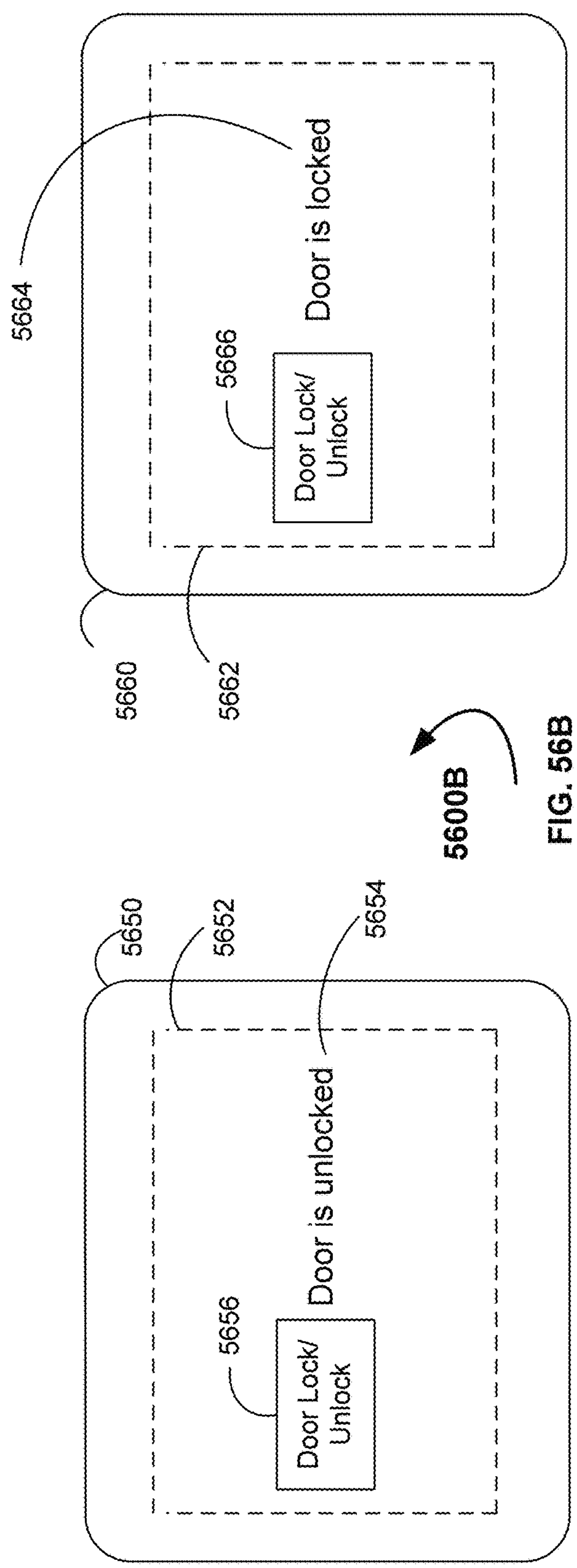
FIG. 56B shows preferred examples of handset's screen displays, presenting the communication between handset 102 and Dev 106, when user uses his/her handset 102 to lock or unlock (via the Dev 106) the entry door, relating to the present invention in the home application.

FIG. 56A illustrates a preferred example of embodiment 5600A of the present invention. This exemplary embodiment presents preferred steps taken by a user in his/her handset to program, control, and view the Central Heating and Air Conditioner of the Dev's Home Control and Monitor system.

When the handset Heat/Air icon 4863/5063 in Home Appliances 4851/5051 (FIG. 48/50) is executed, the handset 102 transmits the command to the Dev 106, which in turns processes said command and passes it to the Heat/Air system 4876 (FIG. 48/50), receives the response from said Heat/Air system 4876, and processes said response and passes it back to the handset 102, which displays the information, as shown on its screen 5602.

Keypad control 5606 and display status 5604 are controlled by AA software 4858/5058 in FIG. 48/50 which has been transmitted from the Heat/Air 4876 (or downloaded from the web), with one copy into the Dev 106 and one into the handset 102. Every selection (icon highlighted/screen button touched) in 5606 (5608, 5610 and 5612) makes the handset 102 transmit command to the Dev 106, which in turn transmits it to the Heating/Air conditioner 4876 and if any response required, will be transmitted back from the Heating/Air conditioner 4876 via the Dev 106 to the handset 102 which displays it on screen 5602. The screen 5604 shows the Heating/Air fan is on, in automatic mode, and the house is at 72 degrees F. The handset 102 navigates to screen 5630, when the user programs the heater (by keying in Prog icon 5614, Heat icon 5620, Time icon 5616, keypad icon 5612 and Set icon 5618) to turn on Heat/Air Conditioner 4876 from LOAM to 6 PM to 78 Degrees F., as are known to those of ordinary skill in the art.

FIG. 56B illustrates a preferred example of embodiment 5600B of the present invention. This exemplary embodiment presents preferred steps taken by a user in his/her handset to open or close the House Entry of the Dev's Home Control and Monitor system.

When the handset Door Lock icon 4859/5059 in Home Appliances 4851/5051 (FIG. 48/50) is executed, the handset 102 transmits the command to the Dev 106, which in turns processes said command and passes it to the Door Lock 4872 (FIG. 48/50), receives the response from said Door Lock 4872, and processes said response and passes it back to the handset 102, which displays the information, as shown on its screen 5650.

Screen 5650 shows the status of the door lock every time icon 5656 is touched; it toggles between unlocked (message 5654) and locked (message 5664). Screen touch control icon 5656/5666 and the display screen 5652/5662 are controlled by DA software 4854/5054 in FIG. 48/50 which has been transmitted from the Door Lock 4872 (or downloaded from the web), with one copy into the Dev 106 and one into the handset 102.

Figure 57:
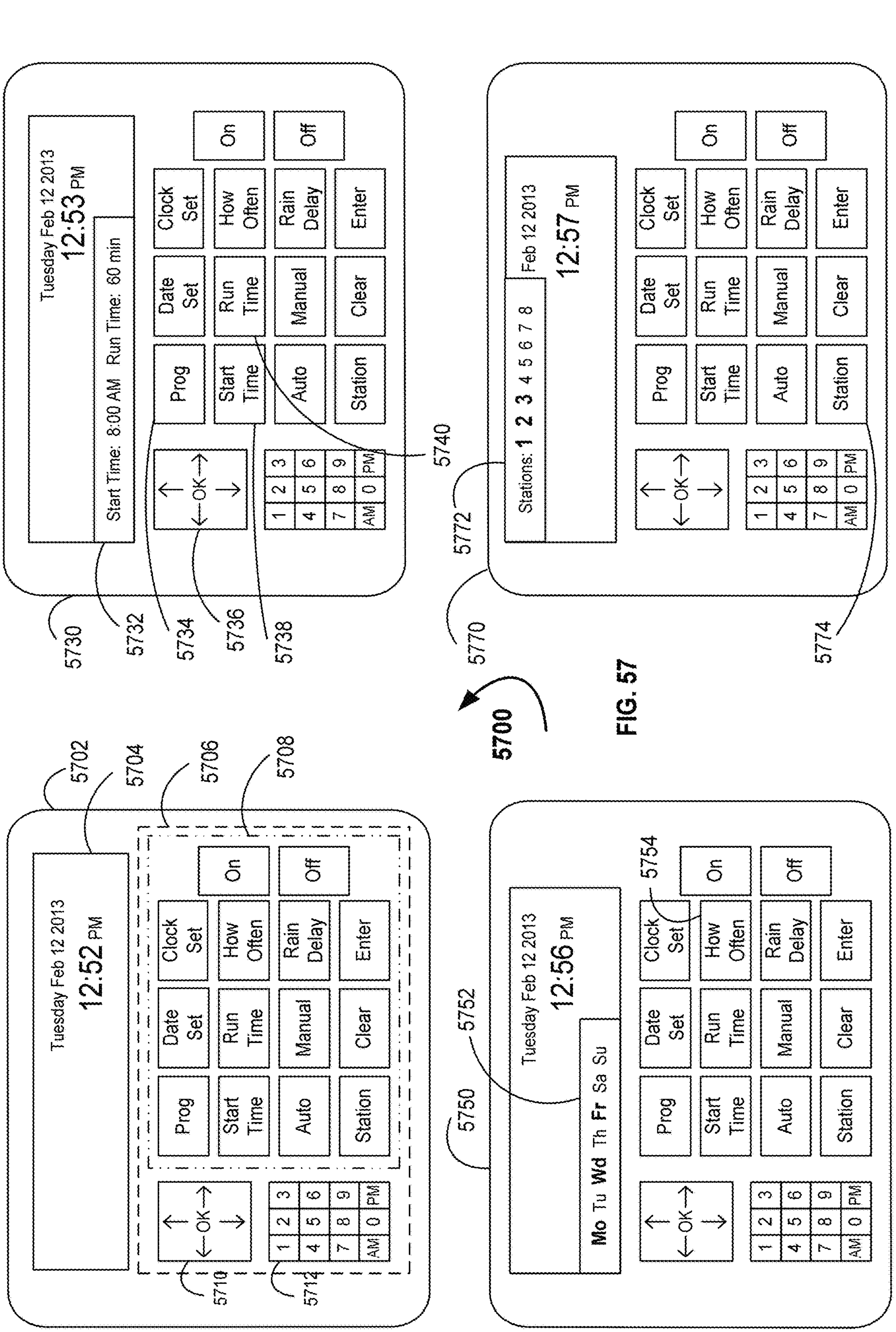
FIG. 57 shows preferred examples of handset's screen displays, presenting the communication between handset 102 and Dev 106, when user uses his/her handset 102 to control and program (via the Dev 106) the landscaping sprinkler system, relating to the present invention in the home application.

FIG. 57 illustrates a preferred example of embodiment 5700 of the present invention. This exemplary embodiment presents preferred steps taken by a user in his/her handset to program, set up and view the indoor/outdoor watering control of the Dev's Home Control and Monitor system.

When the handset Sprinkler icon 4869/5069 in Home Appliances 4851/5051 (FIG. 48/50) is executed, the handset 102 transmits the command to the Dev 106, which in turns processes said command and passes it to the Sprinkler 4882 (FIG. 48/50), receives the response from said Sprinkler 4882, and processes said response and passes it back to the handset 102, which displays the information, as shown on its screen 5702.

Keypad control 5706 and the display 5704 are controlled by SA software 4864/5064 in FIG. 48/50 which has been transmitted from the Sprinkler 4882 (or downloaded from the web), with one copy into the Dev 106 and one into the handset 102. Every selection (icon highlighted/screen button touched) in 5706 (5708, 5710 and 5712), makes the handset 102 transmit command to the Dev 106 which in turn transmits it to the Lawn Sprinkler controller 4882 and if any response required will be transmitted back from the Lawn Sprinkler controller 4882 to the Dev 106 and from the Dev 106 to the handset 102 which appears on its display screen 5702. The handset 102 navigates to screen 5730 when the user programs to turn the sprinkler system on starting at 8 AM duration 60 minutes; to screen 5750 on Monday, Wednesday and Friday 5752; and to screen 5770 for stations 1, 2 and 3 (screen 5772).

Figure 58:
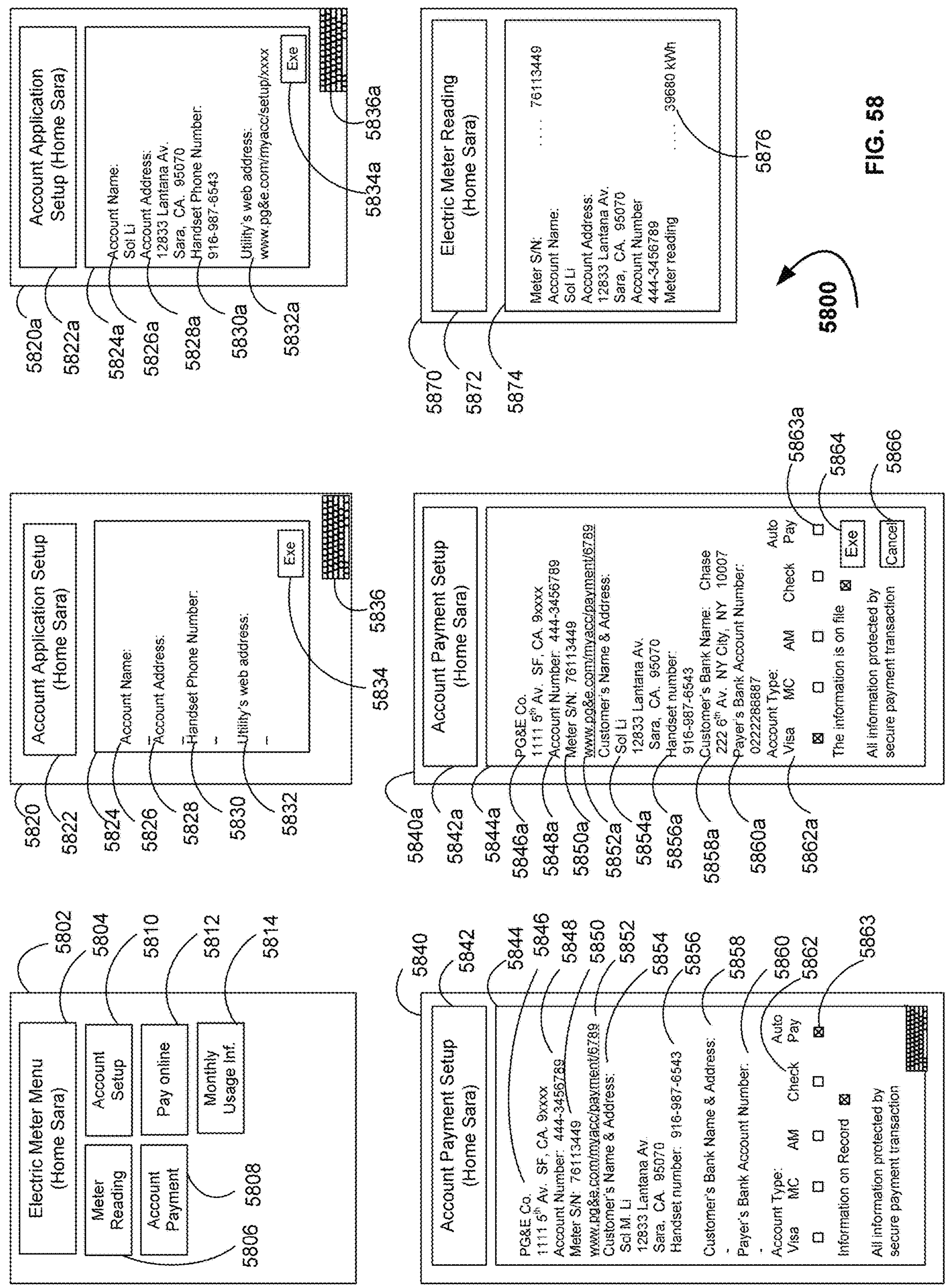
FIGS. 58 and 59 show preferred examples of handset's screen displays and a flow diagram, presenting the communication between handset 102, utility company 5982, Dev 106 and Electric Meter 4884, of the user receiving the monthly invoice and paying the electricity bill, to the utility company 5982, relating to the present invention in the home application.
Figure 59:
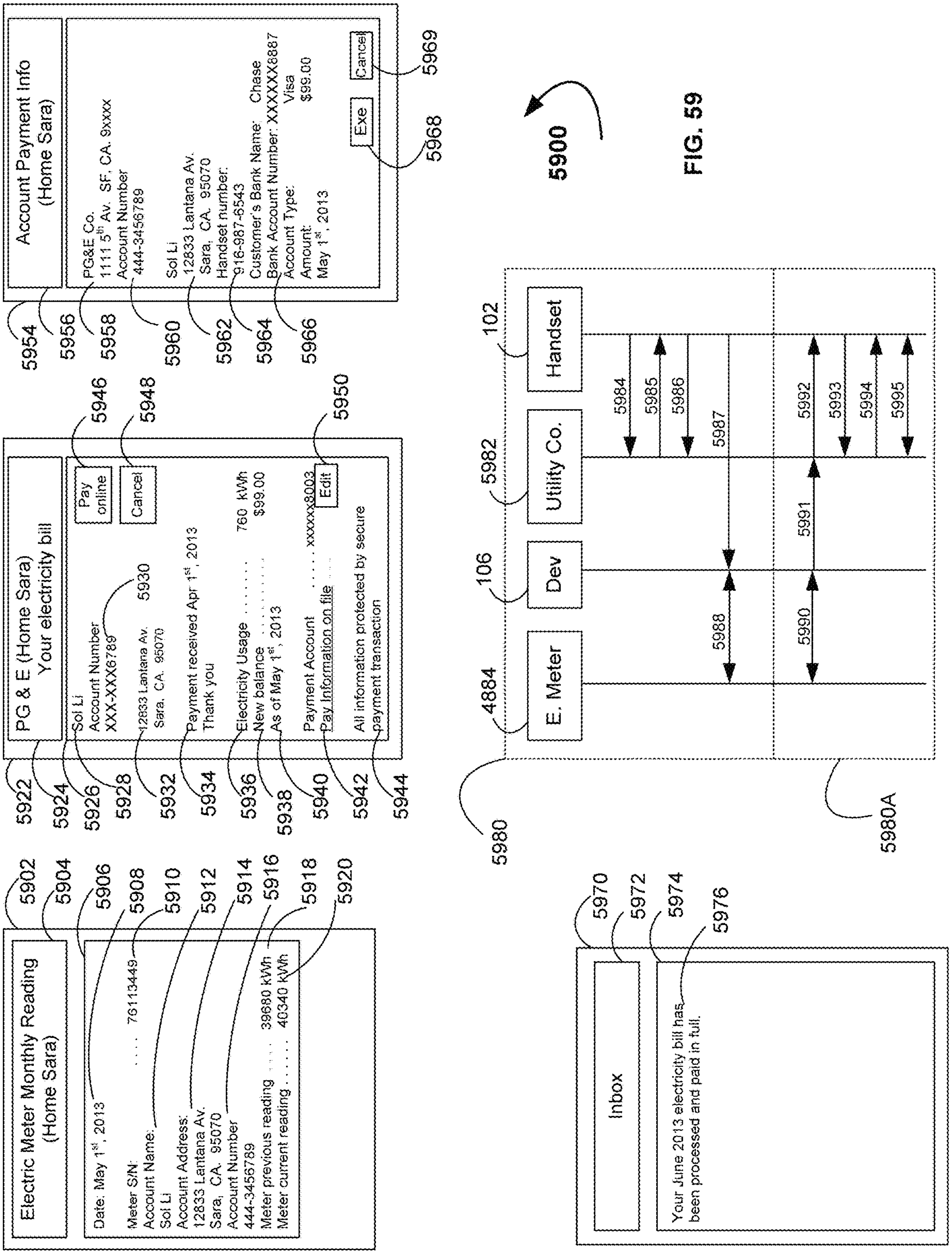

FIGS. 58 and 59 illustrate preferred examples of embodiments 5800 and 5900 of the present invention. The exemplary embodiment 5800 presents preferred steps taken by a user in his/her handset to set up the payment account, view the meter reading, and program the Electric Meter of the Dev's Home Control and Monitor system.

When the user executes the Electric Meter icon 4871/5071 in Home Appliances 4851/5051, which makes the handset 102 navigate to Electric Meter Menu 5804, as shown on its screen 5802. The Electric Meter Menu 5804 contains Account Setup 5810, which when programmed, allows the interaction between the Dev 106, the handset 102, the electric meter 4884, and the utility company 5982. The user then can pay the electricity bill online using the handset 102 or the utility company 5982 will be paid automatically every month. Meter Reading 5806 and Account Payment 5808 let user view current electric meter reading and past account billings (screen 5954). The Pay online icon 5812 lets user pay any account outstanding and the Monthly Usage Inf. Icon 5814 let user view past account usage activity 5822.

The user selects the Account Setup icon 5810 which makes the handset 102 navigate to screen 5820 showing the Account Application Setup 5822. It requires the user to fill out user's name 5826, address 5828, handset phone number 5830 and Utility's web address 5832 (Utility web address 5832 preferably came pre-filled with electric meter application EA 4866/5066 in FIG. 48/50; otherwise user obtains it from the said company either by phone, text message, downloading or any other means). The handset screen 5820*a* shows the required information filled by the user, who then executes the Exe icon 5834*a*, which makes handset 102 transmit the information 5824*a* to the Utility Company 5982 (also as shown in step S984, flow diagram 5980). The Utility Company 5982 processes the application data, and then transmits back (step S985) to the user's handset 102, the partially filled Account Payment Setup information 5844, as shown in the handset screen 5840. Window 5844 shows the Utility Company name 5846, the user/customer assigned account number 5848, the Electric Meter S/N 5850 (Serial Number or identification number since each meter is used to measure electricity usage and hooked to its corresponding residence/business address. It is for device identification during its communication with the Dev since there might be a plurality of devices in close proximity i.e., apartment or high rise building) and the utility company payment web address (URL) 5852.

Field 5844 also shows customer's name, address, and phone number 5854 and 5856 (filled out previously in screen 5820*a*). The user fills out the remainder information, such as: Bank Name 5858, Payer's Bank Account Number 5860 and type of payment 5862. When the user finishes as shown in screen 5840*a*, with the Auto Pay icon 5863*a* unchecked, and executes Exe icon 5864 which makes the handset 102 transmit back (step S986) to the Utility Company 5982 the information as shown in field 5844*a*. The handset 102 also transmits a copy of it 5844*a* to the Dev 106 as shown in step S987 and the Dev 106 in turn communicates with the Electric Meter 4884 as shown in step S988 using the S/N 5850*a* to make sure it communicates with and reading from the right device. The Dev 106 also uses the utility company URL 5852*a* to send the month electricity reading to the utility company 5982 account payment department. Auto payment box 5863 (checked) allows user to pay automatically every month.

On the first of each month (reading from RTC 240), the Dev 106 communicates and reads (step S990) the electricity usage from the Electric Meter 4884 and transmits the reading information 5920 (screen 5902) as shown in step S991 to the Utility Co. 5982. The utility company 5982 processes and sends (step S992) the bill 5924 to user's handset 102 as shown in screen 5922. The field 5926 outlines the user's monthly electricity usage 5936 and the required payment 5938 for the month 5940. It also shows that the payment information is on file 5942 (URL link to the utility company database server) and can be edited 5950 if there are any changes in the payment information. The payment information also is hyper-linked to the Pay online icon 5946, which when executed by the user, makes the handset 102 transmit the information (step S993) to the Utility Co. 5982, which transmits back (step S994) the payment information screen 5954. The user then can make the payment by executing 5968, which makes the handset send the payment command, and receives (step S995) the confirmation 5970 in the inbox from the Utility Co. 5982.

The application software allows the Dev 106 to communicate with the Electric Meter 4884 and the handset 102 is controlled by EA software 4866/5066 in FIG. 48/50 which has been transmitted from the Electric Meter 4884 (or alternatively downloaded from App Server whose URL provided by the Electric Meter 4884) with one copy into the Dev 106 and one into the handset 102.

This embodiment can also be similarly applicable to the Water Meter, Cooking & Heating Gas Meter and the like.

FIG. 60A illustrates a preferred activation example of embodiment 6000A of the present invention. This exemplary embodiment presents preferred steps taken by a user in his/her handset to monitor, and talk with the Help Alert wearer, via the Dev's Home Appliances system remotely.

It illustrates one aspect of the invention when handset user or help alert wearer needs to communicate with each other. The Dev 106 communicates with Help Alert device 4874, so the user can monitor (via his/her handset) the well being of the person who wears said device. The device 4874 preferably consists of a wireless camera and the voice recognition integrated circuit so the Help Alert 4874 connects to the Dev 106, which transmits a message and rings up the user's handset 102, in order for its wearer to communicate with the handset user. When the device wearer says a sentence, such as: "Hi Dave (i.e., name of handset's user), I want to talk to you", the Help Alert device 4874 transmits the command to the Dev 106, which in turn rings up the user's handset, and also preferably transmits a text message. When the user answers the call, then the conversation takes place. As soon as the user hangs up or if there is no audio variation for 5 minutes, the Dev 106 will stop the audio communication to the Help Alert device 4874.

When the user selects the Help Alert icon 6061, the handset 102 navigates to screen 6002 where the Help Alert Menu 6004 consists of the Talk icon 6008 and the Monitor icon 6006. When the user selects the Monitor icon 6006, the handset will transmit the command to the Dev 106 which connects to the Help Alert device 4874 camera and transmits back to the handset 102 what the camera sees and thus allows the user to monitor what is in front of the wearer (to monitor the well-being of his/her elder parent for instance). When the user selects the Talk icon 6008, the handset will transmit the command to the Dev 106 which then answers and connects to the Help Alert device 4874 audio, and thus allows the conversation to take place. The Help Alert device 4874 also preferably is able to detect vibration, such as a fall so that it can send commands to the Dev 106, which alerts the user of such an event, and he/she can immediately monitor and talk to the wearer.

The application software allows the Dev 106 to communicate with the Help Alert 4874 and the handset 102 is controlled by the HA software 4856/5056 in FIG. 48/50, which has been transmitted from the Help Alert 4874 (or alternatively downloaded from App Server whose URL provided by the Help Alert 4874), with one copy in the Dev 106 and one in the handset 102.

FIG. 60B illustrates a preferred activation example of embodiment 6000B of the present invention. This exemplary embodiment presents preferred steps taken by a user in his/her handset to answer, talk, and monitor the visitor, who rings the door bell and intercom via the Dev's Home Control and Monitor System remotely.

When a visitor rings the door bell (step 6082 in flow diagram 6080), the Bell & Intercom 4886 transmits command (step 6084) to the Dev 106 which alerts (step 6086) the user via his/her handset screen 6020. The user then scrolls to the inbox 6040 and sees the Door Bell ringing message 6042. The user then executes the Talk icon 6044 (in order to answer to door), which makes the handset 102 navigate to the Door Bell Intercom menu 6052 in screen 6050. This makes the handset 102 establish the cellular connection (step 6088) to the Dev 106, which conducts the audio duplex transmission (6090) with the front door intercom (Door Bell & Intercom 4886 in FIG. 48/50), thus allows the user to talk to the bell ringer, through his/her handset. The Door Bell Intercom menu 6052 allows the user and the visitor to communicate with each other, through the front door speaker and microphone, without the visitor realizing that the user (i.e., the house owner) may not be at home, at the moment. The user can also put the conversation on speaking phone 6054, make it mute 6056, or put it temporarily on hold 6058. This embodiment makes the unexpected visitor believe that somebody is at home, and any intention of breaking into the house therefore hopefully can be avoided.

The application software which allows the Dev 106 communicate with the Door Bell & Intercom 4886 and the handset 102 is controlled by the BA software 4868/5068 in FIG. 48/50 which has been transmitted from the Door Bell & Intercom 4886 (or alternatively downloaded from the App Server whose URL provided by the Door Bell & Intercom 4886) with one copy into the Dev 106 and one into the handset 102.

Figure 61:
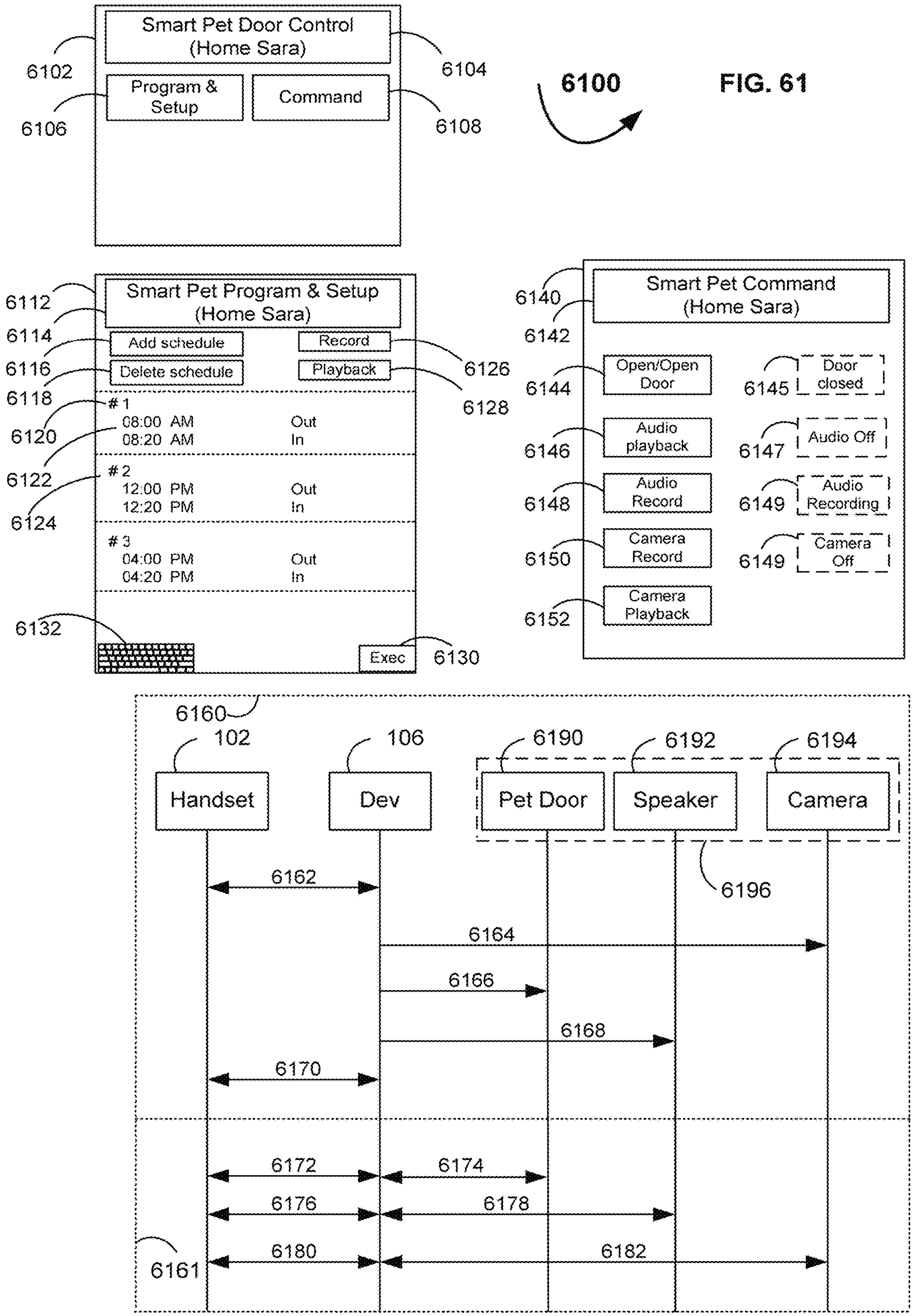
FIG. 61 shows a preferred example of handset's screen displays and a flow diagram, presenting the communication of handset 102 and Dev 106, when user uses his/her handset 102 to program, set up and control (via the Dev 106) the integrated smart pet door control system, relating to the present invention in the home application.

FIG. 61 illustrates a preferred activation example of embodiment 6100 of the present invention. This exemplary embodiment presents preferred steps taken by a user in his/her handset in order to program, set up, and control the Integrated Smart Pet Door (its door, speakers and cameras), via the Dev's Home Control and Monitor System remotely.

The user sets up the Pet Program and Monitor system by executing the Smart Pet Door icon 6077 (in screen 6051 of FIG. 60), making the handset 102 navigate to the Smart Pet Door Control menu 6102. The Program & Setup icon 6106 will let the user schedule his/her pets' need to go out doing their things and the Command icon 6108 allows the user to command its accessories to do certain task relating to their daily needs in real time.

The Program and Setup control (screen 6112 after the user executes icon 6106) lets the user schedule (Add schedule icon 6116), such as: schedule #1 (6120) and schedule #2 (6124) showing the time for the pets to go out of the house and back in (6122). It also lets user delete old schedules (Delete schedule icon 6118). The user has the option of recording the scene in order to play back if he/she needs to verify that the schedule meets their needs. This exemplary embodiment shows that the user schedules the pets do go out three times a day, and each lasts 20 minutes (8:00 AM-8:20 AM, 12 PM-12:20 PM and 04:20 PM-04:20 PM). Chart 6160 illustrates the actions taken by the Dev 106 at schedule time. At the starting time (i.e., 8:00 AM), the Dev 106 sends the Open Door command to the Pet Door 6190 (step 6166), transmits the audio recording the owner's calling the pets on the speaker 6192 (step 6168) to trick them out of the house and optionally turns on the camera (step 6164). At the end time (i.e., 8:20 AM), the Dev 106 transmits the audio recording the owner's calling the pets on the speaker 6192 (step 6168) to induce them back into the house, sends the Close Door command to the Pet Door 6190 (step 6166) and turns off the camera (step 6164).

The Smart Pet Command menu (screen 6140 after the user executes icon 6108) allows the user to open or close the pet door icon 6144 (steps 6172 and 6174) in real time, and let him/her view its status icon 6145. The user can try calling the pet through the speaker 6192 while holding on Call Pets icon 6146 (also shown in steps 6176 and 6178). He/she can record his/her audio (his/her voice onto the Dev 106) call icon 6150 calling to the pets, to play it on the speaker, or play it back to listen to it (icon 6148). The user can record the video and play it back (icons 6152 and 6154, and also in steps 6180 and 6182). This allows the owner the peace of mind on the daily needs of his/her pets and there is no urgency about getting home on time, or asks somebody to do the task.

Similarly the Dev 106 can be programmed to transmit commands to the Smart Pet Feeder (6079 in screen 6051 of FIG. 60A)) and schedule it of the pet feeding time, the right amount of food and alert the handset 102 when the feeder needs to be refilled. Preferably the owner can also program the Dev 106 via the handset 102 to cancel these tasks when they are no longer needed; and remove their software applications from both the handset 102 and the Dev 106, as previously described in FIG. 52, regarding other house-hold devices.

Figure 62:
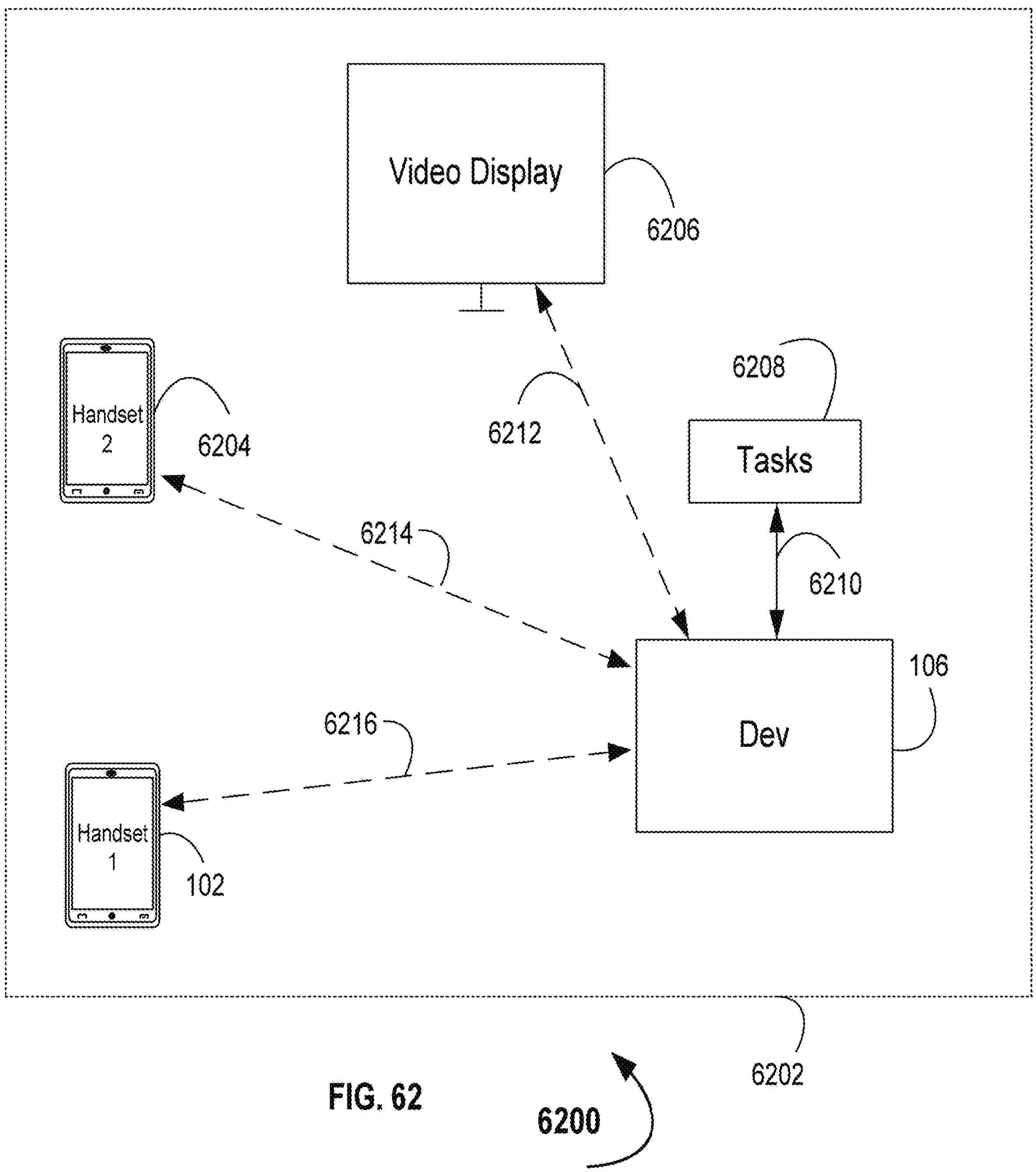
FIG. 62 shows a preferred example of the interaction of various devices, relating to the present invention in the robotic application.

FIG. 62 illustrates a preferred activation example of embodiment 6200 of the present invention for robotic application. This exemplary embodiment presents the communication interaction between the Dev 106, and the plurality of other mobile devices in the robotic application, where a plurality of users (handsets) can program, control and monitor said Dev in fulfilling its task.

It illustrates the operation performed or carried out by the Dev 106 regarding the tasks or functions 6208 through the communication link/connector 6210 connecting to its I/O interface 438 (FIG. 4). The Dev 106 performs the task 6208 using its I/O control 401 (FIG. 4), such as: Lighting Control 410 on behalf of the handset 102 (user) for brightness, Temperature Sensors 404 to check the environment reading, Audio I/O 408 for voice/sound, Video I/O 406 for seeing and General I/O 412 for performing and controlling various steps and procedures in order to complete a task. The Video screen 6206 projects images from the video I/O 406 so a third party can observe and participate in. An unregistered handset 6204 (which as mentioned earlier in FIG. 1, can be a smart phone, tablet PC, laptop PC, iPad-like device, PDA [Personal Digital Assistant] or any portable electronic device) user can be invited (registered) by the handset 102 user (through the Device Configure Process in FIG. 19/20) to actively participate in carrying out the task 6208. Connections 6214 and 6216 are preferably cellular 118 and 6212 is preferably wired/wireless LAN but they can also be any wireless network. Task 6208 can be a robotic device on medical surgery, robotic moving, flying and steering devices on rescue operation inside a collapsed building, houses on fire or a rescue operation where human cannot have access to.

While this invention has been described in terms of several embodiments, there are alterations, modifications, permutations, and substitute equivalents, which fall within the scope of this invention. It should also be noted that there are many alternative ways of implementing the methods and systems of the present invention. It is therefore intended that the following appended claims be interpreted as including all such alterations, modifications, permutations, and substitute equivalents as fall within the true spirit and scope of the present invention.

What is claimed is:

1. In a wireless controller for a smart new appliance, useful for communicating wirelessly with a registered mobile device over a mobile network and short range communication (SRC) network and for communicating, controlling, monitoring wirelessly with at least one of its household device/auto accessory device over a short range communication (SRC) network, the method comprising:

receiving at a first new appliance a biometric data and its associated data from a registered mobile device, wherein the biometric data includes a set of biometrical parameters;

associating said biometrical parameters with a user;

communicating at the new appliance with a plurality of household devices;

receiving at the new appliance a new biometric signal collected from at least one of the plurality of household devices;

verifying at the new appliance the new biometric signal against at least one of the associated biometrical parameters;

generating a response to the verified new biometric signal; and transmitting the response to at least one of the plurality of household devices.

2. The method of claim 1 further comprising:

receiving at the new appliance a command from the registered mobile device which receives said command from its user's voice command;

translating at the new appliance said command and transmitting the translated command to at least one device associated with the new appliance; and transmitting at the new appliance a voice response to the registered mobile device.

3. The method of claim 1 further comprising:

receiving at the new appliance a voice command beginning with a default name associated with the new appliance from a user along with a signal from a registered mobile device and registering said voice command as a descriptive name voice command which has a recognizable and descriptive name;

receiving at the new appliance the descriptive name voice command from said user and transmitting said descriptive name voice command to at least one household appliance associated with at least one of: the new appliance, a vehicle and at least one accessory associated with the new appliance; and generating at the new appliance a voice response to said user.

4. The method of claim 1 further comprising:

receiving at the new appliance a voice recognition command from a registered mobile device;

receiving at the new appliance voice input from the user and processing said voice input through a voice recognition layer;

associating at the new appliance said voice command from said mobile device with its owner;

receiving at the new appliance a new voice command from said mobile device and transmitting said new voice command to at least one household appliance associated with at least one of: the new appliance, a vehicle and at least one accessory associated with the new appliance; and generating at the new appliance a voice response to said mobile device.

5. The method of claim 1 further comprising:

receiving at the new appliance a voice command beginning with a default name associated with the new appliance from a user along with a signal from a registered mobile device and registering said voice command as a descriptive voice command;

receiving at the new appliance a List Appliances command in audio from the user; and transmitting at the new appliance a list of household appliances associated with the new appliance in audio format.

6. The method of claim 1 further comprising: receiving at the new appliance a voice command beginning with a default name associated with the new appliance from a user along with a signal from a registered mobile device and registering said voice command as a descriptive voice command; receiving at the new appliance an intended voice key word change command from a user; and changing and transmitting a changed keyword associated with said intended voice key word change command in audio format.

7. A wireless controller for a smart new appliance, useful for communicating wirelessly with a registered mobile device over a mobile and short range communication (SRC) network, the wireless controller comprising:

a transceiver configured to communicate with all its peripherals and associated third party devices, wherein the transceiver is further configured to receiving at a first new appliance a biometric data and its associated data from a registered mobile device, wherein the biometric data includes a set of biometrical parameters;

a processor configured to associate said biometrical parameters with a user;

the transceiver further configured to communicate at the new appliance with a plurality of household devices, and receive at the new appliance a new biometric signal collected from at least one of the plurality of household devices;

the processor further configured to verify at the new appliance the new biometric signal against at least one of the associated biometrical parameters, and generate a response to the verified new biometric signal; and the transceiver further configured to transmit the response to at least one of the plurality of household devices.

8. In a wireless controller for a smart new appliance, useful for communicating wirelessly with a registered mobile device over a mobile network and short range communication (SRC) network and for communicating, controlling, monitoring wirelessly with at least one of its household device/auto accessory device over a short range communication (SRC) network, the method comprising:

receiving at a first new appliance a biometric data and its associated data from said mobile device biometric data from at least one of its household or auto accessory devices, wherein the biometric data includes a set of biometrical parameters;

associating said biometrical parameters with a user;

communicating at the new appliance with a plurality of household devices;

receiving at the new appliance a new biometric signal collected from at least one of the plurality of household devices;

verifying at the new appliance the new biometric signal against at least one of the associated biometrical parameters;

generating a response to the verified new biometric signal; and transmitting the response to at least one of the plurality of household devices.

9. In a wireless controller for a smart new appliance, useful for communicating wirelessly with a registered mobile device over a mobile network and short range communication (SRC) network and for communicating, controlling, monitoring wirelessly with at least one of its household device/auto accessory device over a short range communication (SRC) network, the method comprising:

receiving at a first new appliance a biometric parameter and its associated data from at least one of its household or auto accessory devices while detecting the presence of a registered mobile device within its vicinity; and associating said biometrical parameter with a user;

receiving at a first new appliance a biometric data and its associated data from a mobile device biometric data from at least one of its household or auto accessory devices, wherein the biometric data includes a set of biometrical parameters;

associating said biometrical parameters with a user;

communicating at the new appliance with a plurality of household devices;

receiving at the new appliance a new biometric signal collected from at least one of the plurality of household devices;

verifying at the new appliance the new biometric signal against at least one of the associated biometrical parameters;

generating a response to the verified new biometric signal; and transmitting the response to at least one of the plurality of household devices.

* * * * *